United States Patent
Mertes et al.

(10) Patent No.: US 12,056,383 B2
(45) Date of Patent: Aug. 6, 2024

(54) EDGE MANAGEMENT SERVICE

(71) Applicant: PURE STORAGE, INC., Mountain View, CA (US)

(72) Inventors: Lawrence Mertes, San Jose, CA (US); Taher Vohra, Sunnyvale, CA (US); Kelvie Wong, Vancouver (CA); Robert Lee, San Carlos, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 119 days.

(21) Appl. No.: 17/849,367

(22) Filed: Jun. 24, 2022

(65) Prior Publication Data

US 2022/0334725 A1    Oct. 20, 2022

Related U.S. Application Data

(63) Continuation-in-part of application No. 17/496,587, filed on Oct. 7, 2021, now Pat. No. 11,941,279, which is a continuation-in-part of application No. 17/157,006, filed on Jan. 25, 2021, now Pat. No. 11,675,520, which is a continuation-in-part of application No. 16/661,724, filed on Oct. 23, 2019, (Continued)

(51) Int. Cl.
   *G06F 3/06*    (2006.01)
   *G06F 16/27*   (2019.01)

(52) U.S. Cl.
   CPC .......... *G06F 3/065* (2013.01); *G06F 3/0617* (2013.01); *G06F 3/067* (2013.01); *G06F 16/275* (2019.01)

(58) Field of Classification Search
   CPC ........ G06F 3/065; G06F 3/0617; G06F 3/067; G06F 3/0665; G06F 3/0605; G06F 16/275
   See application file for complete search history.

(56) References Cited

U.S. PATENT DOCUMENTS

| | | | |
|---|---|---|---|
| 5,706,210 A | 1/1998 | Kumano et al. | |
| 5,799,200 A | 8/1998 | Brant et al. | |

(Continued)

FOREIGN PATENT DOCUMENTS

| | | |
|---|---|---|
| CN | 116368458 A | 6/2023 |
| EP | 0725324 A2 | 8/1996 |

(Continued)

OTHER PUBLICATIONS

Bellamy-Mcintyre et al., "OpenID and the Enterprise: A Model-based Analysis of Single Sign-On Authentication", 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

(Continued)

*Primary Examiner* — Hiep T Nguyen

(57) ABSTRACT

In a particular embodiment, a storage service agent on an edge device is configured to access a particular set of storage system application programming interfaces (APIs) of at least one enterprise storage system, where the storage service agent communicatively coupled to a cloud-based storage service. The storage service agent invokes one or more storage system APIs of the particular set of storage system APIs in response to a control message from the cloud-based storage service.

19 Claims, 41 Drawing Sheets

Related U.S. Application Data now Pat. No. 11,086,555, which is a continuation of application No. 15/842,850, filed on Dec. 14, 2017, now Pat. No. 10,503,427.

(60) Provisional application No. 63/346,715, filed on May 27, 2022, provisional application No. 63/227,480, filed on Jul. 30, 2021, provisional application No. 63/089,800, filed on Oct. 9, 2020, provisional application No. 62/598,989, filed on Dec. 14, 2017, provisional application No. 62/518,071, filed on Jun. 12, 2017, provisional application No. 62/502,060, filed on May 5, 2017, provisional application No. 62/470,172, filed on Mar. 10, 2017.

(56) References Cited

U.S. PATENT DOCUMENTS

| | | |
|---|---|---|
| 5,933,598 A | 8/1999 | Scales et al. |
| 6,012,032 A | 1/2000 | Donovan et al. |
| 6,085,333 A | 7/2000 | Dekoning et al. |
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,200,887 B2 | 6/2012 | Bennett |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,081,713 B1 | 7/2015 | Bennett |
| 9,124,569 B2 | 9/2015 | Hussain et al. |
| 9,134,922 B2 | 9/2015 | Rajagopal et al. |
| 9,189,334 B2 | 11/2015 | Bennett |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,311,182 B2 | 4/2016 | Bennett |
| 9,444,822 B1 | 9/2016 | Borowiec et al. |
| 9,507,532 B1 | 11/2016 | Colgrove et al. |
| 9,632,870 B2 | 4/2017 | Bennett |
| 9,933,947 B1 | 4/2018 | Vokaliga et al. |
| 10,095,428 B1 | 10/2018 | Meiri et al. |
| 10,503,427 B2 | 12/2019 | Botes et al. |
| 11,086,555 B1 | 8/2021 | Botes et al. |
| 11,675,520 B2 | 6/2023 | Karr |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison et al. |
| 2005/0188246 A1 | 8/2005 | Emberty et al. |
| 2005/0216800 A1 | 9/2005 | Bicknell et al. |
| 2005/0273565 A1 | 12/2005 | Hirakawa et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2006/0288178 A1 | 12/2006 | Yagawa et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Pinto et al. |
| 2014/0101434 A1 | 4/2014 | Senthurpandi et al. |
| 2014/0143367 A1 | 5/2014 | Dahlin et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |

(56) References Cited

U.S. PATENT DOCUMENTS

| | | | |
|---|---|---|---|
| 2014/0201541 A1 | 7/2014 | Paul et al. | |
| 2014/0208155 A1 | 7/2014 | Pan | |
| 2014/0215590 A1 | 7/2014 | Brand | |
| 2014/0229654 A1 | 8/2014 | Goss et al. | |
| 2014/0230017 A1 | 8/2014 | Saib | |
| 2014/0258526 A1 | 9/2014 | Le Sant et al. | |
| 2014/0282983 A1 | 9/2014 | Ju et al. | |
| 2014/0285917 A1 | 9/2014 | Cudak et al. | |
| 2014/0325262 A1 | 10/2014 | Cooper et al. | |
| 2014/0351627 A1 | 11/2014 | Best et al. | |
| 2014/0373104 A1 | 12/2014 | Gaddam et al. | |
| 2014/0373126 A1 | 12/2014 | Hussain et al. | |
| 2015/0026387 A1 | 1/2015 | Sheredy et al. | |
| 2015/0074463 A1 | 3/2015 | Jacoby et al. | |
| 2015/0089569 A1 | 3/2015 | Sondhi et al. | |
| 2015/0095515 A1 | 4/2015 | Krithivas et al. | |
| 2015/0113203 A1 | 4/2015 | Dancho et al. | |
| 2015/0121137 A1 | 4/2015 | McKnight et al. | |
| 2015/0134920 A1 | 5/2015 | Anderson et al. | |
| 2015/0149822 A1 | 5/2015 | Coronado et al. | |
| 2015/0193169 A1 | 7/2015 | Sundaram et al. | |
| 2015/0378888 A1 | 12/2015 | Zhang et al. | |
| 2016/0026442 A1 | 1/2016 | Chhaparia | |
| 2016/0098323 A1 | 4/2016 | Mutha et al. | |
| 2016/0173367 A1 | 6/2016 | Sareen et al. | |
| 2016/0205182 A1 | 7/2016 | Lazar et al. | |
| 2016/0283139 A1 | 9/2016 | Brooker et al. | |
| 2016/0350009 A1 | 12/2016 | Cerreta et al. | |
| 2016/0352720 A1 | 12/2016 | Hu et al. | |
| 2016/0352830 A1 | 12/2016 | Borowiec et al. | |
| 2016/0352834 A1 | 12/2016 | Borowiec et al. | |
| 2017/0046234 A1 | 2/2017 | Yang et al. | |
| 2017/0149883 A1 | 5/2017 | Joshi et al. | |
| 2017/0155713 A1 | 6/2017 | Powell et al. | |
| 2018/0081562 A1 | 3/2018 | Vasudevan | |
| 2018/0089101 A1 | 3/2018 | Sternberg et al. | |
| 2018/0260125 A1 | 9/2018 | Botes et al. | |
| 2019/0146675 A1 | 5/2019 | Subramanian et al. | |
| 2020/0026425 A1 | 1/2020 | Memon et al. | |
| 2021/0124762 A1 | 4/2021 | Chen et al. | |
| 2022/0027051 A1 | 1/2022 | Kant et al. | |
| 2022/0241869 A1* | 8/2022 | Marell | B23B 27/1607 |
| 2022/0326886 A1* | 10/2022 | Baturin | G06F 9/5077 |
| 2022/0410398 A1* | 12/2022 | Sisley | G06Q 10/06316 |
| 2022/0413823 A1* | 12/2022 | Wu | G06F 21/57 |
| 2023/0128271 A1* | 4/2023 | Liu | G06N 3/063 706/12 |

FOREIGN PATENT DOCUMENTS

| | | |
|---|---|---|
| EP | 2638469 A1 | 9/2013 |
| EP | 3414653 A1 | 12/2018 |
| WO | 2012087648 A2 | 6/2012 |
| WO | 2013071087 A1 | 5/2013 |
| WO | 2013163650 A1 | 10/2013 |
| WO | 2014110137 A1 | 7/2014 |
| WO | 2016004120 A2 | 1/2016 |
| WO | 2016015008 A1 | 1/2016 |
| WO | 2016100790 A1 | 6/2016 |
| WO | 2016190938 A1 | 12/2016 |
| WO | 2016195759 A1 | 12/2016 |
| WO | 2016195958 A1 | 12/2016 |
| WO | 2016195961 A1 | 12/2016 |
| WO | 2018164782 A1 | 9/2018 |
| WO | 2022076856 A1 | 4/2022 |

OTHER PUBLICATIONS

ETSI, "Network Function Virtualisation (NFV); Resiliency Requirements", ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Faith, "dictzip file format", GitHub.com (online), accessed Jul. 28, 2015, 1 page, URL: github.com/fidlej/idzip.

Google Search of "storage array define" performed by the Examiner on Nov. 4, 2015 for U.S. Appl. No. 14/725,278, Results limited to entries dated before 2012, 1 page.

Hota et al., "Capability-based Cryptographic Data Access Control in Cloud Computing", International Journal of Advanced Networking and Applications, col. 1, Issue 1, Aug. 2011, 10 pages, Eswar Publications, India.

Hu et al., "Container Marking: Combining Data Placement, Garbage Collection and Wear Levelling for Flash", 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, Apr. 29, 2016, 12 pages.

International Search Report and Written Opinion, PCT/US2016/015008, May 4, 2016, 12 pages.

International Search Report and Written Opinion, PCT/US2016/016333, Jun. 8, 2016, 12 pages.

International Search Report and Written Opinion, PCT/US2016/020410, Jul. 8, 2016, 12 pages.

International Search Report and Written Opinion, PCT/US2016/032052, Aug. 30, 2016, 17 pages.

International Search Report and Written Opinion, PCT/US2016/032084, Jul. 18, 2016, 12 pages.

International Search Report and Written Opinion, PCT/US2016/035492, Aug. 17, 2016, 10 pages.

International Search Report and Written Opinion, PCT/US2016/036693, Aug. 29, 2016, 10 pages.

International Search Report and Written Opinion, PCT/US2016/038758, Oct. 7, 2016, 10 pages.

International Search Report and Written Opinion, PCT/US2016/040393, Sep. 22, 2016, 10 pages.

International Search Report and Written Opinion, PCT/US2016/044020, Sep. 30, 2016, 11 pages.

International Search Report and Written Opinion, PCT/US2016/044874, Oct. 7, 2016, 11 pages.

International Search Report and Written Opinion, PCT/US2016/044875, Oct. 5, 2016, 13 pages.

International Search Report and Written Opinion, PCT/US2016/044876, Oct. 21, 2016, 12 pages.

International Search Report and Written Opinion, PCT/US2016/044877, Sep. 29, 2016, 13 pages.

International Search Report and Written Opinion, PCT/US2018/016125, Apr. 20, 2018, 13 pages.

International Search Report and Written Opinion, PCT/US2021/054230, Feb. 10, 2022, 16 pages.

Kong, "Using PCI Express as the Primary System Interconnect in Multiroot Compute, Storage, Communications and Embedded Systems", White Paper, IDT.com (online), Aug. 28, 2008, 12 pages, URL: www.idt.com/document/whp/idt-pcie-multi-root-white-paper.

Li et al., "Access Control for the Services Oriented Architecture", Proceedings of the 2007 ACM Workshop on Secure Web Services (SWS '07), Nov. 2007, pp. 9-17, ACM New York, NY.

Microsoft, "Hybrid for SharePoint Server 2013—Security Reference Architecture", Microsoft (online), Oct. 2014, 53 pages, URL: hybrid.office.com/img/Security_Reference_Architecture.pdf.

Microsoft, "Hybrid Identity Management", Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Microsoft, "Hybrid Identity", Microsoft (online), Apr. 2014, 36 pages, URL: www.aka.ms/HybridIdentityWp.

PCMAG, "Storage Array Definition", Published May 10, 2013, URL: http://web.archive.org/web/20130510121646/http://www.pcmag.com/encyclopedia/term/52091/storage-array, 2 pages.

Storer et al., "Secure Data Deduplication", Proceedings of the 4th ACM International Workshop on Storage Security and Survivability (StorageSS'08), Oct. 2008, 10 pages, ACM New York, NY. USA, DOI: 10.1145/1456469.1456471.

(56) References Cited

OTHER PUBLICATIONS

Sweere, "Creating Storage Class Persistent Memory with NVDIMM", Published in Aug. 2013, Flash Memory Summit 2013, URL: http://ww.flashmemorysummit.com/English/Collaterals/Proceedings/2013/20130814_T2_Sweere.pdf, 22 pages.

Techopedia, "What is a disk array", techopedia.com (online), Jan. 13, 2012, 1 page, URL: web.archive.org/web/20120113053358/http://www.techopedia.com/definition/1009/disk-array.

Webopedia, "What is a disk array", webopedia.com (online), May 26, 2011, 2 pages, URL: web/archive.org/web/20110526081214/http://www.webopedia.com/TERM/D/disk_array.html.

Wikipedia, "Convergent Encryption", Wikipedia.org (online), accessed Sep. 8, 2015, 2 pages, URL: en.wikipedia.org/wiki/Convergent_encryption.

* cited by examiner

EDGE MANAGEMENT SERVICE

CROSS-REFERENCE TO RELATED APPLICATIONS

This is a continuation in-part application for patent entitled to a filing date and claiming the benefit of earlier-filed U.S. patent application Ser. No. 17/496,587, filed Oct. 7, 2021, which claims benefit of U.S. Provisional Applications 63/227,480, filed Jul. 30, 2021 and 63/089,800, filed Oct. 9, 2020, and is a continuation in-part of U.S. patent Ser. No. 17/157,006, filed Jan. 25, 2021, which is a continuation in-part of U.S. Pat. No. 11,086,555, issued Aug. 10, 2021, which is a continuation of U.S. Pat. No. 10,503,427, issued Dec. 10, 2019, which claims benefit of U.S. Provisional Applications 62/598,989, filed Dec. 14, 2017, 62/518,071, filed Jun. 12, 2017, 62/502,060, filed May 5, 2017, and 62/470,172, filed Mar. 10, 2017; this application also claims benefit of U.S. Provisional Patent Application No. 63/346,715, filed May 27, 2022.

DESCRIPTION OF EMBODIMENTS

Figure 1A:
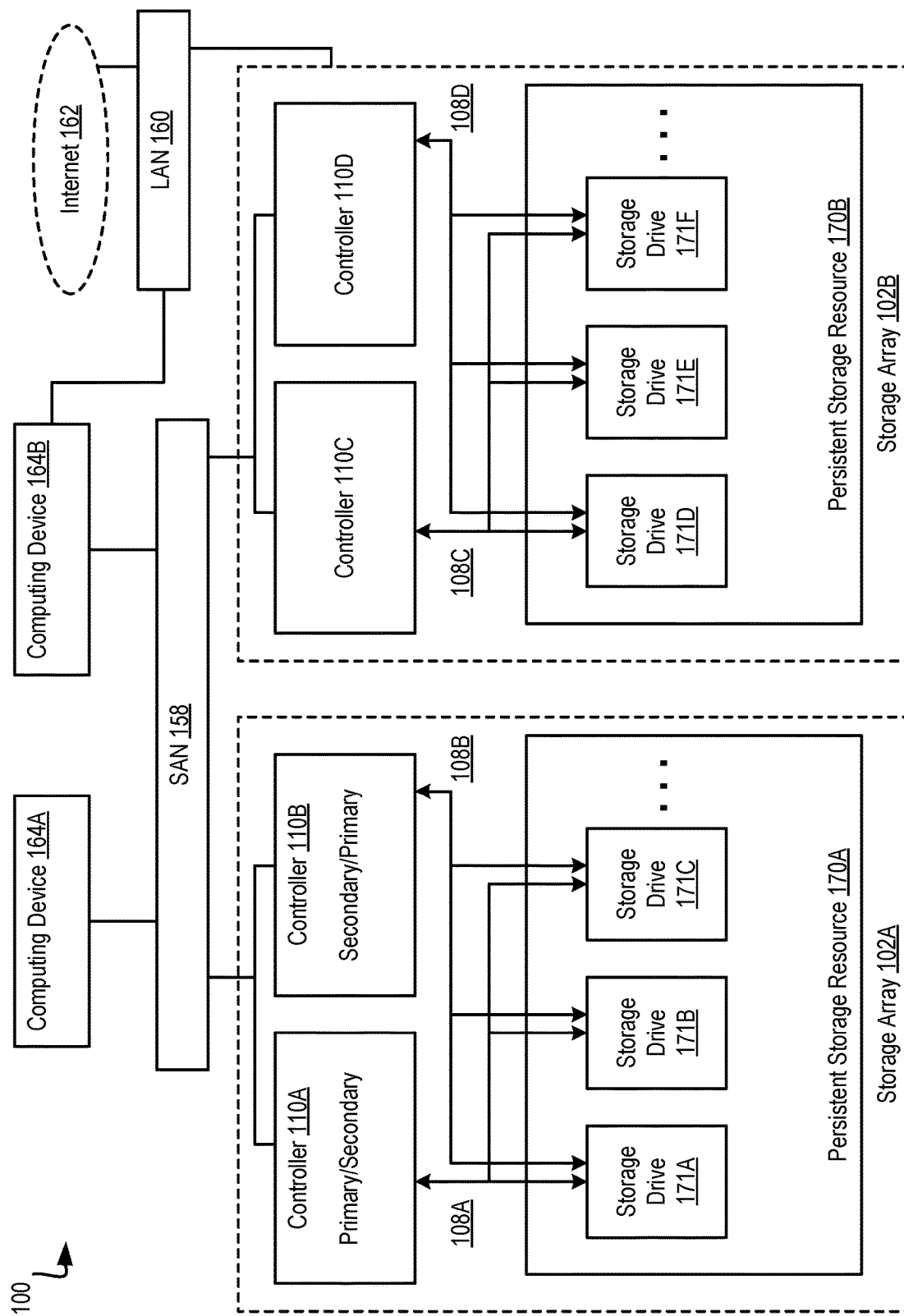
FIG. 1A illustrates a first example system for data storage in accordance with some implementations.

Example methods, apparatus, and products for an edge management service in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller 110A-D (e.g., storage array controller 110A) of a storage system 100 may be designated with primary status (also referred to as "primary controller" herein), and other storage array controllers 110A-D (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
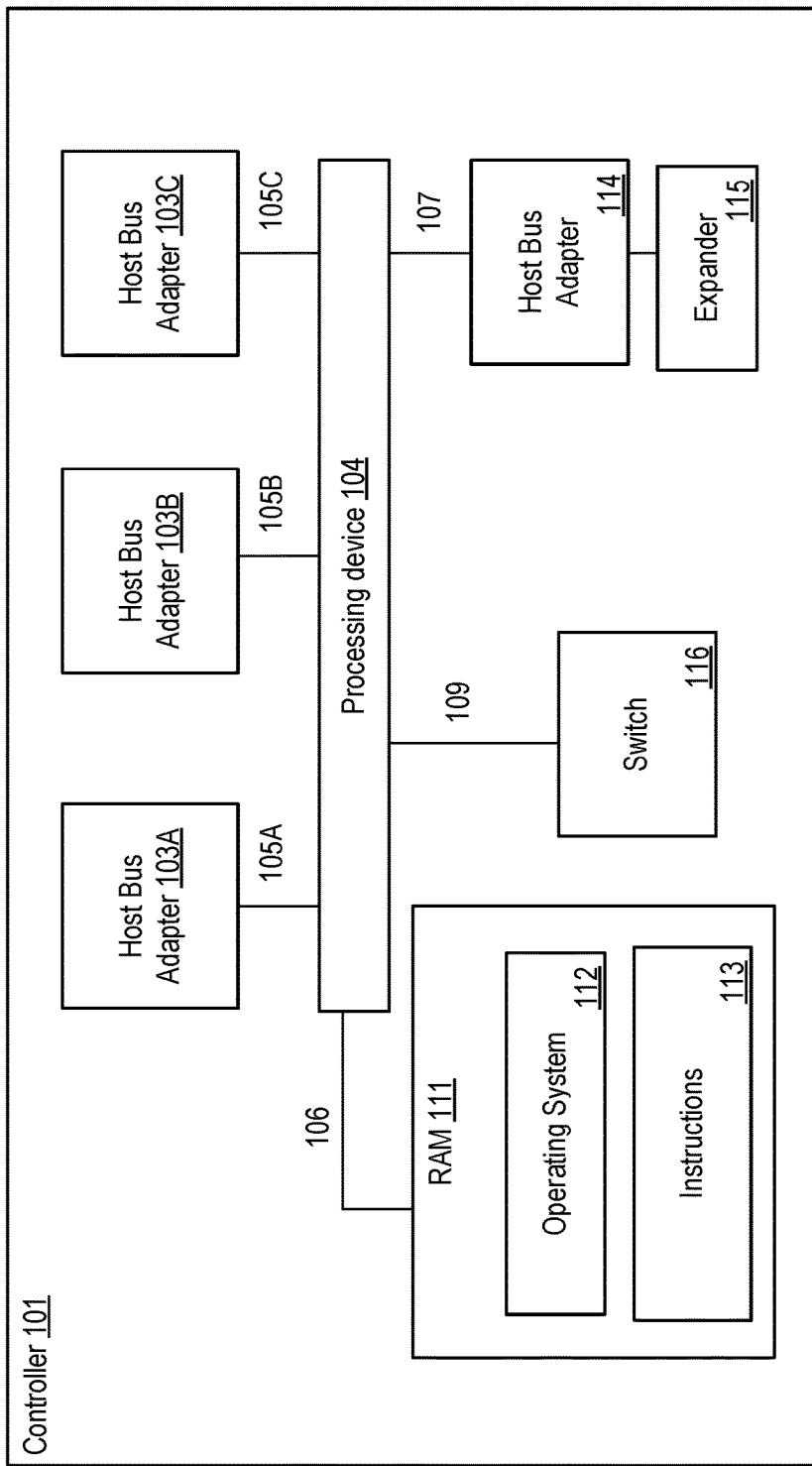
FIG. 1B illustrates a second example system for data storage in accordance with some implementations.

FIG. 1B illustrates an example system for data storage, in accordance with some implementations. Storage array controller 101 illustrated in FIG. 1B may be similar to the storage array controllers 110A-D described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an ASIC, an FPGA, a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

In implementations, storage drive 171A-F may be one or more zoned storage devices. In some implementations, the one or more zoned storage devices may be a shingled HDD. In implementations, the one or more storage devices may be a flash-based SSD. In a zoned storage device, a zoned namespace on the zoned storage device can be addressed by groups of blocks that are grouped and aligned by a natural size, forming a number of addressable zones. In implementations utilizing an SSD, the natural size may be based on the erase block size of the SSD. In some implementations, the zones of the zoned storage device may be defined during initialization of the zoned storage device. In implementations, the zones may be defined dynamically as data is written to the zoned storage device.

In some implementations, zones may be heterogeneous, with some zones each being a page group and other zones being multiple page groups. In implementations, some zones may correspond to an erase block and other zones may correspond to multiple erase blocks. In an implementation, zones may be any combination of differing numbers of pages in page groups and/or erase blocks, for heterogeneous mixes of programming modes, manufacturers, product types and/or product generations of storage devices, as applied to heterogeneous assemblies, upgrades, distributed storages, etc. In some implementations, zones may be defined as having usage characteristics, such as a property of supporting data with particular kinds of longevity (very short lived or very long lived, for example). These properties could be used by a zoned storage device to determine how the zone will be managed over the zone's expected lifetime.

It should be appreciated that a zone is a virtual construct. Any particular zone may not have a fixed location at a storage device. Until allocated, a zone may not have any location at a storage device. A zone may correspond to a number representing a chunk of virtually allocatable space that is the size of an erase block or other block size in various implementations. When the system allocates or opens a zone, zones get allocated to flash or other solid-state storage memory and, as the system writes to the zone, pages are written to that mapped flash or other solid-state storage memory of the zoned storage device. When the system closes the zone, the associated erase block(s) or other sized block(s) are completed. At some point in the future, the system may delete a zone which will free up the zone's allocated space. During its lifetime, a zone may be moved around to different locations of the zoned storage device, e.g., as the zoned storage device does internal maintenance.

In implementations, the zones of the zoned storage device may be in different states. A zone may be in an empty state in which data has not been stored at the zone. An empty zone may be opened explicitly, or implicitly by writing data to the zone. This is the initial state for zones on a fresh zoned storage device, but may also be the result of a zone reset. In some implementations, an empty zone may have a designated location within the flash memory of the zoned storage device. In an implementation, the location of the empty zone may be chosen when the zone is first opened or first written to (or later if writes are buffered into memory). A zone may be in an open state either implicitly or explicitly, where a zone that is in an open state may be written to store data with write or append commands. In an implementation, a zone that is in an open state may also be written to using a copy command that copies data from a different zone. In some implementations, a zoned storage device may have a limit on the number of open zones at a particular time.

A zone in a closed state is a zone that has been partially written to, but has entered a closed state after issuing an explicit close operation. A zone in a closed state may be left available for future writes, but may reduce some of the run-time overhead consumed by keeping the zone in an open state. In implementations, a zoned storage device may have a limit on the number of closed zones at a particular time. A zone in a full state is a zone that is storing data and can no longer be written to. A zone may be in a full state either after writes have written data to the entirety of the zone or as a result of a zone finish operation. Prior to a finish operation, a zone may or may not have been completely written. After a finish operation, however, the zone may not be opened a written to further without first performing a zone reset operation.

The mapping from a zone to an erase block (or to a shingled track in an HDD) may be arbitrary, dynamic, and hidden from view. The process of opening a zone may be an operation that allows a new zone to be dynamically mapped to underlying storage of the zoned storage device, and then allows data to be written through appending writes into the zone until the zone reaches capacity. The zone can be finished at any point, after which further data may not be written into the zone. When the data stored at the zone is no longer needed, the zone can be reset which effectively deletes the zone's content from the zoned storage device, making the physical storage held by that zone available for the subsequent storage of data. Once a zone has been written and finished, the zoned storage device ensures that the data stored at the zone is not lost until the zone is reset. In the time between writing the data to the zone and the resetting of the zone, the zone may be moved around between shingle tracks or erase blocks as part of maintenance operations within the zoned storage device, such as by copying data to keep the data refreshed or to handle memory cell aging in an SSD.

In implementations utilizing an HDD, the resetting of the zone may allow the shingle tracks to be allocated to a new, opened zone that may be opened at some point in the future. In implementations utilizing an SSD, the resetting of the zone may cause the associated physical erase block(s) of the zone to be erased and subsequently reused for the storage of data. In some implementations, the zoned storage device may have a limit on the number of open zones at a point in time to reduce the amount of overhead dedicated to keeping zones open.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
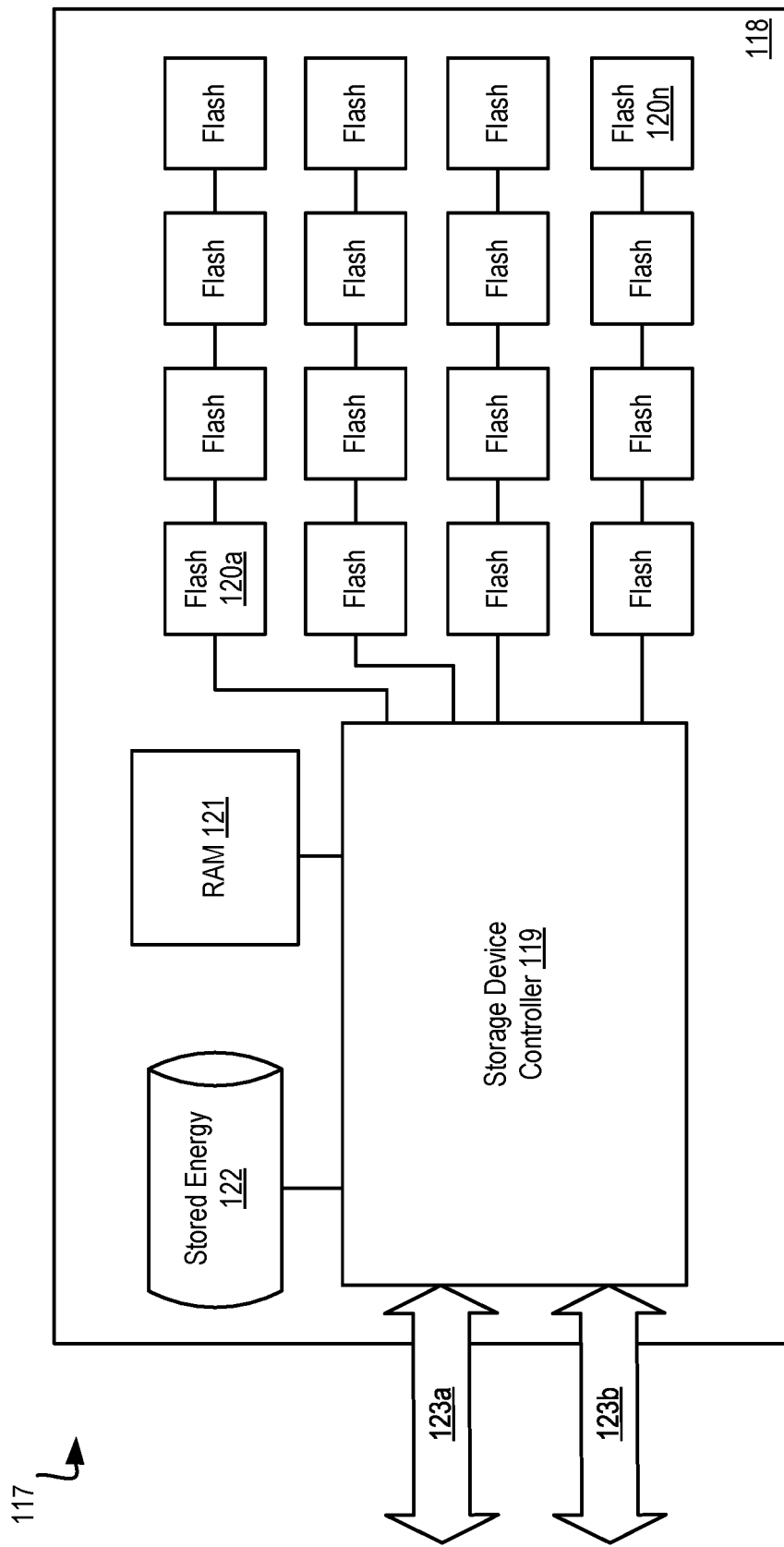
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage device controller 119. In one embodiment, storage device controller 119A-D may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119A-D as an addressable collection of Flash pages, erase blocks, and/or control elements sufficient to allow the storage device controller 119A-D to program and retrieve various aspects of the Flash. In one embodiment, storage device controller 119A-D may perform operations on flash memory devices 120a-n including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119A-D or multiple storage device controllers. The RAM 121 may be utilized for other purposes as well, such as temporary program memory for a processing device (e.g., a CPU) in the storage device controller 119.

In one embodiment, system 117 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119A-D may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119A-D from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119A-D may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119A-D may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 120a-120n stored energy device 122 may power storage device controller 119A-D and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the stored energy device 122 to measure corresponding discharge characteristics, etc. If the available energy decreases over time, the effective available capacity of the addressable fast-write storage may be decreased to ensure that it can be written safely based on the currently available stored energy.

Figure 1D:
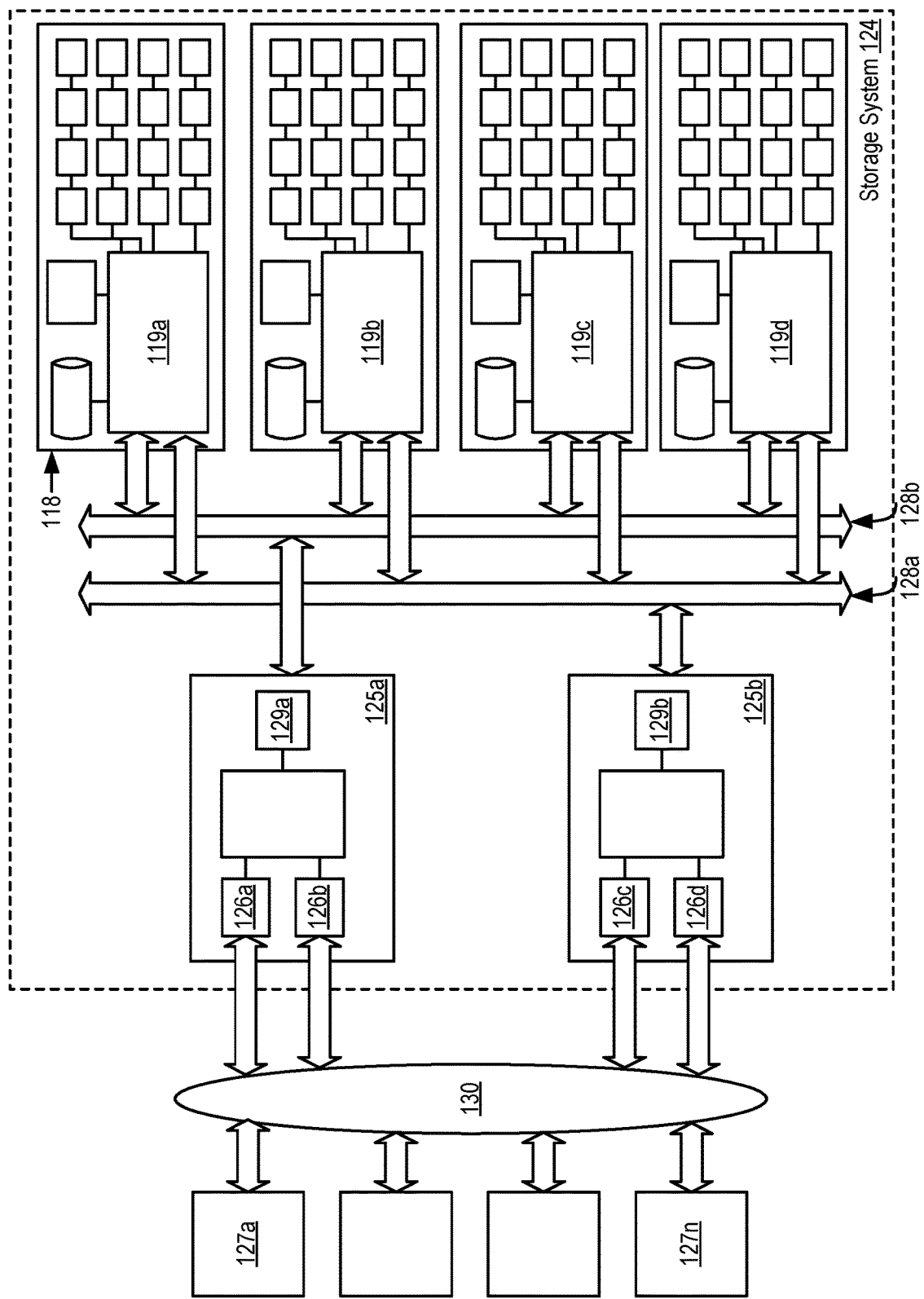
FIG. 1D illustrates a fourth example system for data storage in accordance with some implementations.

FIG. 1D illustrates a third example storage system 124 for data storage in accordance with some implementations. In one embodiment, storage system 124 includes storage controllers 125a, 125b. In one embodiment, storage controllers 125a, 125b are operatively coupled to Dual PCI storage devices. Storage controllers 125a, 125b may be operatively coupled (e.g., via a storage network 130) to some number of host computers 127a-n.

In one embodiment, two storage controllers (e.g., 125a and 125b) provide storage services, such as a SCS) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, storage controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one storage controller 125a to another storage controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119A-D may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
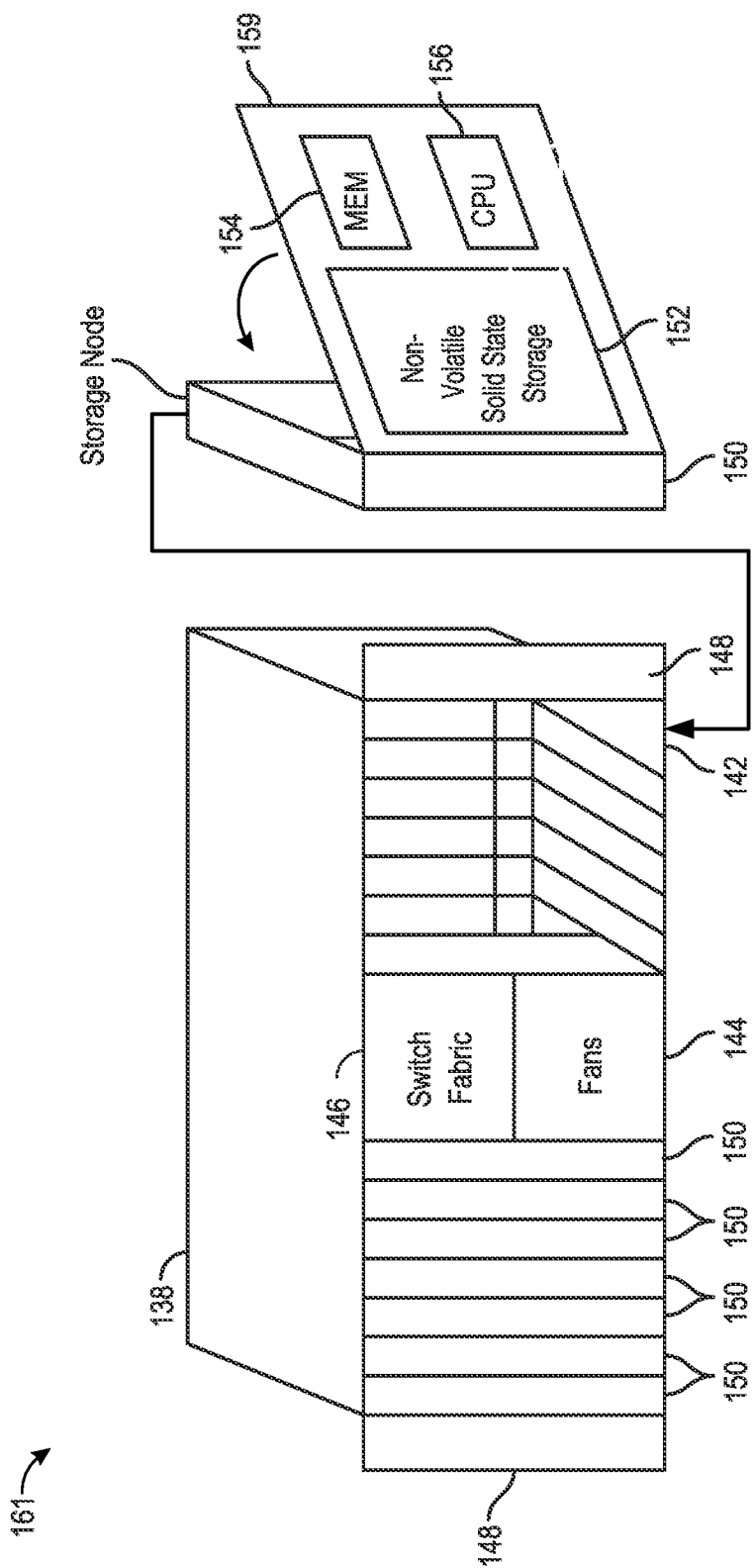
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage 152 units or storage nodes 150 within the chassis.

Figure 2B:
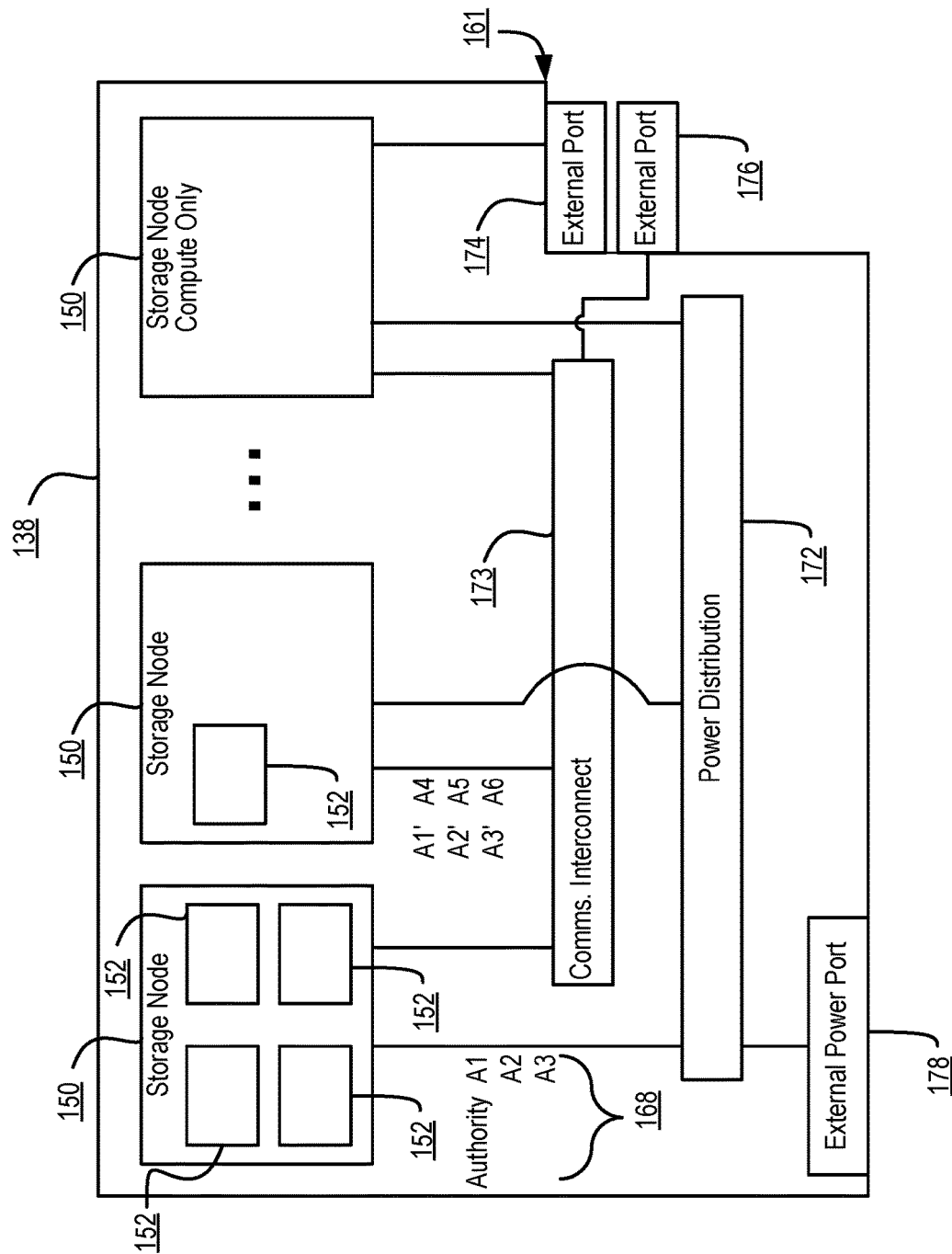
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storage 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storage 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storage 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In embodiments, authorities 168 operate to determine how operations will proceed against particular logical elements. Each of the logical elements may be operated on through a particular authority across a plurality of storage controllers of a storage system. The authorities 168 may communicate with the plurality of storage controllers so that the plurality of storage controllers collectively perform operations against those particular logical elements.

In embodiments, logical elements could be, for example, files, directories, object buckets, individual objects, delineated parts of files or objects, other forms of key-value pair databases, or tables. In embodiments, performing an operation can involve, for example, ensuring consistency, structural integrity, and/or recoverability with other operations against the same logical element, reading metadata and data associated with that logical element, determining what data should be written durably into the storage system to persist any changes for the operation, or where metadata and data can be determined to be stored across modular storage devices attached to a plurality of the storage controllers in the storage system.

In some embodiments the operations are token based transactions to efficiently communicate within a distributed system. Each transaction may be accompanied by or associated with a token, which gives permission to execute the transaction. The authorities 168 are able to maintain a pre-transaction state of the system until completion of the operation in some embodiments. The token based communication may be accomplished without a global lock across the system, and also enables restart of an operation in case of a disruption or other failure.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage 152 unit may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
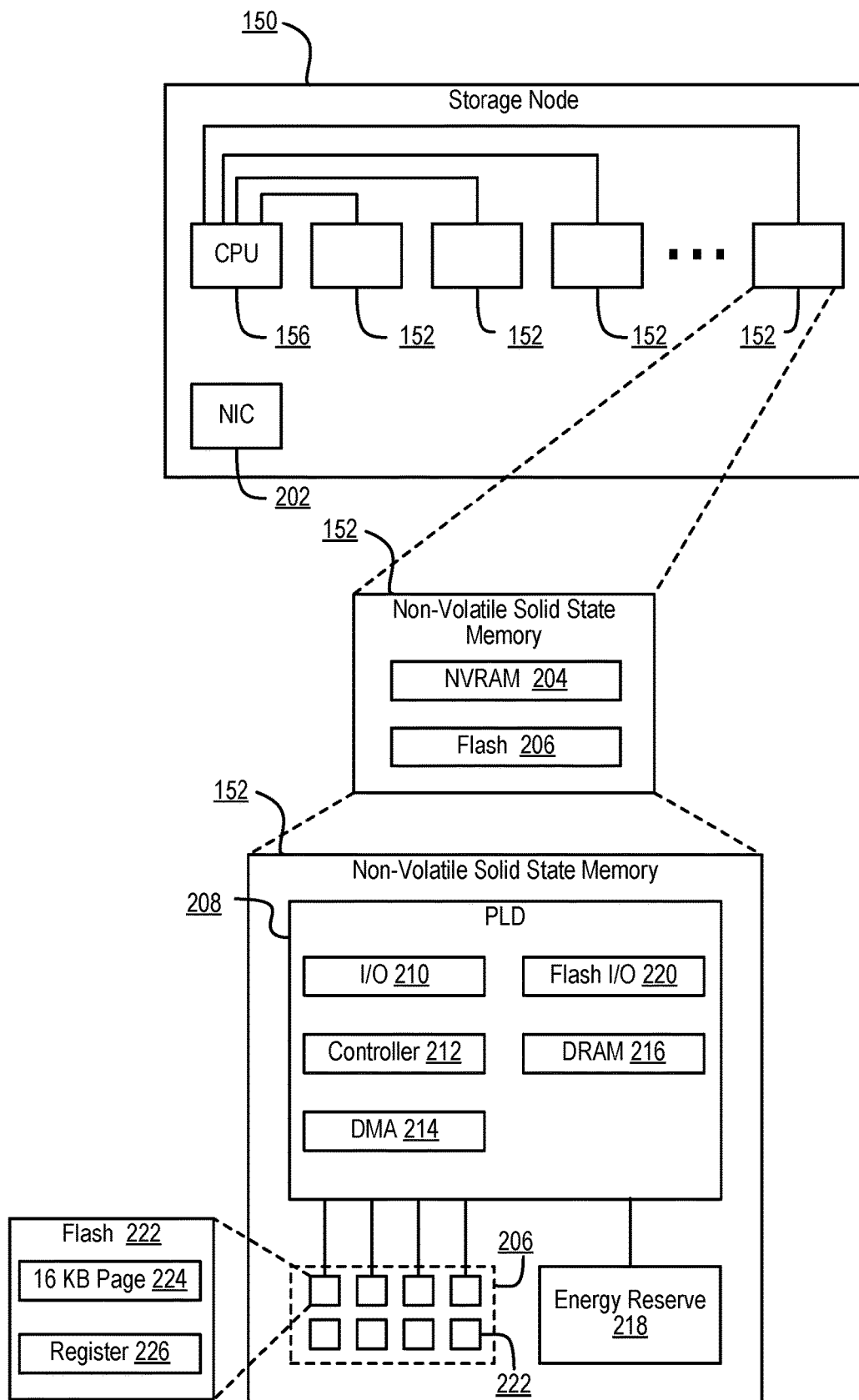
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e., multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., an FPGA. In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The non-volatile solid state storage 152 units described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple non-volatile sold state storage 152 units and/or storage nodes 150 cooperate in various ways (e.g., for erasure coding, data sharding, metadata communication and redundancy, storage capacity expansion or contraction, data recovery, and so on).

Figure 2D:
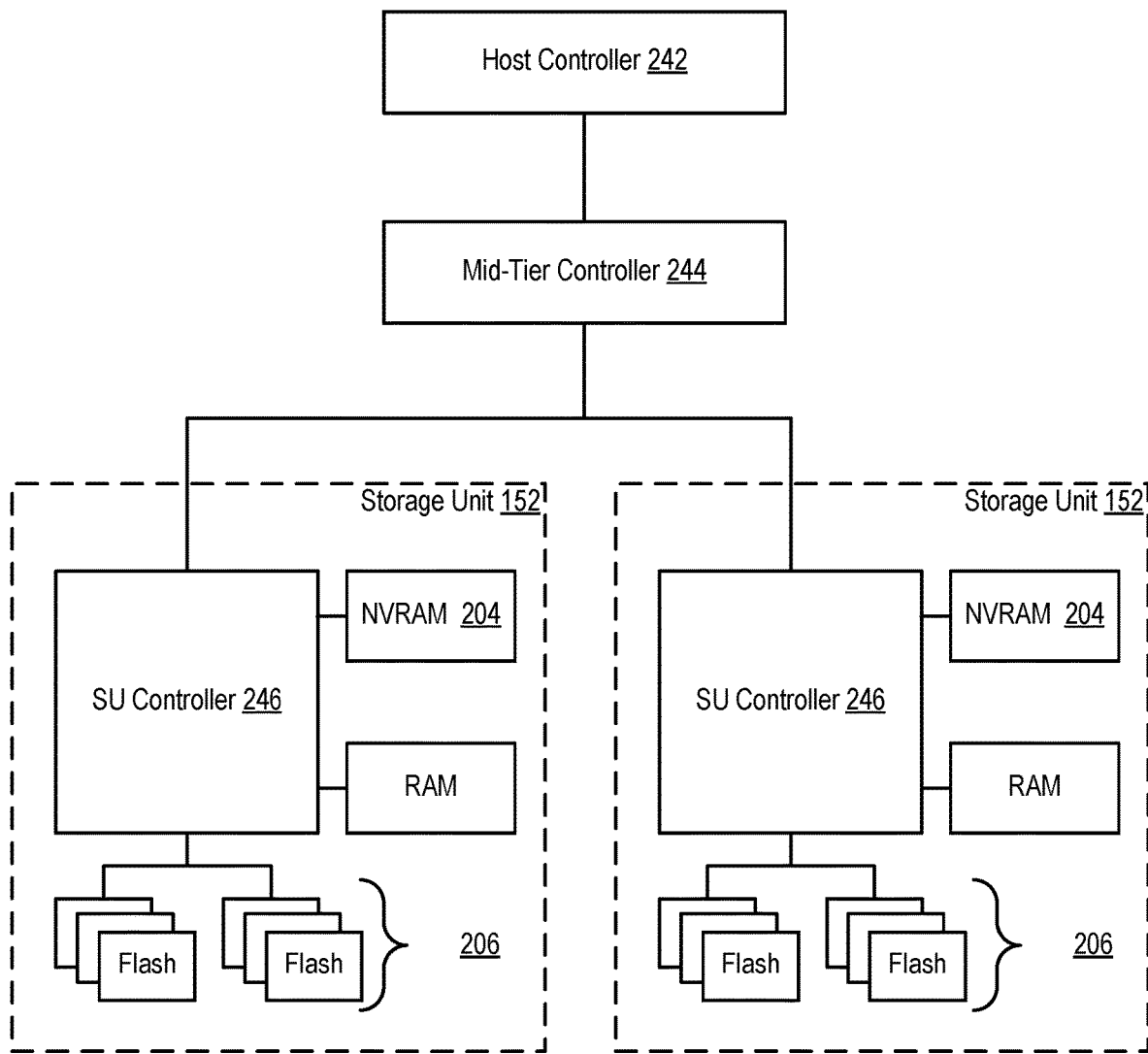
FIG. 2D shows a storage server environment, which uses embodiments of the storage nodes and storage units of some previous figures in accordance with some embodiments.

FIG. 2D shows a storage server environment, which uses embodiments of the storage nodes 150 and storage 152 units of FIGS. 2A-C. In this version, each non-volatile solid state storage 152 unit has a processor such as controller 212 (see FIG. 2C), an FPGA, flash memory 206, and NVRAM 204 (which is super-capacitor backed DRAM 216, see FIGS. 2B and 2C) on a PCIe (peripheral component interconnect express) board in a chassis 138 (see FIG. 2A). The non-volatile solid state storage 152 unit may be implemented as a single board containing storage, and may be the largest tolerable failure domain inside the chassis. In some embodiments, up to two non-volatile solid state storage 152 units may fail and the device will continue with no data loss.

The physical storage is divided into named regions based on application usage in some embodiments. The NVRAM 204 is a contiguous block of reserved memory in the non-volatile solid state storage 152 DRAM 216, and is backed by NAND flash. NVRAM 204 is logically rdivided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a non-volatile solid state storage 152 unit fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
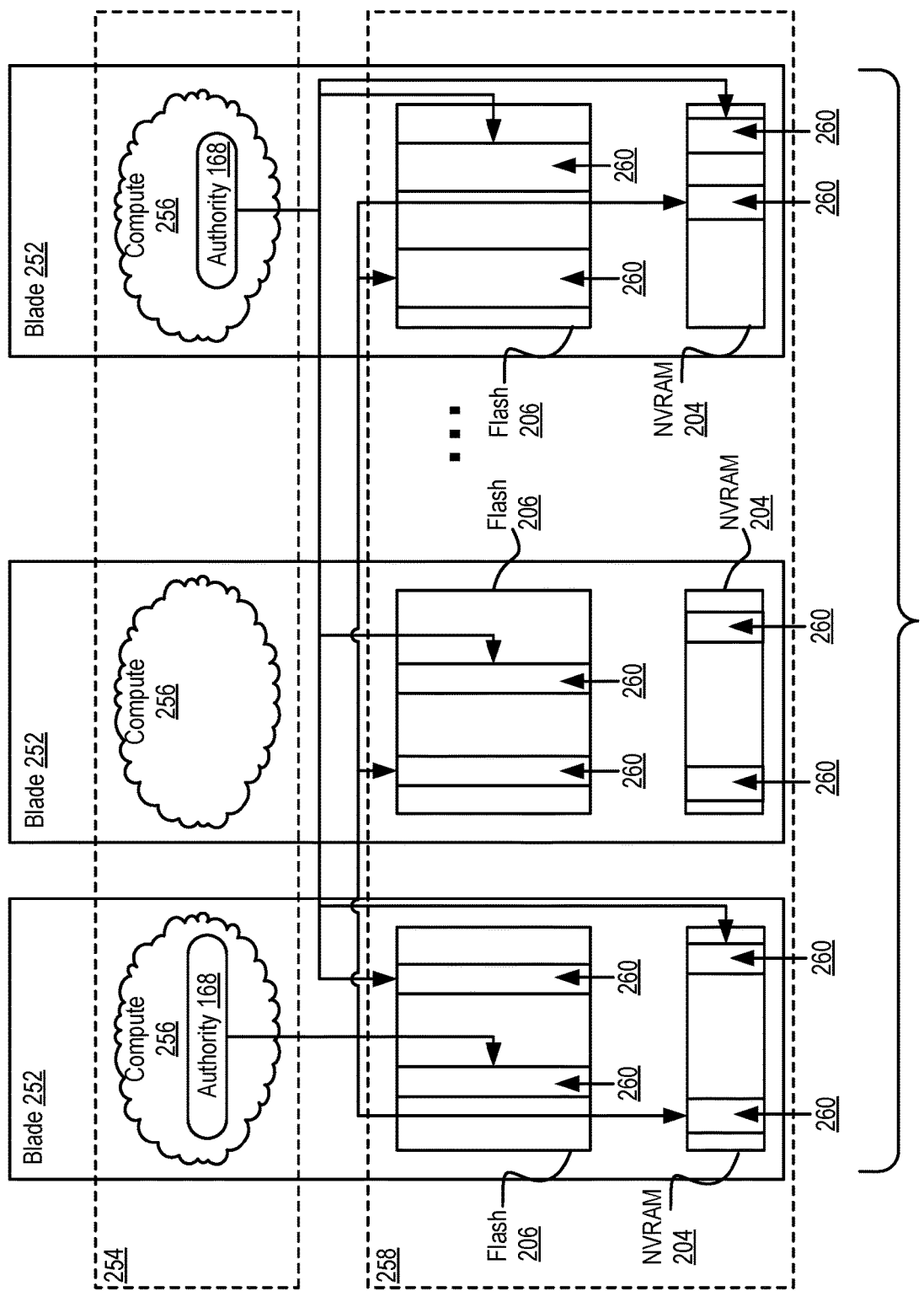
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources. In one embodiment, the compute plane 256 may perform the operations of a storage array controller, as described herein, on one or more devices of the storage plane 258 (e.g., a storage array).

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g., partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
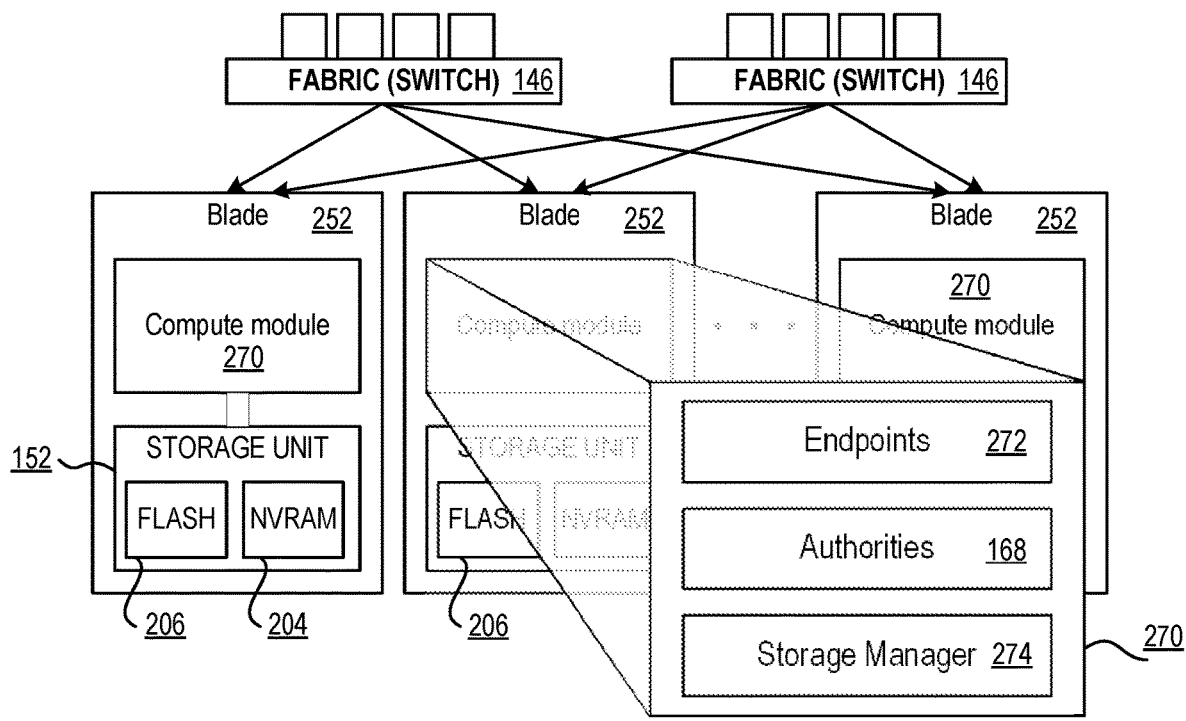
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
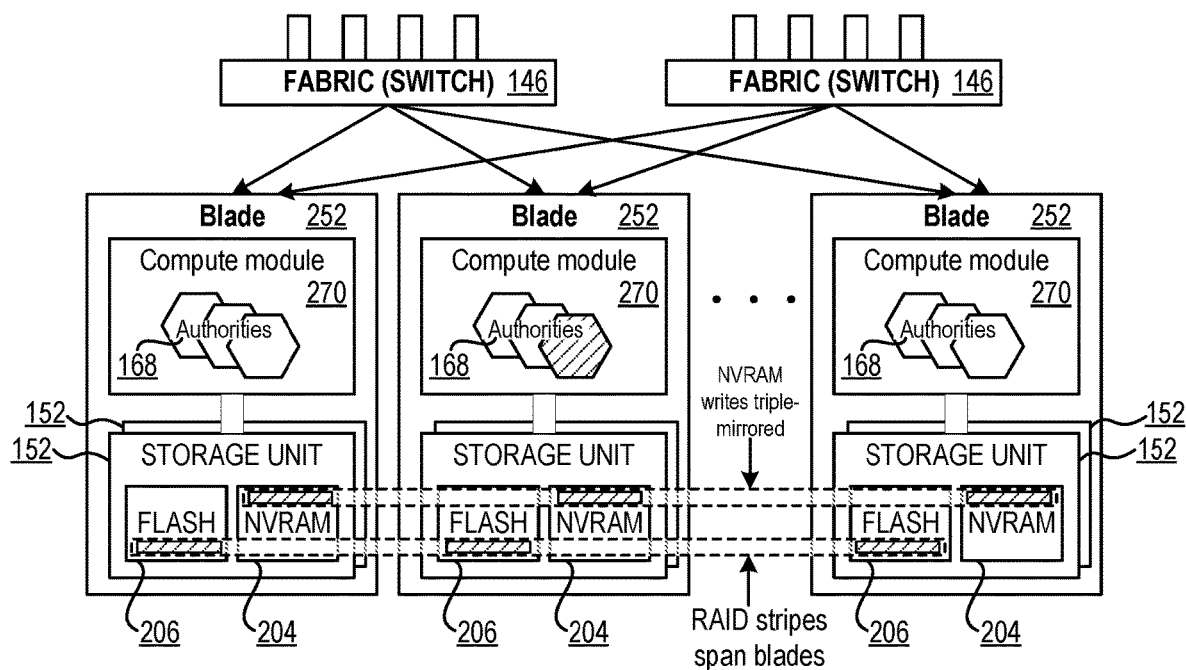
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
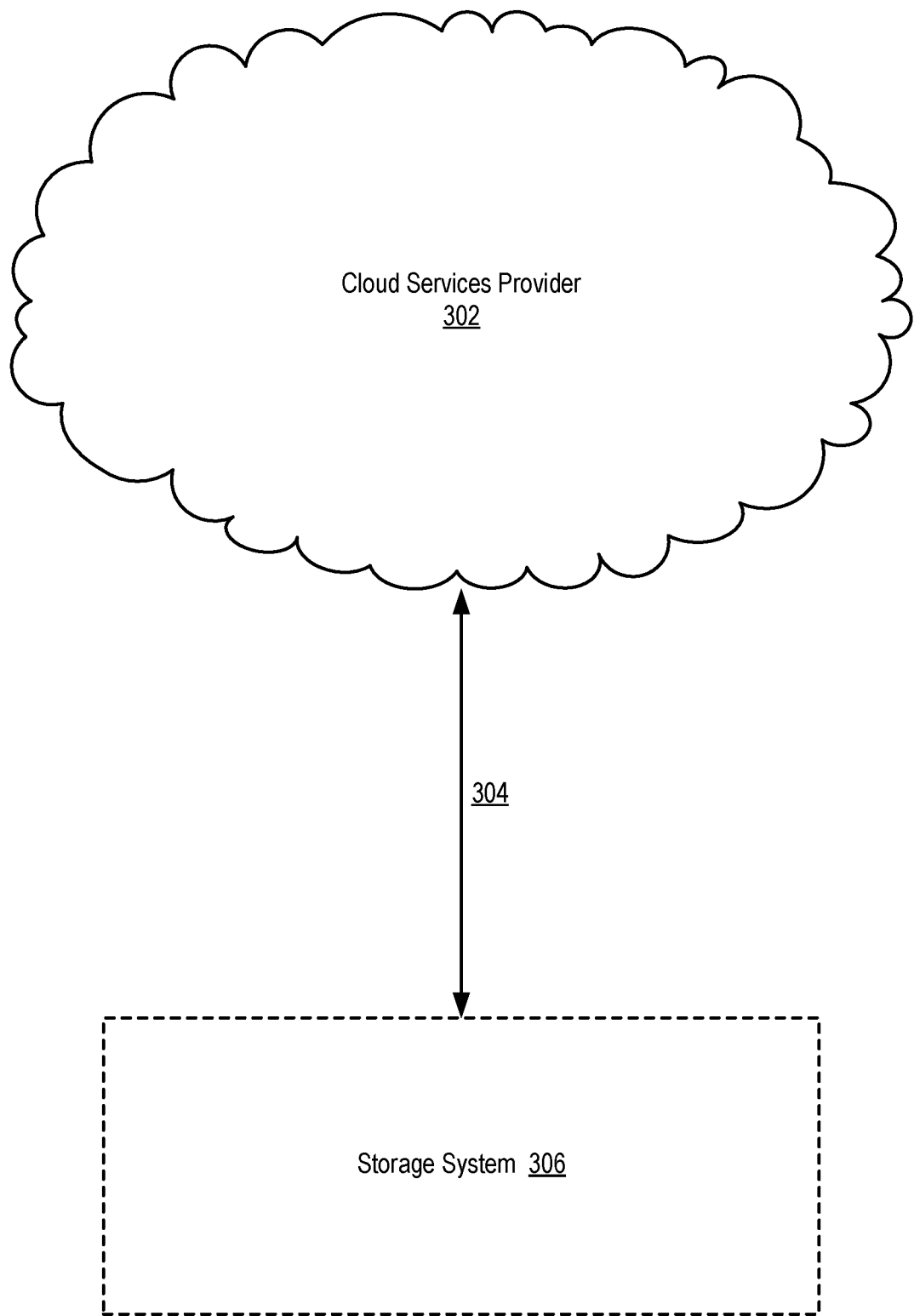
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or LAN, or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides a vast array of services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services through the implementation of an infrastructure as a service ('IaaS') service model, through the implementation of a platform as a service ('PaaS') service model, through the implementation of a software as a service ('SaaS') service model, through the implementation of an authentication as a service ('AaaS') service model, through the implementation of a storage as a service model where the cloud services provider 302 offers access to its storage infrastructure for use by the storage system 306 and users of the storage system 306, and so on. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. In still alternative embodiments, the cloud services provider 302 may be embodied as a mix of a private and public cloud services with a hybrid cloud deployment.

Although not explicitly depicted in FIG. 3A, readers will appreciate that a vast amount of additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage system 306 and remote, cloud-based storage that is utilized by the storage system 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model, eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive vast amounts of telemetry data phoned home by the storage system 306. Such telemetry data may describe various operating characteristics of the storage system 306 and may be analyzed for a vast array of purposes including, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Although the example depicted in FIG. 3A illustrates the storage system 306 being coupled for data communications with the cloud services provider 302, in other embodiments the storage system 306 may be part of a hybrid cloud deployment in which private cloud elements (e.g., private cloud services, on-premises infrastructure, and so on) and public cloud elements (e.g., public cloud services, infrastructure, and so on that may be provided by one or more cloud services providers) are combined to form a single solution, with orchestration among the various platforms. Such a hybrid cloud deployment may leverage hybrid cloud management software such as, for example, Azure™ Arc from Microsoft™, that centralize the management of the hybrid cloud deployment to any infrastructure and enable the deployment of services anywhere. In such an example, the hybrid cloud management software may be configured to create, update, and delete resources (both physical and virtual) that form the hybrid cloud deployment, to allocate compute and storage to specific workloads, to monitor workloads and resources for performance, policy compliance, updates and patches, security status, or to perform a variety of other tasks.

Readers will appreciate that by pairing the storage systems described herein with one or more cloud services providers, various offerings may be enabled. For example, disaster recovery as a service ('DRaaS') may be provided where cloud resources are utilized to protect applications and data from disruption caused by disaster, including in embodiments where the storage systems may serve as the primary data store. In such embodiments, a total system backup may be taken that allows for business continuity in the event of system failure. In such embodiments, cloud data backup techniques (by themselves or as part of a larger DRaaS solution) may also be integrated into an overall solution that includes the storage systems and cloud services providers described herein.

The storage systems described herein, as well as the cloud services providers, may be utilized to provide a wide array of security features. For example, the storage systems may encrypt data at rest (and data may be sent to and from the storage systems encrypted) and may make use of Key Management-as-a-Service ('KMaaS') to manage encryption keys, keys for locking and unlocking storage devices, and so on. Likewise, cloud data security gateways or similar mechanisms may be utilized to ensure that data stored within the storage systems does not improperly end up being stored in the cloud as part of a cloud data backup operation. Furthermore, microsegmentation or identity-based-segmentation may be utilized in a data center that includes the storage systems or within the cloud services provider, to create secure zones in data centers and cloud deployments that enables the isolation of workloads from one another.

Figure 3B:
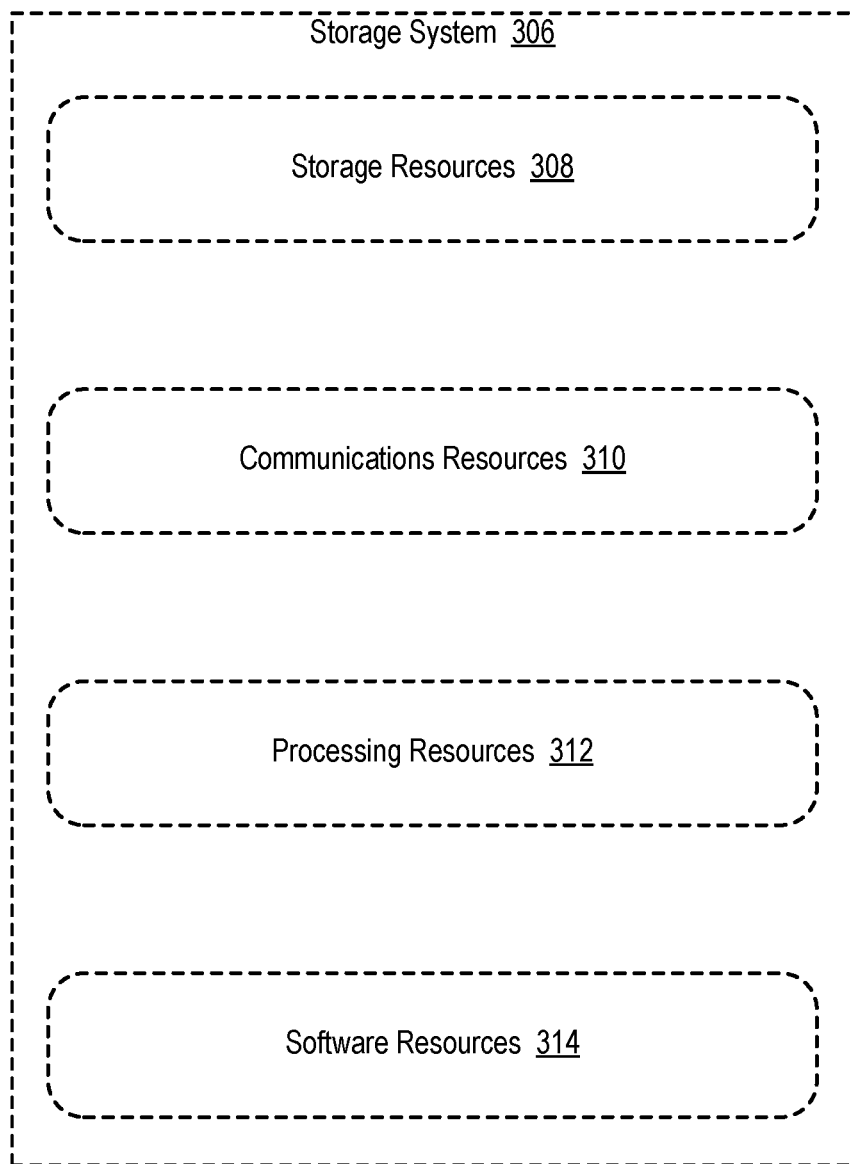
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include a vast amount of storage resources 308, which may be embodied in many forms. For example, the storage resources 308 can include nano-RAM or another form of nonvolatile random access memory that utilizes carbon nanotubes deposited on a substrate, 3D crosspoint non-volatile memory, flash memory including single-level cell ('SLC') NAND flash, multi-level cell ('MLC') NAND flash, triple-level cell ('TLC') NAND flash, quad-level cell ('QLC') NAND flash, or others. Likewise, the storage resources 308 may include non-volatile magnetoresistive random-access memory ('MRAM'), including spin transfer torque ('STT') MRAM. The example storage resources 308 may alternatively include non-volatile phase-change memory ('PCM'), quantum memory that allows for the storage and retrieval of photonic quantum information, resistive random-access memory ('ReRAM'), storage class memory ('SCM'), or other form of storage resources, including any combination of resources described herein. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The storage resources 308 depicted in FIG. 3B may include various forms of SCM. SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D XPoint, Intel Memory Drive Technology, Samsung's Z-SSD, and others.

The storage resources 308 depicted in FIG. 3B may also include racetrack memory (also referred to as domain-wall memory). Such racetrack memory may be embodied as a form of non-volatile, solid-state memory that relies on the intrinsic strength and orientation of the magnetic field created by an electron as it spins in addition to its electronic charge, in solid-state devices. Through the use of spin-coherent electric current to move magnetic domains along a nanoscopic permalloy wire, the domains may pass by magnetic read/write heads positioned near the wire as current is passed through the wire, which alter the domains to record patterns of bits. In order to create a racetrack memory device, many such wires and read/write elements may be packaged together.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The example storage system 306 depicted in FIG. 3B may leverage the storage resources described above in a variety of different ways. For example, some portion of the storage resources may be utilized to serve as a write cache, storage resources within the storage system may be utilized as a read cache, or tiering may be achieved within the storage systems by placing data within the storage system in accordance with one or more tiering policies.

The storage system 306 depicted in FIG. 3B also includes communications resources 310 that may be useful in facilitating data communications between components within the storage system 306, as well as data communications between the storage system 306 and computing devices that are outside of the storage system 306, including embodiments where those resources are separated by a relatively vast expanse. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC network, FC over ethernet ('FCoE') technologies through which FC frames are encapsulated and transmitted over Ethernet networks, InfiniBand ('IB') technologies in which a switched fabric topology is utilized to facilitate transmissions between channel adapters, NVM Express ('NVMe') technologies and NVMe over fabrics ('NVMeoF') technologies through which non-volatile storage media attached via a PCI express ('PCIe') bus may be accessed, and others. In fact, the storage systems described above may, directly or indirectly, make use of neutrino communication technologies and devices through which information (including binary information) is transmitted using a beam of neutrinos.

The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more ASICs that are customized for some particular purpose as well as one or more CPUs. The processing resources 312 may also include one or more DSPs, one or more FPGAs, one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform a vast array of tasks. The software resources 314 may include, for example, one or more modules of computer program instructions that when executed by processing resources 312 within the storage system 306 are useful in carrying out various data protection techniques. Such data protection techniques may be carried out, for example, by system software executing on computer hardware within the storage system, by a cloud services provider, or in other ways. Such data protection techniques can include data archiving, data backup, data replication, data snapshotting, data and database cloning, and other data protection techniques.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage system 306. For example, the software resources 314 may include software modules that perform various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Figure 3C:
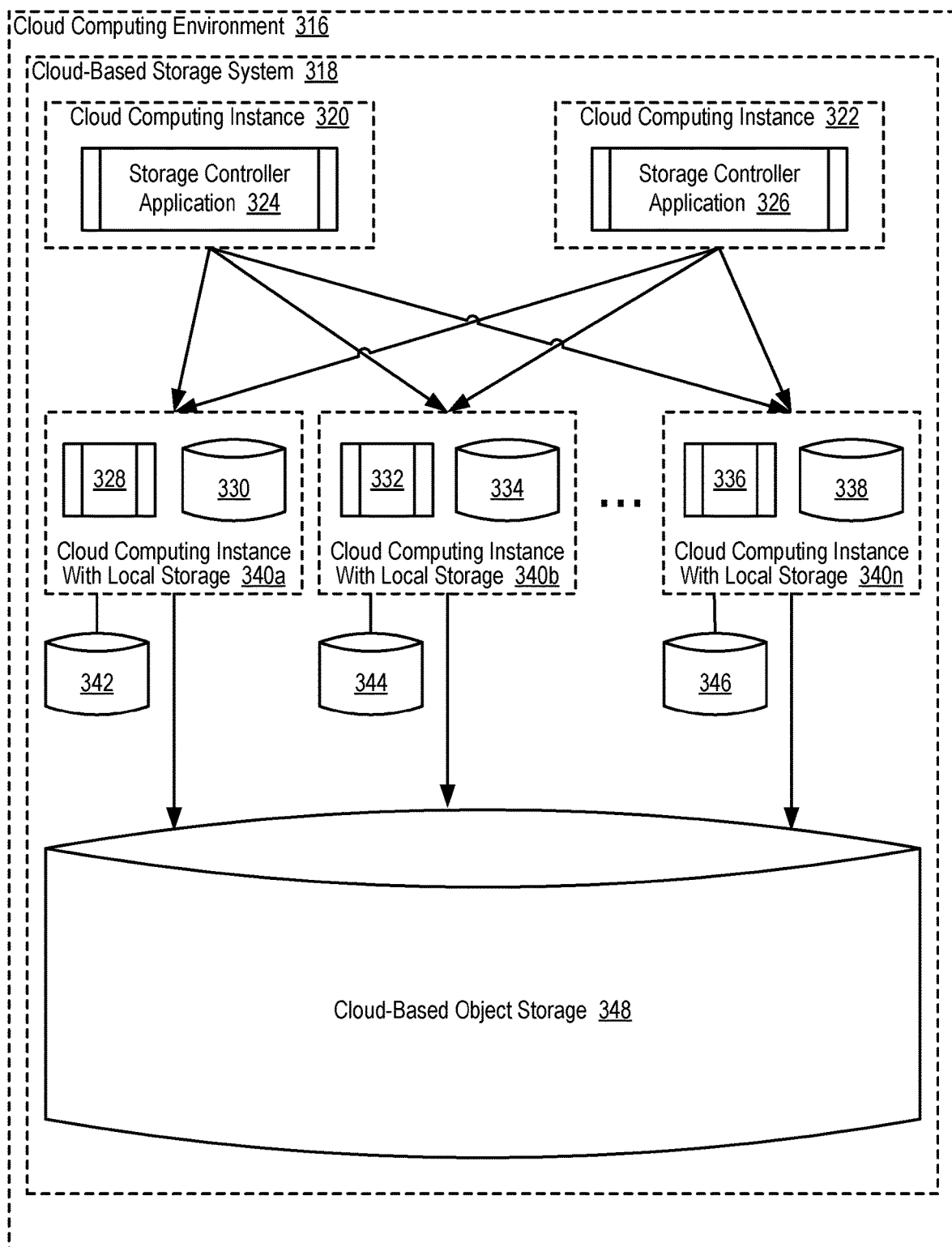
FIG. 3C sets forth an example of a cloud-based storage system in accordance with some embodiments of the present disclosure.

For further explanation, FIG. 3C sets forth an example of a cloud-based storage system 318 in accordance with some embodiments of the present disclosure. In the example depicted in FIG. 3C, the cloud-based storage system 318 is created entirely in a cloud computing environment 316 such as, for example, Amazon Web Services ('AWS')™, Microsoft Azure™, Google Cloud Platform™, IBM Cloud™, Oracle Cloud™, and others. The cloud-based storage system 318 may be used to provide services similar to the services that may be provided by the storage systems described above.

The cloud-based storage system 318 depicted in FIG. 3C includes two cloud computing instances 320, 322 that each are used to support the execution of a storage controller application 324, 326. The cloud computing instances 320, 322 may be embodied, for example, as instances of cloud computing resources (e.g., virtual machines) that may be provided by the cloud computing environment 316 to support the execution of software applications such as the storage controller application 324, 326. For example, each of the cloud computing instances 320, 322 may execute on an Azure VM, where each Azure VM may include high speed temporary storage that may be leveraged as a cache (e.g., as a read cache). In one embodiment, the cloud computing instances 320, 322 may be embodied as Amazon Elastic Compute Cloud ('EC2') instances. In such an example, an Amazon Machine Image ('AMI') that includes the storage controller application 324, 326 may be booted to create and configure a virtual machine that may execute the storage controller application 324, 326.

In the example method depicted in FIG. 3C, the storage controller application 324, 326 may be embodied as a module of computer program instructions that, when executed, carries out various storage tasks. For example, the storage controller application 324, 326 may be embodied as a module of computer program instructions that, when executed, carries out the same tasks as the controllers 110A, 110B in FIG. 1A described above such as writing data to the cloud-based storage system 318, erasing data from the cloud-based storage system 318, retrieving data from the cloud-based storage system 318, monitoring and reporting of disk utilization and performance, performing redundancy operations, such as RAID or RAID-like data redundancy operations, compressing data, encrypting data, deduplicating data, and so forth. Readers will appreciate that because there are two cloud computing instances 320, 322 that each include the storage controller application 324, 326, in some embodiments one cloud computing instance 320 may operate as the primary controller as described above while the other cloud computing instance 322 may operate as the secondary controller as described above. Readers will appreciate that the storage controller application 324, 326 depicted in FIG. 3C may include identical source code that is executed within different cloud computing instances 320, 322 such as distinct EC2 instances.

Readers will appreciate that other embodiments that do not include a primary and secondary controller are within the scope of the present disclosure. For example, each cloud computing instance 320, 322 may operate as a primary controller for some portion of the address space supported by the cloud-based storage system 318, each cloud computing instance 320, 322 may operate as a primary controller where the servicing of I/O operations directed to the cloud-based storage system 318 are divided in some other way, and so on. In fact, in other embodiments where costs savings may be prioritized over performance demands, only a single cloud computing instance may exist that contains the storage controller application.

The cloud-based storage system 318 depicted in FIG. 3C includes cloud computing instances 340a, 340b, 340n with local storage 330, 334, 338. The cloud computing instances 340a, 340b, 340n may be embodied, for example, as instances of cloud computing resources that may be provided by the cloud computing environment 316 to support the execution of software applications. The cloud computing instances 340a, 340b, 340n of FIG. 3C may differ from the cloud computing instances 320, 322 described above as the cloud computing instances 340a, 340b, 340n of FIG. 3C have local storage 330, 334, 338 resources whereas the cloud computing instances 320, 322 that support the execution of the storage controller application 324, 326 need not have local storage resources. The cloud computing instances 340a, 340b, 340n with local storage 330, 334, 338 may be embodied, for example, as EC2 M5 instances that include one or more SSDs, as EC2 R5 instances that include one or more SSDs, as EC2 I3 instances that include one or more SSDs, and so on. In some embodiments, the local storage 330, 334, 338 must be embodied as solid-state storage (e.g., SSDs) rather than storage that makes use of hard disk drives.

In the example depicted in FIG. 3C, each of the cloud computing instances 340a, 340b, 340n with local storage 330, 334, 338 can include a software daemon 328, 332, 336 that, when executed by a cloud computing instance 340a, 340b, 340n can present itself to the storage controller applications 324, 326 as if the cloud computing instance 340a, 340b, 340n were a physical storage device (e.g., one or more SSDs). In such an example, the software daemon 328, 332, 336 may include computer program instructions similar to those that would normally be contained on a storage device such that the storage controller applications 324, 326 can send and receive the same commands that a storage controller would send to storage devices. In such a way, the storage controller applications 324, 326 may include code that is identical to (or substantially identical to) the code that would be executed by the controllers in the storage systems described above. In these and similar embodiments, communications between the storage controller applications 324, 326 and the cloud computing instances 340a, 340b, 340n with local storage 330, 334, 338 may utilize iSCSI, NVMe over TCP, messaging, a custom protocol, or in some other mechanism.

In the example depicted in FIG. 3C, each of the cloud computing instances 340a, 340b, 340n with local storage 330, 334, 338 may also be coupled to block storage 342, 344, 346 that is offered by the cloud computing environment 316 such as, for example, as Amazon Elastic Block Store ('EBS') volumes. In such an example, the block storage 342, 344, 346 that is offered by the cloud computing environment 316 may be utilized in a manner that is similar to how the NVRAM devices described above are utilized, as the software daemon 328, 332, 336 (or some other module) that is executing within a particular cloud comping instance 340a, 340b, 340n may, upon receiving a request to write data, initiate a write of the data to its attached EBS volume as well as a write of the data to its local storage 330, 334, 338 resources. In some alternative embodiments, data may only be written to the local storage 330, 334, 338 resources within a particular cloud comping instance 340a, 340b, 340n. In an alternative embodiment, rather than using the block storage 342, 344, 346 that is offered by the cloud computing environment 316 as NVRAM, actual RAM on each of the cloud computing instances 340a, 340b, 340n with local storage 330, 334, 338 may be used as NVRAM, thereby decreasing network utilization costs that would be associated with using an EBS volume as the NVRAM. In yet another embodiment, high performance block storage resources such as one or more Azure Ultra Disks may be utilized as the NVRAM.

The storage controller applications 324, 326 may be used to perform various tasks such as deduplicating the data contained in the request, compressing the data contained in the request, determining where to the write the data contained in the request, and so on, before ultimately sending a request to write a deduplicated, encrypted, or otherwise possibly updated version of the data to one or more of the cloud computing instances 340a, 340b, 340n with local storage 330, 334, 338. Either cloud computing instance 320, 322, in some embodiments, may receive a request to read data from the cloud-based storage system 318 and may ultimately send a request to read data to one or more of the cloud computing instances 340a, 340b, 340n with local storage 330, 334, 338.

When a request to write data is received by a particular cloud computing instance 340a, 340b, 340n with local storage 330, 334, 338, the software daemon 328, 332, 336 may be configured to not only write the data to its own local storage 330, 334, 338 resources and any appropriate block storage 342, 344, 346 resources, but the software daemon 328, 332, 336 may also be configured to write the data to cloud-based object storage 348 that is attached to the particular cloud computing instance 340a, 340b, 340n. The cloud-based object storage 348 that is attached to the particular cloud computing instance 340a, 340b, 340n may be embodied, for example, as Amazon Simple Storage Service ('S3'). In other embodiments, the cloud computing instances 320, 322 that each include the storage controller application 324, 326 may initiate the storage of the data in the local storage 330, 334, 338 of the cloud computing instances 340a, 340b, 340n and the cloud-based object storage 348. In other embodiments, rather than using both the cloud computing instances 340a, 340b, 340n with local storage 330, 334, 338 (also referred to herein as 'virtual drives') and the cloud-based object storage 348 to store data, a persistent storage layer may be implemented in other ways. For example, one or more Azure Ultra disks may be used to persistently store data (e.g., after the data has been written to the NVRAM layer).

While the local storage 330, 334, 338 resources and the block storage 342, 344, 346 resources that are utilized by the cloud computing instances 340a, 340b, 340n may support block-level access, the cloud-based object storage 348 that is attached to the particular cloud computing instance 340a, 340b, 340n supports only object-based access. The software daemon 328, 332, 336 may therefore be configured to take blocks of data, package those blocks into objects, and write the objects to the cloud-based object storage 348 that is attached to the particular cloud computing instance 340a, 340b, 340n.

Consider an example in which data is written to the local storage 330, 334, 338 resources and the block storage 342, 344, 346 resources that are utilized by the cloud computing instances 340a, 340b, 340n in 1 MB blocks. In such an example, assume that a user of the cloud-based storage system 318 issues a request to write data that, after being compressed and deduplicated by the storage controller application 324, 326 results in the need to write 5 MB of data. In such an example, writing the data to the local storage 330, 334, 338 resources and the block storage 342, 344, 346 resources that are utilized by the cloud computing instances 340a, 340b, 340n is relatively straightforward as 5 blocks that are 1 MB in size are written to the local storage 330, 334, 338 resources and the block storage 342, 344, 346 resources that are utilized by the cloud computing instances 340a, 340b, 340n. In such an example, the software daemon 328, 332, 336 may also be configured to create five objects containing distinct 1 MB chunks of the data. As such, in some embodiments, each object that is written to the cloud-based object storage 348 may be identical (or nearly identical) in size. Readers will appreciate that in such an example, metadata that is associated with the data itself may be included in each object (e.g., the first 1 MB of the object is data and the remaining portion is metadata associated with the data). Readers will appreciate that the cloud-based object storage 348 may be incorporated into the cloud-based storage system 318 to increase the durability of the cloud-based storage system 318.

In some embodiments, all data that is stored by the cloud-based storage system 318 may be stored in both: 1) the cloud-based object storage 348, and 2) at least one of the local storage 330, 334, 338 resources or block storage 342, 344, 346 resources that are utilized by the cloud computing instances 340a, 340b, 340n. In such embodiments, the local storage 330, 334, 338 resources and block storage 342, 344, 346 resources that are utilized by the cloud computing instances 340a, 340b, 340n may effectively operate as cache that generally includes all data that is also stored in S3, such that all reads of data may be serviced by the cloud computing instances 340a, 340b, 340n without requiring the cloud computing instances 340a, 340b, 340n to access the cloud-based object storage 348. Readers will appreciate that in other embodiments, however, all data that is stored by the cloud-based storage system 318 may be stored in the cloud-based object storage 348, but less than all data that is stored by the cloud-based storage system 318 may be stored in at least one of the local storage 330, 334, 338 resources or block storage 342, 344, 346 resources that are utilized by the cloud computing instances 340a, 340b, 340n. In such an example, various policies may be utilized to determine which subset of the data that is stored by the cloud-based storage system 318 should reside in both: 1) the cloud-based object storage 348, and 2) at least one of the local storage 330, 334, 338 resources or block storage 342, 344, 346 resources that are utilized by the cloud computing instances 340a, 340b, 340n.

One or more modules of computer program instructions that are executing within the cloud-based storage system 318 (e.g., a monitoring module that is executing on its own EC2 instance) may be designed to handle the failure of one or more of the cloud computing instances 340a, 340b, 340n with local storage 330, 334, 338. In such an example, the monitoring module may handle the failure of one or more of the cloud computing instances 340a, 340b, 340n with local storage 330, 334, 338 by creating one or more new cloud computing instances with local storage, retrieving data that was stored on the failed cloud computing instances 340a, 340b, 340n from the cloud-based object storage 348, and storing the data retrieved from the cloud-based object storage 348 in local storage on the newly created cloud computing instances. Readers will appreciate that many variants of this process may be implemented.

Readers will appreciate that various performance aspects of the cloud-based storage system 318 may be monitored (e.g., by a monitoring module that is executing in an EC2 instance) such that the cloud-based storage system 318 can be scaled-up or scaled-out as needed. For example, if the cloud computing instances 320, 322 that are used to support the execution of a storage controller application 324, 326 are undersized and not sufficiently servicing the I/O requests that are issued by users of the cloud-based storage system 318, a monitoring module may create a new, more powerful cloud computing instance (e.g., a cloud computing instance of a type that includes more processing power, more memory, etc. . . . ) that includes the storage controller application such that the new, more powerful cloud computing instance can begin operating as the primary controller. Likewise, if the monitoring module determines that the cloud computing instances 320, 322 that are used to support the execution of a storage controller application 324, 326 are oversized and that cost savings could be gained by switching to a smaller, less powerful cloud computing instance, the monitoring module may create a new, less powerful (and less expensive) cloud computing instance that includes the storage controller application such that the new, less powerful cloud computing instance can begin operating as the primary controller.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state. Consider an example in which malware infects the storage system. In such an example, the storage system may include software resources 314 that can scan each backup to identify backups that were captured before the malware infected the storage system and those backups that were captured after the malware infected the storage system. In such an example, the storage system may restore itself from a backup that does not include the malware—or at least not restore the portions of a backup that contained the malware. In such an example, the storage system may include software resources 314 that can scan each backup to identify the presences of malware (or a virus, or some other undesirable), for example, by identifying write operations that were serviced by the storage system and originated from a network subnet that is suspected to have delivered the malware, by identifying write operations that were serviced by the storage system and originated from a user that is suspected to have delivered the malware, by identifying write operations that were serviced by the storage system and examining the content of the write operation against fingerprints of the malware, and in many other ways.

Readers will further appreciate that the backups (often in the form of one or more snapshots) may also be utilized to perform rapid recovery of the storage system. Consider an example in which the storage system is infected with ransomware that locks users out of the storage system. In such an example, software resources 314 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the various components described above may be grouped into one or more optimized computing packages as converged infrastructures. Such converged infrastructures may include pools of computers, storage and networking resources that can be shared by multiple applications and managed in a collective manner using policy-driven processes. Such converged infrastructures may be implemented with a converged infrastructure reference architecture, with standalone appliances, with a software driven hyper-converged approach (e.g., hyper-converged infrastructures), or in other ways.

Readers will appreciate that the storage systems described in this disclosure may be useful for supporting various types of software applications. In fact, the storage systems may be 'application aware' in the sense that the storage systems may obtain, maintain, or otherwise have access to information describing connected applications (e.g., applications that utilize the storage systems) to optimize the operation of the storage system based on intelligence about the applications and their utilization patterns. For example, the storage system may optimize data layouts, optimize caching behaviors, optimize 'QoS' levels, or perform some other optimization that is designed to improve the storage performance that is experienced by the application.

As an example of one type of application that may be supported by the storage systems describe herein, the storage system 306 may be useful in supporting artificial intelligence ('AI') applications, database applications, XOps projects (e.g., DevOps projects, DataOps projects, MLOps projects, ModelOps projects, PlatformOps projects), electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

In view of the fact that the storage systems include compute resources, storage resources, and a wide variety of other resources, the storage systems may be well suited to support applications that are resource intensive such as, for example, AI applications. AI applications may be deployed in a variety of fields, including: predictive maintenance in manufacturing and related fields, healthcare applications such as patient data & risk analytics, retail and marketing deployments (e.g., search advertising, social media advertising), supply chains solutions, fintech solutions such as business analytics & reporting tools, operational deployments such as real-time analytics tools, application performance management tools, IT infrastructure management tools, and many others.

Such AI applications may enable devices to perceive their environment and take actions that maximize their chance of success at some goal. Examples of such AI applications can include IBM Watson™, Microsoft Oxford™, Google DeepMind™, Baidu Minwa™, and others.

The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed. One particular area of machine learning is referred to as reinforcement learning, which involves taking suitable actions to maximize reward in a particular situation.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. Such GPUs may include thousands of cores that are well-suited to run algorithms that loosely represent the parallel nature of the human brain.

Advances in deep neural networks, including the development of multi-layer neural networks, have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others. Applications of AI techniques has materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

In order for the storage systems described above to serve as a data hub or as part of an AI deployment, in some embodiments the storage systems may be configured to provide DMA between storage devices that are included in the storage systems and one or more GPUs that are used in an AI or big data analytics pipeline. The one or more GPUs may be coupled to the storage system, for example, via NVMe-over-Fabrics ('NVMe-oF') such that bottlenecks such as the host CPU can be bypassed and the storage system (or one of the components contained therein) can directly access GPU memory. In such an example, the storage systems may leverage API hooks to the GPUs to transfer data directly to the GPUs. For example, the GPUs may be embodied as Nvidia GPUs and the storage systems may support GPUDirect Storage ('GDS') software, or have similar proprietary software, that enables the storage system to transfer data to the GPUs via RDMA or similar mechanism.

Although the preceding paragraphs discuss deep learning applications, readers will appreciate that the storage systems described herein may also be part of a distributed deep learning ('DDL') platform to support the execution of DDL algorithms. The storage systems described above may also be paired with other technologies such as TensorFlow, an open-source software library for dataflow programming across a range of tasks that may be used for machine learning applications such as neural networks, to facilitate the development of such machine learning models, applications, and so on.

The storage systems described above may also be used in a neuromorphic computing environment. Neuromorphic computing is a form of computing that mimics brain cells. To support neuromorphic computing, an architecture of interconnected "neurons" replace traditional computing models with low-powered signals that go directly between neurons for more efficient computation. Neuromorphic computing may make use of very-large-scale integration (VLSI) systems containing electronic analog circuits to mimic neuro-biological architectures present in the nervous system, as well as analog, digital, mixed-mode analog/digital VLSI, and software systems that implement models of neural systems for perception, motor control, or multisensory integration.

Readers will appreciate that the storage systems described above may be configured to support the storage or use of (among other types of data) blockchains and derivative items such as, for example, open source blockchains and related tools that are part of the IBM™ Hyperledger project, permissioned blockchains in which a certain number of trusted parties are allowed to access the block chain, blockchain products that enable developers to build their own distributed ledger projects, and others. Blockchains and the storage systems described herein may be leveraged to support on-chain storage of data as well as off-chain storage of data.

Off-chain storage of data can be implemented in a variety of ways and can occur when the data itself is not stored within the blockchain. For example, in one embodiment, a hash function may be utilized and the data itself may be fed into the hash function to generate a hash value. In such an example, the hashes of large pieces of data may be embedded within transactions, instead of the data itself. Readers will appreciate that, in other embodiments, alternatives to blockchains may be used to facilitate the decentralized storage of information. For example, one alternative to a blockchain that may be used is a blockweave. While conventional blockchains store every transaction to achieve validation, a blockweave permits secure decentralization without the usage of the entire chain, thereby enabling low cost on-chain storage of data. Such blockweaves may utilize a consensus mechanism that is based on proof of access (PoA) and proof of work (PoW).

The storage systems described above may, either alone or in combination with other computing devices, be used to support in-memory computing applications. In-memory computing involves the storage of information in RAM that is distributed across a cluster of computers. Readers will appreciate that the storage systems described above, especially those that are configurable with customizable amounts of processing resources, storage resources, and memory resources (e.g., those systems in which blades that contain configurable amounts of each type of resource), may be configured in a way so as to provide an infrastructure that can support in-memory computing. Likewise, the storage systems described above may include component parts (e.g., NVDIMMs, 3D crosspoint storage that provide fast random access memory that is persistent) that can actually provide for an improved in-memory computing environment as compared to in-memory computing environments that rely on RAM distributed across dedicated servers.

In some embodiments, the storage systems described above may be configured to operate as a hybrid in-memory computing environment that includes a universal interface to all storage media (e.g., RAM, flash storage, 3D crosspoint storage). In such embodiments, users may have no knowledge regarding the details of where their data is stored but they can still use the same full, unified API to address data. In such embodiments, the storage system may (in the background) move data to the fastest layer available—including intelligently placing the data in dependence upon various characteristics of the data or in dependence upon some other heuristic. In such an example, the storage systems may even make use of existing products such as Apache Ignite and GridGain to move data between the various storage layers, or the storage systems may make use of custom software to move data between the various storage layers. The storage systems described herein may implement various optimizations to improve the performance of in-memory computing such as, for example, having computations occur as close to the data as possible.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also be possible.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBM™ Cloud Private for Data, that includes integrated data science, data engineering and application building services.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics, including being leveraged as part of a composable data analytics pipeline where containerized analytics architectures, for example, make analytics capabilities more composable. Big data analytics may be generally described as the process of examining large and varied data sets to uncover hidden patterns, unknown correlations, market trends, customer preferences and other useful information that can help organizations make more-informed business decisions. As part of that process, semi-structured and unstructured data such as, for example, internet clickstream data, web server logs, social media content, text from customer emails and survey responses, mobile-phone call-detail records, IoT sensor data, and other data may be converted to a structured form.

The storage systems described above may also support (including implementing as a system interface) applications that perform tasks in response to human speech. For example, the storage systems may support the execution intelligent personal assistant applications such as, for example, Amazon's Alexa™, Apple Siri™, Google Voice™, Samsung Bixby™, Microsoft Cortana™, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution of artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others.

The storage systems described above may also, either alone or in combination with other computing environments, be used to deliver a wide range of transparently immersive experiences (including those that use digital twins of various "things" such as people, places, processes, systems, and so on) where technology can introduce transparency between people, businesses, and things. Such transparently immersive experiences may be delivered as augmented reality technologies, connected homes, virtual reality technologies, brain-computer interfaces, human augmentation technologies, nanotube electronics, volumetric displays, 4D printing technologies, or others.

The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload.

The storage systems described above may be used as a part of a platform to enable the use of crypto-anchors that may be used to authenticate a product's origins and contents to ensure that it matches a blockchain record associated with the product. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to $2^n$ different states simultaneously, whereas a traditional computer can only be in one of these states at any one time. A quantum Turing machine is a theoretical model of such a computer.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming though the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers.

The systems described above can support the execution of a wide array of software applications. Such software applications can be deployed in a variety of ways, including container-based deployment models. Containerized applications may be managed using a variety of tools. For example, containerized applications may be managed using Docker Swarm, Kubernetes, and others. Containerized applications may be used to facilitate a serverless, cloud native computing deployment and management model for software applications. In support of a serverless, cloud native computing deployment and management model for software applications, containers may be used as part of an event handling mechanisms (e.g., AWS Lambdas) such that various events cause a containerized application to be spun up to operate as an event handler.

The systems described above may be deployed in a variety of ways, including being deployed in ways that support fifth generation ('5G') networks. 5G networks may support substantially faster data communications than previous generations of mobile communications networks and, as a consequence may lead to the disaggregation of data and computing resources as modern massive data centers may become less prominent and may be replaced, for example, by more-local, micro data centers that are close to the mobile-network towers. The systems described above may be included in such local, micro data centers and may be part of or paired to multi-access edge computing ('MEC') systems. Such MEC systems may enable cloud computing capabilities and an IT service environment at the edge of the cellular network. By running applications and performing related processing tasks closer to the cellular customer, network congestion may be reduced and applications may perform better.

The storage systems described above may also be configured to implement NVMe Zoned Namespaces. Through the use of NVMe Zoned Namespaces, the logical address space of a namespace is divided into zones. Each zone provides a logical block address range that must be written sequentially and explicitly reset before rewriting, thereby enabling the creation of namespaces that expose the natural boundaries of the device and offload management of internal mapping tables to the host. In order to implement NVMe Zoned Name Spaces ('ZNS'), ZNS SSDs or some other form of zoned block devices may be utilized that expose a namespace logical address space using zones. With the zones aligned to the internal physical properties of the device, several inefficiencies in the placement of data can be eliminated. In such embodiments, each zone may be mapped, for example, to a separate application such that functions like wear levelling and garbage collection could be performed on a per-zone or per-application basis rather than across the entire device. In order to support ZNS, the storage controllers described herein may be configured with to interact with zoned block devices through the usage of, for example, the Linux™ kernel zoned block device interface or other tools.

The storage systems described above may also be configured to implement zoned storage in other ways such as, for example, through the usage of shingled magnetic recording (SMR) storage devices. In examples where zoned storage is used, device-managed embodiments may be deployed where the storage devices hide this complexity by managing it in the firmware, presenting an interface like any other storage device. Alternatively, zoned storage may be implemented via a host-managed embodiment that depends on the operating system to know how to handle the drive, and only write sequentially to certain regions of the drive. Zoned storage may similarly be implemented using a host-aware embodiment in which a combination of a drive managed and host managed implementation is deployed.

The storage systems described herein may be used to form a data lake. A data lake may operate as the first place that an organization's data flows to, where such data may be in a raw format. Metadata tagging may be implemented to facilitate searches of data elements in the data lake, especially in embodiments where the data lake contains multiple stores of data, in formats not easily accessible or readable (e.g., unstructured data, semi-structured data, structured data). From the data lake, data may go downstream to a data warehouse where data may be stored in a more processed, packaged, and consumable format. The storage systems described above may also be used to implement such a data warehouse. In addition, a data mart or data hub may allow for data that is even more easily consumed, where the storage systems described above may also be used to provide the underlying storage resources necessary for a data mart or data hub. In embodiments, queries the data lake may require a schema-on-read approach, where data is applied to a plan or schema as it is pulled out of a stored location, rather than as it goes into the stored location.

The storage systems described herein may also be configured implement a recovery point objective ('RPO'), which may be establish by a user, established by an administrator, established as a system default, established as part of a storage class or service that the storage system is participating in the delivery of, or in some other way. A "recovery point objective" is a goal for the maximum time difference between the last update to a source dataset and the last recoverable replicated dataset update that would be correctly recoverable, given a reason to do so, from a continuously or frequently updated copy of the source dataset. An update is correctly recoverable if it properly takes into account all updates that were processed on the source dataset prior to the last recoverable replicated dataset update.

In synchronous replication, the RPO would be zero, meaning that under normal operation, all completed updates on the source dataset should be present and correctly recoverable on the copy dataset. In best effort nearly synchronous replication, the RPO can be as low as a few seconds. In snapshot-based replication, the RPO can be roughly calculated as the interval between snapshots plus the time to transfer the modifications between a previous already transferred snapshot and the most recent to-be-replicated snapshot.

If updates accumulate faster than they are replicated, then an RPO can be missed. If more data to be replicated accumulates between two snapshots, for snapshot-based replication, than can be replicated between taking the snapshot and replicating that snapshot's cumulative updates to the copy, then the RPO can be missed. If, again in snapshot-based replication, data to be replicated accumulates at a faster rate than could be transferred in the time between subsequent snapshots, then replication can start to fall further behind which can extend the miss between the expected recovery point objective and the actual recovery point that is represented by the last correctly replicated update.

The storage systems described above may also be part of a shared nothing storage cluster. In a shared nothing storage cluster, each node of the cluster has local storage and communicates with other nodes in the cluster through networks, where the storage used by the cluster is (in general) provided only by the storage connected to each individual node. A collection of nodes that are synchronously replicating a dataset may be one example of a shared nothing storage cluster, as each storage system has local storage and communicates to other storage systems through a network, where those storage systems do not (in general) use storage from somewhere else that they share access to through some kind of interconnect. In contrast, some of the storage systems described above are themselves built as a shared-storage cluster, since there are drive shelves that are shared by the paired controllers. Other storage systems described above, however, are built as a shared nothing storage cluster, as all storage is local to a particular node (e.g., a blade) and all communication is through networks that link the compute nodes together.

In other embodiments, other forms of a shared nothing storage cluster can include embodiments where any node in the cluster has a local copy of all storage they need, and where data is mirrored through a synchronous style of replication to other nodes in the cluster either to ensure that the data isn't lost or because other nodes are also using that storage. In such an embodiment, if a new cluster node needs some data, that data can be copied to the new node from other nodes that have copies of the data.

In some embodiments, mirror-copy-based shared storage clusters may store multiple copies of all the cluster's stored data, with each subset of data replicated to a particular set of nodes, and different subsets of data replicated to different sets of nodes. In some variations, embodiments may store all of the cluster's stored data in all nodes, whereas in other variations nodes may be divided up such that a first set of nodes will all store the same set of data and a second, different set of nodes will all store a different set of data.

Readers will appreciate that RAFT-based databases (e.g., etcd) may operate like shared-nothing storage clusters where all RAFT nodes store all data. The amount of data stored in a RAFT cluster, however, may be limited so that extra copies don't consume too much storage. A container server cluster might also be able to replicate all data to all cluster nodes, presuming the containers don't tend to be too large and their bulk data (the data manipulated by the applications that run in the containers) is stored elsewhere such as in an S3 cluster or an external file server. In such an example, the container storage may be provided by the cluster directly through its shared-nothing storage model, with those containers providing the images that form the execution environment for parts of an application or service.

Figure 3D:
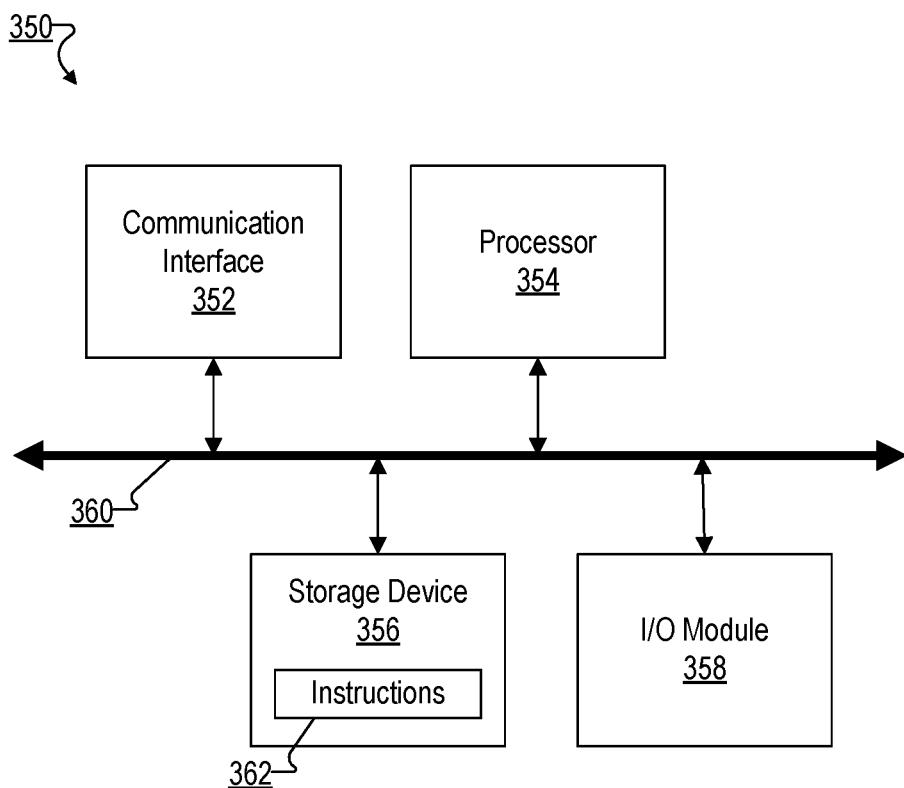
FIG. 3D illustrates an exemplary computing device that may be specifically configured to perform one or more of the processes described herein.

For further explanation, FIG. 3D illustrates an exemplary computing device 350 that may be specifically configured to perform one or more of the processes described herein. As shown in FIG. 3D, computing device 350 may include a communication interface 352, a processor 354, a storage device 356, and an input/output ("I/O") module 358 communicatively connected one to another via a communication infrastructure 360. While an exemplary computing device 350 is shown in FIG. 3D, the components illustrated in FIG. 3D are not intended to be limiting. Additional or alternative components may be used in other embodiments. Components of computing device 350 shown in FIG. 3D will now be described in additional detail.

Communication interface 352 may be configured to communicate with one or more computing devices. Examples of communication interface 352 include, without limitation, a wired network interface (such as a network interface card), a wireless network interface (such as a wireless network interface card), a modem, an audio/video connection, and any other suitable interface.

Processor 354 generally represents any type or form of processing unit capable of processing data and/or interpreting, executing, and/or directing execution of one or more of the instructions, processes, and/or operations described herein. Processor 354 may perform operations by executing computer-executable instructions 362 (e.g., an application, software, code, and/or other executable data instance) stored in storage device 356.

Storage device 356 may include one or more data storage media, devices, or configurations and may employ any type, form, and combination of data storage media and/or device. For example, storage device 356 may include, but is not limited to, any combination of the non-volatile media and/or volatile media described herein. Electronic data, including data described herein, may be temporarily and/or permanently stored in storage device 356. For example, data representative of computer-executable instructions 362 configured to direct processor 354 to perform any of the operations described herein may be stored within storage device 356. In some examples, data may be arranged in one or more databases residing within storage device 356.

I/O module 358 may include one or more I/O modules configured to receive user input and provide user output. I/O module 358 may include any hardware, firmware, software, or combination thereof supportive of input and output capabilities. For example, I/O module 358 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 358 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 358 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 350.

Figure 3E:
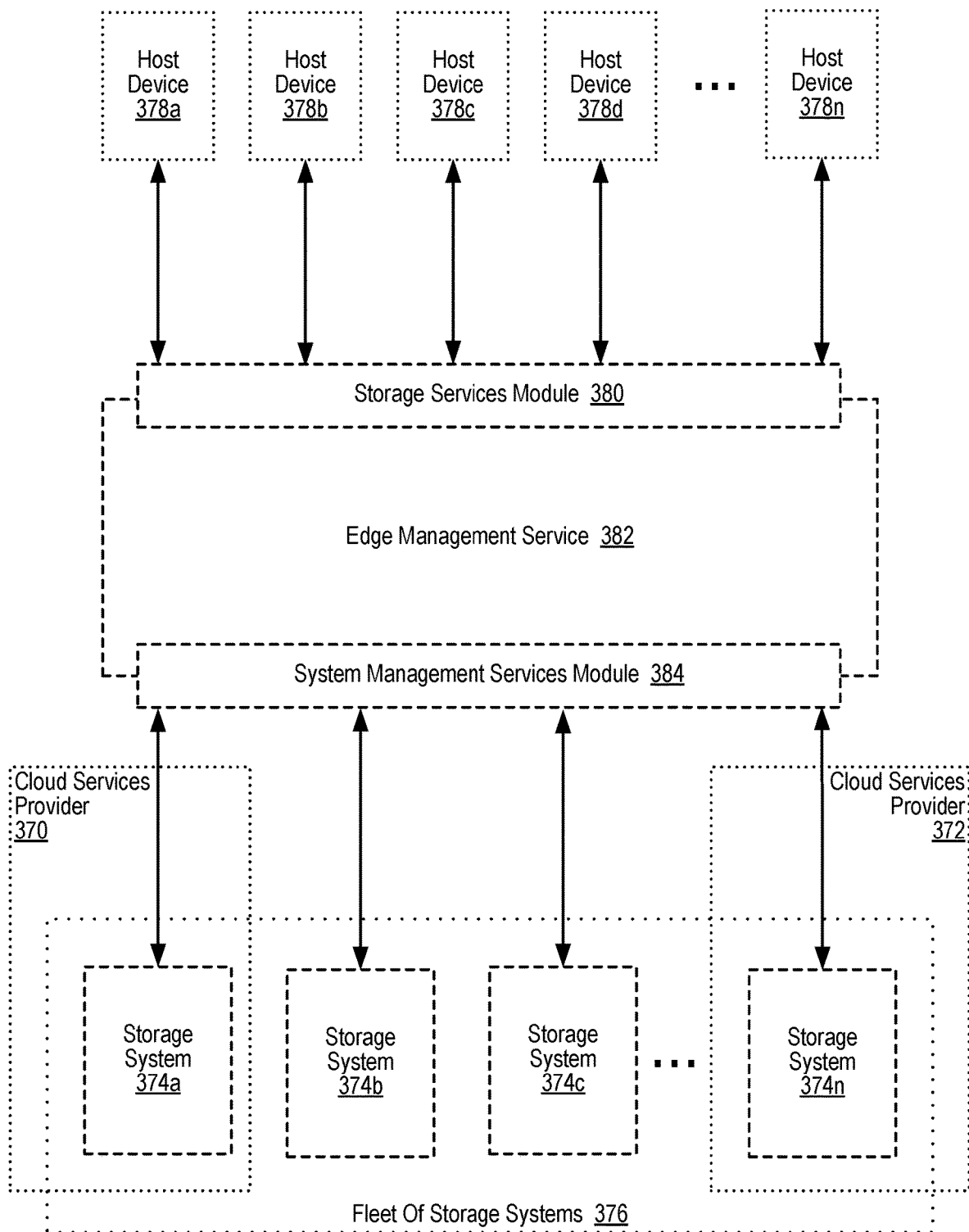
FIG. 3E illustrates an example of a fleet of storage systems for providing storage services in accordance with some embodiments of the present disclosure.

For further explanation, FIG. 3E illustrates an example of a fleet of storage systems 376 for providing storage services (also referred to herein as 'data services'). The fleet of storage systems 376 depicted in FIG. 3 includes a plurality of storage systems 374a, 374b, 374c, 374d, 374n that may each be similar to the storage systems described herein. The storage systems 374a, 374b, 374c, 374d, 374n in the fleet of storage systems 376 may be embodied as identical storage systems or as different types of storage systems. For example, two of the storage systems 374a, 374n depicted in FIG. 3E are depicted as being cloud-based storage systems, as the resources that collectively form each of the storage systems 374a, 374n are provided by distinct cloud services providers 370, 372. For example, the first cloud services provider 370 may be Amazon AWS™ whereas the second cloud services provider 372 is Microsoft Azure™, although in other embodiments one or more public clouds, private clouds, or combinations thereof may be used to provide the underlying resources that are used to form a particular storage system in the fleet of storage systems 376.

The example depicted in FIG. 3E includes an edge management service 382 for delivering storage services in accordance with some embodiments of the present disclosure. The storage services (also referred to herein as 'data services') that are delivered may include, for example, services to provide a certain amount of storage to a consumer, services to provide storage to a consumer in accordance with a predetermined service level agreement, services to provide storage to a consumer in accordance with predetermined regulatory requirements, and many others.

The edge management service 382 depicted in FIG. 3E may be embodied, for example, as one or more modules of computer program instructions executing on computer hardware such as one or more computer processors. Alternatively, the edge management service 382 may be embodied as one or more modules of computer program instructions executing on a virtualized execution environment such as one or more virtual machines, in one or more containers, or in some other way. In other embodiments, the edge management service 382 may be embodied as a combination of the embodiments described above, including embodiments where the one or more modules of computer program instructions that are included in the edge management service 382 are distributed across multiple physical or virtual execution environments.

The edge management service 382 may operate as a gateway for providing storage services to storage consumers, where the storage services leverage storage offered by one or more storage systems 374a, 374b, 374c, 374d, 374n. For example, the edge management service 382 may be configured to provide storage services to host devices 378a, 378b, 378c, 378d, 378n that are executing one or more applications that consume the storage services. In such an example, the edge management service 382 may operate as a gateway between the host devices 378a, 378b, 378c, 378d, 378n and the storage systems 374a, 374b, 374c, 374d, 374n, rather than requiring that the host devices 378a, 378b, 378c, 378d, 378n directly access the storage systems 374a, 374b, 374c, 374d, 374n.

The edge management service 382 of FIG. 3E exposes a storage services module 380 to the host devices 378a, 378b, 378c, 378d, 378n of FIG. 3E, although in other embodiments the edge management service 382 may expose the storage services module 380 to other consumers of the various storage services. The various storage services may be presented to consumers via one or more user interfaces, via one or more APIs, or through some other mechanism provided by the storage services module 380. As such, the storage services module 380 depicted in FIG. 3E may be embodied as one or more modules of computer program instructions executing on physical hardware, on a virtualized execution environment, or combinations thereof, where executing such modules causes enables a consumer of storage services to be offered, select, and access the various storage services.

The edge management service 382 of FIG. 3E also includes a system management services module 384. The system management services module 384 of FIG. 3E includes one or more modules of computer program instructions that, when executed, perform various operations in coordination with the storage systems 374a, 374b, 374c, 374d, 374n to provide storage services to the host devices 378a, 378b, 378c, 378d, 378n. The system management services module 384 may be configured, for example, to perform tasks such as provisioning storage resources from the storage systems 374a, 374b, 374c, 374d, 374n via one or more APIs exposed by the storage systems 374a, 374b, 374c, 374d, 374n, migrating datasets or workloads amongst the storage systems 374a, 374b, 374c, 374d, 374n via one or more APIs exposed by the storage systems 374a, 374b, 374c, 374d, 374n, setting one or more tunable parameters (i.e., one or more configurable settings) on the storage systems 374a, 374b, 374c, 374d, 374n via one or more APIs exposed by the storage systems 374a, 374b, 374c, 374d, 374n, and so on. For example, many of the services described below relate to embodiments where the storage systems 374a, 374b, 374c, 374d, 374n are configured to operate in some way. In such examples, the system management services module 384 may be responsible for using APIs (or some other mechanism) provided by the storage systems 374a, 374b, 374c, 374d, 374n to configure the storage systems 374a, 374b, 374c, 374d, 374n to operate in the ways described below.

In addition to configuring the storage systems 374a, 374b, 374c, 374d, 374n, the edge management service 382 itself may be configured to perform various tasks required to provide the various storage services. Consider an example in which the storage service includes a service that, when selected and applied, causes personally identifiable information (PIP) contained in a dataset to be obfuscated when the dataset is accessed. In such an example, the storage systems 374a, 374b, 374c, 374d, 374n may be configured to obfuscate PII when servicing read requests directed to the dataset. Alternatively, the storage systems 374a, 374b, 374c, 374d, 374n may service reads by returning data that includes the PII, but the edge management service 382 itself may obfuscate the PII as the data is passed through the edge management service 382 on its way from the storage systems 374a, 374b, 374c, 374d, 374n to the host devices 378a, 378b, 378c, 378d, 378n.

The storage systems 374a, 374b, 374c, 374d, 374n depicted in FIG. 3E may be embodied as one or more of the storage systems described above with reference to FIGS. 1A-3D, including variations thereof. In fact, the storage systems 374a, 374b, 374c, 374d, 374n may serve as a pool of storage resources where the individual components in that pool have different performance characteristics, different storage characteristics, and so on. For example, one of the storage systems 374a may be a cloud-based storage system, another storage system 374b may be a storage system that provides block storage, another storage system 374c may be a storage system that provides file storage, another storage system 374d may be a relatively high-performance storage system while another storage system 374n may be a relatively low-performance storage system, and so on. In alternative embodiments, only a single storage system may be present.

The storage systems 374a, 374b, 374c, 374d, 374n depicted in FIG. 3E may also be organized into different failure domains so that the failure of one storage system 374a should be totally unrelated to the failure of another storage system 374b. For example, each of the storage systems may receive power from independent power systems, each of the storage systems may be coupled for data communications over independent data communications networks, and so on. Furthermore, the storage systems in a first failure domain may be accessed via a first gateway whereas storage systems in a second failure domain may be accessed via a second gateway. For example, the first gateway may be a first instance of the edge management service 382 and the second gateway may be a second instance of the edge management service 382, including embodiments where each instance is distinct, or each instance is part of a distributed edge management service 382.

As an illustrative example of available storage services, storage services may be presented to a user that are associated with different levels of data protection. For example, storage services may be presented to the user that, when selected and enforced, guarantee the user that data associated with that user will be protected such that various recovery point objectives ('RPO') can be guaranteed. A first available storage service may ensure, for example, that some dataset associated with the user will be protected such that any data that is more than 5 seconds old can be recovered in the event of a failure of the primary data store whereas a second available storage service may ensure that the dataset that is associated with the user will be protected such that any data that is more than 5 minutes old can be recovered in the event of a failure of the primary data store.

An additional example of storage services that may be presented to a user, selected by a user, and ultimately applied to a dataset associated with the user can include one or more data compliance services. Such data compliance services may be embodied, for example, as services that may be provided to consumers (i.e., a user) the data compliance services to ensure that the user's datasets are managed in a way to adhere to various regulatory requirements. For example, one or more data compliance services may be offered to a user to ensure that the user's datasets are managed in a way so as to adhere to the General Data Protection Regulation ('GDPR'), one or data compliance services may be offered to a user to ensure that the user's datasets are managed in a way so as to adhere to the Sarbanes-Oxley Act of 2002 ('SOX'), or one or more data compliance services may be offered to a user to ensure that the user's datasets are managed in a way so as to adhere to some other regulatory act. In addition, the one or more data compliance services may be offered to a user to ensure that the user's datasets are managed in a way so as to adhere to some non-governmental guidance (e.g., to adhere to best practices for auditing purposes), the one or more data compliance services may be offered to a user to ensure that the user's datasets are managed in a way so as to adhere to a particular clients or organizations requirements, and so on.

Consider an example in which a particular data compliance service is designed to ensure that a user's datasets are managed in a way so as to adhere to the requirements set forth in the GDPR. While a listing of all requirements of the GDPR can be found in the regulation itself, for the purposes of illustration, an example requirement set forth in the GDPR requires that pseudonymization processes must be applied to stored data in order to transform personal data in such a way that the resulting data cannot be attributed to a specific data subject without the use of additional information. For example, data encryption techniques can be applied to render the original data unintelligible, and such data encryption techniques cannot be reversed without access to the correct decryption key. As such, the GDPR may require that the decryption key be kept separately from the pseudonymised data. One particular data compliance service may be offered to ensure adherence to the requirements set forth in this paragraph.

In order to provide this particular data compliance service, the data compliance service may be presented to a user (e.g., via a GUI) and selected by the user. In response to receiving the selection of the particular data compliance service, one or more storage services policies may be applied to a dataset associated with the user to carry out the particular data compliance service. For example, a storage services policy may be applied requiring that the dataset be encrypted prior to be stored in a storage system, prior to being stored in a cloud environment, or prior to being stored elsewhere. In order to enforce this policy, a requirement may be enforced not only requiring that the dataset be encrypted when stored, but a requirement may be put in place requiring that the dataset be encrypted prior to transmitting the dataset (e.g., sending the dataset to another party). In such an example, a storage services policy may also be put in place requiring that any encryption keys used to encrypt the dataset are not stored on the same system that stores the dataset itself. Readers will appreciate that many other forms of data compliance services may be offered and implemented in accordance with embodiments of the present disclosure.

The storage systems 374a, 374b, 374c, 374d, 374n in the fleet of storage systems 376 may be managed collectively, for example, by one or more fleet management modules. The fleet management modules may be part of or separate from the system management services module 384 depicted in FIG. 3E. The fleet management modules may perform tasks such as monitoring the health of each storage system in the fleet, initiating updates or upgrades on one or more storage systems in the fleet, migrating workloads for loading balancing or other performance purposes, and many other tasks.

As such, and for many other reasons, the storage systems 374a, 374b, 374c, 374d, 374n may be coupled to each other via one or more data communications links in order to exchange data between the storage systems 374a, 374b, 374c, 374d, 374n.

The storage systems described herein may support various forms of data replication. For example, two or more of the storage systems may synchronously replicate a dataset between each other. In synchronous replication, distinct copies of a particular dataset may be maintained by multiple storage systems, but all accesses (e.g., a read) of the dataset should yield consistent results regardless of which storage system the access was directed to. For example, a read directed to any of the storage systems that are synchronously replicating the dataset should return identical results. As such, while updates to the version of the dataset need not occur at exactly the same time, precautions must be taken to ensure consistent accesses to the dataset. For example, if an update (e.g., a write) that is directed to the dataset is received by a first storage system, the update may only be acknowledged as being completed if all storage systems that are synchronously replicating the dataset have applied the update to their copies of the dataset. In such an example, synchronous replication may be carried out through the use of I/O forwarding (e.g., a write received at a first storage system is forwarded to a second storage system), communications between the storage systems (e.g., each storage system indicating that it has completed the update), or in other ways.

In other embodiments, a dataset may be replicated through the use of checkpoints. In checkpoint-based replication (also referred to as 'nearly synchronous replication'), a set of updates to a dataset (e.g., one or more write operations directed to the dataset) may occur between different checkpoints, such that a dataset has been updated to a specific checkpoint only if all updates to the dataset prior to the specific checkpoint have been completed. Consider an example in which a first storage system stores a live copy of a dataset that is being accessed by users of the dataset. In this example, assume that the dataset is being replicated from the first storage system to a second storage system using checkpoint-based replication. For example, the first storage system may send a first checkpoint (at time t=0) to the second storage system, followed by a first set of updates to the dataset, followed by a second checkpoint (at time t=1), followed by a second set of updates to the dataset, followed by a third checkpoint (at time t=2). In such an example, if the second storage system has performed all updates in the first set of updates but has not yet performed all updates in the second set of updates, the copy of the dataset that is stored on the second storage system may be up-to-date until the second checkpoint. Alternatively, if the second storage system has performed all updates in both the first set of updates and the second set of updates, the copy of the dataset that is stored on the second storage system may be up-to-date until the third checkpoint. Readers will appreciate that various types of checkpoints may be used (e.g., metadata only checkpoints), checkpoints may be spread out based on a variety of factors (e.g., time, number of operations, an RPO setting), and so on.

In other embodiments, a dataset may be replicated through snapshot-based replication (also referred to as 'asynchronous replication'). In snapshot-based replication, snapshots of a dataset may be sent from a replication source such as a first storage system to a replication target such as a second storage system. In such an embodiment, each snapshot may include the entire dataset or a subset of the dataset such as, for example, only the portions of the dataset that have changed since the last snapshot was sent from the replication source to the replication target. Readers will appreciate that snapshots may be sent on-demand, based on a policy that takes a variety of factors into consideration (e.g., time, number of operations, an RPO setting), or in some other way.

The storage systems described above may, either alone or in combination, by configured to serve as a continuous data protection store. A continuous data protection store is a feature of a storage system that records updates to a dataset in such a way that consistent images of prior contents of the dataset can be accessed with a low time granularity (often on the order of seconds, or even less), and stretching back for a reasonable period of time (often hours or days). These allow access to very recent consistent points in time for the dataset, and also allow access to access to points in time for a dataset that might have just preceded some event that, for example, caused parts of the dataset to be corrupted or otherwise lost, while retaining close to the maximum number of updates that preceded that event. Conceptually, they are like a sequence of snapshots of a dataset taken very frequently and kept for a long period of time, though continuous data protection stores are often implemented quite differently from snapshots. A storage system implementing a data continuous data protection store may further provide a means of accessing these points in time, accessing one or more of these points in time as snapshots or as cloned copies, or reverting the dataset back to one of those recorded points in time.

Over time, to reduce overhead, some points in the time held in a continuous data protection store can be merged with other nearby points in time, essentially deleting some of these points in time from the store. This can reduce the capacity needed to store updates. It may also be possible to convert a limited number of these points in time into longer duration snapshots. For example, such a store might keep a low granularity sequence of points in time stretching back a few hours from the present, with some points in time merged or deleted to reduce overhead for up to an additional day. Stretching back in the past further than that, some of these points in time could be converted to snapshots representing consistent point-in-time images from only every few hours.

Although some embodiments are described largely in the context of a storage system, readers of skill in the art will recognize that embodiments of the present disclosure may also take the form of a computer program product disposed upon computer readable storage media for use with any suitable processing system. Such computer readable storage media may be any storage medium for machine-readable information, including magnetic media, optical media, solid-state media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps described herein as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

In some examples, a non-transitory computer-readable medium storing computer-readable instructions may be provided in accordance with the principles described herein.

The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 4:
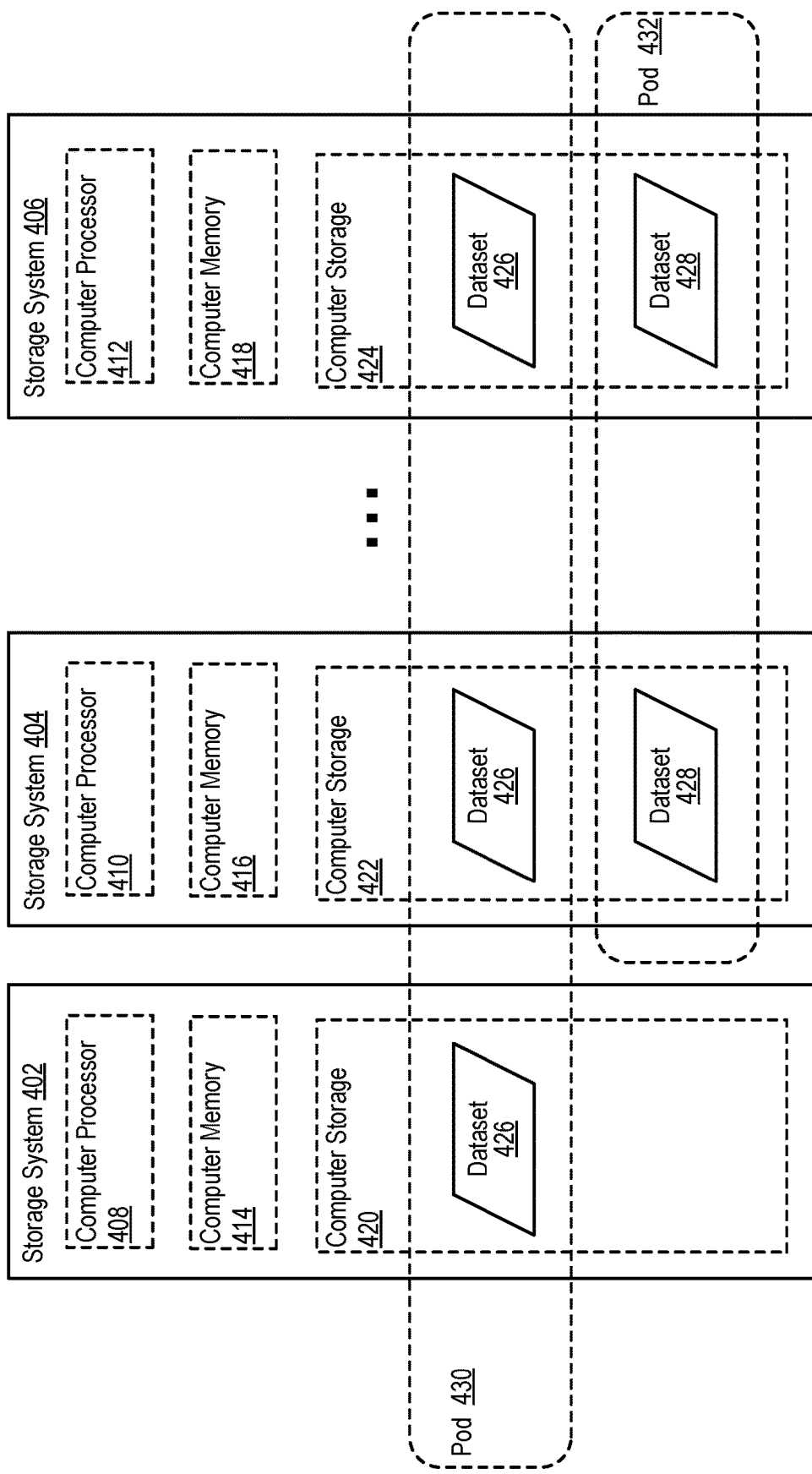
FIG. 4 sets forth a block diagram illustrating a plurality of storage systems that support a pod according to some embodiments of the present disclosure.

For further explanation, FIG. 4 sets forth a block diagram illustrating a plurality of storage systems (402, 404, 406) that support a pod according to some embodiments of the present disclosure. Although depicted in less detail, the storage systems (402, 404, 406) depicted in FIG. 4 may be similar to the storage systems described above with reference to FIGS. 1A-1D, FIGS. 2A-2G, FIGS. 3A-3B, or any combination thereof. In fact, the storage systems (402, 404, 406) depicted in FIG. 4 may include the same, fewer, or additional components as the storage systems described above.

In the example depicted in FIG. 4, each of the storage systems (402, 404, 406) is depicted as having at least one computer processor (408, 410, 412), computer memory (414, 416, 418), and computer storage (420, 422, 424). Although in some embodiments the computer memory (414, 416, 418) and the computer storage (420, 422, 424) may be part of the same hardware devices, in other embodiments the computer memory (414, 416, 418) and the computer storage (420, 422, 424) may be part of different hardware devices. The distinction between the computer memory (414, 416, 418) and the computer storage (420, 422, 424) in this particular example may be that the computer memory (414, 416, 418) is physically proximate to the computer processors (408, 410, 412) and may store computer program instructions that are executed by the computer processors (408, 410, 412), while the computer storage (420, 422, 424) is embodied as non-volatile storage for storing user data, metadata describing the user data, and so on. Referring to the example above in FIG. 1A, for example, the computer processors (408, 410, 412) and computer memory (414, 416, 418) for a particular storage system (402, 404, 406) may reside within one of more of the controllers (110A-110D) while the attached storage devices (171A-171F) may serve as the computer storage (420, 422, 424) within a particular storage system (402, 404, 406).

In the example depicted in FIG. 4, the depicted storage systems (402, 404, 406) may attach to one or more pods (430, 432) according to some embodiments of the present disclosure. Each of the pods (430, 432) depicted in FIG. 4 can include a dataset (426, 428). For example, a first pod (430) that three storage systems (402, 404, 406) have attached to includes a first dataset (426) while a second pod (432) that two storage systems (404, 406) have attached to includes a second dataset (428). In such an example, when a particular storage system attaches to a pod, the pod's dataset is copied to the particular storage system and then kept up to date as the dataset is modified. Storage systems can be removed from a pod, resulting in the dataset being no longer kept up to date on the removed storage system. In the example depicted in FIG. 4, any storage system which is active for a pod (it is an up-to-date, operating, non-faulted member of a non-faulted pod) can receive and process requests to modify or read the pod's dataset.

In the example depicted in FIG. 4, each pod (430, 432) may also include a set of managed objects and management operations, as well as a set of access operations to modify or read the dataset (426, 428) that is associated with the particular pod (430, 432). In such an example, the management operations may modify or query managed objects equivalently through any of the storage systems. Likewise, access operations to read or modify the dataset may operate equivalently through any of the storage systems. In such an example, while each storage system stores a separate copy of the dataset as a proper subset of the datasets stored and advertised for use by the storage system, the operations to modify managed objects or the dataset performed and completed through any one storage system are reflected in subsequent management objects to query the pod or subsequent access operations to read the dataset.

Readers will appreciate that pods may implement more capabilities than just a clustered synchronously replicated dataset. For example, pods can be used to implement tenants, whereby datasets are in some way securely isolated from each other. Pods can also be used to implement virtual arrays or virtual storage systems where each pod is presented as a unique storage entity on a network (e.g., a Storage Area Network, or Internet Protocol network) with separate addresses. In the case of a multi-storage-system pod implementing a virtual storage system, all physical storage systems associated with the pod may present themselves as in some way the same storage system (e.g., as if the multiple physical storage systems were no different than multiple network ports into a single storage system).

Readers will appreciate that pods may also be units of administration, representing a collection of volumes, file systems, object/analytic stores, snapshots, and other administrative entities, where making administrative changes (e.g., name changes, property changes, managing exports or permissions for some part of the pod's dataset), on any one storage system is automatically reflected to all active storage systems associated with the pod. In addition, pods could also be units of data collection and data analysis, where performance and capacity metrics are presented in ways that aggregate across all active storage systems for the pod, or that call out data collection and analysis separately for each pod, or perhaps presenting each attached storage system's contribution to the incoming content and performance for each a pod.

One model for pod membership may be defined as a list of storage systems, and a subset of that list where storage systems are considered to be in-sync for the pod. A storage system may be considered to be in-sync for a pod if it is at least within a recovery of having identical idle content for the last written copy of the dataset associated with the pod. Idle content is the content after any in-progress modifications have completed with no processing of new modifications. Sometimes this is referred to as "crash recoverable" consistency. Recovery of a pod carries out the process of reconciling differences in applying concurrent updates to in-sync storage systems in the pod. Recovery can resolve any inconsistencies between storage systems in the completion of concurrent modifications that had been requested to various members of the pod but that were not signaled to any requestor as having completed successfully. Storage systems that are listed as pod members but that are not listed as in-sync for the pod can be described as "detached" from the pod. Storage systems that are listed as pod members, are in-sync for the pod, and are currently available for actively serving data for the pod are "online" for the pod.

Each storage system member of a pod may have its own copy of the membership, including which storage systems it last knew were in-sync, and which storage systems it last knew comprised the entire set of pod members. To be online for a pod, a storage system must consider itself to be in-sync for the pod and must be communicating with all other storage systems it considers to be in-sync for the pod. If a storage system can't be certain that it is in-sync and communicating with all other storage systems that are in-sync, then it must stop processing new incoming requests for the pod (or must complete them with an error or exception) until it can be certain that it is in-sync and communicating with all other storage systems that are in-sync. A first storage system may conclude that a second paired storage system should be detached, which will allow the first storage system to continue since it is now in-sync with all storage systems now in the list. But, the second storage system must be prevented from concluding, alternatively, that the first storage system should be detached and with the second storage system continuing operation. This would result in a "split brain" condition that can lead to irreconcilable datasets, dataset corruption, or application corruption, among other dangers.

The situation of needing to determine how to proceed when not communicating with paired storage systems can arise while a storage system is running normally and then notices lost communications, while it is currently recovering from some previous fault, while it is rebooting or resuming from a temporary power loss or recovered communication outage, while it is switching operations from one set of storage system controller to another set for whatever reason, or during or after any combination of these or other kinds of events. In fact, any time a storage system that is associated with a pod can't communicate with all known non-detached members, the storage system can either wait briefly until communications can be established, go offline and continue waiting, or it can determine through some means that it is safe to detach the non-communicating storage system without risk of incurring a split brain due to the non-communicating storage system concluding the alternative view, and then continue. If a safe detach can happen quickly enough, the storage system can remain online for the pod with little more than a short delay and with no resulting application outages for applications that can issue requests to the remaining online storage systems.

One example of this situation is when a storage system may know that it is out-of-date. That can happen, for example, when a first storage system is first added to a pod that is already associated with one or more storage systems, or when a first storage system reconnects to another storage system and finds that the other storage system had already marked the first storage system as detached. In this case, this first storage system will simply wait until it connects to some other set of storage systems that are in-sync for the pod.

This model demands some degree of consideration for how storage systems are added to or removed from pods or from the in-sync pod members list. Since each storage system will have its own copy of the list, and since two independent storage systems can't update their local copy at exactly the same time, and since the local copy is all that is available on a reboot or in various fault scenarios, care must be taken to ensure that transient inconsistencies don't cause problems. For example, if one storage systems is in-sync for a pod and a second storage system is added, then if the second storage system is updated to list both storage systems as in-sync first, then if there is a fault and a restart of both storage systems, the second might startup and wait to connect to the first storage system while the first might be unaware that it should or could wait for the second storage system. If the second storage system then responds to an inability to connect with the first storage system by going through a process to detach it, then it might succeed in completing a process that the first storage system is unaware of, resulting in a split brain. As such, it may be necessary to ensure that storage systems won't disagree inappropriately on whether they might opt to go through a detach process if they aren't communicating.

One way to ensure that storage systems won't disagree inappropriately on whether they might opt to go through a detach process if they aren't communicating is to ensure that when adding a new storage system to the in-sync member list for a pod, the new storage system first stores that it is a detached member (and perhaps that it is being added as an in-sync member). Then, the existing in-sync storage systems can locally store that the new storage system is an in-sync pod member before the new storage system locally stores that same fact. If there is a set of reboots or network outages prior to the new storage system storing its in-sync status, then the original storage systems may detach the new storage system due to non-communication, but the new storage system will wait. A reverse version of this change might be needed for removing a communicating storage system from a pod: first the storage system being removed stores that it is no longer in-sync, then the storage systems that will remain store that the storage system being removed is no longer in-sync, then all storage systems delete the storage system being removed from their pod membership lists. Depending on the implementation, an intermediate persisted detached state may not be necessary. Whether or not care is required in local copies of membership lists may depend on the model storage systems use for monitoring each other or for validating their membership. If a consensus model is used for both, or if an external system (or an external distributed or clustered system) is used to store and validate pod membership, then inconsistencies in locally stored membership lists may not matter.

When communications fail or one or several storage systems in a pod fail, or when a storage system starts up (or fails over to a secondary controller) and can't communicate with paired storage systems for a pod, and it is time for one or more storage systems to decide to detach one or more paired storage systems, some algorithm or mechanism must be employed to decide that it is safe to do so and to follow through on the detach. One means of resolving detaches is use a majority (or quorum) model for membership. With three storage systems, as long as two are communicating, they can agree to detach a third storage system that isn't communicating, but that third storage system cannot by itself choose to detach either of the other two. Confusion can arise when storage system communication is inconsistent. For example, storage system A might be communicating with storage system B but not C, while storage system B might be communicating with both A and C. So, A and B could detach C, or B and C could detach A, but more communication between pod members may be needed to figure this out.

Care needs to be taken in a quorum membership model when adding and removing storage systems. For example, if a fourth storage system is added, then a "majority" of storage systems is at that point three. The transition from three storage systems (with two required for majority) to a pod including a fourth storage system (with three required for majority) may require something similar to the model described previously for carefully adding a storage system to the in-sync list. For example, the fourth storage system might start in an attaching state but not yet attached where it would never instigate a vote over quorum. Once in that state, the original three pod members could each be updated to be aware of the fourth member and the new requirement for a three storage system majority to detach a fourth. Removing a storage system from a pod might similarly move that storage system to a locally stored "detaching" state before updating other pod members. A variant scheme for this is to use a distributed consensus mechanism such as PAXOS or RAFT to implement any membership changes or to process detach requests.

Another means of managing membership transitions is to use an external system that is outside of the storage systems themselves to handle pod membership. In order to become online for a pod, a storage system must first contact the external pod membership system to verify that it is in-sync for the pod. Any storage system that is online for a pod should then remain in communication with the pod membership system and should wait or go offline if it loses communication. An external pod membership manager could be implemented as a highly available cluster using various cluster tools, such as Oracle RAC, Linux HA, VERITAS Cluster Server, IBM's HACMP, or others. An external pod membership manager could also use distributed configuration tools such as Etcd or Zookeeper, or a reliable distributed database such as Amazon's DynamoDB.

In the example depicted in FIG. 4, the depicted storage systems (402, 404, 406) may receive a request to read a portion of the dataset (426, 428) and process the request to read the portion of the dataset locally according to some embodiments of the present disclosure. Readers will appreciate that although requests to modify (e.g., a write operation) the dataset (426, 428) require coordination between the storage systems (402, 404, 406) in a pod, as the dataset (426, 428) should be consistent across all storage systems (402, 404, 406) in a pod, responding to a request to read a portion of the dataset (426, 428) does not require similar coordination between the storage systems (402, 404, 406). As such, a particular storage system that receives a read request may service the read request locally by reading a portion of the dataset (426, 428) that is stored within the storage system's storage devices, with no synchronous communication with other storage systems in the pod. Read requests received by one storage system for a replicated dataset in a replicated cluster are expected to avoid any communication in the vast majority of cases, at least when received by a storage system that is running within a cluster that is also running nominally. Such reads should normally be processed simply by reading from the local copy of a clustered dataset with no further interaction required with other storage systems in the cluster.

Readers will appreciate that the storage systems may take steps to ensure read consistency such that a read request will return the same result regardless of which storage system processes the read request. For example, the resulting clustered dataset content for any set of updates received by any set of storage systems in the cluster should be consistent across the cluster, at least at any time updates are idle (all previous modifying operations have been indicated as complete and no new update requests have been received and processed in any way). More specifically, the instances of a clustered dataset across a set of storage systems can differ only as a result of updates that have not yet completed. This means, for example, that any two write requests which overlap in their volume block range, or any combination of a write request and an overlapping snapshot, compare-and-write, or virtual block range copy, must yield a consistent result on all copies of the dataset. Two operations should not yield a result as if they happened in one order on one storage system and a different order on another storage system in the replicated cluster.

Furthermore, read requests can be made time order consistent. For example, if one read request is received on a replicated cluster and completed and that read is then followed by another read request to an overlapping address range which is received by the replicated cluster and where one or both reads in any way overlap in time and volume address range with a modification request received by the replicated cluster (whether any of the reads or the modification are received by the same storage system or a different storage system in the replicated cluster), then if the first read reflects the result of the update then the second read should also reflect the results of that update, rather than possibly returning data that preceded the update. If the first read does not reflect the update, then the second read can either reflect the update or not. This ensures that between two read requests "time" for a data segment cannot roll backward.

In the example depicted in FIG. 4, the depicted storage systems (402, 404, 406) may also detect a disruption in data communications with one or more of the other storage systems and determine whether to the particular storage system should remain in the pod. A disruption in data communications with one or more of the other storage systems may occur for a variety of reasons. For example, a disruption in data communications with one or more of the other storage systems may occur because one of the storage systems has failed, because a network interconnect has failed, or for some other reason. An important aspect of synchronous replicated clustering is ensuring that any fault handling doesn't result in unrecoverable inconsistencies, or any inconsistency in responses. For example, if a network fails between two storage systems, at most one of the storage systems can continue processing newly incoming I/O requests for a pod. And, if one storage system continues processing, the other storage system can't process any new requests to completion, including read requests.

In the example depicted in FIG. 4, the depicted storage systems (402, 404, 406) may also determine whether the particular storage system should remain in the pod in response to detecting a disruption in data communications with one or more of the other storage systems. As mentioned above, to be 'online' as part of a pod, a storage system must consider itself to be in-sync for the pod and must be communicating with all other storage systems it considers to be in-sync for the pod. If a storage system can't be certain that it is in-sync and communicating with all other storage systems that are in-sync, then it may stop processing new incoming requests to access the dataset (426, 428). As such, the storage system may determine whether to the particular storage system should remain online as part of the pod, for example, by determining whether it can communicate with all other storage systems it considers to be in-sync for the pod (e.g., via one or more test messages), by determining whether the all other storage systems it considers to be in-sync for the pod also consider the storage system to be attached to the pod, through a combination of both steps where the particular storage system must confirm that it can communicate with all other storage systems it considers to be in-sync for the pod and that all other storage systems it considers to be in-sync for the pod also consider the storage system to be attached to the pod, or through some other mechanism.

In the example depicted in FIG. 4, the depicted storage systems (402, 404, 406) may also keep the dataset on the particular storage system accessible for management and dataset operations in response to determining that the particular storage system should remain in the pod. The storage system may keep the dataset (426, 428) on the particular storage system accessible for management and dataset operations, for example, by accepting requests to access the version of the dataset (426, 428) that is stored on the storage system and processing such requests, by accepting and processing management operations associated with the dataset (426, 428) that are issued by a host or authorized administrator, by accepting and processing management operations associated with the dataset (426, 428) that are issued by one of the other storage systems, or in some other way.

In the example depicted in FIG. 4, the depicted storage systems (402, 404, 406) may, however, make the dataset on the particular storage system inaccessible for management and dataset operations in response to determining that the particular storage system should not remain in the pod. The storage system may make the dataset (426, 428) on the particular storage system inaccessible for management and dataset operations, for example, by rejecting requests to access the version of the dataset (426, 428) that is stored on the storage system, by rejecting management operations associated with the dataset (426, 428) that are issued by a host or other authorized administrator, by rejecting management operations associated with the dataset (426, 428) that are issued by one of the other storage systems in the pod, or in some other way.

In the example depicted in FIG. 4, the depicted storage systems (402, 404, 406) may also detect that the disruption in data communications with one or more of the other storage systems has been repaired and make the dataset on the particular storage system accessible for management and dataset operations. The storage system may detect that the disruption in data communications with one or more of the other storage systems has been repaired, for example, by receiving a message from the one or more of the other storage systems. In response to detecting that the disruption in data communications with one or more of the other storage systems has been repaired, the storage system may make the dataset (426, 428) on the particular storage system accessible for management and dataset operations once the previously detached storage system has been resynchronized with the storage systems that remained attached to the pod.

In the example depicted in FIG. 4, the depicted storage systems (402, 404, 406) may also go offline from the pod such that the particular storage system no longer allows management and dataset operations. The depicted storage systems (402, 404, 406) may go offline from the pod such that the particular storage system no longer allows management and dataset operations for a variety of reasons. For example, the depicted storage systems (402, 404, 406) may also go offline from the pod due to some fault with the storage system itself, because an update or some other maintenance is occurring on the storage system, due to communications faults, or for many other reasons. In such an example, the depicted storage systems (402, 404, 406) may subsequently update the dataset on the particular storage system to include all updates to the dataset since the particular storage system went offline and go back online with the pod such that the particular storage system allows management and dataset operations, as will be described in greater detail in the resynchronization sections included below.

In the example depicted in FIG. 4, the depicted storage systems (402, 404, 406) may also identifying a target storage system for asynchronously receiving the dataset, where the target storage system is not one of the plurality of storage systems across which the dataset is synchronously replicated. Such a target storage system may represent, for example, a backup storage system, as some storage system that makes use of the synchronously replicated dataset, and so on. In fact, synchronous replication can be leveraged to distribute copies of a dataset closer to some rack of servers, for better local read performance. One such case is smaller top-of-rack storage systems symmetrically replicated to larger storage systems that are centrally located in the data center or campus and where those larger storage systems are more carefully managed for reliability or are connected to external networks for asynchronous replication or backup services.

In the example depicted in FIG. 4, the depicted storage systems (402, 404, 406) may also identify a portion of the dataset that is not being asynchronously replicated to the target storage system by any of the other storages systems and asynchronously replicate, to the target storage system, the portion of the dataset that is not being asynchronously replicated to the target storage system by any of the other storages systems, wherein the two or more storage systems collectively replicate the entire dataset to the target storage system. In such a way, the work associated with asynchronously replicating a particular dataset may be split amongst the members of a pod, such that each storage system in a pod is only responsible for asynchronously replicating a subset of a dataset to the target storage system.

In the example depicted in FIG. 4, the depicted storage systems (402, 404, 406) may also detach from the pod, such that the particular storage system that detaches from the pod is no longer included in the set of storage systems across which the dataset is synchronously replicated. For example, if storage system (404) in FIG. 4 detached from the pod (430) illustrated in FIG. 4, the pod (430) would only include storage systems (402, 406) as the storage systems across which the dataset (426) that is included in the pod (430) would be synchronously replicated across. In such an example, detaching the storage system from the pod could also include removing the dataset from the particular storage system that detached from the pod. Continuing with the example where the storage system (404) in FIG. 4 detached from the pod (430) illustrated in FIG. 4, the dataset (426) that is included in the pod (430) could be deleted or otherwise removed from the storage system (404).

Readers will appreciate that there are a number of unique administrative capabilities enabled by the pod model that can further be supported. Also, the pod model itself introduces some issues that can be addressed by an implementation. For example, when a storage system is offline for a pod, but is otherwise running, such as because an interconnect failed and another storage system for the pod won out in mediation, there may still be a desire or need to access the offline pod's dataset on the offline storage system. One solution may be simply to enable the pod in some detached mode and allow the dataset to be accessed. However, that solution can be dangerous and that solution can cause the pod's metadata and data to be much more difficult to reconcile when the storage systems do regain communication. Furthermore, there could still be a separate path for hosts to access the offline storage system as well as the still online storage systems. In that case, a host might issue I/O to both storage systems even though they are no longer being kept in sync, because the host sees target ports reporting volumes with the same identifiers and the host I/O drivers presume it sees additional paths to the same volume. This can result in fairly damaging data corruption as reads and writes issued to both storage systems are no longer consistent even though the host presumes they are. As a variant of this case, in a clustered application, such as a shared storage clustered database, the clustered application running on one host might be reading or writing to one storage system and the same clustered application running on another host might be reading or writing to the "detached" storage system, yet the two instances of the clustered application are communicating between each other on the presumption that the dataset they each see is entirely consistent for completed writes. Since they aren't consistent, that presumption is violated and the application's dataset (e.g., the database) can quickly end up being corrupted.

One way to solve both of these problems is to allow for an offline pod, or perhaps a snapshot of an offline pod, to be copied to a new pod with new volumes that have sufficiently new identities that host I/O drivers and clustered applications won't confuse the copied volumes as being the same as the still online volumes on another storage system. Since each pod maintains a complete copy of the dataset, which is crash consistent but perhaps slightly different from the copy of the pod dataset on another storage system, and since each pod has an independent copy of all data and metadata needed to operate on the pod content, it is a straightforward problem to make a virtual copy of some or all volumes or snapshots in the pod to new volumes in a new pod. In a logical extent graph implementation, for example, all that is needed is to define new volumes in a new pod which reference logical extent graphs from the copied pod associated with the pod's volumes or snapshots, and with the logical extent graphs being marked as copy on write. The new volumes should be treated as new volumes, similarly to how volume snapshots copied to a new volume might be implemented. Volumes may have the same administrative name, though within a new pod namespace. But, they should have different underlying identifiers, and differing logical unit identifiers from the original volumes.

In some cases it may be possible to use virtual network isolation techniques (for example, by creating a virtual LAN in the case of IP networks or a virtual SAN in the case of fiber channel networks) in such a way that isolation of volumes presented to some interfaces can be assured to be inaccessible from host network interfaces or host SCSI initiator ports that might also see the original volumes. In such cases, it may be safe to provide the copies of volumes with the same SCSI or other storage identifiers as the original volumes. This could be used, for example, in cases where the applications expect to see a particular set of storage identifiers in order to function without an undue burden in reconfiguration.

Some of the techniques described herein could also be used outside of an active fault context to test readiness for handling faults. Readiness testing (sometimes referred to as "fire drills") is commonly required for disaster recovery configurations, where frequent and repeated testing is considered a necessity to ensure that most or all aspects of a disaster recovery plan are correct and account for any recent changes to applications, datasets, or changes in equipment. Readiness testing should be non-disruptive to current production operations, including replication. In many cases the real operations can't actually be invoked on the active configuration, but a good way to get close is to use storage operations to make copies of production datasets, and then perhaps couple that with the use of virtual networking, to create an isolated environment containing all data that is believed necessary for the important applications that must be brought up successfully in cases of disasters. Making such a copy of a synchronously replicated (or even an asynchronously replicated) dataset available within a site (or collection of sites) that is expected to perform a disaster recovery readiness test procedure and then starting the important applications on that dataset to ensure that it can startup and function is a great tool, since it helps ensure that no important parts of the application datasets were left out in the disaster recovery plan. If necessary, and practical, this could be coupled with virtual isolated networks coupled perhaps with isolated collection of physical or virtual machines, to get as close as possible to a real world disaster recovery takeover scenario. Virtually copying a pod (or set of pods) to another pod as a point-in-time image of the pod datasets immediately creates an isolated dataset that contains all the copied elements and that can then be operated on essentially identically to the originally pods, as well as allowing isolation to a single site (or a few sites) separately from the original pod. Further, these are fast operations and they can be torn down and repeated easily allowing testing to repeated as often as is desired.

Some enhancements could be made to get further toward perfect disaster recovery testing. For example, in conjunction with isolated networks, SCSI logical unit identities or other types of identities could be copied into the target pod so that the test servers, virtual machines, and applications see the same identities. Further, the administrative environment of the servers could be configured to respond to requests from a particular virtual set of virtual networks to respond to requests and operations on the original pod name so scripts don't require use of test-variants with alternate "test" versions of object names. A further enhancement can be used in cases where the host-side server infrastructure that will take over in the case of a disaster takeover can be used during a test. This includes cases where a disaster recovery data center is completely stocked with alternative server infrastructure that won't generally be used until directed to do so by a disaster. It also includes cases where that infrastructure might be used for non-critical operations (for example, running analytics on production data, or simply supporting application development or other functions which may be important but can be halted if needed for more critical functions). Specifically, host definitions and configurations and the server infrastructure that will use them can be set up as they will be for an actual disaster recovery takeover event and tested as part of disaster recovery takeover testing, with the tested volumes being connected to these host definitions from the virtual pod copy used to provide a snapshot of the dataset. From the standpoint of the storage systems involved, then, these host definitions and configurations used for testing, and the volume-to-host connection configurations used during testing, can be reused when an actual disaster takeover event is triggered, greatly minimizing the configuration differences between the test configuration and the real configuration that will be used in case of a disaster recovery takeover.

In some cases it may make sense to move volumes out of a first pod and into a new second pod including just those volumes. The pod membership and high availability and recovery characteristics can then be adjusted separately, and administration of the two resulting pod datasets can then be isolated from each other. An operation that can be done in one direction should also be possible in the other direction. At some point, it may make sense to take two pods and merge them into one so that the volumes in each of the original two pods will now track each other for storage system membership and high availability and recovery characteristics and events. Both operations can be accomplished safely and with reasonably minimal or no disruption to running applications by relying on the characteristics suggested for changing mediation or quorum properties for a pod which were discussed in an earlier section. With mediation, for example, a mediator for a pod can be changed using a sequence consisting of a step where each storage system in a pod is changed to depend on both a first mediator and a second mediator and each is then changed to depend only on the second mediator. If a fault occurs in the middle of the sequence, some storage systems may depend on both the first mediator and the second mediator, but in no case will recovery and fault handling result in some storage systems depending only on the first mediator and other storage systems only depending on the second mediator. Quorum can be handled similarly by temporarily depending on winning against both a first quorum model and a second quorum model in order to proceed to recovery. This may result in a very short time period where availability of the pod in the face of faults depend on additional resources, thus reducing potential availability, but this time period is very short and the reduction in availability is often very little. With mediation, if the change in mediator parameters is nothing more than the change in the key used for mediation and the mediation service used is the same, then the potential reduction in availability is even less, since it now depends only on two calls to the same service versus one call to that service, and rather than separate calls to two separate services.

Readers will note that changing the quorum model may be quite complex. An additional step may be necessary where storage systems will participate in the second quorum model but won't depend on winning in that second quorum model, which is then followed by the step of also depending on the second quorum model. This may be necessary to account for the fact that if only one system has processed the change to depend on the quorum model, then it will never win quorum since there will never be a majority. With this model in place for changing the high availability parameters (mediation relationship, quorum model, takeover preferences), we can create a safe procedure for these operations to split a pod into two or to join two pods into one. This may require adding one other capability: linking a second pod to a first pod for high availability such that if two pods include compatible high availability parameters the second pod linked to the first pod can depend on the first pod for determining and instigating detach-related processing and operations, offline and in-sync states, and recovery and resynchronization actions.

To split a pod into two, which is an operation to move some volumes into a newly created pod, a distributed operation may be formed that can be described as: form a second pod into which we will move a set of volumes which were previously in a first pod, copy the high availability parameters from the first pod into the second pod to ensure they are compatible for linking, and link the second pod to the first pod for high availability. This operation may be encoded as messages and should be implemented by each storage system in the pod in such a way that the storage system ensures that the operation happens completely on that storage system or does not happen at all if processing is interrupted by a fault. Once all in-sync storage systems for the two pods have processed this operation, the storage systems can then process a subsequent operation which changes the second pod so that it is no longer linked to the first pod. As with other changes to high availability characteristics for a pod, this involves first having each in-sync storage system change to rely on both the previous model (that model being that high availability is linked to the first pod) and the new model (that model being its own now independent high availability). In the case of mediation or quorum, this means that storage systems which processed this change will first depend on mediation or quorum being achieved as appropriate for the first pod and will additionally depend on a new separate mediation (for example, a new mediation key) or quorum being achieved for the second pod before the second pod can proceed following a fault that required mediation or testing for quorum. As with the previous description of changing quorum models, an intermediate step may set storage systems to participate in quorum for the second pod before the step where storage systems participate in and depend on quorum for the second pod. Once all in-sync storage systems have processed the change to depend on the new parameters for mediation or quorum for both the first pod and the second pod, the split is complete.

Joining a second pod into a first pod operates essentially in reverse. First, the second pod must be adjusted to be compatible with the first pod, by having an identical list of storage systems and by having a compatible high availability model. This may involve some set of steps such as those described elsewhere in this paper to add or remove storage systems or to change mediator and quorum models. Depending on implementation, it may be necessary only to reach an identical list of storage systems. Joining proceeds by processing an operation on each in-sync storage system to link the second pod to the first pod for high availability. Each storage system which processes that operation will then depend on the first pod for high availability and then the second pod for high availability. Once all in-sync storage systems for the second pod have processed that operation, the storage systems will then each process a subsequent operation to eliminate the link between the second pod and the first pod, migrate the volumes from the second pod into the first pod, and delete the second pod. Host or application dataset access can be preserved throughout these operations, as long as the implementation allows proper direction of host or application dataset modification or read operations to the volume by identity and as long as the identity is preserved as appropriate to the storage protocol or storage model (for example, as long as logical unit identifiers for volumes and use of target ports for accessing volumes are preserved in the case of SCSI).

Migrating a volume between pods may present issues. If the pods have an identical set of in-sync membership storage systems, then it may be straightforward: temporarily suspend operations on the volumes being migrated, switch control over operations on those volumes to controlling software and structures for the new pod, and then resume operations. This allows for a seamless migration with continuous uptime for applications apart from the very brief operation suspension, provided network and ports migrate properly between pods. Depending on the implementation, suspending operations may not even be necessary, or may be so internal to the system that the suspension of operations has no impact. Copying volumes between pods with different in-sync membership sets is more of a problem. If the target pod for the copy has a subset of in-sync members from the source pod, this isn't much of a problem: a member storage system can be dropped safely enough without having to do more work. But, if the target pod adds in-sync member storage systems to the volume over the source pod, then the added storage systems must be synchronized to include the volume's content before they can be used. Until synchronized, this leaves the copied volumes distinctly different from the already synchronized volumes, in that fault handling differs and request handling from the not yet synced member storage systems either won't work or must be forwarded or won't be as fast because reads will have to traverse an interconnect. Also, the internal implementation will have to handle some volumes being in sync and ready for fault handling and others not being in sync.

There are other problems relating to reliability of the operation in the face of faults. Coordinating a migration of volumes between multi-storage-system pods is a distributed operation. If pods are the unit of fault handling and recovery, and if mediation or quorum or whatever means are used to avoid split-brain situations, then a switch in volumes from one pod with a particular set of state and configurations and relationships for fault handling, recovery, mediation and quorum to another then storage systems in a pod have to be careful about coordinating changes related to that handling for any volumes. Operations can't be atomically distributed between storage systems, but must be staged in some way. Mediation and quorum models essentially provide pods with the tools for implementing distributed transactional atomicity, but this may not extend to inter-pod operations without adding to the implementation.

Consider even a simple migration of a volume from a first pod to a second pod even for two pods that share the same first and second storage systems. At some point the storage systems will coordinate to define that the volume is now in the second pod and is no longer in the first pod. If there is no inherent mechanism for transactional atomicity across the storage systems for the two pods, then a naive implementation could leave the volume in the first pod on the first storage system and the second pod on the second storage system at the time of a network fault that results in fault handling to detach storage systems from the two pods. If pods separately determine which storage system succeeds in detaching the other, then the result could be that the same storage system detaches the other storage system for both pods, in which case the result of the volume migration recovery should be consistent, or it could result in a different storage system detaching the other for the two pods. If the first storage system detaches the second storage system for the first pod and the second storage system detaches the first storage system for the second pod, then recovery might result in the volume being recovered to the first pod on the first storage system and into the second pod on the second storage system, with the volume then running and exported to hosts and storage applications on both storage systems. If instead the second storage system detaches the first storage system for the first pod and first storage detaches the second storage system for the second pod, then recovery might result in the volume being discarded from the second pod by the first storage system and the volume being discarded from the first pod by the second storage system, resulting in the volume disappearing entirely. If the pods a volume is being migrated between are on differing sets of storage systems, then things can get even more complicated.

A solution to these problems may be to use an intermediate pod along with the techniques described previously for splitting and joining pods. This intermediate pod may never be presented as visible managed objects associated with the storage systems. In this model, volumes to be moved from a first pod to a second pod are first split from the first pod into a new intermediate pod using the split operation described previously. The storage system members for the intermediate pod can then be adjusted to match the membership of storage systems by adding or removing storage systems from the pod as necessary. Subsequently, the intermediate pod can be joined with the second pod.

Figure 5:
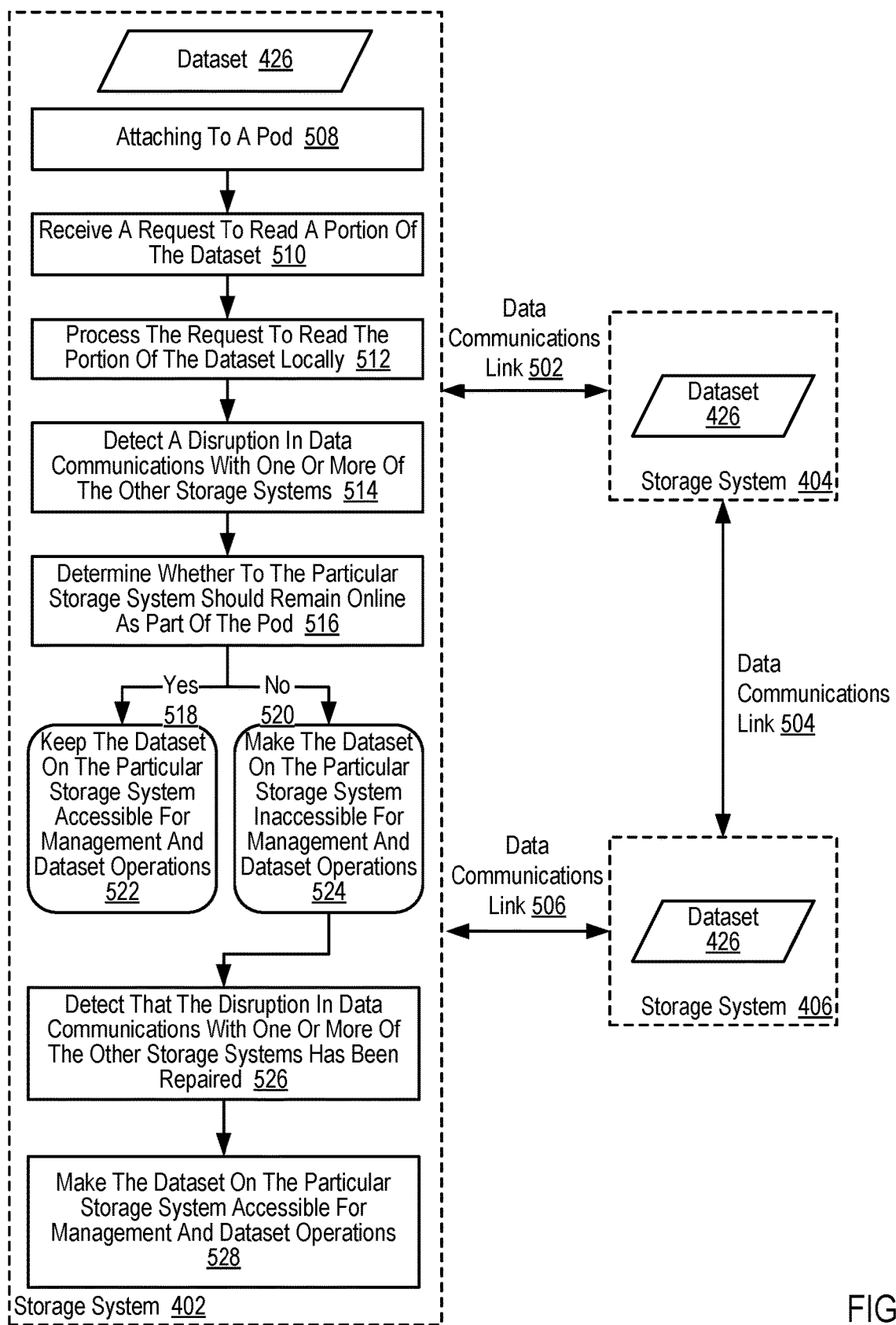
FIG. 5 sets forth a block diagram illustrating a plurality of storage systems that support a pod according to some embodiments of the present disclosure.

For further explanation, FIG. 5 sets forth a flow chart illustrating steps that may be performed by storage systems (402, 404, 406) that support a pod according to some embodiments of the present disclosure. Although depicted in less detail, the storage systems (402, 404, 406) depicted in FIG. 5 may be similar to the storage systems described above with reference to FIGS. 1A-1D, FIGS. 2A-2G, FIGS. 3A-3B, FIG. 4, or any combination thereof. In fact, the storage systems (402, 404, 406) depicted in FIG. 5 may include the same, fewer, additional components as the storage systems described above.

In the example method depicted in FIG. 5, a storage system (402) may attach (508) to a pod. The model for pod membership may include a list of storage systems and a subset of that list where storage systems are presumed to be in-sync for the pod. A storage system is in-sync for a pod if it is at least within a recovery of having identical idle content for the last written copy of the dataset associated with the pod. Idle content is the content after any in-progress modifications have completed with no processing of new modifications. Sometimes this is referred to as "crash recoverable" consistency. Storage systems that are listed as pod members but that are not listed as in-sync for the pod can be described as "detached" from the pod. Storage systems that are listed as pod members, are in-sync for the pod, and are currently available for actively serving data for the pod are "online" for the pod.

In the example method depicted in FIG. 5, the storage system (402) may attach (508) to a pod, for example, by synchronizing its locally stored version of the dataset (426) along with an up-to-date version of the dataset (426) that is stored on other storage systems (404, 406) in the pod that are online, as the term is described above. In such an example, in order for the storage system (402) to attach (508) to the pod, a pod definition stored locally within each of the storage systems (402, 404, 406) in the pod may need to be updated in order for the storage system (402) to attach (508) to the pod. In such an example, each storage system member of a pod may have its own copy of the membership, including which storage systems it last knew were in-sync, and which storage systems it last knew comprised the entire set of pod members.

In the example method depicted in FIG. 5, the storage system (402) may also receive (510) a request to read a portion of the dataset (426) and the storage system (402) may process (512) the request to read the portion of the dataset (426) locally. Readers will appreciate that although requests to modify (e.g., a write operation) the dataset (426) require coordination between the storage systems (402, 404, 406) in a pod, as the dataset (426) should be consistent across all storage systems (402, 404, 406) in a pod, responding to a request to read a portion of the dataset (426) does not require similar coordination between the storage systems (402, 404, 406). As such, a particular storage system (402) that receives a read request may service the read request locally by reading a portion of the dataset (426) that is stored within the storage system's (402) storage devices, with no synchronous communication with other storage systems (404, 406) in the pod. Read requests received by one storage system for a replicated dataset in a replicated cluster are expected to avoid any communication in the vast majority of cases, at least when received by a storage system that is running within a cluster that is also running nominally. Such reads should normally be processed simply by reading from the local copy of a clustered dataset with no further interaction required with other storage systems in the cluster.

Readers will appreciate that the storage systems may take steps to ensure read consistency such that a read request will return the same result regardless of which storage system processes the read request. For example, the resulting clustered dataset content for any set of updates received by any set of storage systems in the cluster should be consistent across the cluster, at least at any time updates are idle (all previous modifying operations have been indicated as complete and no new update requests have been received and processed in any way). More specifically, the instances of a clustered dataset across a set of storage systems can differ only as a result of updates that have not yet completed. This means, for example, that any two write requests which overlap in their volume block range, or any combination of a write request and an overlapping snapshot, compare-and-write, or virtual block range copy, must yield a consistent result on all copies of the dataset. Two operations cannot yield a result as if they happened in one order on one storage system and a different order on another storage system in the replicated cluster.

Furthermore, read requests may be time order consistent. For example, if one read request is received on a replicated cluster and completed and that read is then followed by another read request to an overlapping address range which is received by the replicated cluster and where one or both reads in any way overlap in time and volume address range with a modification request received by the replicated cluster (whether any of the reads or the modification are received by the same storage system or a different storage system in the replicated cluster), then if the first read reflects the result of the update then the second read should also reflect the results of that update, rather than possibly returning data that preceded the update. If the first read does not reflect the update, then the second read can either reflect the update or not. This ensures that between two read requests "time" for a data segment cannot roll backward.

In the example method depicted in FIG. 5, the storage system (402) may also detect (514) a disruption in data communications with one or more of the other storage systems (404, 406). A disruption in data communications with one or more of the other storage systems (404, 406) may occur for a variety of reasons. For example, a disruption in data communications with one or more of the other storage systems (404, 406) may occur because one of the storage systems (402, 404, 406) has failed, because a network interconnect has failed (e.g., some portion of data communications link (502), data communications link (504), or data communications link (506) has failed), or for some other reason. An important aspect of synchronous replicated clustering is ensuring that any fault handling doesn't result in unrecoverable inconsistencies, or any inconsistency in responses. For example, if a network fails between two storage systems, at most one of the storage systems can continue processing newly incoming I/O requests for a pod. And, if one storage system continues processing, the other storage system can't process any new requests to completion, including read requests.

In the example method depicted in FIG. 5, the storage system (402) may also determine (516) whether to the particular storage system (402) should remain online as part of the pod. As mentioned above, to be 'online' as part of a pod, a storage system must consider itself to be in-sync for the pod and must be communicating with all other storage systems it considers to be in-sync for the pod. If a storage system can't be certain that it is in-sync and communicating with all other storage systems that are in-sync, then it may stop processing new incoming requests to access the dataset (426). As such, the storage system (402) may determine (516) whether to the particular storage system (402) should remain online as part of the pod, for example, by determining whether it can communicate with all other storage systems (404, 406) it considers to be in-sync for the pod (e.g., via one or more test messages), by determining whether the all other storage systems (404, 406) it considers to be in-sync for the pod also consider the storage system (402) to be attached to the pod, through a combination of both steps where the particular storage system (402) must confirm that it can communicate with all other storage systems (404, 406) it considers to be in-sync for the pod and that all other storage systems (404, 406) it considers to be in-sync for the pod also consider the storage system (402) to be attached to the pod, or through some other mechanism.

In the example method depicted in FIG. 5, the storage system (402) may also, responsive to affirmatively (518) determining that the particular storage system (402) should remain online as part of the pod, keep (522) the dataset (426) on the particular storage system (402) accessible for management and dataset operations. The storage system (402) may keep (522) the dataset (426) on the particular storage system (402) accessible for management and dataset operations, for example, by accepting requests to access the version of the dataset (426) that is stored on the storage system (402) and processing such requests, by accepting and processing management operations associated with the dataset (426) that are issued by a host or authorized administrator, by accepting and processing management operations associated with the dataset (426) that are issued by one of the other storage systems (404, 406) in the pod, or in some other way.

In the example method depicted in FIG. 5, the storage system (402) may also, responsive to determining that the particular storage system should not (520) remain online as part of the pod, make (524) the dataset (426) on the particular storage system (402) inaccessible for management and dataset operations. The storage system (402) may make (524) the dataset (426) on the particular storage system (402) inaccessible for management and dataset operations, for example, by rejecting requests to access the version of the dataset (426) that is stored on the storage system (402), by rejecting management operations associated with the dataset (426) that are issued by a host or other authorized administrator, by rejecting management operations associated with the dataset (426) that are issued by one of the other storage systems (404, 406) in the pod, or in some other way.

In the example method depicted in FIG. 5, the storage system (402) may also detect (526) that the disruption in data communications with one or more of the other storage systems (404, 406) has been repaired. The storage system (402) may detect (526) that the disruption in data communications with one or more of the other storage systems (404, 406) has been repaired, for example, by receiving a message from the one or more of the other storage systems (404, 406). In response to detecting (526) that the disruption in data communications with one or more of the other storage systems (404, 406) has been repaired, the storage system (402) may make (528) the dataset (426) on the particular storage system (402) accessible for management and dataset operations.

Readers will appreciate that the example depicted in FIG. 5 describes an embodiment in which various actions are depicted as occurring within some order, although no ordering is required. Furthermore, other embodiments may exist where the storage system (402) only carries out a subset of the described actions. For example, the storage system (402) may perform the steps of detecting (514) a disruption in data communications with one or more of the other storage systems (404, 406), determining (516) whether to the particular storage system (402) should remain in the pod, keeping (522) the dataset (426) on the particular storage system (402) accessible for management and dataset operations or making (524) the dataset (426) on the particular storage system (402) inaccessible for management and dataset operations without first receiving (510) a request to read a portion of the dataset (426) and processing (512) the request to read the portion of the dataset (426) locally. Furthermore, the storage system (402) may detect (526) that the disruption in data communications with one or more of the other storage systems (404, 406) has been repaired and make (528) the dataset (426) on the particular storage system (402) accessible for management and dataset operations without first receiving (510) a request to read a portion of the dataset (426) and processing (512) the request to read the portion of the dataset (426) locally. In fact, none of the steps described herein are explicitly required in all embodiments as prerequisites for performing other steps described herein.

Figure 6:
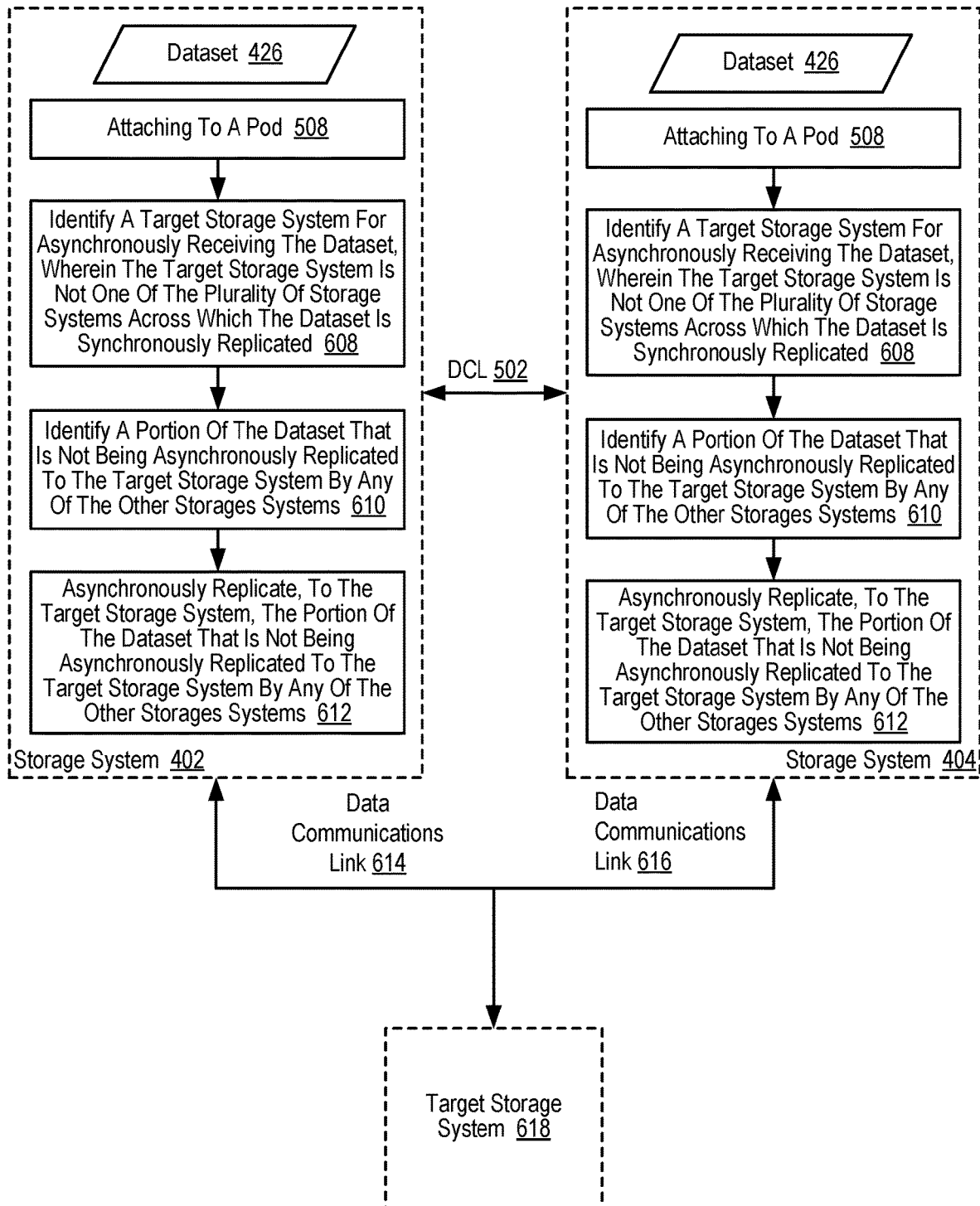
FIG. 6 sets forth a block diagram illustrating a plurality of storage systems that support a pod according to some embodiments of the present disclosure.

For further explanation, FIG. 6 sets forth a flow chart illustrating steps that may be performed by storage systems (402, 404, 406) that support a pod according to some embodiments of the present disclosure. Although depicted in less detail, the storage systems (402, 404, 406) depicted in FIG. 6 may be similar to the storage systems described above with reference to FIGS. 1A-1D, FIGS. 2A-2G, FIGS. 3A-3B, FIG. 4, or any combination thereof. In fact, the storage systems (402, 404, 406) depicted in FIG. 6 may include the same, fewer, additional components as the storage systems described above and each of the storage systems may be configured for data communications via one or more data communications links (502, 614, 616).

In the example method depicted in FIG. 6, two or more of the storage systems (402, 404) may each identify (608) a target storage system (618) for asynchronously receiving the dataset (426). The target storage system (618) for asynchronously receiving the dataset (426) may be embodied, for example, as a backup storage system that is located in a different data center than either of the storage systems (402, 404) that are members of a particular pod, as cloud storage that is provided by a cloud services provider, or in many other ways. Readers will appreciate that the target storage system (618) is not one of the plurality of storage systems (402, 404) across which the dataset (426) is synchronously replicated, and as such, the target storage system (618) initially does not include an up-to-date local copy of the dataset (426).

In the example method depicted in FIG. 6, two or more of the storage systems (402, 404) may each also identify (610) a portion of the dataset (426) that is not being asynchronously replicated to the target storage system (618) by any of the other storages systems that are members of a pod that includes the dataset (426). In such an example, the storage systems (402, 404) may each asynchronously replicate (612), to the target storage system (618), the portion of the dataset (426) that is not being asynchronously replicated to the target storage system by any of the other storages systems. Consider an example in which a first storage system (402) is responsible for asynchronously replicating a first portion (e.g., a first half of an address space) of the dataset (426) to the target storage system (618). In such an example, the second storage system (404) would be responsible for asynchronously replicating a second portion (e.g., a second half of an address space) of the dataset (426) to the target storage system (618), such that the two or more storage systems (402, 404) collectively replicate the entire dataset (426) to the target storage system (618).

Readers will appreciate that through the use of pods, as described above, the replication relationship between two storage systems may be switched from a relationship where data is asynchronously replicated to a relationship where data is synchronously replicated. For example, if storage system A is configured to asynchronously replicate a dataset to storage system B, creating a pod that includes the dataset, storage system A as a member, and storage system B as a member can switch the relationship where data is asynchronously replicated to a relationship where data is synchronously replicated. Likewise, through the use of pods, the replication relationship between two storage systems may be switched from a relationship where data is synchronously replicated to a relationship where data is asynchronously replicated. For example, if a pod is created that includes the dataset, storage system A as a member, and storage system B as a member, by merely unstretching the pod (to remove storage system A as a member or to remove storage system B as a member), a relationship where data is synchronously replicated between the storage systems can immediately be switched to a relationship where data is asynchronously replicated. In such a way, storage systems may switch back-and-forth as needed between asynchronous replication and synchronous replication.

This switching can be facilitated by the implementation relying on similar techniques for both synchronous and asynchronous replication. For example, if resynchronization for a synchronously replicated dataset relies on the same or a compatible mechanism as is used for asynchronous replication, then switching to asynchronous replication is conceptually identical to dropping the in-sync state and leaving a relationship in a state similar to a "perpetual recovery" mode. Likewise, switching from asynchronous replication to synchronous replication can operate conceptually by "catching up" and becoming in-sync just as is done when completing a resynchronization with the switching system becoming an in-sync pod member.

Alternatively, or additionally, if both synchronous and asynchronous replication rely on similar or identical common metadata, or a common model for representing and identifying logical extents or stored block identities, or a common model for representing content-addressable stored blocks, then these aspects of commonality can be leveraged to dramatically reduce the content that may need to be transferred when switching to and from synchronous and asynchronous replication. Further, if a dataset is asynchronously replicated from a storage system A to a storage system B, and system B further asynchronously replicates that data set to a storage system C, then a common metadata model, common logical extent or block identities, or common representation of content-addressable stored blocks, can dramatically reduce the data transfers needed to enable synchronous replication between storage system A and storage system C.

Readers will further appreciate that that through the use of pods, as described above, replication techniques may be used to perform tasks other than replicating data. In fact, because a pod may include a set of managed objects, tasks like migrating a virtual machine may be carried out using pods and the replication techniques described herein. For example, if virtual machine A is executing on storage system A, by creating a pod that includes virtual machine A as a managed object, storage system A as a member, and storage system B as a member, virtual machine A and any associated images and definitions may be migrated to storage system B, at which time the pod could simply be destroyed, membership could be updated, or other actions may be taken as necessary.

Figure 7:
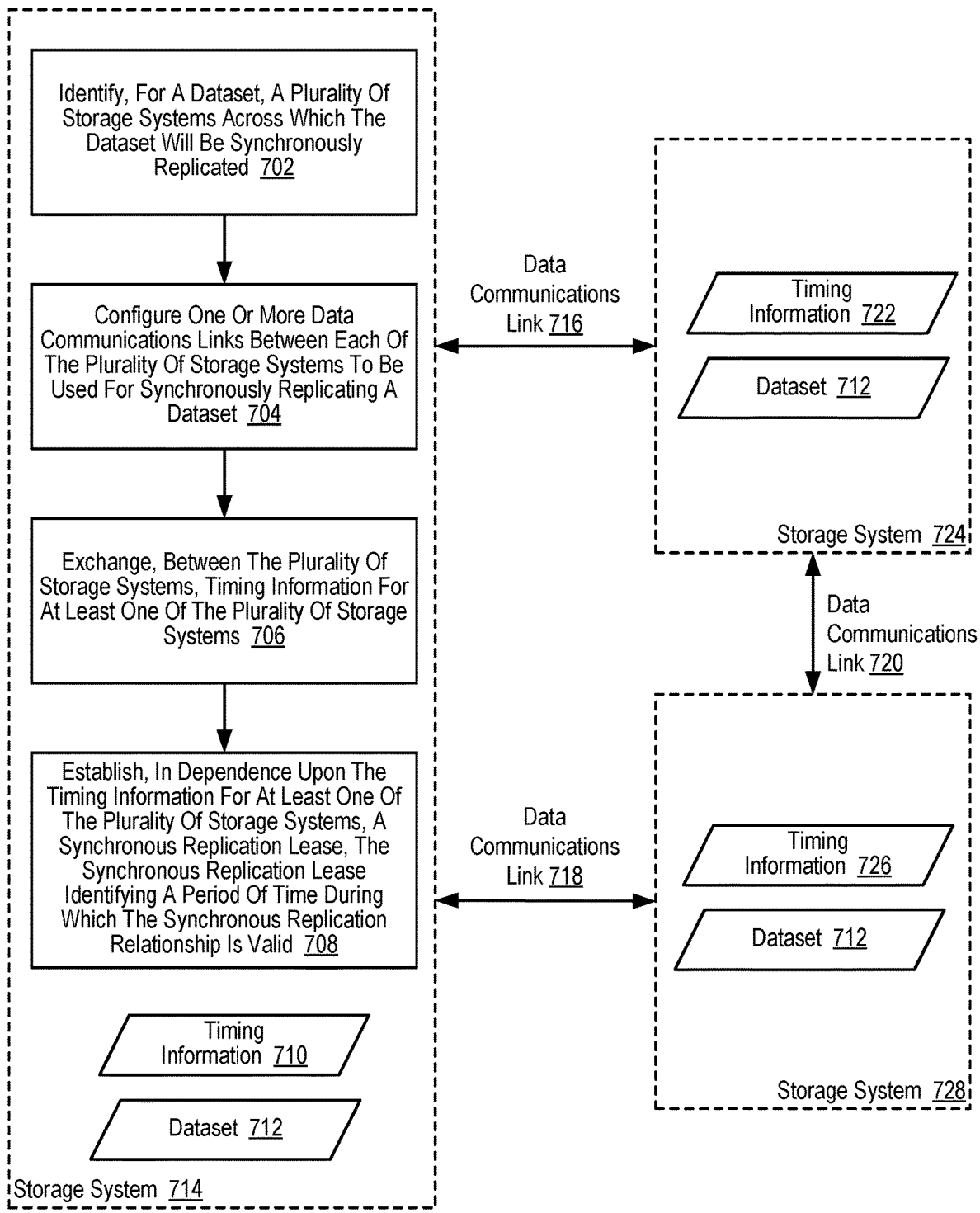
FIG. 7 sets forth a flow chart illustrating an example method of establishing a synchronous replication relationship between two or more storage systems according to some embodiments of the present disclosure.

For further explanation, FIG. 7 sets forth a flow chart illustrating an example method of establishing a synchronous replication relationship between two or more storage systems (714, 724, 728) according to some embodiments of the present disclosure. Although depicted in less detail, the storage systems (714, 724, 728) depicted in FIG. 7 may be similar to the storage systems described above with reference to FIGS. 1A-1D, FIGS. 2A-2G, FIGS. 3A-3B, or any combination thereof. In fact, the storage systems (714, 724, 728) depicted in FIG. 7 may include the same, fewer, additional components as the storage systems described above.

The example method depicted in FIG. 7 includes identifying (702), for a dataset (712), a plurality of storage systems (714, 724, 728) across which the dataset (712) will be synchronously replicated. The dataset (712) depicted in FIG. 7 may be embodied, for example, as the contents of a particular volume, as the contents of a particular shard of a volume, or as any other collection of one or more data elements. The dataset (712) may be synchronized across a plurality of storage systems (714, 724, 728) such that each storage system (714, 724, 728) retains a local copy of the dataset (712). In the examples described herein, such a dataset (712) is synchronously replicated across the storage systems (714, 724, 728) in such a way that the dataset (712) can be accessed through any of the storage systems (714, 724, 728) with performance characteristics such that any one storage system in the cluster doesn't operate substantially more optimally than any other storage system in the cluster, at least as long as the cluster and the particular storage system being accessed are running nominally. In such systems, modifications to the dataset (712) should be made to the copy of the dataset that resides on each storage system (714, 724, 728) in such a way that accessing the dataset (712) on any of the storage systems (714, 724, 728) will yield consistent results. For example, a write request issued to the dataset must be serviced on all storage systems (714, 724, 728) or serviced on none of the storage systems (714, 724, 728). Likewise, some groups of operations (e.g., two write operations that are directed to same location within the dataset) must be executed in the same order on all storage systems (714, 724, 728) such that the copy of the dataset that resides on each storage system (714, 724, 728) is ultimately identical. Modifications to the dataset (712) need not be made at the exact same time, but some actions (e.g., issuing an acknowledgement that a write request directed to the dataset, enabling read access to a location within the dataset that is targeted by a write request that has not yet been completed on all storage systems) may be delayed until the copy of the dataset (712) on each storage system (714, 724, 728) has been modified.

In the example method depicted in FIG. 7, identifying (702), for a dataset (712), a plurality of storage systems (714, 724, 728) across which the dataset (712) will be synchronously replicated may be carried out, for example, by examining a pod definition or similar data structure that associates a dataset (712) with one or more storage systems (714, 724, 728) which nominally store that dataset (712). A 'pod', as the term is used here and throughout the remainder of the present application, may be embodied as a management entity that represents a dataset, a set of managed objects and management operations, a set of access operations to modify or read the dataset, and a plurality of storage systems. Such management operations may modify or query managed objects equivalently through any of the storage systems, where access operations to read or modify the dataset operate equivalently through any of the storage systems. Each storage system may store a separate copy of the dataset as a proper subset of the datasets stored and advertised for use by the storage system, where operations to modify managed objects or the dataset performed and completed through any one storage system are reflected in subsequent management objects to query the pod or subsequent access operations to read the dataset. Additional details regarding a 'pod' may be found in previously filed provisional patent application No. 62/518,071, which is incorporated herein by reference. In such an example, the pod definition may include at least an identification of a dataset (712) and a set of storage systems (714, 724, 728) across which the dataset (712) is synchronously replicated. Such a pod may encapsulate some of number of (perhaps optional) properties including symmetric access, flexible addition/removal of replicas, high availability data consistency, uniform user administration across storage systems in relationship to the dataset, managed host access, application clustering, and so on. Storage systems can be added to a pod, resulting in the pod's dataset (712) being copied to that storage system and then kept up to date as the dataset (712) is modified. Storage systems can also be removed from a pod, resulting in the dataset (712) being no longer kept up to date on the removed storage system. In such examples, a pod definition or similar data structure may be updated as storage systems are added to and removed from a particular pod.

The example method depicted in FIG. 7 also includes configuring (704) one or more data communications links (716, 718, 720) between each of the plurality of storage systems (714, 724, 728) to be used for synchronously replicating the dataset (712). In the example method depicted in FIG. 6, the storage systems (714, 724, 728) in a pod must communicate with each other both for high bandwidth data transfer, and for cluster, status, and administrative communication. These distinct types of communication could be over the same data communications links (716, 718, 720) or, in an alternative embodiment, these distinct types of communication could be over separate data communications links (716, 718, 720). In a cluster of dual controller storage systems, both controllers in each storage system should have the nominal ability to communicate with both controllers for any paired storage systems (i.e., any other storage system in a pod).

In a primary/secondary controller design, all cluster communication for active replication may run between primary controllers until a fault occurs. In such systems, some communication may occur between a primary controller and a secondary controller, or between secondary controllers on distinct storage systems, in order to verify that the data communications links between such entities are operational. In other cases, virtual network addresses might be used to limit the configuration needed for of inter-datacenter network links, or to simplify design of the clustered aspect of the storage system. In an active/active controller design, cluster communications might run from all active controllers of one storage system to some or all active controllers in any paired storage systems, or they might be filtered through a common switch, or they might use a virtual network address to simplify configuration, or they might use some combination. In a scale-out design, two or more common network switches may be used such that all scale-out storage controllers within the storage system connect to the network switches in order to handle data traffic. The switches might or might not use techniques to limit the number of exposed network addresses, so that paired storage systems don't need to be configured with the network addresses of all storage controllers.

In the example method depicted in FIG. 7, configuring (704) one or more data communications links (716, 718, 720) between each of the plurality of storage systems (714, 724, 728) to be used for synchronously replicating the dataset (712) may be carried out, for example, by configuring the storage systems (716, 718, 720) to communicate via defined ports over a data communications network, by configuring the storage systems (716, 718, 720) to communicate over a point-to-point data communications link between two of the storage systems (716, 724, 728), or in a variety of ways. If secure communication is required, some form of key exchange may be needed, or communication could be done or bootstrapped through some service such as SSH (Secure SHell), SSL, or some other service or protocol built around public keys or Diffie-Hellman key exchange or reasonable alternatives. Secure communications could also be mediated through some vendor-provided cloud service tied in some way to customer identities. Alternately, a service configured to run on customer facilities, such as running in a virtual machine or container, could be used to mediate key exchanges necessary for secure communications between replicating storage systems (716, 718, 720). Readers will appreciate that a pod including more than two storage systems may need communication links between most or all of the individual storage systems. In the example depicted in FIG. 6, three data communications links (716, 718, 720) are illustrated, although additional data communications links may exist in other embodiments.

Readers will appreciate that communication between the storage systems (714, 724, 728) across which the dataset (712) will be synchronously replicated serves some number of purposes. One purpose, for example, is to deliver data from one storage system (714, 724, 728) to another storage system (714, 724, 728) as part of I/O processing. For example, processing a write commonly requires delivering the write content and some description of the write to any paired storage systems for a pod. Another purpose served by data communications between the storage systems (714, 724, 728) may be to communicate configuration changes and analytics data in order to handle creating, extending, deleting or renaming volumes, files, object buckets, and so on. Another purpose served by data communications between the storage systems (714, 724, 728) may be to carry out communication involved in detecting and handling storage system and interconnect faults. This type of communication may be time critical and may need to be prioritized to ensure it doesn't get stuck behind a long network queue delay when a large burst of write traffic is suddenly dumped on the datacenter interconnect.

Readers will further appreciate that different types of communication may use the same connections, or different connections, and may use the same networks, or different networks, in various combinations. Further, some communications may be encrypted and secured while other communications might not be encrypted. In some cases, the data communications links could be used to forward I/O requests (either directly as the requests themselves or as logical descriptions of the operations the I/O requests represent) from one storage system to another. This could be used, for example, in cases where one storage system has up-to-date and in-sync content for a pod, and another storage system does not currently have up-to-date and in-sync content for the pod. In such cases, as long as the data communications links are running, requests can be forwarded from the storage system that is not up-to-date and in-sync to the storage system that is up-to-date and in-sync.

The example method depicted in FIG. 7 also includes exchanging (706), between the plurality of storage systems (714, 724, 728), timing information (710, 722, 726) for at least one of the plurality of storage systems (714, 724, 728). In the example method depicted in FIG. 6, timing information (710, 722, 726) for a particular storage system (714, 724, 728) may be embodied, for example, as the value of a clock within the storage system (714, 724, 728). In an alternative embodiment, the timing information (710, 722, 726) for a particular storage system (714, 724, 728) may be embodied as a value which serves as a proxy for a clock value. The value which serves as a proxy for a clock value may be included in a token that is exchanged between the storage systems. Such a value which serves as a proxy for a clock value may be embodied, for example, a sequence number that a particular storage system (714, 724, 728) or storage system controller can internally record as having been sent at a particular time. In such an example, if the token (e.g., the sequence number) is received back, the associated clock value can be found and utilized as the basis for determining whether a valid lease is still in place. In the example method depicted in FIG. 6, exchanging (706) timing information (710, 722, 726) for at least one of the plurality of storage systems (714, 724, 728) between the plurality of storage systems (714, 724, 728) may be carried out, for example, by each storage system (714, 724, 728) sending timing information to each other storage system (714, 724, 728) in a pod on a periodic basis, on demand, within a predetermined amount of time after a lease is established, within a predetermined amount of time before a lease is set to expire, as part of an attempt to initiate or re-establish a synchronous replication relationship, or in some other way.

The example method depicted in FIG. 7 also includes establishing (708), in dependence upon the timing information (710, 722, 726) for at least one of the plurality of storage systems (714, 724, 728), a synchronous replication lease, the synchronous replication lease identifying a period of time during which the synchronous replication relationship is valid. In the example method depicted in FIG. 7, a synchronous replication relationship is formed as a set of storage systems (714, 724, 728) that replicate some dataset (712) between these largely independent stores, where each storage systems (714, 724, 728) has its own copy and its own separate internal management of relevant data structures for defining storage objects, for mapping objects to physical storage, for deduplication, for defining the mapping of content to snapshots, and so on. A synchronous replication relationship can be specific to a particular dataset, such that a particular storage system (714, 724, 728) may be associated with more than one synchronous replication relationship, where each synchronous replication relationship is differentiated by the dataset being described and may further consist of a different set of additional member storage systems.

In the example method depicted in FIG. 7, a synchronous replication lease may be established (708) in dependence upon the timing information (710, 722, 726) for at least one of the plurality of storage systems (714, 724, 728) in a variety of different ways. In one embodiment, the storage systems may establish (708) a synchronous replication lease by utilizing the timing information (710, 722, 726) for each of the plurality of storage systems (714, 724, 728) to coordinate clocks. In such an example, once the clocks are coordinated for each of the storage systems (714, 724, 728), the storage system may establish (708) a synchronous replication lease that extends for a predetermined period of time beyond the coordinated clock values. For example, if the clocks for each storage system (714, 724, 728) are coordinated to be at a value of X, the storage systems (714, 724, 728) may each be configured to establish a synchronous replication lease that is valid until X+2 seconds.

In an alternative embodiment, the need to coordinate clocks between the storage systems (714, 724, 728) may be avoided while still achieving a timing guarantee. In such an embodiment, a storage controller within each storage system (714, 724, 728) may have a local monotonically increasing clock. A synchronous replication lease may be established (708) between storage controllers (such as a primary controller in one storage system communicating with a primary controller in a paired storage system) by each controller sending its clock value to the other storage controllers along with the last clock value it received from the other storage controller. When a particular controller receives back its clock value from another controller, it adds some agreed upon lease interval to that received clock value and uses that to establish (708) its local synchronous replication lease. In such a way, the synchronous replication lease may be calculated in dependence upon a value of a local clock that was received from another storage system.

Consider an example in which a storage controller in a first storage system (714) is communicating with a storage controller in a second storage system (724). In such an example, assume that the value of the monotonically increasing clock for the storage controller in the first storage system (714) is 1000 milliseconds. Further assume that the storage controller in the first storage system (714) sends a message to the storage controller in the second storage system (724) indicating that its clock value at the time that the message was generated was 1000 milliseconds. In such an example, assume that 500 milliseconds after the storage controller in the first storage system (714) sent a message to the storage controller in the second storage system (724) indicating that its clock value at the time that the message was generated was 1000 milliseconds, the storage controller in the first storage system (714) receives a message from the storage controller in a second storage system (724) indicating that: 1) the value of the monotonically increasing clock in the storage controller in the second storage system (724) was at a value of 5000 milliseconds when the message was generated, and 2) the last value of the monotonically increasing clock in the storage controller in the first storage system (714) that was received by the second storage system (724) was 1000 milliseconds. In such an example, if the agreed upon lease interval is 2000 milliseconds, the first storage system (714) will establish (708) a synchronous replication lease that is valid until the monotonically increasing clock for the storage controller in the first storage system (714) is at a value of 3000 milliseconds. If the storage controller in the first storage system (714) does not receive a message from the storage controller in the second storage system (724) that includes an updated value of the monotonically increasing clock for the storage controller in the first storage system (714) by the time that the monotonically increasing clock for the storage controller in the first storage system (714) reaches a value of 3000 milliseconds, the first storage system (714) will treat the synchronous replication lease to have expired and may take various actions as described in greater detail below. Readers will appreciate that storage controllers within the remaining storage systems (724, 728) in a pod may react similarly and perform a similar tracking and updating of the synchronous replication lease. Essentially, the receiving controller can be assured that the network and the paired controllers were running somewhere during that time interval, and it can be assured that the paired controller received a message that it sent somewhere during that time interval. Without any coordination in clocks, the receiving controller can't know exactly where in that time interval the network and the paired controller were running, and can't really know if there were queue delays in sending its clock value or in receiving back its clock value.

In a pod consisting of two storage systems, each with a simple primary controller, where the primary controllers are exchanging clocks as part of their cluster communication, each primary controller can use the activity lease to put a bound on when it won't know for certain that the paired controller was running. At the point it becomes uncertain (when the controller's connection's activity lease has expired), it can start sending messages indicating that it is uncertain and that a properly synchronized connection must be reestablished before activity leases can again be resumed. These messages may be received and responses may not be received, if the network is working in one direction but is not working properly in the other direction. This may be the first indication by a running paired controller that the connection isn't running normally, because its own activity lease may not yet have expired, due to a different combination of lost messages and queue delays. As a result, if such a message is received, it should also consider its own activity lease to be expired, and it should start sending messages of its own attempting to coordinate synchronizing the connection and resuming of activity leases. Until that happens and a new set of clock exchanges can succeed, neither controller can consider its activity lease to be valid.

In this model, a controller can wait for lease interval seconds after it started sending reestablish messages, and if it hasn't received a response, it can be assured that either the paired controller is down or the paired controller's own lease for the connection will have expired. To handle minor amounts of clock drift, it may wait slightly longer than the lease interval (i.e., a reestablishment lease). When a controller receives a reestablish message, it could consider the reestablishment lease to be expired immediately, rather than waiting (since it knows that the sending controller's activity lease has expired), but it will often make sense to attempt further messaging before giving up, in case message loss was a temporary condition caused, for example, by a congested network switch.

In an alternative embodiment, in addition to establishing a synchronous replication lease, a cluster membership lease may also be established upon receipt of a clock value from a paired storage system or upon receipt back of a clock exchanged with a paired storage system. In such an example, each storage system may have its own synchronous replication lease and its own cluster membership lease with every paired storage system. The expiration of a synchronous replication lease with any pair may result in paused processing. Cluster membership, however, cannot be recalculated until the cluster membership lease has expired with all pairs. As such, the duration of the cluster membership lease should be set, based on the message and clock value interactions, to ensure that the cluster membership lease with a pair will not expire until after a pair's synchronous replication link for that link has expired. Readers will appreciate that a cluster membership lease can be established by each storage system in a pod and may be associated with a communication link between any two storage systems that are members of the pod. Furthermore, the cluster membership lease may extend after the expiration of the synchronous replication lease for a duration of time that is at least as long as the time period for expiration of the synchronous replication lease. The cluster membership lease may be extended on receipt of a clock value received from a paired storage system as part of a clock exchange, where the cluster membership lease period from the current clock value may be at least as long as the period established for the last synchronous replication lease extension based on exchanged clock values. In additional embodiments, additional cluster membership information can be exchanged over a connection, including when a session is first negotiated. Readers will appreciate that in embodiments that utilize a cluster membership lease, each storage system (or storage controller) may have its own value for the cluster membership lease. Such a lease should not expire until it can be assured that all synchronous replication leases across all pod members will have expired given that the cluster lease expiration allows establishing new membership such as through a mediator race and the synchronous replication lease expiration forces processing of new requests to pause. In such an example, the pause must be assured to be in place everywhere before cluster membership actions can be taken.

Readers will appreciate that although only one of the storage systems (714) is depicted as identifying (702), for a dataset (712), a plurality of storage systems (714, 724, 728) across which the dataset (712) will be synchronously replicated, configuring (704) one or more data communications links (716, 718, 720) between each of the plurality of storage systems (714, 724, 728) to be used for synchronously replicating the dataset (712), exchanging (706), between the plurality of storage systems (714, 724, 728), timing information (710, 722, 726) for at least one of the plurality of storage systems (714, 724, 728), and establishing (708), in dependence upon the timing information (710, 722, 726) for at least one of the plurality of storage systems (714, 724, 728), a synchronous replication lease, the remaining storage systems (724, 728) may also carry out such steps. In fact, all three storage systems (714, 724, 728) may carry out one or more of the steps described above at the same time, as establishing a synchronous replication relationship between two or more storage systems (714, 724, 728) may require collaboration and interaction between two or more storage systems (714, 724, 728).

Figure 8:
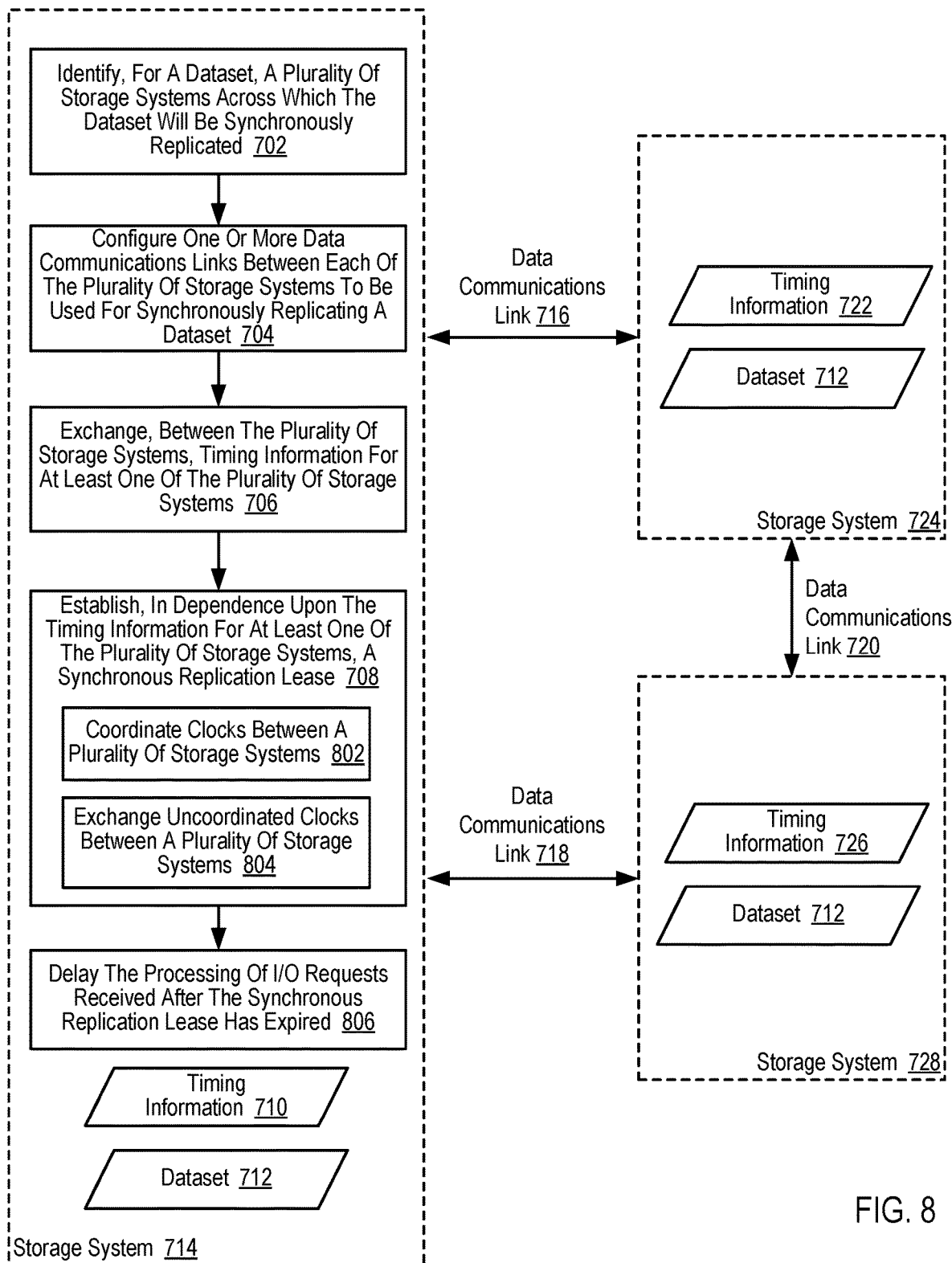
FIG. 8 sets forth a flow chart illustrating an additional example method of establishing a synchronous replication relationship between two or more storage systems according to some embodiments of the present disclosure.

For further explanation, FIG. 8 sets forth a flow chart illustrating an additional example method of establishing a synchronous replication relationship between two or more storage systems (714, 724, 728) according to some embodiments of the present disclosure. The example method depicted in FIG. 8 is similar to the example method depicted in FIG. 7, as the example method depicted in FIG. 8 also includes identifying (702), for a dataset (712), a plurality of storage systems (714, 724, 728) across which the dataset (712) will be synchronously replicated, configuring (704) one or more data communications links (716, 718, 720) between each of the plurality of storage systems (714, 724, 728) to be used for synchronously replicating the dataset (712), exchanging (706), between the plurality of storage systems (714, 724, 728), timing information (710, 722, 726) for at least one of the plurality of storage systems (714, 724, 728), and establishing (708), in dependence upon the timing information (710, 722, 726) for at least one of the plurality of storage systems (714, 724, 728), a synchronous replication lease, the synchronous replication lease identifying a period of time during which the synchronous replication relationship is valid.

In the example method depicted in FIG. 8, establishing (708), in dependence upon the timing information (710, 722, 726) for at least one of the plurality of storage systems (714, 724, 728), a synchronous replication lease can include coordinating (802) clocks between a plurality of storage systems (714, 724, 728). In the example method depicted in FIG. 8, coordinating (802) clocks between a plurality of storage systems (714, 724, 728) may be carried out, for example, through the exchange of one or more messages sent between the storage systems (714, 724, 728). The one or more messages sent between the storage systems (714, 724, 728) may include information such as, for example, the clock value of a storage system whose clock value will be used by all other storage systems, an instruction for all storage systems to set their clock values to a predetermined value, confirmation messages from a storage system that has updated its clock value, and so on. In such an example, the storage systems (714, 724, 728) may be configured such that the clock value for a particular storage system (e.g., a leader storage system) should be used by all other storage systems, the clock value from all of the storage system that meets some particular criteria (e.g., the highest clock value) should be used all other storage systems, and so on. In such an example, some predetermined amount of time may be added to a clock value received from another storage system to account for transmission times associated with the exchange of messages.

In the example method depicted in FIG. 8, establishing (708), in dependence upon the timing information (710, 722, 726) for at least one of the plurality of storage systems (714, 724, 728), a synchronous replication lease can include exchanging (804) uncoordinated clocks between a plurality of storage systems (714, 724, 728). Exchanging (804) uncoordinated clocks between a plurality of storage systems (714, 724, 728) may be carried, for example, by a storage controller in each storage system (714, 724, 728) exchanging values for a local monotonically increasing clock as described in greater detail above. In such an example, each storage system (714, 724, 728) may utilize an agreed upon synchronous replication lease interval and messaging received from other storage systems (714, 724, 728) to establish (708) a synchronous replication lease.

The example method depicted in FIG. 8 also includes delaying (806) the processing of I/O requests received after the synchronous replication lease has expired. I/O requests received by any of the storage systems after the synchronous replication lease has expired may be delayed (806), for example, for a predetermined amount of time that is sufficient for attempting to re-establish a synchronous replication relationship, until a new synchronous replication lease has been established, and so on. In such an example, a storage system may delay (806) the processing of I/O requests by failing with some type of 'busy' or temporary failure indication, or in some other way.

Figure 9:
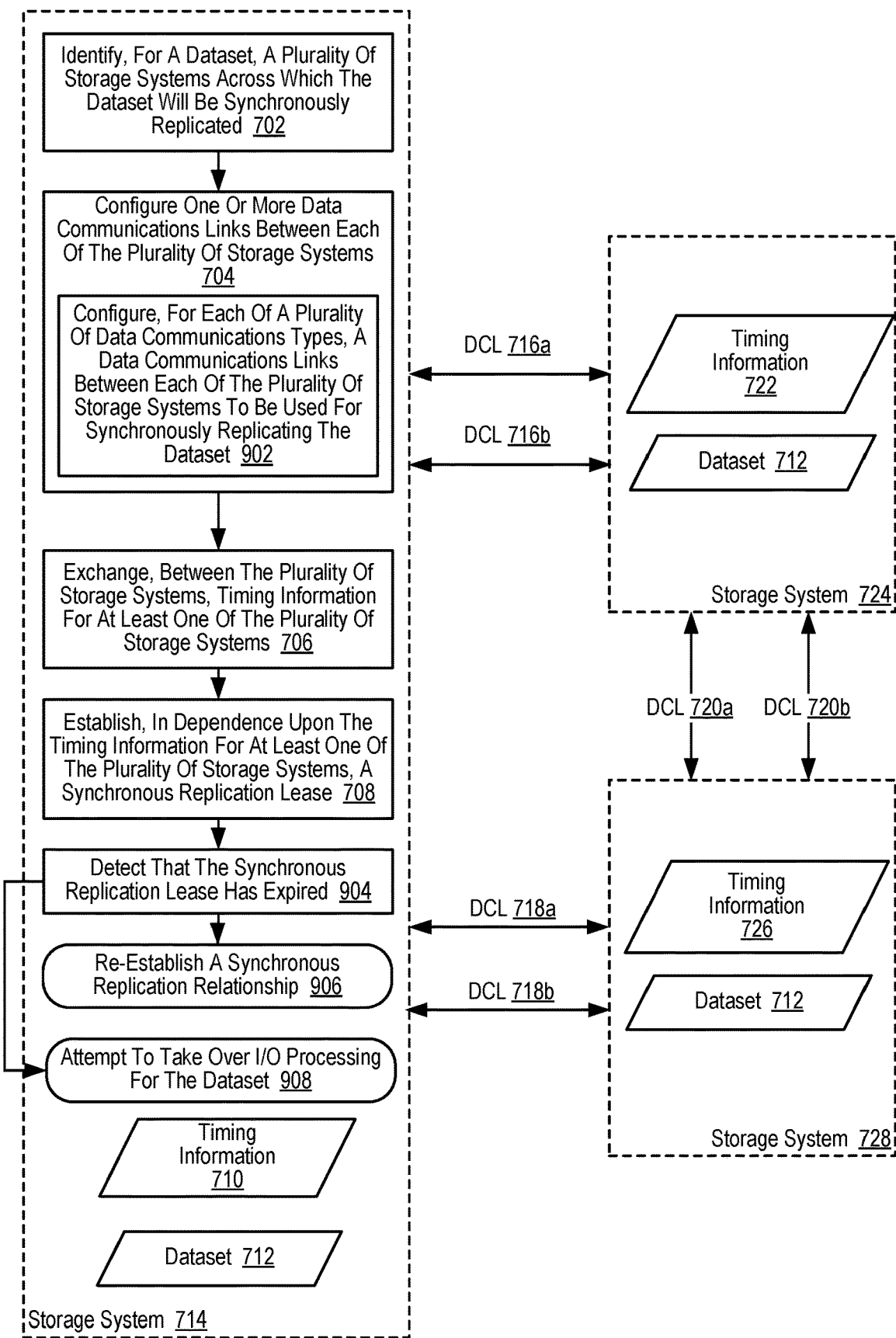
FIG. 9 sets forth a flow chart illustrating an additional example method of establishing a synchronous replication relationship between two or more storage systems according to some embodiments of the present disclosure.

For further explanation, FIG. 9 sets forth a flow chart illustrating an additional example method of establishing a synchronous replication relationship between two or more storage systems (714, 724, 728) according to some embodiments of the present disclosure. The example method depicted in FIG. 9 is similar to the example method depicted in FIG. 7, as the example method depicted in FIG. 9 also includes identifying (702), for a dataset (712), a plurality of storage systems (714, 724, 728) across which the dataset (712) will be synchronously replicated, configuring (704) one or more data communications links (716*a*, 716*b*, 718*a*, 718*b*, 720*a*, 720*b*) between each of the plurality of storage systems (714, 724, 728) to be used for synchronously replicating the dataset (712), exchanging (706), between the plurality of storage systems (714, 724, 728), timing information (710, 722, 726) for at least one of the plurality of storage systems (714, 724, 728), and establishing (708), in dependence upon the timing information (710, 722, 726) for at least one of the plurality of storage systems (714, 724, 728), a synchronous replication lease, the synchronous replication lease identifying a period of time during which the synchronous replication relationship is valid.

In the example method depicted in FIG. 9, configuring (704) one or more data communications links (716*a*, 716*b*, 718*a*, 718*b*, 720*a*, 720*b*) between each of the plurality of storage systems (714, 724, 728) to be used for synchronously replicating the dataset (712) can include configuring (902), for each of a plurality of data communications types, a data communications link (716*a*, 716*b*, 718*a*, 718*b*, 720*a*, 720*b*) between each of the plurality of storage systems (714, 724, 728) to be used for synchronously replicating the dataset (712). In the example method depicted in FIG. 9, each storage system may be configured to generate a plurality of data communications types that the storage system sends to other storage systems in a pod. For example, a storage system may generate data communications of a first type that includes data that is part of I/O processing (e.g., data to be written to a storage system as part of a write request issued by a host), the storage system may be configured to generate data communications of a second type that includes configuration changes (e.g., information generated in response to create, extend, delete or rename volumes), the storage system may be configured to generate data communications of a third type that includes communication involved in detecting and handling storage system and interconnect faults, and so on. In such an example, the data communications type may be determined, for example, based on which software module initiated the message, based on which hardware component initiated the message, based on the type of event that caused the message to be initiated, and in other ways. In the example method depicted in FIG. 9, configuring (902) a data communications link (716*a*, 716*b*, 718*a*, 718*b*, 720*a*, 720*b*) between each of the plurality of storage systems (714, 724, 728) for each of a plurality of data communications types may be carried out, for example, by configuring the storage systems to use distinct interconnects for each of a plurality of data communications types, by configuring the storage systems to use distinct networks for each of a plurality of data communications types, or in other ways.

The example method depicted in FIG. 9 also includes detecting (904) that the synchronous replication lease has expired. In the example method depicted in FIG. 9, detecting (904) that the synchronous replication lease has expired may be carried out, for example, by a particular storage system comparing a current clock value to the period of time during which the lease was valid. Consider an example in which the storage systems (714, 724, 728) coordinated clocks to set the value of a clock within each storage system (714, 724, 728) to a value of 5000 milliseconds and each storage system (714, 724, 728) was configured to establish (708) a synchronous replication lease that extended for a lease interval of 2000 milliseconds beyond their clock values, such that the synchronous replication lease for each storage system (714, 724, 728) expired when the clock within a particular storage system (714, 724, 728) reached a value that exceeds 7000 milliseconds. In such an example, detecting (904) that the synchronous replication lease has expired may be carried out by determining that the clock within a particular storage system (714, 724, 728) reached a value of 7001 milliseconds or higher.

Readers will appreciate that the occurrence of other events may also cause each storage system (714, 724, 728) to immediately treat a synchronous replication lease as being expired, For example, a storage system (714, 724, 728) may immediately treat a synchronous replication lease as being expired upon detecting a communications failure between the storage system (714, 724, 728) and another storage system (714, 724, 728) in the pod, a storage system (714, 724, 728) may immediately treat a synchronous replication lease as being expired upon receiving a lease re-establishment message from another storage system (714, 724, 728) in the pod, a storage system (714, 724, 728) may immediately treat a synchronous replication lease as being expired upon detecting that another storage system (714, 724, 728) in the pod has failed, and so on. In such an example, the occurrence of any of the events described in the preceding sentence may cause a storage system to detect (904) that the synchronous replication lease has expired.

The example method depicted in FIG. 9 also includes re-establishing (906) a synchronous replication relationship. In the example method depicted in FIG. 9, re-establishing (906) a synchronous replication relationship may be carried out, for example, through the use of one or more re-establishment messages. Such re-establishment messages can include, for example, an identification of a pod for which the synchronous replication relationship is to be re-established, information needed to configure one or more data communications links, updated timing information, and so on. In such a way, the storage systems (714, 724, 728) may re-establish (906) a synchronous replication relationship in much the same way that the synchronous replication relationship was initially created, including but not limited to, each storage system performing one or more of: identifying (702), for a dataset (712), a plurality of storage systems (714, 724, 728) across which the dataset (712) will be synchronously replicated, configuring (704) one or more data communications links (716*a*, 716*b*, 718*a*, 718*b*, 720*a*, 720*b*) between each of the plurality of storage systems (714, 724, 728) to be used for synchronously replicating the dataset (712), exchanging (706), between the plurality of storage systems (714, 724, 728), timing information (710, 722, 726) for at least one of the plurality of storage systems (714, 724, 728), and establishing (708), in dependence upon the timing information (710, 722, 726) for at least one of the plurality of storage systems (714, 724, 728), a synchronous replication lease, the synchronous replication lease identifying a period of time during which the synchronous replication relationship is valid.

In the example method depicted in FIG. 9, the expiration of a synchronous replication lease may be followed by some set of events, followed by a reestablishment message, followed by a new activity lease, or followed by some other action. Data communications, configuration communications, or other communications might be in transit while the synchronous replication lease expires and is re-established. In fact, communication may not be received, for example, until after a new synchronous replication lease has been established. In such cases, the communications may have been sent based on one understanding of the pod, cluster, or network link state, and may be received by a storage system (714, 724, 728) that now has a different understanding of one or another aspect of that state. As such, there should generally be some means of ensuring that received communications are discarded if the communications were sent prior to some set of cluster or link state changes. There are several possible ways of ensuring that received communications are discarded if the communications were sent prior to some set of cluster or link state changes. One way of ensuring that received communications are discarded if the communications were sent prior to some set of cluster or link state changes is to establish some session identifier (e.g., a number) that is associated with establishing or reestablishing a link with a working synchronous replication lease that is being extended. After a cluster communications link is reestablished, the link gets a new session identifier. This identifier can be included with data, configuration, or other communication messages. Any message that is received with the wrong session identifier is discarded or results in an error response indicating a mismatched session identifier.

Readers will appreciate that the manner in which storage systems (714, 724, 728) respond to the re-establishment of a synchronous replication lease may change based on different embodiments that the storage systems and the pods may take. In the case of simple primary controllers with two storage systems, any new request to perform an operation on a storage system (reads, writes, file operations, object operations, administrative operations, etc.) that is received after the receiving controller's synchronous replication lease has expired may have its processing delayed, dropped, or failed with some kind of "retry later" error code. As such, a running primary storage controller can be assured that the paired storage controller is not processing new requests if it can be assured that the paired storage controller's synchronous replication lease has expired, which it can be assured of when its own reestablishment lease has expired. After the reestablishment lease has expired it is safe for the controller to start looking further at corrective actions, including considering the paired controller to be offline and then continuing storage processing without the paired controller. Exactly what actions those might be can differ based on a wide variety of considerations and implementation details.

In the case of storage systems with primary and secondary controllers, a still running primary controller on one storage system might try to connect to the paired storage system's previous secondary controller, on the presumption that the paired storage system's previous secondary controller might be taking over. Or, a still running primary controller on one storage system might wait for some particular amount of time that is the likely maximum secondary takeover time. If the secondary controller connects and establishes a new connection with a new synchronous replication lease within a reasonable time, then the pod may then recover itself to a consistent state (described later) and then continue normally. If the paired secondary controller doesn't connect quickly enough, then the still running primary controller may take further action, such as trying to determine whether the still running primary controller should consider the paired storage system to be faulted and then continue operating without the paired storage system. Primary controllers might instead keep active, leased, connections to secondary controllers on paired storage systems within a pod. In that case, expiration of the primary-to-primary reestablishment lease might result instead in a surviving primary using that connection to query for secondary takeover, rather than there being a need to establish that connection in the first place. It is also possible that two primary storage controllers are running, while the network isn't working between them, but the network is working between one or the other primary controller and the paired secondary controller. In that case, internal high availability monitoring within the storage system might not detect a condition on its own that triggers a failover from primary to secondary controller. Responses to that condition include: triggering a failover from primary to secondary anyway, just to resume synchronous replication, routing communication traffic from a primary through a secondary, or operating exactly as if communication had failed completely between the two storage systems, resulting in the same fault handling as if that had happened.

If multiple controllers are active for a pod (including in both dual active-active controller storage systems and in scale-out storage systems), leases might still be kept by individual controller cluster communications with any or all controllers in a paired storage system. In this case, an expired synchronous replication lease might need to result in pausing of new request processing for a pod across the entire storage system. The lease model can be extended with exchanging of clocks and paired clock responses between all active controllers in a storage system, with the further exchanging of those clocks with any paired controllers in the paired storage systems. If there is an operating path over which a particular local controller's clock is exchanged with any paired controller, then the controller can use that path for an independent synchronous replication lease and possibly for an independent reestablishment lease. In this case, local controllers within a storage system may be further exchanging clocks between each other for local leases between each other as well. This may already be incorporated into the local storage system's high availability and monitoring mechanisms, but any timings related to the storage system's high availability mechanisms should be taken into account in the duration of the activity and reestablishment leases, or in any further delays between reestablishment lease expiration and actions taken to handle an interconnect fault.

Alternately, storage-system-to-storage-system cluster communications or lease protocols alone may be assigned to one primary controller at a time within an individual multi-controller or scale-out storage system, at least for a particular pod. This service may migrate from controller to controller as a result of faults or, perhaps, as a result of load imbalances. Or cluster communications or lease protocols might run on a subset of controllers (for example, two) in order to limit clock exchanges or the complexity of analyzing fault scenarios. Each local controller may need to exchange clocks within the controllers that handle storage system to storage system leases, and the time to respond after a lease expiration might have to be adjusted accordingly, to account for potential cascading delays in when individual controllers can be ensured to have effected a processing pause. Connections that are not currently depended on for leases related to processing pausing might still be monitored for alerting purposes.

The example method depicted in FIG. 9 also includes attempting (908) to take over I/O processing for the dataset. In the example method depicted in FIG. 9, attempting (908)

to take over I/O processing for the dataset (712) may be carried, for example, by a storage system (714, 724, 728) racing to a mediator. If a particular storage system (714, 724, 728) successfully takes over I/O processing for the dataset (712), all accesses of the dataset (712) will be serviced by the particular storage system (714, 724, 728) until a synchronous replication relationship can be reestablished and any changes to the dataset (712) that occurred after the previous synchronous replication relationship expired can then be transferred and persisted on the other storage systems (714, 724, 728). In such an example, an attempt (908) to take over I/O processing for the dataset (712) may only occur after the expiration of some period of time after the synchronous replication lease expires. For example, attempts to resolve how to proceed after link failure (including one or more of the storage systems attempting to take over I/O processing for the dataset) may not start until a time period after the synchronous replication lease has expired that is, for example, at least as long as the maximum lease time resulting from clock exchanges.

Readers will appreciate that in many of the examples depicted above, although only one of the storage systems (714) is depicted as carrying out the steps described above, in fact, all storage systems (714, 724, 728) in a pod (or in a pod that is being formed) may carry out one or more of the steps described above at the same time, as establishing a synchronous replication relationship between two or more storage systems may require collaboration and interaction between two or more storage systems.

When any one or more storage systems that are members of a pod are interrupted, then any remaining storage systems, or any storage systems that resume operation earlier, may either detach them (so that they are no longer in-sync) or will wait for them and participate in a recovery action to ensure consistency before moving forward. If the outage is short enough, and recovery is quick enough, then operating systems and applications external to the storage systems, or running on a storage system that does not fault in a way that brings the application itself down, may experience a temporary delay in storage operation processing but may not experience a service outage. SCSI and other storage protocols support retries, including to alternate target storage interfaces, in the case of operations lost due to a temporary storage controller or interface target controller outage, and SCSI in particular supports a BUSY status which requests initiator retries which could be used while a storage controller participates in recovery.

In general, one of the goals of recovery is to handle any inconsistencies from an unexpected disruption of in-progress, distributed operations and to resolve the inconsistencies by making in-sync pod member storage systems sufficiently identical. At that point, providing the pod service can be safely resumed. Sufficiently identical at least includes the content stored in the pod, and in other cases, sufficiently identical may include the state of persistent reservations. Sufficiently identical may also include ensuring that snapshots are either consistent—and still correct with respect to completed, concurrent, or more recently received modifying operations—or consistently deleted. Depending on an implementation, there may be other metadata that should be made consistent. If there is metadata used for tracking or optimizing the transfer of content from a replication source to an asynchronous or snapshot-based replication target, then that might need to be made consistent to allow the replication source to switch seamlessly from one member storage system of a pod to another member storage system. The existence and properties of volumes may also need to be recovered, and perhaps definitions related to applications or initiating host systems. Many of these properties may be recovered using standard database transaction recovery techniques, depending on how they are implemented.

In some examples, beyond ensuring that administrative metadata is sufficiently identical in a storage system that implements modifying operations to content in a block-based storage system, recovery must ensure that that those modifications are applied or discarded consistently across a pod and with proper consideration for block storage semantics (order, concurrency, consistency, atomicity for operations such as COMPARE AND WRITE and XDWRITEREAD). At core, this implementation relies on being able to know during recovery what operations might have been applied to at least one in-sync storage system for a pod that might not have been applied to all other in-sync storage systems for the pod, and either applying them everywhere or backing them out. Either action results in consistency—apply everywhere or backout everywhere—and there is no inherent reason why the answer has to be uniform across all operations. Backout may be allowed if at least one in-sync storage system for the pod did not apply the operation. In general, it is often simpler to reason about applying all updates that were found on any in-sync storage system for a pod rather than backing out some or all updates that are on one or more in-sync storage systems for a pod but that are not on all in-sync storage systems for the pod. To be efficient, knowing what was applied on some systems that might not have been applied on other systems generally requires that the storage systems record something other than the raw data (otherwise, all data might have to be compared which could be enormously time consuming). Discussed below is additional detail regarding implementations for recording such information that may enable storage system recovery.

Two examples for persistently tracking information for ensuring consistency include: (1) identifying that the content of volumes might be different across in-sync storage systems for the pod, and (2) identifying collections of operations that might not have been universally applied across all in-sync storage systems for the pod. The first example is a traditional model for mirroring: keep a tracking map of logical regions that are being written (often as a list or as a bitmap covering a volume's logical space with some granularity) and use that list during recovery to note which regions might differ between one copy and another. The tracking map is written to some or all mirrors (or is written separately) prior or during the write of the volume data in such a way that recovery of the tracking map is guaranteed to cover any volume regions that were in flux at the time of a fault. Recovery in this first variation generally consists of copying content from one copy to another to make sure they are the same.

The second example in persistent tracking—based on operation tracking—may be useful in storage systems that support synchronously replicating virtual copying of large volume ranges within and between volumes in a pod since this case can be more difficult or expensive to track simply as potential differences in volume content between synchronously replicated storage systems (though see a later section describing tracking and recovery in content-addressable storage systems). Also, simple content tracking might work less well in storage systems where synchronous replication must track more complex information, such as in content tracking graphs with extent and larger granularity identifiers that drive forms of asynchronous replication and where the asynchronous replication source can be migrated or faulted over from one in-sync storage system in a pod to another. When operations are tracked instead of content, recovery includes identifying operations that may not have completed everywhere. Once such operations have been identified, any ordering consistency issues should be resolved, just as they should be during normal run-time using techniques such as leader-defined ordering or predicates or through interlock exceptions. An interlock exception is described below, and with regard to predicates, descriptions of relationships between operations and common metadata updates may be described as a set of interdependencies between separate, modifying operations—where these interdependencies may be described as a set of precursors that one operation depends on in some way, where the set of precursors may be considered predicates that must be true for an operation to complete. To continue with this example, given the identified operations, the operations may then be reapplied. Recorded information about operations should include any metadata changes that should be consistent across pod member storage systems, and this recorded information can then be copied and applied. Further, predicates, if they are used to disseminate restrictions on concurrency between leaders and followers, might not need to be preserved, if those predicates drive the order in which storage systems persist information, since the persisted information implies the various plausible outcomes.

As discussed more thoroughly within U.S. Provisional Patent Application Ser. Nos. 62/470,172 and 62/518,071, references that are incorporated herein in their entirety, a set of in-sync storage systems may implement a symmetric I/O model for providing data consistency. In a symmetric I/O model, multiple storage systems may maintain a dataset within a pod, and a member storage system that receives an I/O operation may process the I/O operation locally concurrent with the processing of the I/O operation on all the other storage systems in the pod—where the receiving storage system may initiate the processing of the I/O operation on the other storage systems. However, in some cases, multiple storage systems may receive independent I/O operations that write to overlapping memory regions. For example, if a first write comes in to a first storage system, then the first storage system may begin persisting the first write locally while also sending the first write to a second storage system—while at about the same time, a second write, to an overlapping volume region with the first write, is received at a second storage system, where the second storage system begins persisting the second write locally while also sending the second write to the first storage system. In this scenario, at some point, either the first storage system, the second storage system, or both storage systems may notice that there is a concurrent overlap. Further in this scenario, the first write can not be completed on the first storage system until both the second storage system has persisted the first write and responded with a success indication, and the first storage system has successfully persisted the first write—where the second storage system is in a similar situation with the second write. Because both storage systems have access to both the first and second writes, either storage system may detect the concurrent overlap, and when one storage system detects the concurrent overlap, the storage system may trigger an exception, which is referred to herein as an "interlock exception." One solution includes the two, or possibly more storage systems when the scenario is expanded to additional storage systems, storage systems involved in an interlock exception to reach agreement on which write operation prevails.

In another example, such as in the case of overlapping write requests, write-type requests (e.g., WRITE, WRITE SAME, and UNMAP requests, or combinations) that were overlapping in time and in volume address range at the time of an event that interrupted replication and led to an eventual recovery might have completed inconsistently between the in-sync storage systems. The manner in which this situation is handled can depend on the implementation of the I/O path during normal operation. In this example, discussed further below, is a first and second write that overlapped in time, where each was received by one storage system or another for a pod before either was signaled as having completed. This example is readily extended to more than two writes by considering each two in turn, and to more than two storage systems by considering that a first write and a second write might have completed on more than one storage system, and by considering that a first, second, and third write (or additional writes) might have completed inconsistently on three or more storage systems. The techniques described are easily extended to these cases. In a symmetric I/O-based storage system implementation based on interlock exceptions, only the first write might have completed on one storage system while only the second of the two overlapping writes might have completed on a second storage system. This case can be detected by noticing that the ranges overlap between each write, and by noticing that neither storage system includes the alternate overlapping write. If the two writes overlap completely (one completely covers the other), then one of the two writes may simply be copied to the other storage system and applied to replace that storage system's content for that volume address range. If the writes overlap only partially, then the content that partially overlaps can be copied from one storage system to the other (and applied), while the parts that don't overlap can be copied between each storage system so that the content is made uniform and up-to-date on both storage systems. In a leader based system with predicates or some other means for the leader to declare that one write precedes another, the storage systems performing the writes may well persist one before the other, or persist the two together. In another case, the implementation may persist the two writes separately and out of order, with the ordering predicates used merely to control completion signaling. If the implementation allows out-of-order write processing, then the preceding example explains how consistency can be recovered. In cases where storage systems enforce ordering of persistence during normal operation, then recovery might still see only the first write on a first storage system, but the first and second writes on a second storage system. In that case, the second write can be copied from the second storage system to the first storage system as part of recovery.

In another example snapshots may also be recovered. In some cases, such as for snapshots concurrent with modifications where a leader determined some modifications should be included in the snapshot and others shouldn't, the recorded information might include information about whether a particular write should be included within a snapshot or not. In that model, it may not be necessary to ensure that everything that a leader decided to include in a snapshot must end up included in the snapshot after a recovery. If one in-sync storage system for a pod recorded the existence of the snapshot and no in-sync storage system for the pod recorded a write that was ordered for inclusion in the snapshot, then uniformly applying the snapshot without including that write still results in snapshot content that is entirely consistent across all in-sync storage systems for the pod. This discrepancy should only occur in the case of concurrent writes and snapshots that had never been signaled as completed so no inclusion guarantee is warranted: the leader assigning predicates and ordering may be necessary only for run-time consistency rather than for recovery order consistency. In cases where recovery identifies a write for inclusion in a snapshot, but where recovery doesn't locate the write, the snapshot operation itself might safely ignore the snapshot depending on the implementation. The same argument about snapshots applies to virtual copying of a volume address range through SCSI EXTENDED COPY and similar operations: the leader defines which writes to the source address range might logically precede the copy and which writes to the target address range might logically precede or follow the address range copy. However, during recovery, the same arguments apply as with snapshots: a concurrent write with a volume range copy could miss either the concurrent write or the volume range copy as long as the result is consistent across in-sync storage systems for a pod and does not roll back a modification that had completed everywhere and does not reverse a modification that a dataset consumer might have read.

Further with regard to this example describing recovery of snapshots, if any storage system applied the write for a COMPARE AND WRITE, then the comparison must have succeeded on one in-sync storage system for a pod, and run-time consistency should have meant that the comparison should have succeeded on all in-sync storage systems for the pod, so if any such storage system had applied the write, it can be copied and applied to any other in-sync storage system for the pod that had not applied it prior to recovery. Further still, recovery of XDWRITEREAD or XPWRITE requests (or similar arithmetic transformation operations between pre-existing data and new data) could operate either by delivering the result of the transformation after reading that result from one storage system, or it can operate by delivering the operation with the transforming data to other storage systems if it can be ensured that any ordering data preceding the transforming write is consistent across in-sync storage systems for the pod and if it can be reliably determined which such storage systems had not yet applied the transforming write.

As another example, recovery of metadata may be implemented. In this case, recovery should also result in consistent recovery of metadata between in-sync storage system for a pod, where that metadata is expected to be consistent across the pod. As long as this metadata is included with operations, these can be applied along with content updates described by those operations. The manner in which this data is merged with existing metadata depends on the metadata and the implementation. Longer-term change tracking information for driving asynchronous replication can often be merged quite simply as nearby or otherwise related modifications are identified.

As another example, recording recent activity for operation tracking may be implemented in various ways to identify operations that were in progress on in-sync storage systems in a pod at the time of a fault or other type of service interruption that led to a recovery. For example, one model is to record recovery information in modifications to each in-sync storage system within a pod either atomically with any modification (which can work well if the updates are staged through fast journaling devices) or by recording information about operations that will be in progress before they can occur. The recorded recovery information may include a logical operation identifier, such as based on the original request or based on some identifier assigned by a leader as part of describing the operation, and whatever level of operation description may be necessary for recovery to operate. Information recorded by a storage system for a write which is to be included in the content of a concurrent snapshot should indicate that the write is to be included in the snapshot as well as in the content of the volume that the write is applied to. In some storage system implementations, the content of a snapshot is automatically included in the content of the volume unless replaced by specific overlapping content in a newer snapshot or replaced by specific overlapping content written later to the live the volume. Two concurrent write-type requests (e.g., WRITE, WRITE SAME or UNMAP requests, or combinations) which overlap in time and in volume address may be explicitly ordered by a leader such that the leader ensures that the first write is persisted first to all in-sync storage systems for a pod before the second one can be persisted by any in-sync storage system for the pod. This ensures, in a simple way, that inconsistencies cannot happen. Further, since concurrent overlapping writes to a volume are very rare, this may be acceptable. In that case, if there is a record on any recovering storage system for the second write, then the first write must have completed everywhere so it should not need recovery. Alternately, a predicate may be described by the leader requiring that storage systems order a first write before a second write. The storage systems may then perform both writes together, such that they are guaranteed to either both persist or both fail to persist. In another case, the storage system may persist the first write and then the second write after the persistence of the first write is assured. A COMPARE AND WRITE, XDWRITEREAD, or XPWRITE request should be ordered in such a way that the precursor content is identical on all storage systems at the time each performs the operation. Alternately, one storage system might calculate the result and deliver the request to all storage systems as a regular write-type request. Further, with regard to making these operations recoverable, tracking which operations have completed everywhere may allow their recency to be discounted and recorded information that causes an operation recovery analysis for completed operations can then be either discarded or efficiently skipped over by recovery.

In another example, clearing out completed operations may be implemented. One example to handle clearing of recorded information is to clear it across all storage systems after the operation is known to have been processed on all in-sync storage systems for the pod. This can be implemented by having the storage system which received the request and which signaled completion send a message to all storage systems for the pod after completion is signaled, allowing each storage system to clear them out. Recovery then involves querying for all recorded operations that have not been cleared out across all in-sync storage systems for the pod that are involved in the recovery. Alternately, these messages could be batched so that they happen periodically (e.g., every 50 ms), or after some number of operations (say, every 10 to 100). This batching process may reduce message traffic significantly at the expense of somewhat increased recovery times since more fully completed operations are reported as potentially incomplete. Further, in a leader based implementation (as an example), the leader could be made aware of which operations are completed and it could send out the clear messages.

In another example, a sliding window may be implemented. Such an example may work well in implementations based on leaders and followers, where the leader may attach a sequence number to operations or collections of operations. In this way, in response to the leader determining that all operations up to some sequence number have completed, it may send a message to all in-sync storage systems indicating that all operations up to that sequence number have completed. The sequence number could also be an arbitrary number, such that when all operations associated with an arbitrary number have completed, a message is sent to indicate all those operations have completed. With a sequence number based model, recovery could query for all operations on any in-sync storage system associated with a sequence number larger than the last completed sequence number. In a symmetric implementation without a leader, each storage system that receives request for the pod could define its own sliding window and sliding window identity space. In that case, recovery may include querying for all operations on any in-sync storage window that are associated with any sliding window identity space whose sliding window identity is after the last identity which has completed where operations for all preceding identifiers have also completed.

In another example, checkpoints may be implemented. In a checkpoint model, special operations may be inserted by a leader which depend on the completion of a uniform set of precursor operations and that all successive operations then depend on. Each storage system may then persist the checkpoint in response to all precursor operations having been persisted or completed. A successive checkpoint may be started sometime after the previous checkpoint has been signaled as persisted on all in-sync storage systems for the pod. A successive checkpoint would thus not be initiated until some time after all precursor operations are persisted across the pod; otherwise, the previous checkpoint would not have completed. In this model, recovery may include querying for all operations on all in in-sync storage systems that follow after the previous to last checkpoint. This could be accomplished by identifying the second to last checkpoint known to any in-sync storage system for the pod, or by asking each storage system to report all operations since its second to last persisted checkpoint. Alternately, recovery may include searching for the last checkpoint known to have completed on all in-sync storage systems and may include querying for all operations that follow on any in-sync storage system—if a checkpoint completed on all in-sync storage systems, then all operations prior to that checkpoint were clearly persisted everywhere.

In another example, recovery of pods based on replicated directed acyclic graphs of logical extents may be implemented. However, prior to describing such an implementation, storage systems using directed acyclic graphs of logical extents are first described.

A storage system may be implemented based on directed acyclic graphs comprising logical extents. In this model, logical extents can be categorized into two types: leaf logical extents, which reference some amount of stored data in some way, and composite logical extents, which reference other leaf or composite logical extents.

A leaf extent can reference data in a variety of ways. It can point directly to a single range of stored data (e.g., 64 kilobytes of data), or it can be a collection of references to stored data (e.g., a 1 megabyte "range" of content that maps some number of virtual blocks associated with the range to physically stored blocks). In the latter case, these blocks may be referenced using some identity, and some blocks within the range of the extent may not be mapped to anything. Also, in that latter case, these block references need not be unique, allowing multiple mappings from virtual blocks within some number of logical extents within and across some number of volumes to map to the same physically stored blocks. Instead of stored block references, a logical extent could encode simple patterns: for example, a block which is a string of identical bytes could simply encode that the block is a repeated pattern of identical bytes.

A composite logical extent can be a logical range of content with some virtual size, which comprises a plurality of maps that each map from a subrange of the composite logical extent logical range of content to an underlying leaf or composite logical extent. Transforming a request related to content for a composite logical extent, then, involves taking the content range for the request within the context of the composite logical extent, determining which underlying leaf or composite logical extents that request maps to, and transforming the request to apply to an appropriate range of content within those underlying leaf or composite logical extents.

Volumes, or files or other types of storage objects, can be described as composite logical extents. Thus, these presented storage objects (which in most of our discussion will simply be referred to as volumes) can be organized using this extent model.

Depending on implementation, leaf or composite logical extents could be referenced from a plurality of other composite logical extents, effectively allowing inexpensive duplication of larger collections of content within and across volumes. Thus, logical extents can be arranged essentially within an acyclic graph of references, each ending in leaf logical extents. This can be used to make copies of volumes, to make snapshots of volumes, or as part of supporting virtual range copies within and between volumes as part of EXTENDED COPY or similar types of operations.

An implementation may provide each logical extent with an identity which can be used to name it. This simplifies referencing, since the references within composite logical extents become lists comprising logical extent identities and a logical subrange corresponding to each such logical extent identity. Within logical extents, each stored data block reference may also be based on some identity used to name it.

To support these duplicated uses of extents, we can add a further capability: copy-on-write logical extents. When a modifying operation affects a copy-on-write leaf or composite logical extent the logical extent is copied, with the copy being a new reference and possibly having a new identity (depending on implementation). The copy retains all references or identities related to underlying leaf or composite logical extents, but with whatever modifications result from the modifying operation. For example, a WRITE, WRITE SAME, XDWRITEREAD, XPWRITE, or COMPARE AND WRITE request may store new blocks in the storage system (or use deduplication techniques to identify existing stored blocks), resulting in modifying the corresponding leaf logical extents to reference or store identities to a new set of blocks, possibly replacing references and stored identities for a previous set of blocks. Alternately, an UNMAP request may modify a leaf logical extent to remove one or more block references. In both types of cases, a leaf logical extent is modified. If the leaf logical extent is copy-on-write, then a new leaf logical extent will be created that is formed by copying unaffected block references from the old extent and then replacing or removing block references based on the modifying operation.

A composite logical extent that was used to locate the leaf logical extent may then be modified to store the new leaf logical extent reference or identity associated with the copied and modified leaf logical extent as a replacement for the previous leaf logical extent. If that composite logical extent is copy-on-write, then a new composite logical extent is created as a new reference or with a new identity, and any unaffected references or identities to its underlying logical extents are copied to that new composite logical extent, with the previous leaf logical extent reference or identity being replaced with the new leaf logical extent reference or identity.

This process continues further backward from referenced extent to referencing composite extent, based on the search path through the acyclic graph used to process the modifying operation, with all copy-on-write logical extents being copied, modified, and replaced.

These copied leaf and composite logical extents can then drop the characteristic of being copy on write, so that further modifications do not result in an additional copy. For example, the first time some underlying logical extent within a copy-on-write "parent" composite extent is modified, that underlying logical extent may be copied and modified, with the copy having a new identity which is then written into a copied and replaced instance of the parent composite logical extent. However, a second time some other underlying logical extent is copied and modified and with that other underlying logical extent copy's new identity being written to the parent composite logical extent, the parent can then be modified in place with no further copy and replace necessary on behalf of references to the parent composite logical extent.

Modifying operations to new regions of a volume or of a composite logical extent for which there is no current leaf logical extent may create a new leaf logical extent to store the results of those modifications. If that new logical extent is to be referenced from an existing copy-on-write composite logical extent, then that existing copy-on-write composite logical extent will be modified to reference the new logical extent, resulting in another copy, modify, and replace sequence of operations similar to the sequence for modifying an existing leaf logical extent.

If a parent composite logical extent cannot be grown large enough (based on implementation) to cover an address range associated that includes new leaf logical extents to create for a new modifying operation, then the parent composite logical extent may be copied into two or more new composite logical extents which are then referenced from a single "grandparent" composite logical extent which yet again is a new reference or a new identity. If that grandparent logical extent is itself found through another composite logical extent that is copy-on-write, then that another composite logical extent will be copied and modified and replaced in a similar way as described in previous paragraphs. This copy-on-write model can be used as part of implementing snapshots, volume copies, and virtual volume address range copies within a storage system implementation based on these directed acyclic graphs of logical extents. To make a snapshot as a read-only copy of an otherwise writable volume, a graph of logical extents associated with the volume is marked copy-on-write and a reference to the original composite logical extents are retained by the snapshot. Modifying operations to the volume will then make logical extent copies as needed, resulting in the volume storing the results of those modifying operations and the snapshots retaining the original content. Volume copies are similar, except that both the original volume and the copied volume can modify content resulting in their own copied logical extent graphs and subgraphs.

Virtual volume address range copies can operate either by copying block references within and between leaf logical extents (which does not itself involve using copy-on-write techniques unless changes to block references modifies copy-on-write leaf logical extents). Alternately, virtual volume address range copies can duplicate references to leaf or composite logical extents, which works well for volume address range copies of larger address ranges. Further, this allows graphs to become directed acyclic graphs of references rather than merely reference trees. Copy-on-write techniques associated with duplicated logical extent references can be used to ensure that modifying operations to the source or target of a virtual address range copy will result in the creation of new logical extents to store those modifications without affecting the target or the source that share the same logical extent immediately after the volume address range copy operation.

Input/output operations for pods may also be implemented based on replicating directed acyclic graphs of logical extents. For example, each storage system within a pod could implement private graphs of logical extents, such that the graphs on one storage system for a pod have no particular relationship to the graphs on any second storage system for the pod. However, there is value in synchronizing the graphs between storage systems in a pod. This can be useful for resynchronization and for coordinating features such as asynchronous or snapshot based replication to remote storage systems. Further, it may be useful for reducing some overhead for handling the distribution of snapshot and copy related processing. In such a model, keeping the content of a pod in sync across all in-sync storage systems for a pod is essentially the same as keeping graphs of leaf and composite logical extents in sync for all volumes across all in-sync storage systems for the pod, and ensuring that the content of all logical extents is in-sync. To be in sync, matching leaf and composite logical extents should either have the same identity or should have mappable identities. Mapping could involve some set of intermediate mapping tables or could involve some other type of identity translation. In some cases, identities of blocks mapped by leaf logical extents could also be kept in sync.

In a pod implementation based on a leader and followers, with a single leader for each pod, the leader can be in charge of determining any changes to the logical extent graphs. If a new leaf or composite logical extent is to be created, it can be given an identity. If an existing leaf or composite logical extent is to be copied to form a new logical extent with modifications, the new logical extent can be described as a copy of a previous logical extent with some set of modifications. If an existing logical extent is to be split, the split can be described along with the new resulting identities. If a logical extent is to be referenced as an underlying logical extent from some additional composite logical extent, that reference can be described as a change to the composite logical extent to reference that underlying logical extent.

Modifying operations in a pod thus comprises distributing descriptions of modifications to logical extent graphs (where new logical extents are created to extend content or where logical extents are copied, modified, and replaced to handle copy-on-write states related to snapshots, volume copies, and volume address range copies) and distributing descriptions and content for modifications to the content of leaf logical extents. An additional benefit that comes from using metadata in the form of directed acyclic graphs, as described above, is that I/O operations that modify stored data in physical storage may be given effect at a user level through the modification of metadata corresponding to the stored data in physical storage—without modifying the stored data in physical storage. In the disclosed embodiments of storage systems, where the physical storage may be a solid state drive, the wear that accompanies modifications to flash memory may be avoided or reduced due to I/O operations being given effect through the modifications of the metadata representing the data targeted by the I/O operations instead of through the reading, erasing, or writing of flash memory. Further, in virtualized storage systems, the metadata described above may be used to handle the relationship between virtual, or logical, addresses and physical, or real, addresses—in other words, the metadata representation of stored data enables a virtualized storage system that may be considered flash-friendly in that it reduces, or minimizes, wear on flash memory.

Leader storage systems may perform their own local operations to implement these descriptions in the context of their local copy of the pod dataset and the local storage system's metadata. Further, the in-sync followers perform their own separate local operations to implement these descriptions in the context of their separate local copy of the pod dataset and their separate local storage system's metadata. When both leader and follower operations are complete, the result is compatible graphs of logical extents with compatible leaf logical extent content. These graphs of logical extents then become a type of "common metadata" as described in previous examples. This common metadata can be described as dependencies between modifying operations and required common metadata. Transformations to graphs can be described as separate operations with a queue predicate relationship with subsequent modifying operations. Alternately, each modifying operation that relies on a particular same graph transformation that has not yet been known to complete across the pod can include the parts of any graph transformation that it relies on. Processing an operation description that identifies a "new" leaf or composite logical extent that already exists can avoid creating the new logical extent since that part was already handled in the processing of some earlier operation, and can instead implement only the parts of the operation processing that change the content of leaf or composite logical extents. It is a role of the leader to ensure that transformations are compatible with each other. For example, we can start with two writes come that come in for a pod. A first write replaces a composite logical extent A with a copy of formed as composite logical extent B, replaces a leaf logical extent C with a copy as leaf logical extent D and with modifications to store the content for the second write, and further writes leaf logical extent D into composite logical extent B. Meanwhile, a second write implies the same copy and replacement of composite logical extent A with composite logical extent B but copies and replaces a different leaf logical extent E with a logical extent F which is modified to store the content of the second write, and further writes logical extent F into logical extent B. In that case, the description for the first write can include the replacement of A with B and C with D and the writing of D into composite logical extent B and the writing of the content of the first write into leaf extend B; and, the description of the second write can include the replacement of A with B and E with F and the writing of F into composite logical extent B, along with the content of the second write which will be written to leaf extent F. A leader or any follower can then separately process the first write or the second write in any order, and the end result is B copying and replacing A, D copying and replacing C, F copying replacing E, and D and F being written into composite logical extent B. A second copy of A to form B can be avoided by recognizing that B already exists. In this way, a leader can ensure that the pod maintains compatible common metadata for a logical extent graph across in-sync storage systems for a pod.

Given an implementation of storage systems using directed acyclic graphs of logical extents, recovery of pods based on replicated directed acyclic graphs of logical extents may be implemented. Specifically, in this example, recovery in pods may be based on replicated extent graphs then involves recovering consistency of these graphs as well as recovering content of leaf logical extents. In this implementation of recovery, operations may include querying for graph transformations that are not known to have completed on all in-sync storage systems for a pod, as well as all leaf logical extent content modifications that are not known to have completed across all storage systems for the pod. Such querying could be based on operations since some coordinated checkpoint, or could simply be operations not known to have completed where each storage system keeps a list of operations during normal operation that have not yet been signaled as completed. In this example, graph transformations are straightforward: a graph transformation may create new things, copy old things to new things, and copy old things into two or more split new things, or they modify composite extents to modify their references to other extents. Any stored operation description found on any in-sync storage system that creates or replaces any logical extent can be copied and performed on any other storage system that does not yet have that logical extent. Operations that describe modifications to leaf or composite logical extents can apply those modifications to any in-sync storage system that had not yet applied them, as long as the involved leaf or composite logical extents have been recovered properly.

Further in this example, recovery of a pod may include the following:

- querying all in-sync storage systems for leaf and composite logical extent creations and their precursor leaf and composite logical extents if any that were not known to have completed on all in-sync storage systems for the pod;
- querying all in-sync storage systems for modifying operations to leaf logical extents that were not known to have completed on all in-sync storage systems for the pod;
- querying for logical address range copy operations as new references to pre-existing leaf and composite logical extents;
- identifying modifications that are not known to have completed to leaf logical extents and where that leaf logical extent is the source for a replacement leaf logical extent that also may need recovery—so that modifications can be completed to that leaf logical extent to all in-sync storage systems before the leaf logical extent copy is recovered on any in-sync storage systems that had not already copied it;
- completing all leaf and composite logical extent copy operations;
- applying all further updates to leaf and composite logical extents including naming new logical extent references, updating leaf logical extent content, or removing logical extent references; and
- determining that all necessary actions have completed, at which point further aspects of recovery can proceed.

In another example, as an alternative to using a logical extent graph, storage may be implemented based on a replicated content-addressable store. In a content-addressable store, for each block of data (for example, every 512 bytes, 4096 bytes, 8192 bytes or even 16384 bytes) a unique hash value (sometimes also called a fingerprint) is calculated, based on the block content, so that a volume or an extent range of a volume can be described as a list of references to blocks that have a particular hash value. In a synchronously replicated storage system implementation based on references to blocks with the same hash value, replication could involve a first storage system receiving blocks, calculating fingerprints for those blocks, identifying block references for those fingerprints, and delivering changes to one or a plurality of additional storage systems as updates to the mapping of volume blocks to referenced blocks. If a block is found to have already been stored by the first storage system, that storage system can use its reference to name the reference in each of the additional storage systems (either because the reference uses the same hash value or because an identifier for the reference is either identical or can be mapped readily). Alternately, if a block is not found by the first storage system, then content of the first storage system may be delivered to other storage systems as part of the operation description along with the hash value or identity associated with that block content. Further, each in-sync storage system's volume descriptions are then updated with the new block references. Recovery in such a store may then include comparing recently updated block references for a volume. If block references differ between different in-sync storage systems for a pod, then one version of each reference can be copied to other storage systems to make them consistent. If the block reference on one system does not exist, then it be copied from some storage system that does store a block for that reference. Virtual copy operations can be supported in such a block or hash reference store by copying the references as part of implementing the virtual copy operation.

Additional details for implementing storage systems that synchronously replicate a dataset may be found within U.S. Provisional Application Nos. 62/470,172 and 62/518,071, which are included by reference in their entirety.

Initial synchronization of a storage system added to a pod—or subsequent resynchronization of a storage system that had been detached from a pod—includes copying all content, or all missing content, from an in-sync storage system for a pod to an uninitialized, or out-of-sync, storage system prior to that storage system being brought online for active use in providing the pod service. Such an initial synchronization may be performed for each storage system introduced as an extension of a pod.

A difference between initial synchronization of content to a storage system added to a pod versus resynchronizing a storage system that had, through some set of events, become out-of-sync relative to the in-sync storage systems for a pod, are conceptually quite similar. In the case of a resynchronization, for example, all blocks that may differ between the in-sync pod member storage systems and the out-of-sync pod member are made up-to-date before the out-of-sync pod member can come back online as an in-sync pod member storage system for the pod. In an initial synchronization, this may include updating all blocks, and consequently, it is conceptually similar to resynchronization where all blocks may differ. In other words, initial synchronization may be considered equivalent to reattaching a storage system that was detached at the beginning of a pod, prior to any volume having been modified from an initial state, or prior to any volume having been created or added to the pod.

Generally, resynchronization accomplishes at least two things to bring a detached pod back to a point where it is in-sync and can be brought back online: (a) backing out, overwriting or otherwise replacing, any changes that were persisted on the detached pod around the time it was detached that had not been retained by the in-sync pod members, and (b) updating the attaching storage system to match content and common metadata for the pod. To be brought back online, a reattachment of a storage system may include re-enabling synchronous replication, re-enabling symmetric synchronous replication, and re-enabling the receiving and processing of operations for the pod on the reattached storage system. Operations for the pod may include reads, data modification operations, or administrative operations.

In the process of detaching a storage system, some number of operations may have been in progress for the pod. Further, some of those operations may have persisted only on the detached storage system, other operations may have persisted only on the storage systems that remained in-sync immediately after the detachment was processed, and other operations may have persisted on both the detached storage system and the storage systems that remained in-sync. In this example, because the in-sync state for the pod could not have recorded the operations persisted only on the detached storage system, any updates to the in-sync content and common metadata for the pod since the detachment of the storage system would not include those updates, which is the reason these updates should be backed out—either explicitly by undoing the updates, or implicitly by overwriting that content as part of a resynchronization process. On the in-sync storage systems themselves, there may be two lists to be accounted for prior to starting a reattachment of a detached storage system: (a) a list of operations, which may be referred to as an in-sync pending operations list at detach, that were in progress and were persisted on any storage system that was in-sync when the reattaching storage system was detached from a pod and that remained in-sync for any duration of time after the detach from the pod, and (b) a list of changes to content or common metadata during the window of time the reattaching storage system was detached from the pod. Further, depending on the pod and storage system implementations, the two lists associated with the in-sync storage systems may be represented by a single list: content not known to be on the reattaching storage system. In a pod where multiple storage systems are detached, and in particular where those storage systems at different times, tracking of changes since each detach may yield separate lists—and how those lists are described may vary considerably from one pod implementation to another. In some cases, an additional issue beyond tracking changes from the time of detach and copying those changes to the attaching storage system is ensuring that new modifying operations received during the resynchronization are applied to the attaching storage system. Conceptually, this problem may be described as ensuring that operations to copy data and processing of modifying operations received by the pod may be merged in such a way that the result is correctly up-to-date at the end of the attach and prior to considering the attaching storage system to be in-sync for the pod.

With respect to simple changed content resynchronization, one model for resynchronization is to generate a complete list of blocks—a detached block list—that may differ between the in-sync storage systems and the attaching storage system, and to start replicating any modifying operations as they would happen for a follower storage system. A complete list of blocks that may differ may include those from the in-sync pending operations list at detach from the in-sync storage systems, the pending operations at the time of detach from the attaching storage system, and blocks that were known to have changed since the detach. Modifying operations may store their modifying content as described, and resynchronization may proceed by locating ranges of blocks from the detached block list and copying those blocks, in sections, from an in-sync storage system to the attaching storage system. In this example, while copying a particular section, incoming modifying operations that overlap with the section being copied may be held off during the copy, or an arrangement may be made to apply those modifying operations after the section has been copied. This solution may create a problem for virtual block range copy operations, such as virtualized implementations of the EXTENDED COPY operation. Further, the source range for the copy may not yet be resynchronized, yet the target range may have already been resynchronized, which means that a straightforward implementation of the virtual block range copy operation may (depending on the implementation) fail to either copy the correct data to the target range because the data is not known at the time the virtual block range copy operation is received, or may fail to resynchronize the target range correctly because the resynchronize operation itself may have presumed the target range was correctly synchronized when it was never resynchronized in its final form. However, there are several solutions for this problem. One solution is to disallow virtual block range copy operations during resynchronization. This may work in many cases because common uses of virtual block range copy operations—including client operating file systems file copy operations and virtual machine clone or migration operations—typically respond to virtual block range copy failures by copying content directly themselves through sequences of read and write requests. Another solution is to remember incomplete virtual range copy operations, not modifying operations that overwrite the target address range of any virtual address range copy operation, and then perform the copy operation while accounting for overwrites when the source data becomes available. Given that the target of a resynchronization may not know that the source data for a copy is not correct, all such operations may have to be deferred until the entire copy completes. Optimizations are possible where the target of a resynchronization is made aware of which regions have not yet been copied, or may be aware of when a resynchronization has completed processing a particular region of a volume.

Another aspect of resynchronizing storage systems may be updated block tracking. For example, keeping a list of all individual blocks that are modified while a storage system was detached (and then resynchronizing them individually) may be impractical in some cases because an extended outage may result in a large number of blocks—and some storage systems cannot read large collections of non-sequential blocks very efficiently. Consequently, in some cases, it may be more practical to begin tracking regions, for example 1 MB ranges of a volume, to reduce the amount of tracked metadata. This course-grained tracking may be updated behind shorter term operation tracking, and may be preserved for as long as is needed to handle a resynchronization of any out-of-date storage system, whether down for minutes, hours, days, or weeks. With solid state storage, as opposed to mechanical spinning storage, tracking which individual blocks of a volume, or of a collection of volumes or an entire pod, may be quite practical, as is resynchronizing only those individual blocks that have changed. Generally, there is very little random read and write penalty, and there is little penalty to reading from a multi-level map, and consequently, it is relatively easy to merge fine-grained activity as operations over short time periods (for example, in the 100 millisecond to 10 second range or every few hundred to every few thousand operations), into a fine-grained map naming all modified blocks. Further, a list of recent activity may be a list that covers content modifications that have been recorded recently into journaling devices (fast write storage such as various flavors of NVRAM intended to support high write bandwidth and a high overwrite rate), but with metadata about those modifications perhaps preserved in journals for longer time periods than the actual content. In this example, a merged list of all activity may be a bitmap where each bit represents a block or a small group of blocks, or it may be a list of block numbers or lists of block ranges organized by volume into a tree structure, such as a B-tree. Such lists of block numbers may be compacted easily because nearby block numbers may be stored as differences from one block number to another block number.

Resynchronizing storage systems may also include block tracking by tracking sequence numbers. For example, some storage systems may, during normal operation, associate a respective sequence number with a respective modification—for all modifications. In such cases, the last sequence number known to have been synchronized with a storage system detached from a pod may be all that is needed to query an in-sync storage system for the pod to find all content that has been modified since the detach, including any content that might not have been replicated to the detached array round the time of the detach.

Resynchronizing storage systems may also include tracking changes as a snapshot. For example, snapshots may be used to track changes since some time in the past, and a storage system may manufacture a snapshot at the time of a detach by excluding content that is not known to have completed. Alternatively, snapshots may be created on a regular basis, or with some periodicity, where the time of the snapshot creation may be compared to a time of a detach to determine which snapshot may serve as a basis for resynchronizing the detached storage system. As a variation, any snapshot created across a pod prior to a detach should be present in both the in-sync and detached storage systems for the pod and may be used in various ways for resynchronization. For example, the content of a storage system that is being reattached may be reverted back to its last synchronized snapshot that predates the detach, and then rolled forward from that point to match current in-sync content in the pod. Generally, snapshots indicate a difference relative to a previous snapshot or indicate a difference to current content. Using these features of snapshots, resynchronizing content to a reattaching storage system may include replicating differences between the time of the reattach and the time of the last complete pre-detach synchronized snapshot. In some cases, resynchronization may use a snapshot-based model as a fallback. For example, short outages (such as outages of about a few minutes) may be handled through fine-grain tracking or recording and replaying operations that have occurred since the time a storage system detached, and longer outages may be handled by reverting to snapshots taken every few minutes—where the threshold number of minutes may be a default value or specified by a user or an administrator. Such a configuration may be practical because relatively infrequent snapshots may have low long-term overhead but may generate more data to be resynchronized. For example, a ten second outage may be handled through replaying recorded operations, where resynchronization may occur in ten seconds or less—whereas a snapshot taken five minutes prior to a detach may, in some cases, transfer up to five minutes' worth of content modification. In other cases, resynchronization after an outage may be based on accumulated changes, such as by limits on the accumulated size of a short-term map.

In some cases, resynchronization may be based on asynchronous replication. For example, the snapshot-based resynchronization model discussed above may also support another resynchronization model: storage systems that support asynchronous or periodic replication may use the snapshot mechanisms to replicate content during resynchronization. An asynchronous or periodic replication model may potentially copy out-of-date data during short periods of outage, where periodic replication models may be based on snapshots or checkpoint differencing, and where the differencing automatically handles outages. As for asynchronous replication, there may be a reliance on snapshots or checkpoints as a backup for extended outages, similarly to the discussion above, and as a result, it may be practical to combine implementations or to utilize such an available asynchronous or periodic replication implementation for resynchronization. However, one issue may be that asynchronous or periodic replication models may not be configured to get a replication target all the way up-to-date, or completely in-sync. As a result, with such resynchronization implementations, new in-flight operations may also be tracked so that the in-flight operations may be applied so that all modifications to an attaching storage system are current for a pod.

In some cases, resynchronization may be implemented to include multi-phase resynchronization. For example, in a first phase, content up to some point may be replicated from in-sync storage systems for a pod to an attaching storage system for a pod. In this example, a second snapshot may be taken during the attach and differences between a first snapshot that was the last snapshot known to have been synchronized prior to a detach, and the differences between the first snapshot and the second snapshot to be replicated to the attaching storage system. Such a mechanism may get the attaching storage system more closely in sync than it was prior to the attach, however, it may still not be up-to-date. As such, a third snapshot may be created, and differences between the third snapshot and the second snapshot may be determined, and then replicated to an attaching storage system. This third snapshot, and the determined differences, may make up part of the differences between the content replicated up to the second snapshot and the current content. Further, it is possible that additional snapshots may be taken and replicated to get within a few seconds of being up-to-date. At this point, modifying operations may be paused until a last snapshot is replicated—thereby bringing the attaching storage system up-to-date for the pod. In other cases, it is possible to switch after replicating one or more snapshots to some mode where modifying operations that are received after a final resynchronization snapshot are handled in such a way that they can be merged with the replicated snapshot content. Such an implementation may include having the attaching storage system keep track of those modifying operations, and apply the modifying operations after the snapshot replication is complete—or after the snapshot replication is known to have synchronized specific volume regions affected by particular modifying operation. This implementation may have additional overhead since tracking all operations until the underlying content is known to have been copied may result in a large number of tracked operations. An alternative is to consider the content related to recently received operations, for example writes that rely on particular common metadata or extended copy operations from one block range to another block range, and request that the resynchronization prioritize the processing of that content or that common metadata information. In this way, any received operations tied to content known to have been copied by such a process may then have tracking structures released much more quickly.

In some cases, resynchronization may be implemented to use directed acyclic graphs of logical extents. As described above, replicated storage systems may be based on directed acyclic graphs of logical extents. In such a storage system, the process of resynchronization may be expected to replicate the logical extent graphs from in-sync storage systems for a pod to an attaching storage system for a pod—including all leaf logical extent content, and ensuring that the graphs are synchronized and are being kept synchronized prior to enabling an attaching storage system as an in-sync pod member. Resynchronization in this model may proceed by having a target storage system for an attach retrieve a top-level extent identity for each volume—or for each file or object in a file or object based storage system. Any logical extent identity that is already known to the attach target may be considered up-to-date, but any unknown composite logical extent may be retrieved and then decomposed into underlying leaf or composite logical extents, each of which is either already known to the attach target or unknown to the attach target. Further, any unknown leaf logical extent may retrieve content, or can retrieve identities for stored blocks to determine if the block are already stored by the target storage system—with unrecognized blocks then being retrieved from an in-sync storage system. However, such an approach may not always result in resynchronization because some number of extents from around a time of a detach of a storage system may have a same identity, but different content, because only operations that marked logical extents are read-only may form new logical extents as a result of modifying operations. Further, in-progress modifying operations may have completed differently on different storage systems during faults that lead to a detach, and if those modifying operations were to non-read-only logical extents, then those logical extents may have the same identity on two storage systems but have different content. However, some solutions include when one set of storage systems for a pod detach another storage system, the set of storage systems may mark the leaf and composite logical extents associated with in-progress modifying operations, and associate those leaf and composite logical extents with a future reattach operation that includes the detached storage system. Similarly, the reattaching storage system for a pod may identify the leaf and composite logical extents that it knew of that were associated with in-progress logical extents. As a result, two sets of logical extents whose contents (for leaf extents), or whose references (for composite logical extents), may need to be transferred in addition to transferring any unknown leaf or composite logical extents. Alternatively, coordinated snapshots may be taken periodically within replicated pods, and a target of a reattach operation may ensure that logical extents created after the last coordinated snapshot are discarded or ignored during resynchronization. As yet another alternative, during a time period for which a storage system is detached from a pod, the remaining in-sync storage systems may manufacture a snapshot that represents the content from all completed operations, that that replays all potentially in-progress operations to apply to pod content that post-dates the snapshot—this results in any content not already replicated to the detached storage system being given new logical extent identities that the detached storage system may never have received.

Another issue that may face resynchronization implementations is getting extent graph based synchronous replication fully synchronized and running live. For example, resynchronization may proceed by first transferring a more recent snapshot, such as one created at a beginning of an attach, by having the target storage system retrieve it from in-sync storage systems in the manner described above, where the target incrementally requests leaf and composite logical extents that it does not have. This process may include accounting for in-progress operations at the time of the detach, where at the end of this process, the content up to that more recent snapshot is synchronized between the in-sync storage systems for the pod and the attaching storage system. Further, this process may be repeated with another snapshot, and possibly with additional snapshots, to get the target storage system closer to the in-sync storage system. However, at some point, the live data may also have to be transferred, and to do this, replication of live modifying operations may be enabled for transfer to an attaching storage system after a last resynchronization snapshot, such that all modifying operations not included in the snapshot may be delivered to the attaching storage system. This implementation results in operations that describe modifications to leaf and composite logical extents that are included in the snapshot, where these descriptions may include the create of new leaf and composite logical extents (with specified content) or the replacement of existing leaf and composite logical extents with modified copies of those extents with new identities. In cases where an operation description creates new logical extents or replaces logical extents already known to an attaching storage system, the operation may be processed normally as if the attaching storage system is in-sync. In cases where the description for an operations includes at least one replacement of a logical extent not already known to an attaching storage system, that operation may be made durable to allow completion, but full processing of the operation may be delayed until the logical extent being replaced is received. Further, to reduce overhead associated with these operations that are waiting for such a logical extent content transfer, an attaching storage system may prioritize those logical extents to be retrieved earlier than other logical extents. In this example, in dependence upon how efficiently a storage system can handle these operations awaiting such a pre-existing logical extent, there may be no reason to transfer any sequence of snapshot images prior to enabling live operations. Instead, a resynchronization snapshot that describes state information from a time of a detach (or from some time prior to the detach) could be transferred—with operations being processed as described earlier, while transferring the snapshot from in-sync storage systems to the attaching storage system, also as described earlier.

In some cases, an issue that may face a resynchronization implementation is preserving block references during a resynchronization. For example, in a synchronously replicated storage system, a specific written block, or a specific set of blocks associated with an operation, may be given an identify that is included in the operation description for the write of that block, or that block set. In this example, a new write that replaces that block, or some or all of the block set, may supply a new identity for the block or block set, where this new identity may be built from a secure hash of the block content (such as using SHA-256 or some other mechanism that has a suitably infinitesimal chance of differing blocks yielding the same hash value), or the new identity may simply identify the write itself in a unique way irrespective of whether two writes included identical block contents. For example, the new identity may be a sequence number or a timestamp. Further, if the new identity for a block or block set is shared in the distributed description of a write operation and stored in some map in each storage system as part of writing the block or block set, then leaf logical extents may describe their content in terms of these block or block set identities. In such implementations, resynchronization of leaf extents may reference blocks or block sets already stored in an attaching storage system rather than transferring them from an in-sync storage system. This implementation may reduce the total data transferred during a resynchronization. For example, data which had already been written to the attaching storage system around the time of a detach, but that was not included in a resynchronization snapshot, may have been stored with that identity, and may not need to be transferred again because that block or block set identity is already known and stored. Further, if some number of virtual extended copy operations resulted in the copying of block references between two leaf logical extents during the time that a storage system was detached, then the block or block set identities may be used to ensure that the virtually copied blocks are not transferred twice.

In some cases, resynchronization implementations may use content-addressable stores, where stored blocks may have a unique identity that may be based on a secure hash of block content. In this example, resynchronization may proceed by transferring a list of all block identities related to a pod on in-sync storage systems to an attaching storage system, along with a mapping of those blocks identities to volumes (or files or objects) in the pod. In this case, an attach operation may proceed by transferring these blocks the attaching storage system is not aware of from an in-sync storage system for the pod—which may be integrated with processing of live operations that change a mapping from volume to content. Further, if some earlier version of a mapping from pod content to block identities is known from before a storage system detach from the pod, then differences between that earlier version and the current version may be transferred instead of transferring an entire mapping.

As described above, metadata may be synchronized among storage systems that are synchronously replicating a dataset. Such metadata may be referred to as common metadata, or shared metadata, that is stored by a storage system on behalf of a pod related to the mapping of segments of content stored within the pod to virtual address within storage objects within the pod, where information related to those mappings is synchronized between member storage systems for the pod to ensure correct behavior—or better performance—for storage operations related to the pod. In some examples, a storage object may implement a volume or a snapshot. The synchronized metadata may include: (a) information to keep volume content mappings synchronized among the storage systems in the pod; (b) tracking data for recovery checkpoints or for in-progress write operations; (c) information related to the delivery of data and mapping information to a remote storage system for asynchronous or periodic replication.

Information to keep volume content mappings synchronized among the storage systems in the pod may enable efficient creating of snapshots, which in turn enables that subsequent updates, copies of snapshots, or snapshot removals may be performed efficiently and consistently across the pod member storage systems.

Tracking data for recovery checkpoints or for in-progress write operations may enable efficient crash recovery and efficient detection of content or volume mappings that may have been partially or completely applied on individual storage systems for a pod, but that may not have been completely applied on other storage systems for the pod.

Information related to the delivery of data and mapping information to a remote storage system for asynchronous or periodic replication may enable more than one member storage system for a pod to serve as a source for the replicated pod content with minimal concerns for dealing with mismatches in mapping and differencing metadata used to drive asynchronous or periodic replication.

In some examples, shared metadata may include descriptions for, or indications of, a named grouping, or identifiers for, of one or more volumes or one or more storage objects that are a subset of an entire synchronously replicated dataset for a pod—where such a of volumes or storage objects of a dataset may be referred to as a consistency group. A consistency group may be defined to specify a subset of volumes or storage objects of the dataset to be used for consistent snapshots, asynchronous replication, or periodic replication. In some examples, a consistency group may be calculated dynamically, such as by including all volumes connected to a particular set of hosts or host network ports, or that are connected to a particular set of applications or virtual machines or containers, where the applications, virtual machines, or containers may operate on external server systems or may operate on one or more of the storage systems that are members of a pod. In other examples, a consistency group may be defined according to user selections of a type of data or set of data, or specifications of a consistency group similar to the dynamic calculation, where a user may specify, for example through a command or management console, that a particular, or named, consistency group be created to include all volumes connected to a particular set of hosts or host network ports, or be created to include data for a particular set of applications or virtual machines or containers.

In an example using a consistency group, a first consistency group snapshot of a consistency group may include a first set of snapshot for all volumes or other storage objects that are members of the consistency group at the time of the first dataset snapshot, with a second consistency group snapshot of the same consistency group including a second set of snapshots for the volumes or other storage objects that are members of the consistency group at the time of the second dataset snapshot. In other examples, a snapshot of the dataset may be stored on one or more target storage systems in an asynchronous manner. Similarly, asynchronous replication of a consistency group may account for dynamic changes to member volumes and other storage objects of the consistency group, where consistency group snapshots of the consistency group at either the source or the target of the asynchronous replication link include the volumes and other storage objects that are members in relationship to the consistency group at the time that the dataset snapshot relates to. In the case of a target of an asynchronous replication connection, the time that the dataset snapshot relates to depends on the dynamic dataset of the sender as it was received and was in process at the time of the consistency group snapshot on the target. For example, if a target of an asynchronous replication is, say, 2000 operations behind, where some of those operations are consistency group member changes, where a first set of such changes are more than 2000 operations ago for the source, and a second set of changes are within the last 200, then a consistency group snapshot at that time on the target will account for the first set of member changes and will not account for the second set of changes. Other uses of the target of asynchronous replication may similarly account for the nature of the time of the dataset for the consistency group in determining the volumes or other storage objects (and their content) for those uses. For example, in the same case of asynchronous replication being 2000 operations behind, use of the target for a disaster recovery failover might start from a dataset that includes the volumes and other storage objects (and their content) as they were 2000 operations ago at the source. In this discussion, concurrent operations at the source (e.g., writes, storage object creations or deletions, changes to properties that affect inclusion or exclusion of volumes or other storage objects or other data from a consistency group, or other operations that were in progress and not signaled as completed at a same point in time) might not have a single well-defined ordering, so the count of operations only needs to represent some plausible ordering based on any allowed ordering of concurrent operations on the source.

As another example using consistency groups, in the case of periodic replication based on replication of consistency group snapshots, each replicated consistency group snapshot would include the volumes and other storage objects at the time each consistency group snapshot was formed on the source. Ensuring that membership in a consistency group is kept consistent by using common, or shared, metadata, ensures that a fault—or other change which may cause the source of replication, or the system that forms a dataset snapshot, to switch from one storage system in a pod to another—does not lose information needed for properly handling those consistency group snapshots or the consistency group replication. Further, this type of handling may allow for multiple storage systems that are members of a pod to concurrently serve as source systems for asynchronous or periodic replication.

Further, synchronized metadata describing mapping of segments to storage objects is not limited to mappings themselves, and may include additional information such as sequence numbers (or some other value for identifying stored data), timestamps, volume/snapshot relationships, checkpoint identities, trees or graphs defining hierarchies, or directed graphs of mapping relationships, among other storage system information.

Readers will appreciate that the methods described above may be carried out by any combination of storage systems described above. Furthermore, any of the storage systems described above may also pair with storage that is offered by a cloud services provider such as, for example, Amazon™ Web Services ('AWS'), Google™ Cloud Platform, Microsoft™ Azure, or others. In such an example, members of a particular pod may therefore include one of the storage systems described above as well as a logical representation of a storage system that consists of storage that is offered by a cloud services provider. Likewise, the members of a particular pod may consist exclusively of logical representations of storage systems that consist of storage that is offered by a cloud services provider. For example, a first member of a pod may be a logical representation of a storage system that consists of storage in a first AWS availability zone while a second member of the pod may be a logical representation of a storage system that consists of storage in a second AWS availability zone.

To facilitate the ability to synchronously replicate a dataset (or other managed objects such as virtual machines) to storage systems that consist of storage that is offered by a cloud services provider, and perform all other functions described in the present application, software modules that carry out various storage system functions may be executed on processing resources that are provided by a cloud services provider. Such software modules may execute, for example, on one or more virtual machines that are supported by the cloud services provider such as a block device Amazon™ Machine Image ('AMI') instance. Alternatively, such software modules may alternatively execute in a bare metal environment that is provided by a cloud services provider such as an Amazon™ EC2 bare metal instance that has direct access to hardware. In such an embodiment, the Amazon™ EC2 bare metal instance may be paired with dense flash drives to effectively form a storage system. In either implementation, the software modules would ideally be collocated on cloud resources with other traditional datacenter services such as, for example, virtualization software and services offered by VMware™ such as vSAN™. Readers will appreciate that many other implementations are possible and are within the scope of the present disclosure.

Readers will appreciate that in situations where a dataset or other managed object in a pod is retained in an on-promises storage system and the pod is stretched to include a storage system whose resources are offered by a cloud services provider, the dataset or other managed object may be transferred to the storage system whose resources are offered by a cloud services provider as encrypted data. Such data may be encrypted by the on-promises storage system, such that the data that is stored on resources offered by a cloud services provider is encrypted, but without the cloud services provider having the encryption key. In such a way, data stored in the cloud may be more secure as the cloud has no access to the encryption key. Similarly, network encryption could be used when data is originally written to the on-premises storage system, and encrypted data could be transferred to the cloud such that the cloud continues to have no access to the encryption key.

Through the use of storage systems that consist of storage that is offered by a cloud services provider, disaster recovery may be offered as a service. In such an example, datasets, workloads, other managed objects, and so on may reside on an on-premises storage system and may be synchronously replicated to a storage system whose resources are offered by a cloud services provider. If a disaster does occur to the on-premises storage system, the storage system whose resources are offered by a cloud services provider may take over processing of requests directed to the dataset, assist in migrating the dataset to another storage system, and so on. Likewise, the storage system whose resources are offered by a cloud services provider may serve as an on-demand, secondary storage system that may be used during periods of heavy utilization or as otherwise needed. Readers will appreciate that user interfaces or similar mechanisms may be designed that initiate many of the functions described herein, such that enabling disaster recovery as a service may be as simple as performing a single mouse click.

Through the use of storage systems that consist of storage that is offered by a cloud services provider, high availability may also be offered as a service. In such an example, datasets, workloads, other managed objects, that may reside on an on-premises storage system may be synchronously replicated to a storage system whose resources are offered by a cloud services provider. In such an example, because of dedicated network connectivity to a cloud such as AWS Direct Connect, sub-millisecond latency to AWS from variety of locations can be achieved. Applications can therefore run in a stretched cluster mode without massive expenditures upfront and high availability may be achieved without the need for multiple, distinctly located on-premises storage systems to be purchased, maintained, and so on. Readers will appreciate that user interfaces or similar mechanisms may be designed that initiate many of the functions described herein, such that enabling applications may be scaled into the cloud by performing a single mouse click.

Through the use of storage systems that consist of storage that is offered by a cloud services provider, system restores may also be offered as a service. In such an example, point-in-time copies of datasets, managed objects, and other entities that may reside on an on-premises storage system may be synchronously replicated to a storage system whose resources are offered by a cloud services provider. In such an example, if the need arises to restore a storage system back to a particular point-in-time, the point-in-time copies of datasets and other managed objects that are contained on the storage system whose resources are offered by a cloud services provider may be used to restore a storage system.

Through the use of storage systems that consist of resources that are offered by a cloud services provider, data that is stored on an on-premises storage system may be natively piped into the cloud for use by various cloud services. In such an example, the data that is in its native format as it was stored in the on-premises storage system, may be cloned and converted into a format that is usable for various cloud services. For example, data that is in its native format as it was stored in the on-premises storage system may be cloned and converted into a format that is used by Amazon™ Redshift such that data analysis queries may be performed against the data. Likewise, data that is in its native format as it was stored in the on-premises storage system may be cloned and converted into a format that is used by Amazon™ DynamoDB, Amazon™ Aurora, or some other cloud database service. Because such conversions occurs outside of the on-premises storage system, resources within the on-premises storage system may be preserved and retained for use in servicing I/O operations while cloud resources that can be spun-up as needed will be used to perform the data conversion, which may be particularly valuable in embodiments where the on-premises storage system operates as the primary servicer of I/O operations and the storage systems that consist of resources that are offered by a cloud services provider operates as more of a backup storage system. In fact, because managed objects may be synchronized across storage systems, in embodiments where an on-premises storage system was initially responsible for carrying out the steps required in an extract, transform, load ('ETL') pipeline, the components of such a pipeline may be exported to a cloud and run in a cloud environment. Through the use of such techniques, analytics as a service may also be offered, including using point-in-time copies of the dataset (i.e., snapshots) as inputs to analytics services.

Readers will appreciate that applications can run on any of the storage systems described above, and in some embodiments, such applications can run on a primary controller, a secondary controller, or even on both controllers at the same time. Examples of such applications can include applications doing background batched database scans, applications that are doing statistical analysis of run-time data, and so on.

Figure 10:
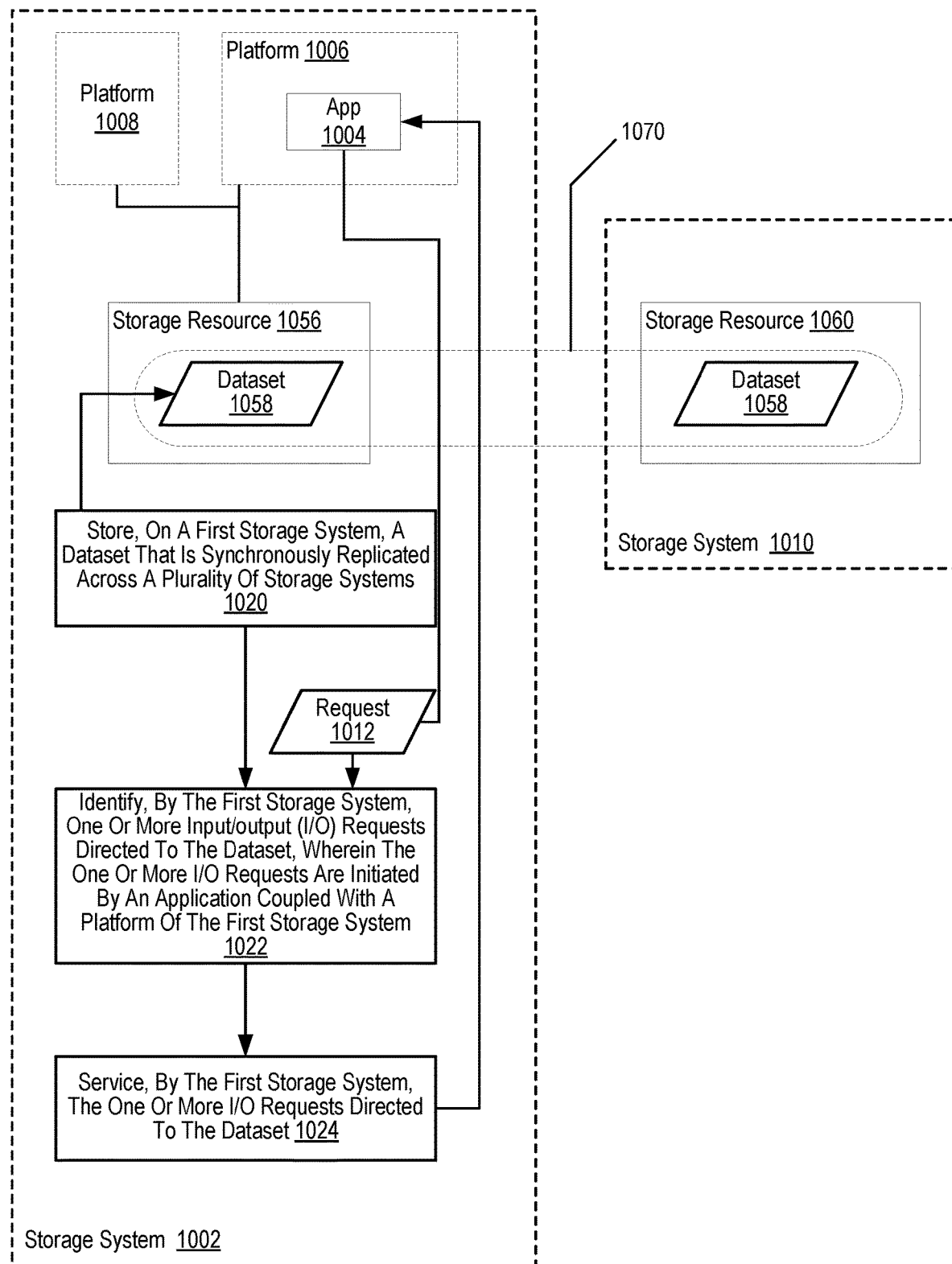
FIG. 10 sets forth a flow chart illustrating an additional example method of application replication among storage systems synchronously replicating a dataset according to some embodiments of the present disclosure.

For further explanation, FIG. 10 sets forth a flow chart illustrating an example method for application replication among storage systems synchronously replicating a dataset according to some embodiments of the present disclosure. Although depicted in less detail, the first storage system (1002) and the second storage system (1010) depicted in FIG. 10 may be similar to the storage systems described above with reference to FIGS. 1A-1D, FIGS. 2A-2G, FIGS. 3A-3C, FIGS. 4-9, or any combination thereof. In fact, the first storage system (1002) and the second storage system (1010) depicted in FIG. 10 may include the same, fewer, additional components as the storage systems described above. In some embodiments, the first storage system (1002) or the second storage system (1010) may be a cloud-based storage system. In some embodiments, both the first storage system (1002) and the second storage system are cloud-based storage systems.

In the example depicted in FIG. 10, the storage system (1002) includes an application (1004) deployed on a platform (1006) coupled with the storage system (1002). In some examples, the application (1004) may be embodied as one or more modules of computer program instructions executing on computer hardware such as a computer processor of the storage system (1002), and may be separate from an operating environment for servicing I/O requests from users of the storage system, writing data to the storage devices in the storage system, reading data from the storage devices in the storage system, performing garbage collection on the storage devices in the storage system, and performing other operations described above. In these examples, the storage system (1002) may be a physical storage system that hosts the application (1004). In other examples, the application (1004) may be embodied as one or more modules of computer program instructions executing within a virtual component that is coupled to the storage system (1002). In these examples, the storage system (1002) may be a virtual storage system coupled to a virtual component (e.g., a virtual compute node) that hosts the application (1004).

The application (1004) may use the storage system (1002) in implementing file systems, data objects, or databases, or may implement background operations such as background batched database scans or statistical analysis of run-time data. In this context, the application running within or coupled to the storage system may be part of a larger application. For example, the coupled application may provide key durability services for, say, an internet banking service, while the overall application providing the banking service itself may be implemented using any number of additional servers or data center or cloud components. Applications such as application (1004) may provide functionality that is dependent upon the storage system (1002) being in-sync and online with other storage systems (e.g., storage system (1010)), where any of these applications may be distributed implementations that operate on a synchronously replicated, and symmetrically accessible, underlying storage implementation. In one example, applications or services such as application (1004) may be hosted on respective platforms running in two locations that use respective storage systems corresponding to those two locations, where these applications or services (or components of the applications or services that use a particular set of storage) run in one location at a time with a storage system being available for access in the location that is currently running those components. In this example, the stored data is synchronously replicated to the other location so that, in the event of a fault, the application or service can be brought up in the alternate location with no data loss.

The application (1004) utilizes the computing resources of the storage system (1002) or a virtual component coupled to the storage system (1002), rather than executing remotely on a host, thus reducing latency between the application (1004) and the data stored on the storage system (1002). The computing resources utilized by the application (1004) may be provided by the platform (1006) in that the application (1004) is hosted on the platform (1006) as, for example, an application resident, deployed, or instantiated on the platform (1006).

In some examples, the storage system (1002) may also include a second platform (1008). The first platform (1006) and the second platform (1008) may be embodied in a variety of ways, so long as the first platform (1006) and the second platform (1008) are able to support the execution of the application (1004). The first platform (1006) and the second platform (1008) may be embodied, for example, as virtual machines that are executing on computer hardware within or coupled to the storage system (1002), as storage controllers that are included within or coupled to the storage system (1002), as servers that are included within or coupled to the storage system (1002), or as any combination of such examples. In some examples, the first platform (1006) and the second platform (1008) are embodied in redundant storage controllers in a dual controller storage system, in that the storage system (1002) can include at least one active controller and at least one redundant controller, which may be similar to the storage array controllers described above. In such an example, a redundant controller can serve as a passive controller in an active-passive pair of controllers, where an active controller serves as the controller that issues I/O requests from external hosts to storage devices within the storage system (1002). Readers will appreciate that while the active controller and the redundant controller may be part of an active-passive pair, such an embodiment is only one possible embodiment of the present disclosure. The first controller and the redundant controller may be part of an active-active pair or configured in some other manner, so long as there are redundant resources.

In one example, the platform (1006) hosting the application (1004) is a secondary controller of a primary/secondary dual controller storage system. As explained above, for high availability of data in the storage system, the passive secondary controller may be promoted to an active secondary controller in the event of a fault in the previously-active primary controller. Readers will appreciate that, while the secondary controller is serving as a passive redundant controller, the computing resources of the secondary controller may be underutilized. As such, the secondary controller may be ideal for hosting applications such as the application (1004) that may utilize the computing resources of the secondary controller to implement file systems or databases, or provide analytics and batch processing functions, particularly where operations are optimized by close proximity to the data stored in the storage system. In the event that the primary controller fails over to the secondary controller, the application may be terminated to free up computing resources needed to service I/O requests from remote hosts. However, in some examples, the application (1004) may be deployed on the active primary controller.

In some implementations, the primary controller is primarily dedicated to servicing I/O requests received from externals hosts, while the secondary controller is not visible to those hosts. In one example, the primary controller services I/O requests directed to a dataset on the storage system that are received from remote hosts, while the secondary controller may service I/O requests directed to a dataset on the storage system that are received from resident applications. In some examples, the first platform (1006) and the second platform (1008) may be redundant virtual controllers of a cloud-based virtual storage system.

While the example of FIG. 10 depicts the first storage system (1002) as having two platforms (e.g., two storage controllers), readers will appreciate that a storage system may include more or fewer storage controllers. For example, a storage system may include a single storage controller. In such an example, the single storage controller in a storage system may serve as a passive secondary passive controller, where a controller in another storage system serves as the active primary controller. Other storage controllers in a storage system may be neither primary or secondary storage controllers, and may instead be used to facilitate communication between the primary and secondary storage controllers.

The example method of FIG. 10 includes storing (1020), on a first storage system (1002), a dataset (1058) that is synchronously replicated across a plurality of storage systems. In the example depicted in FIG. 10, the dataset (1058) is synchronously replicated across the first storage system (1002) and a second storage system (1010), although readers will appreciate that the dataset (1058) may be synchronously replicated across other storage systems in addition to those depicted. The second storage system (1010) depicted in FIG. 10 may be similar to the storage system (1002) and to the storage systems described above with reference to FIGS. 1A-1D, FIGS. 2A-2G, FIGS. 3A-3C, FIGS. 4-9, or any combination thereof. In fact, the storage system (1010) depicted in FIG. 10 may include the same, fewer, or additional components as the storage systems described above. In some embodiments, the second storage system (1010) may be a cloud-based storage system. In some examples, the first storage system (1002) and the second storage system (1010) that are synchronously replicating the dataset (1058) may be members of a pod (1070) having the attributes of a pod as described above. The dataset (1058) may be stored in storage resources (1056) of the first storage system, such as any of the storage devices and storage arrays described above. The dataset (1058) may also be stored in storage resources (1060) of the second storage system, such as any of the storage devices and storage arrays described above.

In the example depicted in FIG. 10, storing (1020), on a first storage system (1002), a dataset (1058) that is synchronously replicated across a plurality of storage systems is carried out by storing the dataset (1058) in storage resources of the first storage system (1002) as well as synchronously replicating, to the second storage system (1010), I/O operations directed to the dataset (1058) that are received by the first storage system (1002), and applying changes to the dataset (1058) that are received from the second storage system (1010), utilizing the synchronous replication techniques described above. In some examples, synchronous replication entails acknowledging to a consuming application, by a storage system that receives a request directed the dataset, that the request has been completed after receiving confirmation that the modification has been applied from other storage systems synchronously replicating the dataset. In some embodiments, asynchronous replication techniques such as those discussed above may be used to replicate the dataset (1058) across a plurality of storage systems (e.g., the first storage system (1002) and the second storage system (1010)). In such examples, asynchronous replication entails acknowledging to a consuming application, by a storage system that receives a request directed the dataset, that the request has been completed without waiting for other storage systems replicating the dataset to confirm that the modification has been applied. For example, checkpoints may be used to synchronize transactions on the storage systems at defined intervals, or snapshot-based replication may be used to asynchronously replicate one storage system (e.g., storage system 1002) onto another storage system (e.g., storage system 1010) during a failover or disaster recovery scenario.

The example method of FIG. 10 also includes identifying (1022), by the first storage system (1002), one or more input/output (I/O) requests (1012) directed to the dataset (1058), wherein the one or more I/O requests (1012) are initiated by an application (1004) coupled with a platform (1006) of the first storage system (1002). Identifying (1022), by the first storage system (1002), one or more input/output (I/O) requests (1012) directed to the dataset (1058), wherein the one or more I/O requests (1012) are initiated by an application (1004) hosted on a platform (1006) of the first storage system (1002) may be implemented using a communication channel that is internal to the storage system (1002) to receive the I/O requests from the application (1004).

In some examples, the application (1004) implements a file system, data objects, or database that requires the dataset (1058) stored on the first storage system (1002) that requires the dataset (1058) to be in-sync with the instance of the dataset (1058) stored on the second storage system. In these examples, the application (1004) may be a clustered application, where distributed processing performed by the application may employ communication between instances of the application, and where modifications to the dataset (1058) made by the application (1004) on the first storage system (1002) are synchronously replicated to the instance of the dataset (1058) stored on the second storage system (1010). In some examples, the application (1004) may be an analytics application or batch processing application that does not receive I/O requests from external hosts.

The application (1004) may be hosted on the first platform (1006) of the storage system (1002) in that the application (1004) is resident, deployed, or instantiated on the first platform (1006). In some examples, the first platform (1006) is a storage controller, such that the application (1004) runs on the storage controller or within a container on the storage controller. In these examples, the first platform (1006) may be a primary storage controller or a secondary storage controller of the first storage system (1002). For example, the first platform (1006) may be a passive secondary controller that does not receive I/O requests from external hosts except in the event that the secondary controller is promoted to an active controller (e.g., in a failover). In this example, the application (1004) utilizes the resources of the secondary controller that are typically underutilized. In some examples, the first platform (1006) includes a virtual machine hosted on or coupled to the storage system, in which the application is instantiated or deployed. In these examples, the virtual machine may have dedicated computing resources (i.e., processor(s) and RAM) of the storage system. In some examples, the application (1004) may be coupled with the first platform (1006) of the storage system (1002) instead being hosted on the platform, such as when the platform (1006) is a virtual component of a virtual storage system or cloud-based storage system.

The example method of FIG. 10 also includes servicing (1024), by the first storage (1002) system, the one or more I/O requests (1012) directed to the dataset (1058). The I/O requests (1012) may include, for example, requests to read, write, copy, or invalidate data stored in the dataset (1058). Servicing (1024), by the first storage (1002) system, the one or more I/O requests (1012) directed to the dataset (1058) by performing the I/O operation requested by the application (1004) on the first storage system (1002) and replicating the I/O operation, when the I/O operation modifies the dataset (1058), to the second storage system (1010).

Readers will appreciate that hosting the application on the storage controller of the storage system reduces the communication pathway, thus reducing I/O operation latency and increasing performance, by placing the application closer to the stored data that if the application were executed on an external host, which is advantageous for data intensive applications. Readers will also appreciate that hosting the application on a passive storage controller in a dual controller or scale out storage system conserves computing resources of the active controller of the storage system. Readers will also appreciate that synchronous replication of the dataset across a plurality of storage systems allows for application clustering and symmetric data access, such that applications hosted on disparate storage systems may utilize local, synchronized instances of the same dataset.

Figure 11:
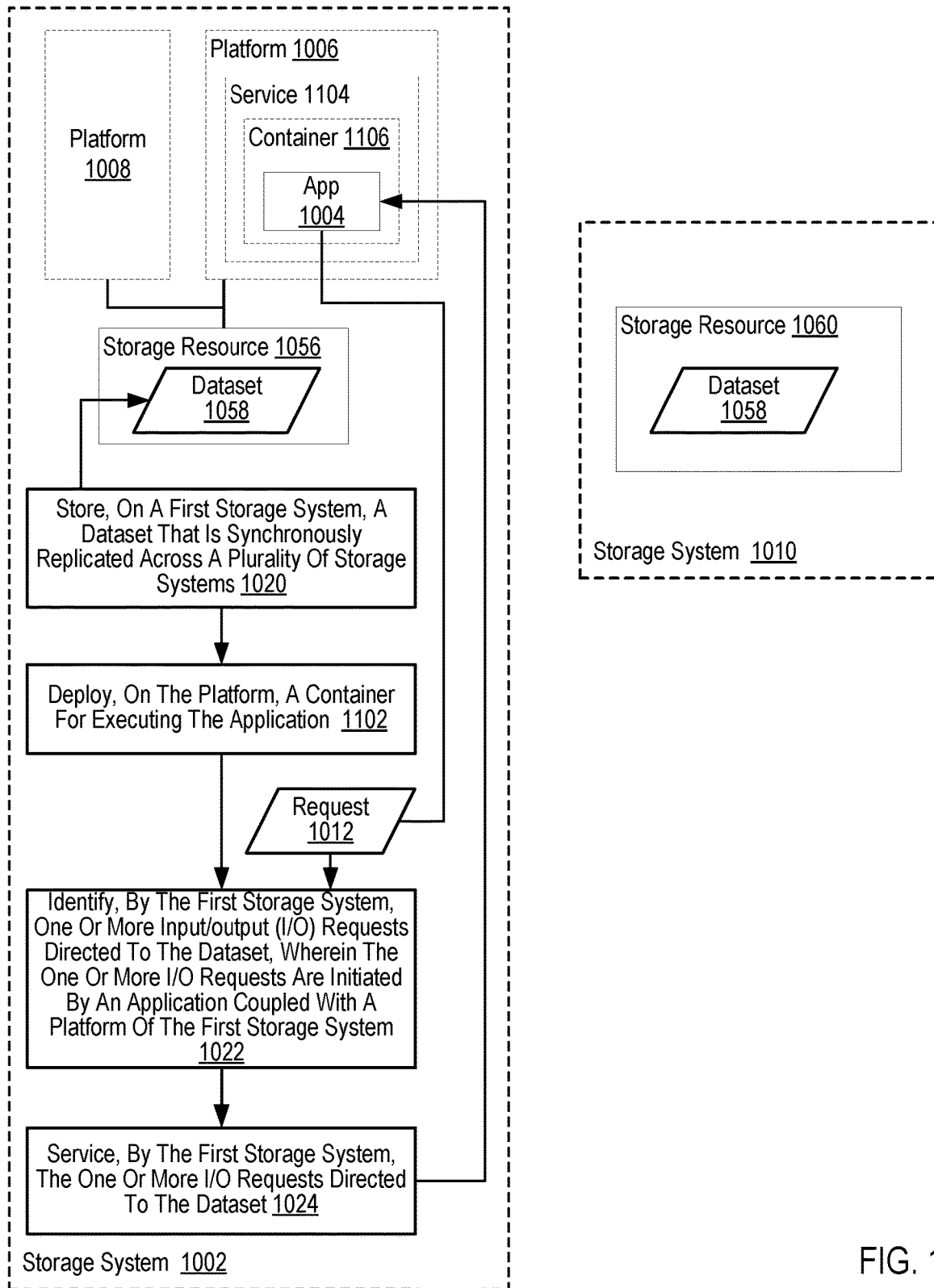
FIG. 11 sets forth a flow chart illustrating an example method for application replication among storage systems synchronously replicating a dataset according to some embodiments of the present disclosure.

For further explanation, FIG. 11 sets forth a flow chart illustrating an example method for application replication among storage systems synchronously replicating a dataset according to some embodiments of the present disclosure. The example method of FIG. 11 is similar to the example method of FIG. 10 in that the example method of FIG. 11 also includes storing (1020), on a first storage system (1002), a dataset (1058) that is synchronously replicated across a plurality of storage systems; identifying (1022), by the first storage system (1002), one or more input/output (I/O) requests (1012) directed to the dataset (1058), wherein the one or more I/O requests (1012) are initiated by an application (1004) coupled with a platform (1006) of the first storage system (1002); and servicing (1024), by the first storage (1002) system, the one or more I/O requests (1012) directed to the dataset (1058).

The example method of FIG. 11 further includes deploying (1102) on the first platform (1006), a container (1106) for executing the application (1004). The application (1004) may be deployed in a variety of ways, including container-based deployment models. Containerized applications may be deployed and managed using a variety of tools, including an operating system level virtualization service (1104) of the first storage system (1102), such as services that provide operating system level virtualization, or containers. Examples of operating system level virtualization services include containerization services such as Docker™, hybrid cloud container orchestration such as Mesosphere™, and Container Orchestration Service such as Kubernetes™ The operating system level virtualization service (1104) may be embodied, for example, as a module of computer software that, when executed on computer hardware, provides a managed environment for deploying containerized applications. The operating system level virtualization service (1104) may support the execution of one or more containerized applications through the use of a container image. A container image may be embodied, for example, as a lightweight, stand-alone, executable package that includes everything needed to run a piece of software (e.g., the containerized application). A container image can include, for example, a runtime or scripts containing the various parts of the application implementation, libraries, environment variables, configuration files, and so on. Thus, the container (1106) may be viewed as a run-time instance of a container image deployed through the operating system level virtualization service (1104).

In the example of FIG. 11, deploying (1102), on the first storage system (1002), a container (1106) executing the application (1004) may be implemented by instantiating a container image including the application (1004). In some examples, instantiating a container image including the application (1004) is carried out by an operating system level virtualization service (1104) of the first storage system (1002). The container image for the containerized application may be provided by a user or may be resident on the storage system (1002). In some examples, the container image for the containerized application may be stored on multiple storage systems such that, for example, any of the storage systems synchronously replicating the dataset (1058) may spin up an instance of the application (1004). In some cases, the application (1004) may be an analytics application that performs run-time performance analysis of the first storage system (1002) or any of the storage systems that includes the operating system level virtualization service (1104) and the container image. In some examples, the second storage system (1010) also includes the operating system level virtualization service (not depicted) for hosting the containerized application (1004). In addition to portability, the use of containers to execute the application (1004) provides data isolation. For example, the container (1106) may be configured to mount a specific volume, thus preventing the application (1004) from modifying or accessing data outside the mounted volume.

In some embodiments, the container image for the application (1004) may be synchronously replicated across the set of storage systems synchronously replicating the dataset, such that the containerized application may be spun up on any of the storage systems. Thus, any changes made to the container image will be propagated to all of the storage systems. Readers will appreciate that embodiments of the present disclosure alleviate the need to transfer the container image over a data communications link to the particular storage system that includes the data for the containerized application because the container may be spun up on any storage system that is synchronously replicating the dataset. In such a way, through the use of synchronously replicated datasets available to the operating system level virtualization service on any storage system synchronously replicating the dataset, containerized applications may be deployed in a way that does not consume networking bandwidth.

Figure 12:
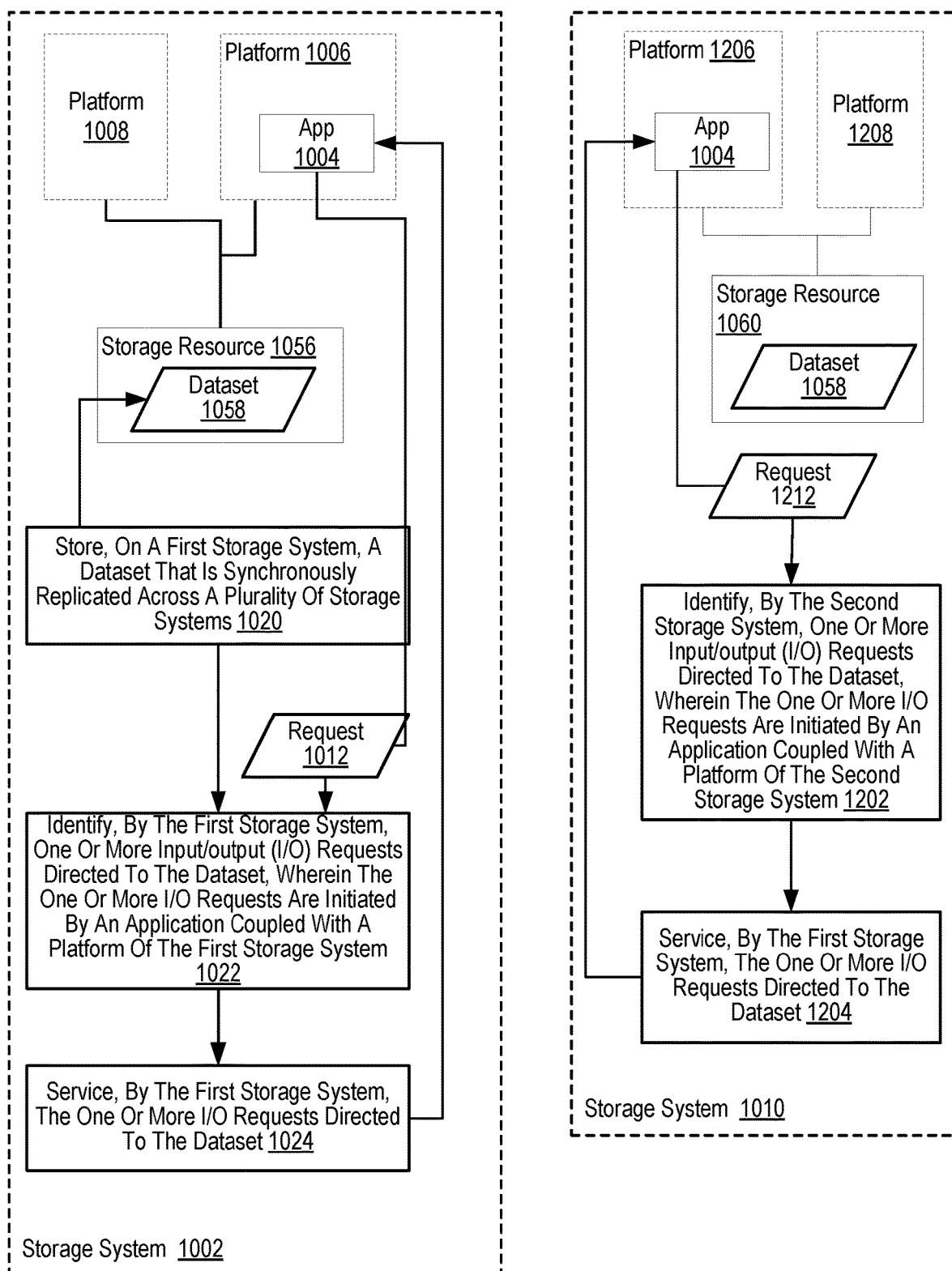
FIG. 12 sets forth a flow chart illustrating an additional example method for application replication among storage systems synchronously replicating a dataset according to some embodiments of the present disclosure.

For further explanation, FIG. 12 sets forth a flow chart illustrating an example method for application replication among storage systems synchronously replicating a dataset according to some embodiments of the present disclosure. The example method of FIG. 12 is similar to the example method of FIG. 10 in that the example method of FIG. 12 also includes storing (1020), on a first storage system (1002), a dataset (1058) that is synchronously replicated across a plurality of storage systems; identifying (1022), by the first storage system (1002), one or more input/output (I/O) requests (1012) directed to the dataset (1058), wherein the one or more I/O requests (1012) are initiated by an application (1004) coupled with a platform (1006) of the first storage system (1002); and servicing (1024), by the first storage (1002) system, the one or more I/O requests (1012) directed to the dataset (1058).

The example method of FIG. 12 further includes identifying (1202), by a second storage system (1010) among the plurality of storage systems synchronously replicating the dataset (1058), one or more I/O requests (1212) directed to the dataset (1058), wherein the one or more I/O requests (1212) are initiated by a second instance of the application (1004) coupled with a platform (1206) of the second storage system (1010). Like the platform (1006) of the first storage system (1002), the platform (1206) of the second storage system (1010) may host a second instance the application (1004), which may be resident, deployed or instantiated on the platform (1206) of the second storage system (1010). In some examples, the application (1004) may be coupled with the platform (1206) of the storage system (1010) instead being hosted on the platform, such as when the platform (1206) is a virtual component of a virtual storage system or cloud-based storage system.

In some examples, as shown in the example depicted in FIG. 12, the second storage system (1010) may include redundant platforms (1206, 1208). The platforms (1206, 1208) may be embodied, for example, as virtual machines that are executing on computer hardware within the storage system (1010), as storage controllers that are included within the storage system (1010), as servers that are included within the storage system (1010), or as any combination of such examples. In some embodiments, the redundant platforms (1206, 1208) of the second storage system are redundant storage controllers as discussed above. For example, the platform (1206) may be a passive secondary storage controller and the platform (1208) may be an active primary controller. Where the computing resources of the secondary storage controller may be underutilized, hosting the application (1004) on the passive secondary storage controller increases the efficiency of resource consumption. In some examples, neither of the platforms (1206, 1208) are designated as primary storage controllers (i.e., active storage controllers). In these examples, the primary storage controller of the first storage system (1002) may also be the primary storage controller of the second storage system (1010).

In the example of FIG. 12, identifying (1202), by a second storage system (1010) among the plurality of storage systems synchronously replicating the dataset (1058), one or more I/O requests (1212) directed to the dataset (1058), wherein the one or more I/O requests (1212) are initiated by a second instance of the application (1004) coupled with a platform (1206) of the second storage system (1010) may be carried out similarly to identifying (1022) one or more I/O requests by the first storage system (1002) as discussed above. For example, identifying (1202), by a second storage system (1010) among the plurality of storage systems synchronously replicating the dataset (1058), one or more I/O requests (1212) directed to the dataset (1058) may be implemented using a communication channel that is internal to the storage system (1010) to receive the I/O requests from the second instance of the application (1004).

The method of FIG. 12 also includes servicing (1204), by the second storage system (1010), the one or more I/O requests (1212) directed to the dataset (1058). Servicing (1204), by the second storage system (1010), the one or more I/O requests (1212) directed to the dataset (1058) may be carried out as discussed above, for example, by performing the I/O operation requested by the second instance of the application (1004) on the second storage system (1010) and replicating the I/O operation, when the I/O operation modifies the dataset (1058), to the first storage system (1002).

In some embodiments, the application (1004) hosted on the first storage system (1002) and the second instance of the application (1004) hosted on the second storage system (1010) may be communicatively linked to operate as a distributed application. For example, the application (1004) may be a database application or an implementation of a file system, in which the application instances act in concert on the dataset (1058) and share information about operations on the dataset (1058) (e.g., workload completion, file system changes). In some examples, communication link between the application (1004) hosted on the first storage system (1002) and the second instance of the application (1004) hosted on the second storage system (1010) may be implemented by using one or more communication protocols for transporting packets or data across a network, such as a storage area network (158), the Internet, or any computer network across which the applications on the storage systems may communicate. The application instances may communicate by sending messages directly between the applications or through the respective storage controllers hosting the applications.

Figure 13:
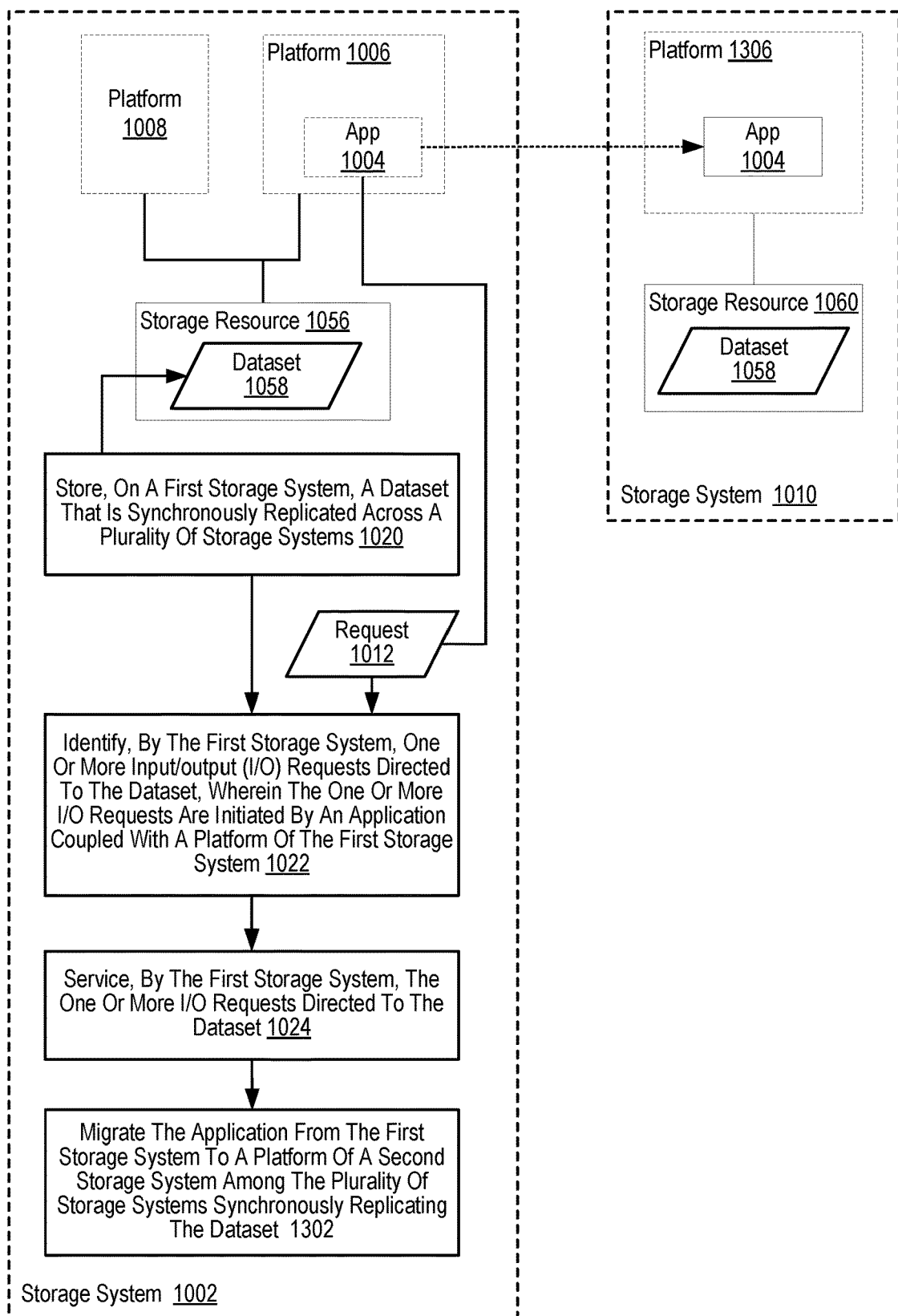
FIG. 13 sets forth a flow chart illustrating an additional example method for application replication among storage systems synchronously replicating a dataset according to some embodiments of the present disclosure.

For further explanation, FIG. 13 sets forth a flow chart illustrating an example method for application replication among storage systems synchronously replicating a dataset according to some embodiments of the present disclosure. The example method of FIG. 13 is similar to the example method of FIG. 10 in that the example method of FIG. 13 also includes storing (1020), on a first storage system (1002), a dataset (1058) that is synchronously replicated across a plurality of storage systems; identifying (1022), by the first storage system (1002), one or more input/output (I/O) requests (1012) directed to the dataset (1058), wherein the one or more I/O requests (1012) are initiated by an application (1004) coupled with a platform (1006) of the first storage system (1002); and servicing (1024), by the first storage (1002) system, the one or more I/O requests (1012) directed to the dataset (1058).

The example method of FIG. 13 further includes migrating (1302) the application from the first storage system (1002) to a platform (1306) of a second storage system (1010) among the plurality of storage systems synchronously replicating the dataset (1058). The platform (1306) may be embodied, for example, as a virtual machine that is executing on computer hardware within the second storage system (1010), as a storage controller that is included within the second storage system (1010), as a server that is included within the second storage system (1010), or as any combination of such examples. In particular embodiments, the platform (1306) is embodied in a storage controller of the second storage system (1010). In some implementations, the second storage system (1010) may include a second platform (not depicted) that may be embodied, for example, in a redundant storage controller in the storage system (1010). In some examples, one of the redundant storage controllers is designated as a primary storage controller, while the other is designated as a secondary storage controller.

In the example of FIG. 13, migrating (1302) the application from the first storage system (1002) to a platform (1306) of a second storage system (1010) among the plurality of storage systems synchronously replicating the dataset (1058) may be carried out by detecting that the application (1004) should be migrated, rejecting pending I/O operations from the application (1004) on the first storage system, and initiating execution of the application (1004) on the second storage system (1010). For example, detecting that the application (1004) should be migrated can include detecting a failover from a storage controller of the first storage system (1002) to a storage controller of the second storage system (1010), or determining that the application (1004) should be migrated as part of a load balancing operation. Initiating execution of the application (1004) on the second storage system (1010) may include, for example, provisioning the application (1004) on the second storage system (1010), instantiating a resident copy of the application (1004) on the second storage system, or deploying the application (1004) as a containerized application.

In some embodiments, asynchronous replication techniques may be used to replicate the dataset (458) among a plurality of storage systems such as the first storage system (1002) and the second storage system (1010). In such cases, a promoted/demoted model may be employed for handling I/O requests and synchronizing the dataset (458) in which one storage system is designated as the promoted storage system for the dataset (458) and all other storage systems replicating the dataset (458) are demoted storage systems. The promoted storage system services I/O requests from the application (1004) directed to the dataset (458), whereas the demoted system does not service I/O requests from the application (1004). Read requests are serviced by the promoted storage system and write requests (or other modifying operations) are acknowledged by the promoted storage system without waiting for synchronization with the demoted storage systems. In one example, to synchronize the dataset (458) on the demoted storage systems, the promoted storage system maintains a journal of modifications to the dataset (458) resulting from the completed write requests. In some cases, the journal functions as a queue of write operations that are to be replicated on the demoted storage systems. The demoted storage systems use the journal to update their local copy of the dataset (458). As such, a replication target (i.e., a demoted storage system) tends to lag slightly behind the replication source (i.e., a promoted storage system), resulting in nearly synchronous replication to the demoted storage systems. In another example, to synchronize the dataset (458) on the demoted storage systems, the promoted storage system copies a snapshot of the dataset (458) to the demoted storage systems, for example, at a periodic interval or after a particular number of write operations have been logged.

Consider an example where the first storage system (1002) is a promoted storage system and the second storage system (1010) is a demoted storage system with respect to the dataset (458). In the event of a failure or other performance degradation in the first storage system (1002), the second storage system (1010) may be promoted. In some scenarios, the second storage system (1010) may be promoted as part of readiness testing of a failover to the second storage system (1010) (also referred to as "fire drills") from another storage system (e.g., the first storage system (1002)). As part of promoting the second storage system (1010) any write requests that were in-flight to the first storage system (1002) must be rejected or redirected to the second storage system (1010), and any journaled operations that have not been processed by the second storage system (1010) must be processed, to ensure an up-to-date copy of the dataset (458). Moreover, the application (1004) executing on the first storage system should be migrated to and configured on the second storage system (1010). In this example, the application (1004) may be migrated from, e.g., the platform (1006) of the first storage system (1002), to the platform (1306) of the second storage system (1010) in response to the second storage system (1010) being promoted. Migrating the application (1004) in response to the second storage system (1010) being promoted may include, for example, provisioning the application (1004) on the second storage system (1010), instantiating a resident copy of the application (1004) on the second storage system, or deploying the application (1004) as a containerized application on the second storage system (1010). In some examples, migrating the application (1004) in response to the second storage system (1010) being promoted may include decoupling the application (1004) from the first storage system (1002) and coupling the application (1004) with the second storage system (1010), where the first storage system (1002) and the second storage system (1010) are virtual or cloud-based storage systems. Additional details regarding promotion and demotion of storage systems, including the integration of coupled application management with fire drills can be found in U.S. patent Ser. Nos. 16/668,794, 16/669,038, and 16/668,664, each of which is incorporated herein for all purposes.

A data path between a host and a storage system can be established through a variety of connectivity mediums such as iSCSI or Fiber Channel. In one example, where iSCSI is used, a host (i.e., a host initiator) is configured with an address (e.g., an IP address) of an iSCSI discovery service. As part of a discovery protocol, the host queries the iSCSI discovery service for a list of iSCSI targets. The discovery service provides a list of name space identifiers (e.g., iSCSI qualified names (IQNs) and target IP addresses for all of the target IQNs to which the host is allowed to connect. The host then connects to the iSCSI target storage system (potentially through multiple paths) using the target IP addresses. Once logged in, the host can access any logical unit numbers (LUNs) advertised through the target IQN. One issue with this approach is the potential mismatch between a target IQN and LUNs. That is, it is difficult to move a volume from appearing behind one IQN target to being exposed from another IQN target without reconfiguring the host.

In accordance with some embodiments, this challenge is addressed by virtualizing a data path by mapping a target namespace identifier (e.g., a target IQN) per volume or for an identifiable group of volumes. This allows, for example, for the migration of a volume (or an identifiable group of volumes) from one storage system to another while maintaining a consistent mapping of logical host connections to the underlying storage system serving the volume or volumes. This also facilitates, for example, for migrating host access to a dataset between storage systems synchronously replicating the dataset.

Figure 14:
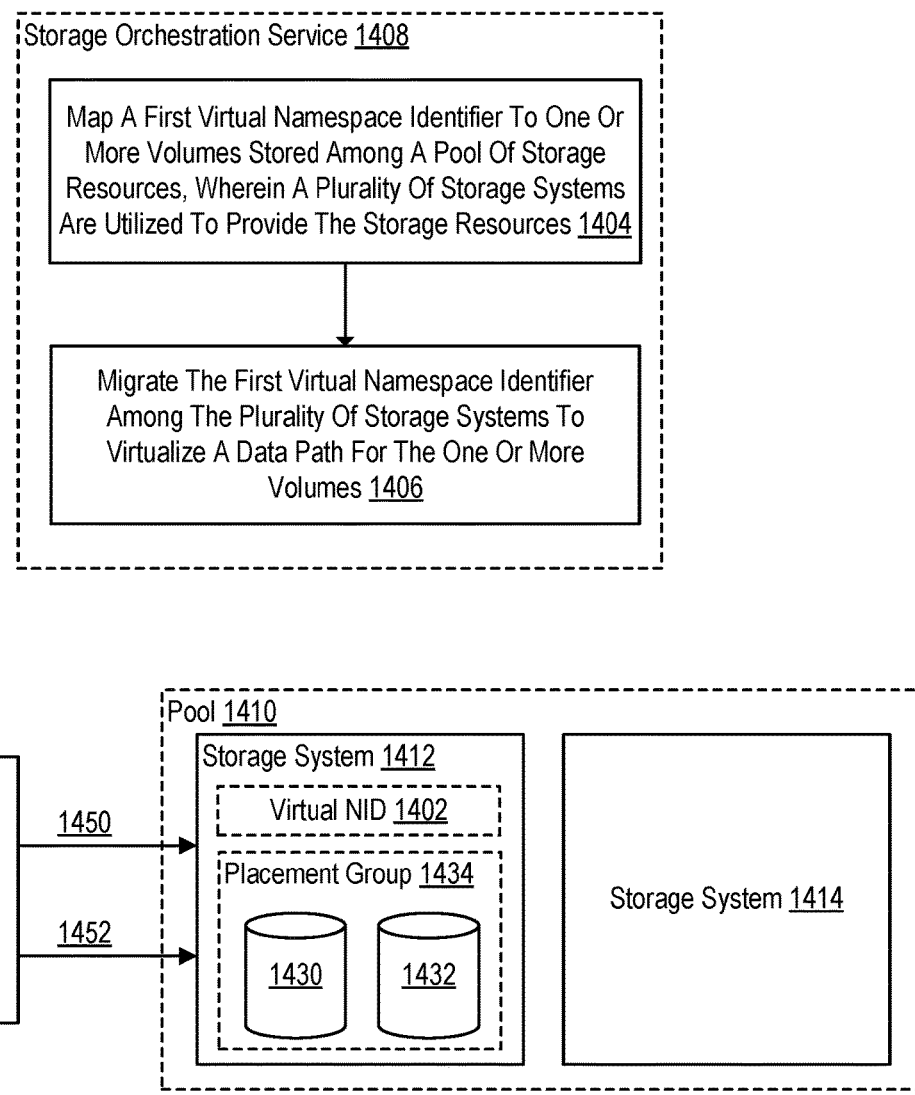
FIG. 14 sets forth a flow chart illustrating an additional example method for data path virtualization according to some embodiments of the present disclosure.

For further explanation, FIG. 14 sets forth a flow chart illustrating an example method of data path virtualization according to some embodiments of the present disclosure. The example of FIG. 14 includes mapping 1404 a virtual namespace identifier 1402 to one or more volumes 1430, 1432 stored among a pool 1410 of storage resources, wherein a plurality of storage systems 1412, 1414 are utilized to provide the storage resources. Although depicted in less detail, storage systems 1412, 1414 depicted in FIG. 14 may be similar to the storage systems described above with reference to FIGS. 1A-1D, FIGS. 2A-2G, FIGS. 3A-3D, FIGS. 4-13, or any combination thereof. In fact, the storage systems 1412, 1414 depicted in FIG. 14 may include the same, fewer, or additional components as the storage systems described above. Although only two storage systems 1412, 1414 are depicted, it will be appreciated that any number of storage systems may be utilized to provide the pool 1410 of storage resources.

In the example depicted in FIG. 14, the storage systems 1412, 1414 provide storage resources to one or more hosts 1422. To that end, each storage system 1412, 1414 includes one or more storage controllers for providing I/O access and data services for volumes serviced by that storage system. A volume can be, for example, a raw block volume, file system volume, or an object store bucket. A host 1422 can connect to the storage controllers of each storage system 1412, 1414 to establish a data path for accessing the volume. In some examples, multiple data paths between a host and a particular storage controller are established for failover or load balancing purposes. A data path can be established through a variety of connection mediums, such as iSCSI, NVMe-over-Fabrics (NVMe-oF), SCSI over Fibre Channel, and other suitable protocols as recognized by those of skill in the art. A storage system endpoint for access to the volume can be a network address of a storage controller, such as an IP address, MAC address, port, virtual network address, or Fibre Channel ID, or combinations thereof.

In the example depicted in FIG. 14, the storage systems 1412, 1414 are federated storage systems that provide pool 1410 of storage resources made available to one or more hosts 1422 through a storage orchestration service 1408. In some examples, the storage orchestration service presents to the host 1422 as a single abstracted storage system that provides storage resources. The storage orchestration service 1408 utilizes storage systems 1412, 1414 to provide those storage resources. Moreover, the storage orchestration service 1408 effectively virtualizes a data path as a logically managed connection between the host and a collection of storage system volumes such that the host remains agnostic to which physical storage system services each volume. The storage orchestration service 1408 coordinates a data path between a host 1422 and an endpoint of the storage system that services a particular volume. As such, the storage orchestration service 1408 presents pool 1410 of storage resources to the host 1422, where the storage orchestration service 1408 utilizes the storage systems 1412, 1414 to provide the pool 1410 of storage resources.

As depicted in FIG. 14, the storage system 1412 stores two volumes 1430, 1432. For example, those volumes 1430, 1432 may have been originally provisioned by the storage orchestration service on the storage system 1412. However, it will be appreciated that any storage system supporting the pool 1410 of storage resources can host the volumes 1430, 1432. In this example, volumes 1430, 1432 belong to a placement group 1434. In some examples, the placement group 1434 belong to a particular tenant space, which can span multiple storage systems. Volumes in a placement group may be aggregated based on specific policies assigned to those volumes. For example, a storage administrator can assign a policy that describes an affinity between two volumes, such that those volumes belong to the same placement group. Conversely, a storage administrator can assign a policy that describes anti-affinity between two volumes, such that those volumes are placed in different placement groups. As another example, a placement group can be constructed of volumes for which data reduction, such as deduplication and compression, is coordinated. As yet another example, a placement group can be constructed based on utilization by a particular application such that volumes containing application data are included in the same placement group. As yet another example, a placement group can be constructed of volumes that share particular performance, permission, or protection characteristics.

In some implementations, as depicted in FIG. 14, volumes in a placement group are localized to the same storage system. For example, FIG. 14 shows that volumes 1430, 1432 in placement group 1434 reside together on storage system 1412 in this particular example. In these implementations, all of the volumes in a placement group migrate together. For example, where the placement group 1434 includes two volumes 1430, 1432, volume 1430 would not migrate to storage system 1414 without volume 1432 also migrating to storage system 1414. Thus, a placement group may ensure that crash consistent snapshots are generated for all volumes in the placement group, for snapshot implementations where crash consistency is provided within a single storage system.

In other implementations, which will be described in more detail below, volumes in a placement group are constrained to a set of storage systems, where that set of storage systems is a subset of the plurality of storage systems that are utilized to provide the pool 1410 of storage resources. That is, in some examples, a placement group is associated with a limited number of storage systems on which volumes in the placement group may reside. In these implementations, individual volumes can move between any these placement group storage systems. Host requests are directed to the storage system that currently hosts a volume, for example, through the use of asymmetric logical access (ALUA) or asymmetric namespace access (ANA) protocols, while still allowing a shared set of target ports for all volumes in the placement group. The limited set of storage systems that individual volumes can move between is updated together for the whole group. In such implementations, where storage systems implement cross-storage system consistent snapshots or cross-storage system consistency groups, consistent snapshots of a placement group can be supported even when volumes within a placement group are hosted on separate storage systems associated with the placement group, as will be described in more detail below.

Although the placement group 1434 is depicted as stored on the storage system 1412, in some examples, the placement group 1434 can be replicated across storages storage systems. In such an example, the storage systems 1412, 1414 may engage a replication relationship with respect to these volumes. For example, the storage systems 1412, 1414 can engage in a synchronous replication relationship, as discussed previously, in which both storage systems maintain an up-to-date copy of the volumes 1430, 1432. In such an example, the storage systems 1412, 1414 can belong to the same pod. The storage systems 1412, 1414 can also engage in an asynchronous replication relationship in which updates to the volume 1430, 1432 are replicated through checkpointing or periodic snapshots, as discussed previously. In these examples, all volumes in the placement group 1434 follow the same replication policies and mechanisms and should be limited at any one time to being stored within storage systems that can ensure consistent replication of all volumes in the placement group.

To provide virtualization of a data path between the host 1422 and a particular volume, the storage system orchestration service 1408 assigns a virtual namespace identifier to an individual volume 1430, 1432 or to a placement group 1434. The virtual namespace identifier can be, for example, an iSCSI qualified name (IQN), NVMe-over-Fabrics qualified name (NQN), extended unique identifier (EUI), worldwide name (WWN), and so on, depending on a connectivity medium for a data path. The virtual namespace identifier can be assigned without respect to the underlying storage system on which the volume or placement group is originally provisioned.

In some examples, mapping 1404 a virtual namespace identifier 1402 to one or more volumes 1430, 1432 stored among a pool 1410 of storage resources is carried out by the storage orchestration service 1408 assigning a virtual namespace identifier to the placement group 1434 that includes the one or more volumes 1430, 1432. In other examples, mapping 1404 a virtual namespace identifier 1402 to one or more volumes 1430, 1432 stored among a pool 1410 of storage resources is carried out by the storage orchestration service 1408 assigning the virtual namespace identifier 1402 to an individual volume such a volume 1430 or volume 1432. As depicted in the particular example shown in FIG. 14, the virtual namespace identifier is mapped to the placement group 1434. In some examples, the virtual namespace identifier 1402 is assigned to one or more volumes 1430, 1432 of the placement group 1434 when the volumes 1430, 1432 are initially provisioned by the storage system orchestrator 1408. In other examples, the virtual namespace identifier 1402 is assigned to the one or more volumes 1430, 1432 or the placement group 1434 when a policy is assigned.

The method of FIG. 14 also includes migrating 1406 the first virtual namespace identifier 1402 among the plurality of storage systems 1412, 1414 to virtualize a data path 1450, 1452 for the one or more volumes 1430, 1432. In some examples, migrating 1406 the first virtual namespace identifier 1402 is carried out by the storage orchestration service 1408 directing the storage system that services a volume 1430, 1432 or placement group 1434 to answer to the virtual namespace identifier 1402 mapped to that volume or placement group. For example, the storage orchestration service 1408 can provide configuration information to the storage system that configures the storage system to answer to the virtual namespace identifier 1402. In some examples, migrating 1406 the first virtual namespace identifier 1402 is carried out in response to a change in the state of the data path 1450, 1452 to a volume 1430, 1432 or placement group 1434. For example, where a volume migrates from one storage system to another, or where host access to a dataset migrates from one storage system to another (e.g., during failover or load rebalancing, or based on a change to a policy assigned to the placement group), the virtual namespace identifier 1402 is also migrated to the other storage system. Thus, in some examples, providing configuration information to configure a storage system to answer to a virtual namespace identifier 1402 can be carried out automatically in response to detecting that an event has occurred that affects the virtualized data path 1450, 1452 for the volume 1430, 1432 or placement group 1434. In these examples, the namespace identifier utilized 1402 by the host to establish the session (i.e., the virtual namespace identifier 1402) does not change, and thus the reconfiguration of the host 1422 is not necessary.

In some examples, the storage orchestration service 1408 migrates the virtual namespace identifier 1402 for the placement group 1434 to the storage system 1412 that services the volumes 1430, 1432 in that placement group. In some implementations, the virtual namespace identifier 1402 may be migrated from the storage orchestration service 1408 to the storage system 1412 servicing the volumes 1430, 1432 during a session login by redirecting the host 1422 using the virtual namespace identifier 1402, as will be discussed in more detail with respect to FIGS. 15 and 16. In other implementations, the storage system orchestrator 1408 migrates the virtual namespace identifier by coordinating the registration and deregistration of the virtual namespace identifier 1402 by the storage systems 1412, 1414 providing the pool 1410 of storage resources, as will be discussed in more detail with respect to FIG. 17.

Figure 15:
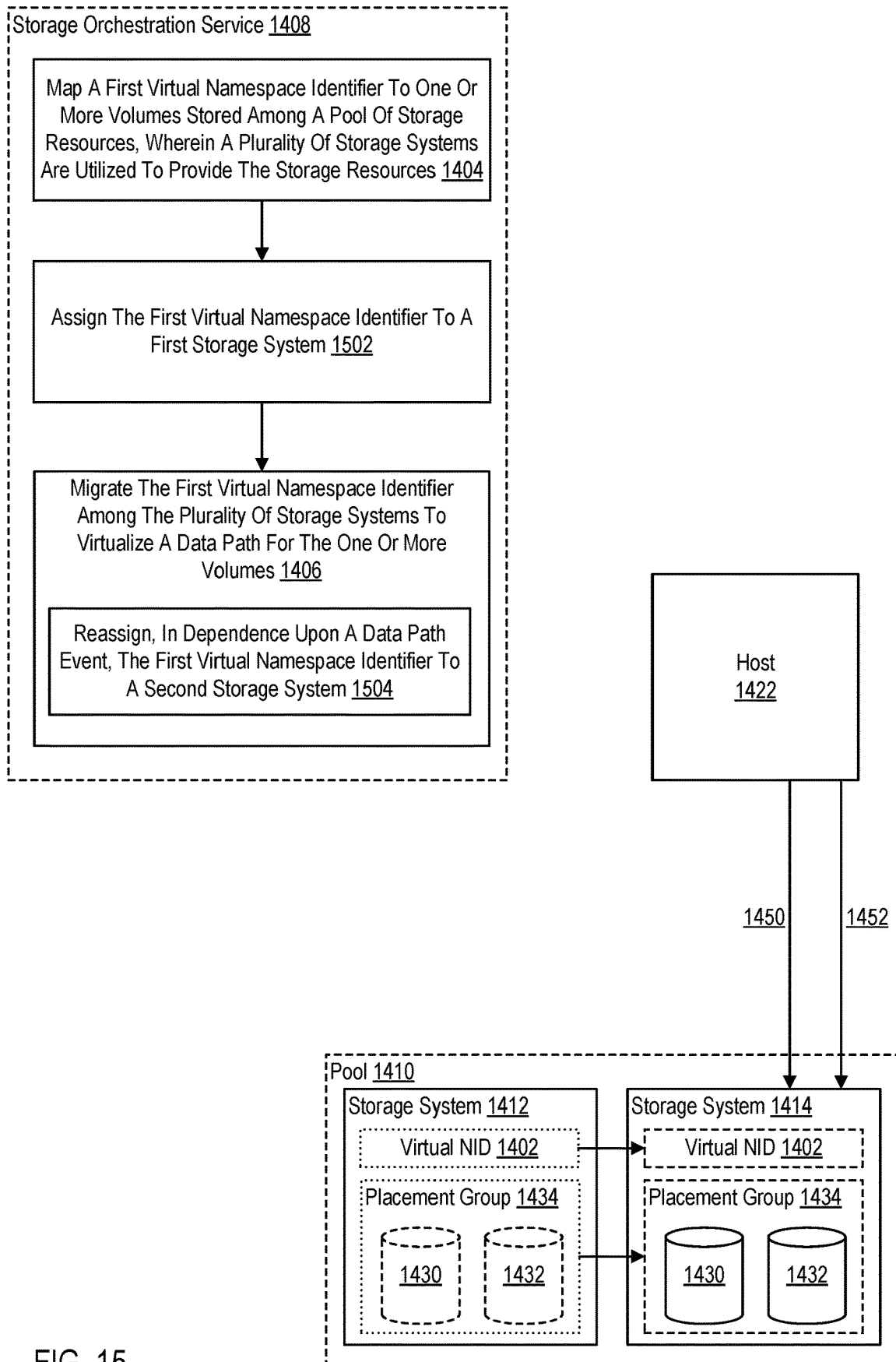
FIG. 15 sets forth a flow chart illustrating an additional example method for data path virtualization according to some embodiments of the present disclosure.

For further explanation, FIG. 15 sets forth a flow chart illustrating an additional example method of data path virtualization according to some embodiments of the present disclosure. The example method depicted in FIG. 15 is similar to the example method depicted in FIG. 14, as the example method depicted in FIG. 15 also includes mapping 1404 a first virtual namespace identifier 1402 to one or more volumes 1430, 1432 stored among a pool 1410 of storage resources, wherein a plurality of storage systems 1412, 1414 are utilized to provide the storage resources; and migrating 1406 the first virtual namespace identifier 1402 among the plurality of storage systems 1412, 1414 to virtualize a data path 1450, 1452 for the one or more volumes 1430, 1432.

The example method of FIG. 15 also includes assigning 1502 the first virtual namespace identifier 1402 to a first storage system 1412. After the storage orchestration service 1408 maps a virtual namespace identifier to a volume or a placement group, the storage orchestration service 1408 identifies the storage system that services the volume to which the virtual namespace identifier is mapped, or that services the volumes included in the placement group to which the virtual namespace identifier is mapped. The storage orchestration service 1408 then configures that storage system to answer to the virtual namespace identifier. Thus, in some examples, the storage orchestration service 1408 configures the storage system 1412 that services the volume 1430, 1432 in the placement group 1434 to answer to the virtual namespace identifier 1402. Host access for the volumes 1430, 1432 using the virtual namespace identifier 1402 is then redirected to the storage system that 1412 that services those volumes.

In the example method of FIG. 15, migrating 1406 the first virtual namespace identifier 1402 among the plurality of storage systems 1412, 1414 to virtualize a data path 1450, 1452 for the one or more volumes 1430, 1432 includes reassigning 1504, in dependence upon a data path event, the first virtual namespace identifier 1402 to a second storage system 1414. In some examples a data path event is a state change to a data path. Generally, a data path event is a condition in which the virtualized data path through which the host 1422 accesses the volumes 1430, 1432 is migrated from one storage system to another. In a variety of scenarios, the storage system utilized to provide storage resources to the host 1422 can change. For example, a volume or placement group can migrate from one storage system to another, necessitating a migration of a virtualized data path for host access to the volume or placement group. The migration of a volume or placement group can be, for example, in response to a storage administrator configuring the migration. The migration of a volume or placement group can also be, for example, initiated by the storage orchestration service 1408 in accordance with a policy or change to a policy that has been assigned to the volume or placement group. A data path event may also be the addition of a new storage system to a set of placement group storage systems, or the removal of a storage system from a set of placement group storage systems. Disaster recovery, load rebalancing, or other events can also necessitate the migration of a virtualized data path for host access from one storage system to another storage system capable of servicing the volume or placement group. Thus, where two storage systems implement a replication policy with respect to the volumes or placement group, the virtualized data path can be migrated between them. In some examples, not all data paths for a volume or placement group are necessarily migrated. In other words, where two storage systems are capable of synchronously servicing a volume, some data paths may be migrated to a second storage system while other data paths remain with the first storage system.

Thus, the storage orchestration service 1408 can identify a data path event when initiating or detecting an event that necessitates a change in a data path between the host 1422 and the underlying storage system that services a volume or placement group. In the example depicted in FIG. 15, the storage orchestration service 1408 identifies, as a data path event, that volumes 1430, 1432 in placement group 1434 are being migrated from the storage system 1412 to the second storage system 1414. For example, the storage orchestration service 1408 may initiate the migration of the placement group 1434 in accordance with one or more policies assigned to the placement group. Thus, the storage orchestration service identifies a state change for at least one data path to the placement group 1434.

As such, the storage orchestration service 1408 configures the storage system 1414 to answer to the virtual namespace identifier 1402. Host access for the volumes 1430, 1432 using the virtual namespace identifier 1402 is then redirected to the storage system that 1412 that now services those volumes. For example, in response to identifying that volumes 1430, 1432 in placement group 1434 are being migrated or have been migrated from the first storage system 1412 to the second storage system 1412, the second storage system 1412 is configured to use the virtual namespace identifier 1402 and a configuration request from a host will be redirected to the second storage system 1414.

Figure 16:
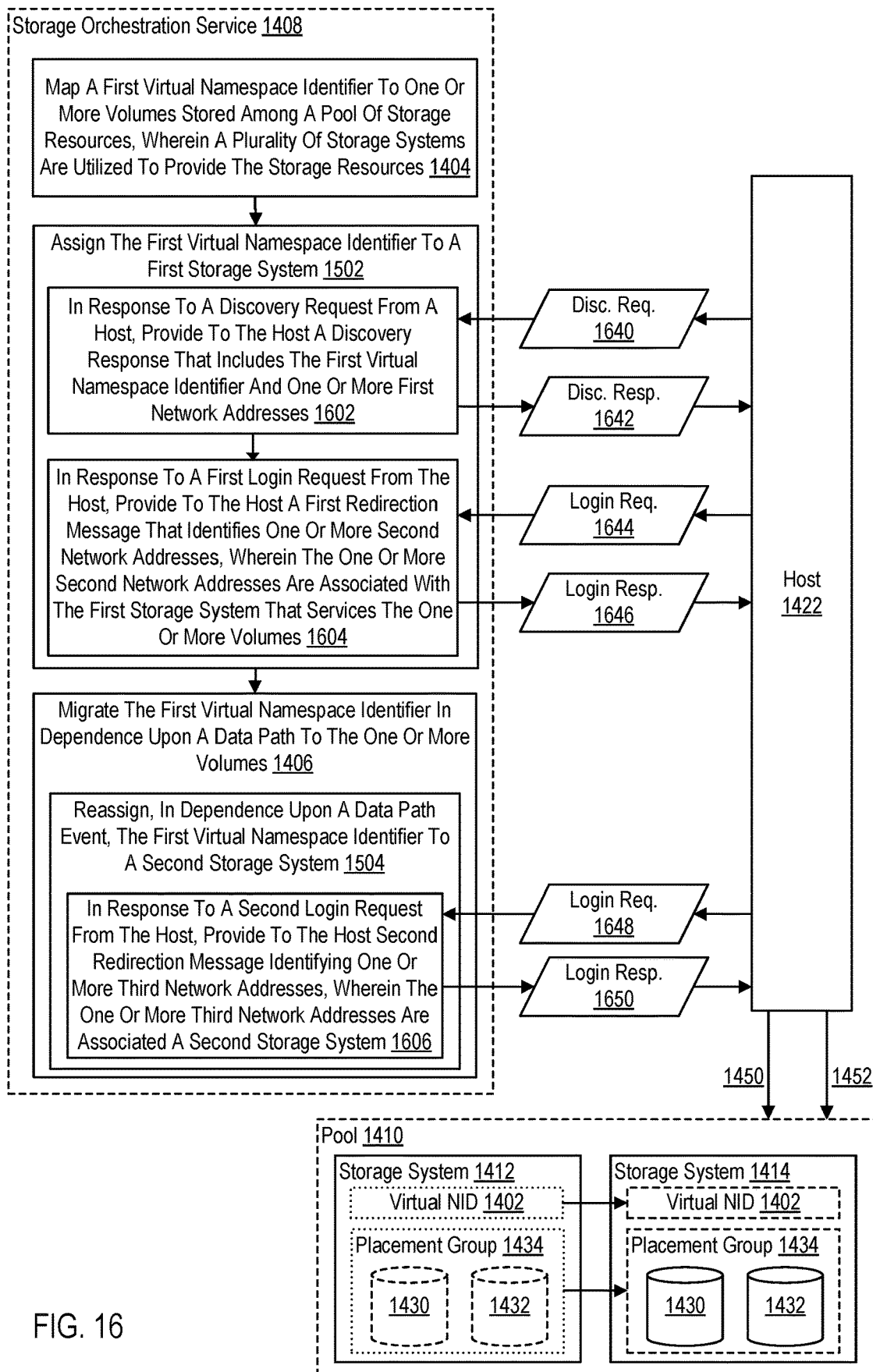
FIG. 16 sets forth a flow chart illustrating an additional example method for data path virtualization according to some embodiments of the present disclosure.

For further explanation, FIG. 16 sets forth a flow chart illustrating an additional example method of data path virtualization according to some embodiments of the present disclosure. The example method depicted in FIG. 16 is similar to the example method depicted in FIG. 15, as the example method depicted in FIG. 16 also includes mapping 1404 a first virtual namespace identifier 1402 to one or more volumes 1430, 1432 stored among a pool 1410 of storage resources, wherein a plurality of storage systems 1412, 1414 are utilized to provide the storage resources; assigning 1502 the first virtual namespace identifier 1402 to a first storage system 1412; and migrating 1406 the first virtual namespace identifier 1402 among the plurality of storage systems 1412, 1414 to virtualize a data path 1450, 1452 for the one or more volumes 1430, 1432, including reassigning 1504, in dependence upon a data path event, the first virtual namespace identifier 1402 to a second storage system 1414.

In the example method of FIG. 16, assigning 1502 the first virtual namespace identifier 1402 to a first storage system 1412 includes, in response to a discovery request 1640 from a host 1422, providing 1602 to the host 1422 a discovery response 1642 that includes the virtual namespace identifier 1402 and one or more first network addresses. In the example of FIG. 16, a virtual namespace identifier 1402 is migrated from the storage orchestration service 1408 to the storage system 1412 during an initial session establishment with the host 1422. In some examples, to mount any volume stored in the pool 1410 of storage resources, the host 1422 sends a discovery request message 1640 to a network address (e.g., an IP address) configured on the host 1422 for discovering storage available to that host. For example, the storage available to the host 1422 can be associated with a tenant space mapped to a host account. The discovery request message 1640 is received by a discovery service of the storage orchestration service 1408. The discovery service answers to the network address, which can be, for example, a virtual network address (e.g., a virtual IP address) that can be floated among hardware configured to host an instance of the storage orchestration service 1408. The discovery request message 1640 includes credentials for the host 1422 and a request for available storage system targets. The discovery service of the storage orchestration service 1408 maps the host credentials to volumes that are available to the host 1422. In one example, the discovery service maps the host login information to a tenant space associated with the host 1422 and identifies available volumes within that tenant space. The discovery service identifies mapping of a virtual namespace identifier 1402 to each volume 1430, 1432 or placement group 1434. In the example depicted in FIG. 16, the discovery service identifies a mapping of a virtual namespace identifier 1402 to the placement group 1434 that includes volumes 1430, 1432, which are volumes that are available to the host 1422.

In some examples, the discovery service of the storage orchestration service 1408 replies to the discovery request message 1640 with a discovery response message 1642 that includes the virtual namespace identifiers 1402 associated with volumes 1430, 1432 or placement groups 1434 that are available to the host 1422. In some examples, the discovery response message 1642 includes one or more proxy network addresses (e.g., IP addresses) associated with the storage orchestration service 1408. The one or more proxy network addresses are answered by the storage orchestration service 1408 rather than a storage system that currently services the volumes or placement groups. That is, the one or more proxy network addresses can be provided to allow the host 1422 to establish a session using the virtual namespace identifier 1402. The one or more proxy network addresses are a placeholder for one or more physical network addresses of a storage controller 1412 that services the volume 1430, 1432 or placement group 1434 associated with the virtual namespace identifier 1402. In other words, for each proxy network address the host 1422 can be redirected to a physical network address of a storage controller. In some examples, the one or more proxy network addresses are virtual network addresses (e.g., virtual IP addresses) that can be floated to any storage system or other hardware configured to host an instance of the storage orchestration service 1408. That is, the storage orchestration service 1408 may be instantiated on any of the storage systems 1412, 1414 in the pool 1410, or on a separate management server (not shown).

In some implementations, where iSCSI is the connectivity medium for data paths, in response to a discovery request 1640 from a host 1422, providing 1602 to the host 1422 a discovery response 1642 that includes the virtual namespace identifier 1402 and one or more first network addresses is carried out by the storage orchestration service 1408 receiving a discovery request from the host 1422 that requests available targets. The host 1422 is configured with a virtual IP address of an iSCSI discovery service, which may be provided by the storage orchestration service 1408 or by other iSCSI endpoint, to initiate a discovery session. In one example, the host 1422 issues a SendTargets message (i.e., a discovery request) to this virtual IP address, which is answered by the iSCSI discovery service. The iSCSI discovery service inspects the initiator IQN and identifies the volumes (e.g., volumes) that are available to the initiator IQN. The storage orchestration service 1408 provides the virtual IQNs (i.e., virtual namespace identifiers) mapped to volumes or placement groups that are available to the host. The iSCSI discovery service returns a SendTargetsResponse message (i.e., a discovery response) to the host 1422, where the SendTargetsResponse includes virtual IQNs and virtual IP addresses (i.e., proxy network addresses) that will be used for redirection to physical IP addresses of a storage controller. In the example depicted in in FIG. 14, an iSCSI discovery service provided by the storage orchestration service 1408 provides a SendTargetsResponse that includes a virtual IQN that maps to the placement group 1434 and virtual IP addresses that are answered by an iSCSI target in the storage orchestration service 1408.

In the example method of FIG. 16, assigning 1502 the first virtual namespace identifier 1402 to a first storage system 1412 also includes, in response to a first login request 1644 from the host 1422, providing 1604 to the host 1422 a first redirection message 1646 that identifies one or more second network addresses, wherein the one or more second network addresses are associated with the first storage system 1412 that services the one or more volumes 1430, 1432. In some examples, in response to receiving the discovery response message 1642, the host 1422 sends a login request message 1644 directed to the one or more proxy network addresses in the discovery response message 1642. The login request message 1644 is a request to establish a session using the virtual namespace identifier 1402. The login request 1644 is received by the storage orchestration service 1408, which answers to the proxy network addresses. In some examples, in response to receiving the login request message 1644, the storage orchestration service 1408 sends a redirection message 1646 to the host 1422. The redirection message 1646 indicates that the target corresponding the virtual namespace identifier has changed. In these examples, the redirection message 1646 indicates one or more target network addresses (e.g., IP addresses) corresponding to the storage system that services the volume or placement group to which the virtual namespace identifier is mapped. In the example depicted in FIG. 16, where the login request message 1646 identifies a virtual namespace 1402 identifier mapped to the placement group 1434, the redirection message 1646 includes the physical network addresses of the storage system 1412 that services the volumes 1430, 1432 in the placement group 1434.

As discussed above, where multipathing is enabled, multiple namespace identifiers may be provided for the same volume or placement group. In such examples, a login request may be received for each virtual namespace identifier. Where a placement group is associated with multiple storage systems, a login request is received for each virtual namespace identifier corresponding to each storage system for the placement group. Although only one of the storage systems stores a particular volume, each of the storage systems for the placement group advertises all volumes in the placement group. Where a particular volume among the one or more volumes 1430, 1432 is symmetrically and synchronously replicated across two or more storage systems 1412, 1414, each storage system that stores that particular volume can report an active/optimized ALUA/ANA state for that volume.

In some examples, the host 1422 retries the login request using the same virtual namespace identifier used in the login request 1644 but instead directed to the network addresses included in the redirection message 1646. Thus, the virtual namespace identifier is migrated to the appropriate storage system. In the example depicted in FIG. 15, the host 1422 retries the login request using the network addresses of the storage system 1412 that services the placement group 1434. Upon completing the login, the host 1422 and storage system 1412 establish a session that includes virtualize data paths 1450, 1452 between the host 1422 and the storage system 1412 using the virtual namespace identifier associated with the placement group 1434.

In some implementations, where iSCSI is the connectivity medium for data paths, providing, to the host 1422, the first redirection message 1646 is carried out by the storage orchestration service 1408 receiving a login protocol data unit (PDU) directed to the virtual IP addresses returned in the SendTargetsResponse message and, in response, providing a redirection message indicating that the virtual IQN included in the login request has been moved. The redirect message includes the physical IP addresses of the storage system that is currently servicing the volume or placement group associated with the virtual IQN. Thus, all hosts wishing to connect to a particular set of volumes presented on a pool of storage systems are provided a single set of target IP addresses for discovery login, a single target IQN to address for those particular volumes, and session login redirection to the storage system currently hosting the volume(s). At a high level, these techniques avoid the need for host-configured drivers or agents by taking advantage of the iSCSI connection protocol, orchestrating volume movement across storage systems, and separating the iSCSI discovery target from the underlying storage systems.

In some examples, where the connectivity medium is NVMe-oF, the virtual namespace identifier is a virtual NQN. Providing a discovery response message that includes a virtual NQN and redirecting a host login using the virtual NQN can be carried out as discussed above with respect to the iSCSI procedures.

In the example method of FIG. 16, reassigning 1504, in dependence upon a data path event, the first virtual namespace identifier 1402 to a second storage system 1414 includes, in response to a second login request 1648 from the host 1422, providing 1606 to the host 1422 a second redirection message 1650 identifying one or more third network addresses, wherein the one or more third network addresses are associated a second storage system 1414. In some examples, in response to identifying the state change for at least one data path to a volume or placement group, the physical connection supporting that data path can be broken. For example, the storage orchestration service 1408 can direct the storage system 1412 to close a socket or otherwise break the connection to the host 1422. In such examples, the host 1422 can retry the login by sending another login request message 1648 directed to the one or more proxy network addresses in the discovery response message 1642. The retry login request 1648 is received by the storage orchestration service 1408, which answers to the proxy network addresses. In the example depicted in FIG. 16, the login request message 1648 is directed to virtual network addresses answered by the storage orchestration service 1408 to establish a session using a virtual namespace identifier mapped to the placement group 1434.

In some examples, in response to receiving the retry login request message 1648, the storage orchestration service 1408 sends a redirection message 1650 to the host 1422. The redirection message 1650 indicates that the target corresponding the virtual namespace identifier 1402 has changed. In these examples, the redirection message 1650 indicates one or more target network addresses (e.g., IP addresses) corresponding to the storage system to which the virtual namespace identifier 1402 has been migrated. In the example depicted in FIG. 16, where the login request message 1650 identifies a virtual namespace identifier 1402 mapped to the placement group 1434, the redirection message 1650 includes the physical network addresses of the storage system 1414 to which the placement group 1434 has migrated.

In some examples, the host 1422 retries the login request using the same virtual namespace identifier used in the login request 1644 but instead directed to the network addresses included in the redirection message 1650. Thus, the virtual namespace identifier is migrated to the appropriate storage system. In the example depicted in FIG. 16, the host 1422 retries the login request using the network addresses of the storage system 1414 that services the placement group 1434. Upon completing the login, the host 1422 and storage system 1414 establish a session that uses the virtualized data paths 1450, 152 between the host 1422 and the storage system 1414 using the virtual namespace identifier 1402 associated with the placement group 1434. For example, connections supporting the virtualized data paths 1450, 1452 are mapped to IP addresses of a first storage controller of the storage system 1414.

In some implementations, where iSCSI is the connectivity medium for data paths, providing 1606 to the host 1422 a second redirection message 1650 identifying one or more third network addresses, wherein the one or more third network addresses are associated a second storage system 1414, is carried out by the storage orchestration service 1408 receiving a second login protocol data unit (PDU) directed to the virtual IP addresses returned in the SendTargetsResponse message and, in response, providing a redirection message indicating that the virtual IQN included in the login request has been moved. The redirect message includes the physical IP addresses of the storage system that is currently servicing the volume or placement group associated with the virtual IQN.

Figure 17:
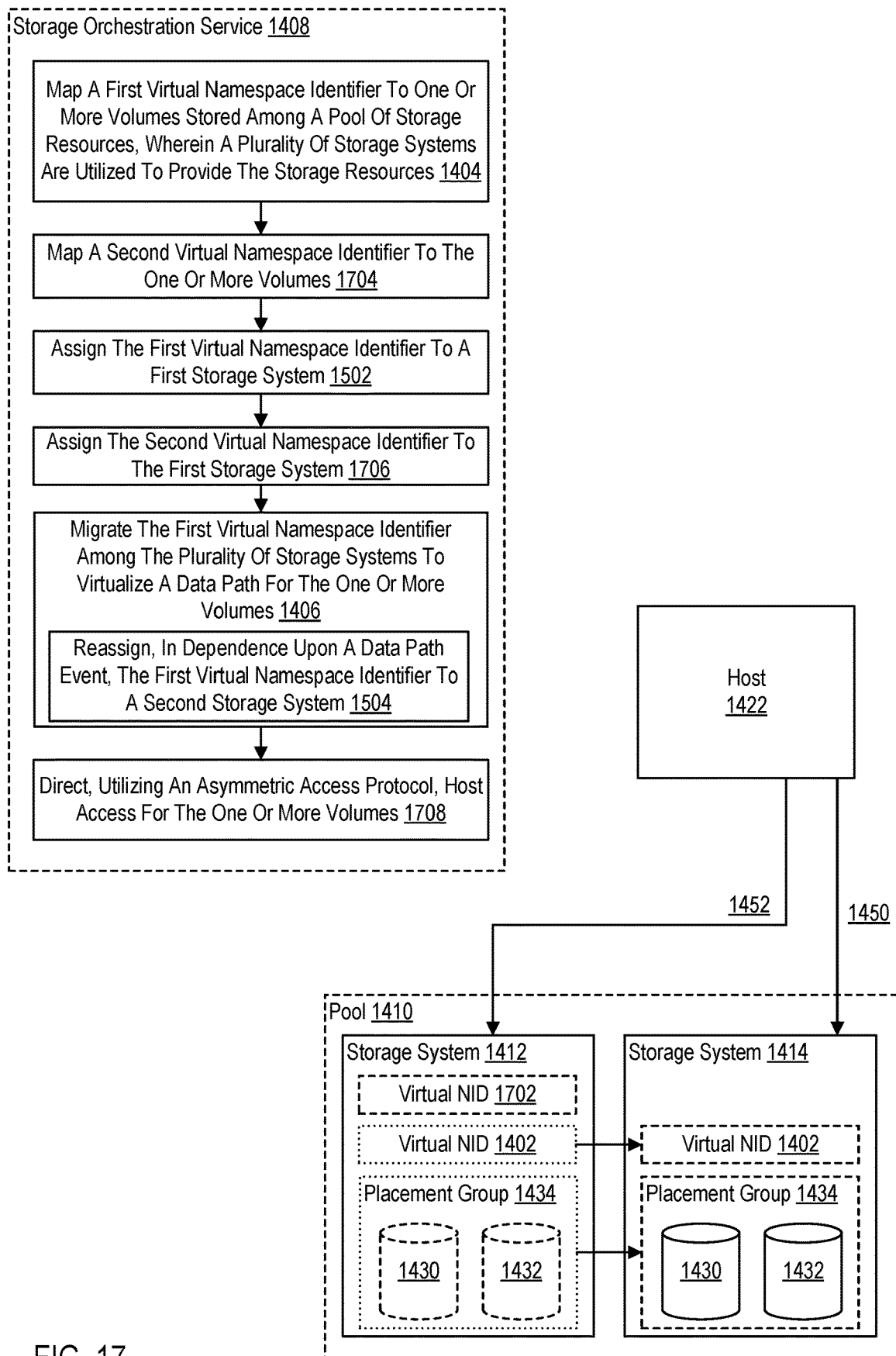
FIG. 17 sets forth a flow chart illustrating an additional example method for data path virtualization according to some embodiments of the present disclosure.

For further explanation, FIG. 17 sets forth a flow chart illustrating an additional example method of data path virtualization according to some embodiments of the present disclosure. The example method depicted in FIG. 17 is similar to the example method depicted in FIG. 15, as the example method depicted in FIG. 17 also includes mapping 1404 a first virtual namespace identifier 1402 to one or more volumes 1430, 1432 stored among a pool 1410 of storage resources, wherein a plurality of storage systems 1412, 1414 are utilized to provide the storage resources; assigning 1502 the first virtual namespace identifier 1402 to a first storage system 1412; and migrating 1406 the first virtual namespace identifier 1402 among the plurality of storage systems 1412, 1414 to virtualize a data path 1450, 1452 for the one or more volumes 1430, 1432, including reassigning 1504, in dependence upon a data path event, the first virtual namespace identifier 1402 to a second storage system 1414.

The example method of FIG. 17 also includes mapping 1704 a second virtual namespace identifier 1702 to the one or more volumes 1430, 1432. In some cases, host multipath drivers allow the utilization of two or more distinct virtual namespace identifiers for access to the same volume. Thus, in some examples, the storage orchestration service 1408 maps a second virtual namespace identifier 1702 to the same set of one or more volumes 1430, 1432, or the same placement group 1434, to which the first virtual namespace identifier is mapped. In some examples, the storage orchestration service 1408 maps 1704 the second namespace identifier 1702 in the same manner as mapping 1404 the first virtual namespace identifier, as discussed above.

The example method of FIG. 17 also includes assigning 1706 the second virtual namespace identifier 1702 to the first storage system 1412. In some examples, the storage orchestration service 1408 assigns the second namespace identifier 1702 to the first storage system 1412 in the same manner as assigning 1502 the first namespace identifier 1402 to the first storage system 1412, as discussed above. However, in these examples, an asymmetric access mechanism, such as ALUA protocol for iSCSI or ANA protocol for NVMe, are utilized to report access states for a data path to a particular volume. That is, an access state can be associated with a virtual namespace identifier with respect to accessing a particular volume or placement group. In some implementations, access states associated with a virtual namespace identifier may include an optimized state, where a data path that uses the virtual namespace identifier is an active and preferred path for access to the volume; a non-optimized access state where a data path that uses the virtual namespace identifier is an active path but not a preferred path for access to the volume; a standby state that indicates to a host that a different data path should be used for access to the volume (i.e., a path that uses a different virtual namespace identifier); or an inactive state that indicates that no requests should be issued to a particular volume using the virtual namespace identifier. For example, the access states can be the Active/Optimized, Active/Non-optimized, Standby, and Inactive states used by ALUA and ANA protocols. Thus, host access to the one or more volumes 1430, 1432 can be directed to use a particular data path based on these reported access states. There can be more than one path to a volume in any one state. For example, where a storage system comprises multiple target ports that virtual namespace identifiers can be mapped to or where a volume is symmetrically synchronously replicated across storage systems, each storage system storing that volume can report an active/optimized state. As depicted in FIG. 17, both virtual namespace identifiers 1402, 1702 are assigned to the first storage system 1412. In one example, one virtual namespace identifier may be assigned to a first controller of the storage system 1412 while a second virtual namespace identifier may be assigned to a second controller of the storage system. Thus, one data path 1450 to the one or more volumes may utilize the first virtual namespace identifier 1402 while a second data path 1452 may utilize the second virtual namespace identifier 1702. In one example, both virtual namespace identifiers 1402, 1702 are associated with an active optimized access state for a particular volume, or one virtual namespace identifier 1402 is associated with an active non-optimized state while the other 1702 is associated with an active optimized state for a particular volume.

The method of FIG. 17 also includes directing 1708, utilizing an asymmetric access protocol, host access for the one or more volumes 1430, 1432. In some examples, the storage orchestration service 1408 migrates one virtual namespace identifier to a migration target storage system as part of a migration of a volume to that migration target, while the other virtual namespace identifier remains assigned to the migration source storage system. For example, the migration 1406 of the virtual namespace identifier can be performed prior to initiating or during the migration of the volume to test a connection between a host and the migration target before migration of the volume is competed. In some examples, until the migration completes successfully, the access state associated with the virtual namespace identifier assigned to the migration source storage system is reported as active/optimized, while the access state associated with the virtual namespace identifier assigned to the migration target storage system is reported as active/non-optimized, standby, or inactive. After the migration of the volume completes successfully, the access state associated with the virtual namespace identifier assigned to the migration source storage system is reported as active/non-optimized, standby, or inactive, while the access state associated with the virtual namespace identifier assigned to the migration target storage system is reported as active/optimized. It should be recognized that a storage system assigned with a virtual namespace identifier that is in the active/non-optimized state or standby state may, in some examples, forward a received access request for the volume to storage system that is currently servicing that volume.

In the example depicted in FIG. 17, the storage orchestration service can migrate the first virtual namespace identifier 1402 to the second storage system 1414 as part of a migration of the one or more volumes 1430, 1432 to the second storage system 1414. For example, prior to initiating or during the migration of a volume, the storage orchestration service 1408 can migrate the first virtual namespace identifier 1402 to the second storage system and prompt the host 1422 to login to the second storage system 1414. Thus, the data path 1450 that utilizes the first virtual namespace identifier 1402 for a migration volume is reestablished with the second storage system 1414. In some examples, an access state associated with the data path 1450 is reported as active/non-optimized, standby, or inactive until the migration of the one or more volumes 1430, 1432 completes, while the access state associated with the data path 1452 (corresponding to the second virtual namespace identifier 1702) is reported as active/optimized. In these examples, after the migration of the one or more volumes 1430, 1432 is complete, the second storage system 1414 assigned with the first virtual namespace identifier 1402 transitions to an active/optimized state while the first storage system assigned with the second virtual namespace identifier 1702 transitions to an active/non-optimized, standby, or inactive state. The access states may be reported by the storage systems 1412, 1414 over the targets ports of those storage systems 1412, 1414 mapped by the by the virtual namespace identifiers.

Figure 18:
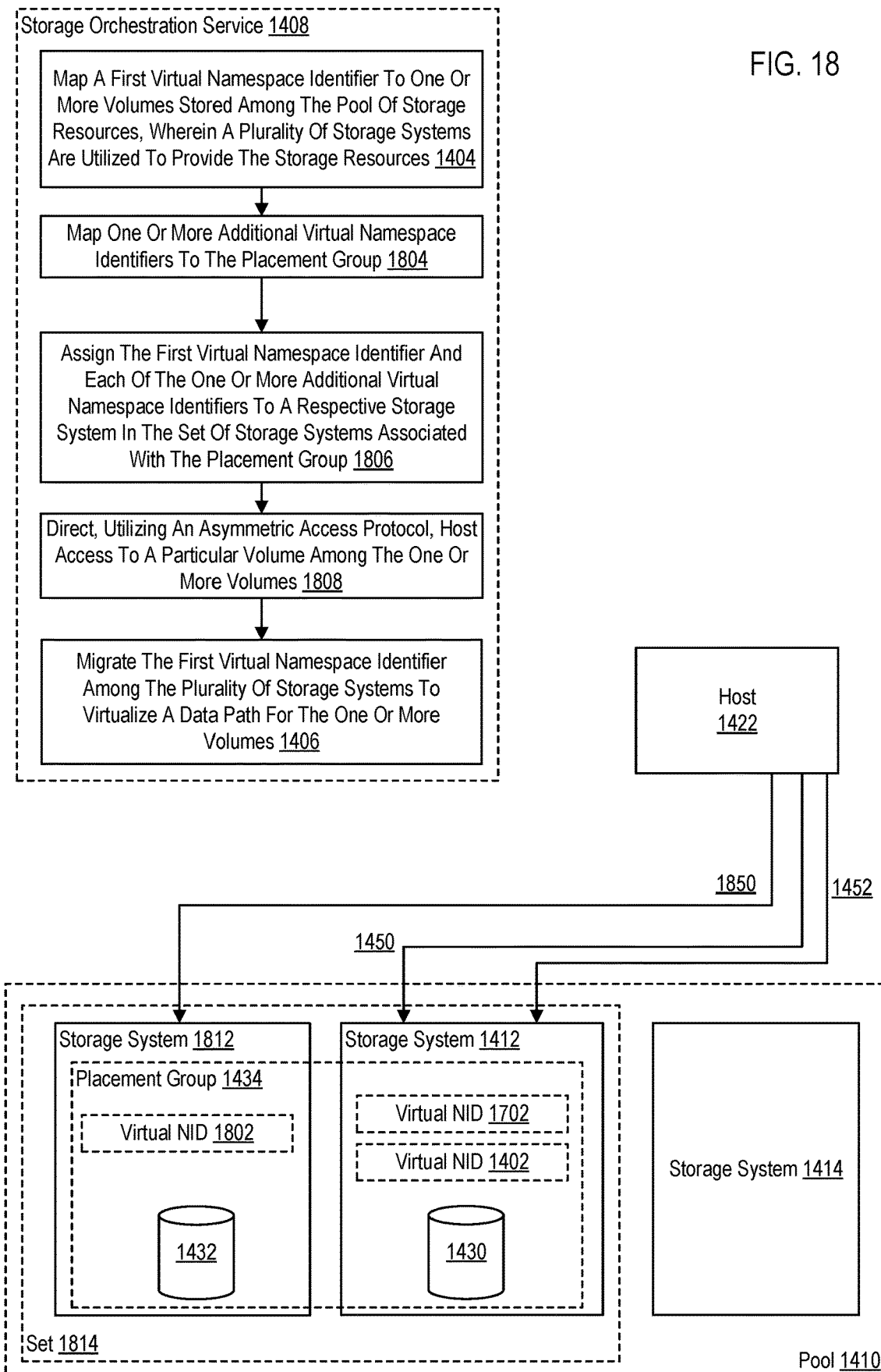
FIG. 18 sets forth a flow chart illustrating an additional example method for data path virtualization according to some embodiments of the present disclosure.

For further explanation, FIG. 18 sets forth a flow chart illustrating an additional example method of data path virtualization according to some embodiments of the present disclosure. The example method depicted in FIG. 18 is similar to the example method depicted in FIG. 14, as the example method depicted in FIG. 18 also includes mapping 1404 a first virtual namespace identifier 1402 to one or more volumes 1430, 1432 stored among a pool 1410 of storage resources, wherein a plurality of storage systems 1412, 1414 are utilized to provide the storage resources; and migrating 1406 the first virtual namespace identifier 1402 among the plurality of storage systems 1412, 1414 to virtualize a data path 1450, 1452 for the one or more volumes 1430, 1432.

The example method of FIG. 18 also includes mapping 1804 one or more additional virtual namespace identifiers 1802 to the placement group. As mentioned above, mapping 1404 the virtual namespace identifier to the one or more volumes can include mapping the virtual namespace identifier to a placement group that includes the one or more volumes, where the one or more volumes in the placement group are constrained to a set of placement group storage systems. For example, in a particular example depicted in FIG. 18, the placement group 1434 is associated with a set 1814 of placement group storage systems 1412, 1812 (where storage system 1812 is also included the plurality of storage systems that are utilized to provide the pool 1410 of storage resources). Thus, the location of the volumes 1430, 1432 are limited to the storage systems 1412, 1812, and individual volumes 1430, 1432 can be located on and moved between either storage systems 1412, 1812. In some examples, all of the storage systems 1412, 1812 in the set 1814 of placement group storage systems advertise all of the volumes 1430, 1432 in the placement group 1434, even though only one storage system stores a particular volume in the placement group 1434. In one example, as depicted, one volume 1430 is located on one storage system 1412 while another volume 1432 in the placement group 1434 is located on another storage system 1812, while both storage systems 1412, 1812 advertise both volumes 1430, 1432. It should be recognized that a set 1814 of placement group storage systems is not limited to only two storage systems and may include more than two storage systems. Similarly, a placement group 1434 is not limited to two volumes and may include more than two volumes. In some examples, the storage orchestration service 1408 maps 1804 the one or more additional virtual namespace identifiers in a manner similar to mapping more than one virtual namespace identifier to a placement group, as discussed above.

In some implementations, the one or more additional virtual namespace identifiers 1802 are mapped such that the total number of virtual namespace identifiers 1402, 1802 mapped to the placement group 1434 is equal to or greater than the number of storage systems in the set 1814 of placement group storage systems. The number of virtual namespace identifiers mapped to the placement group 1434 may be selected to allow more than one virtual namespace identifier to be assigned to a storage system, as discussed above. In some examples, the number of virtual namespace identifiers that will be assigned to a storage system is based on a number of target ports on that storage system. Where a storage system is a dual controller storage system, the number of virtual namespace identifiers that will be assigned to a storage system may be based on the number of controllers and the number or ports on each controller. For example, in a dual controller storage system with two target ports per controller, four virtual namespace identifiers would be assigned to a storage system. Consider an example where a placement group 1434 includes three storage systems that are dual controller storage systems with two ports per controller. In an example implementation where one virtual namespace identifier is assigned to each port of each placement group storage system, twelve virtual namespace identifier is a minimum number of virtual namespace identifiers that should be mapped to the placement group 1434 in this particular example. However, additional namespace identifiers can be mapped to the placement group 1434 in anticipation of the addition of a storage system to the placement group storage systems, as will be discussed below. For example, a particular storage system may be assigned duplicate virtual namespace identifiers, i.e., two virtual namespace identifiers per port per controller, in one example implementation. In such an example, sixteen virtual namespace identifiers should be mapped to the placement group 1434. However, in the examples discussed below, for the sake of clarity, an example implementation is provided where a minimum of one virtual namespace identifier is assigned to one port of a storage system as a minimum implementation for providing access to the one or more volumes on each placement group storage system. When a storage system is added to a placement group and another storage system is removed, and when the minimum number of virtual namespace identifiers have been mapped to the placement group (e.g., N virtual namespace identifiers for N ports among M storage systems) the virtual namespace identifier of the system being removed can be migrated to the new storage system. However, where more than the minimum number of virtual namespace identifiers have been mapped to the placement group (e.g., (e.g., N+1 virtual namespace identifiers for N ports among M storage systems), an extra virtual namespace identifier assigned to one of the placement group storage systems can be migrated to the storage system being added.

The example method of FIG. 18 also includes assigning 1806 the first virtual namespace 1402 identifier and each of the one or more additional virtual namespace identifiers 1802 to a respective storage system 1412, 1812 in the set 1814 of storage systems 1412, 1812 associated with the placement group 1434. In some examples, the storage orchestration service 1408 assigns one (or at least one) virtual namespace identifier 1402, 1802 to each placement group storage system 1412, 1812. As discussed above, in some implementations, the storage orchestration service 1408 assigns more than one virtual namespace identifier to one or more of the placement group storage systems 1412, 1812. For example, storage system 1412 may be assigned both the first virtual namespace identifier 1402 and the second virtual namespace identifier 1702 (discussed above and shown in FIG. 17), while storage system 1812 is assigned one virtual namespace identifier 1802. In these examples, all of the virtual namespace identifiers 1402, 1702, 1802 are mapped to the placement group 1434.

The example of method of FIG. 18 also includes directing 1808, utilizing an asymmetric access protocol, host access for a particular volume among the one or more volumes 1430, 1432. As discussed above, in some examples, an asymmetric access protocol such as ALUA or ANA is utilized to direct host access to a volume, where a virtual namespace identifier is reported as a preferred target for access to the volume over other virtual namespace identifiers also associated with the volume. Thus, where multiple virtual namespace identifiers are mapped to placement group, and at least one of those virtual namespace identifiers is assigned to each placement group storage system, asymmetric access states for those virtual namespace identifiers can direct the host to the placement group storage system that currently stores a particular volume. As discussed above, in some examples the access states include active/optimized, active/non-optimized, standby, and inactive with respect to a volume. Where a volume is mirrored between two or more placement group storage systems within the placement group (such as through symmetric synchronous replication), more than one of the placement group storage systems hosting the replicated volume can be considered active/optimized for that volume. Consider an example where two storage systems 1412, 1812 in the set 1814 of placement group storage systems synchronously replicate a volume 1430. Each storage system 1412, 1812 can report an active/optimized state for the volume 1430 through the virtual namespace identifiers 1402, 1802 assigned to those storage systems.

In some examples, as depicted in the example of FIG. 18, all of the placement group storage systems 1412, 1812 advertise all volumes 1430, 1432 of the placement group 1434. In some examples, the access state for the data path 1450 between the host 1422 and the virtual namespace identifier 1402 is reported as active/optimized to indicate that it is the preferred data path for access to volume 1430. This is because the virtual namespace identifier 1402 is assigned to the storage system 1412 that stores the volume 1430. In some implementation, a second virtual namespace identifier 1702 is also assigned to storage system 1412. In these implementations, the second virtual namespace identifier can be associated with an active/optimized, active/non-optimized, or standby state with respect to volume 1430. In some examples, for access to volume 1432, an access state associated with the virtual namespace identifier 1802 is reported as active/optimized, as the storage system 1812 stores that volume 1432. Thus, data path 1850 is the preferred data path for access to volume 1432. In these examples, the first virtual namespace identifier 1402 can be associated with an active/non-optimized or standby state with respect to volume 1432, and the additional virtual namespace identifier 1802 can be associated with an active/non-optimized or standby state with respect to volume 1430. In some examples, access requests for volume 1430 received by the storage system 1812 are forwarded to the storage system 1412, and access requests for volume 1432 received by the storage system 1412 are forwarded to the storage system 1812.

In some examples, storage systems can be added to or removed from the set 1814 of placement group storage systems by migrating volumes away from a storage system that is being removed and/or migrating a virtual namespace identifier mapped to the placement group 1434 to a new storage system being added. As discussed above, in some examples, one namespace identifier is mapped to each storage system for the placement group, and one or more duplicate namespace identifiers (two namespace identifiers for the same storage system) are also provided. Thus, volumes may move among the storage systems for the placement group using simple ALUA/ANA state changes, while the duplicate namespace identifiers may be used when adding a new storage system for the placement group. When a new storage system is added, one of the virtual namespace identifiers is migrated to the new storage system. When a storage system is removed, one of the virtual namespace identifiers is migrated from that storage system to one of the storage systems remaining in the placement group. Volumes within the placement group would be migrated accordingly to make use of new storage systems and to be migrated from storage systems being removed. ALUA/ANA path management can be used to ensure that hosts favor (or exclusively use) only those virtual namespace identifiers that map to a storage system that currently hosts any particular volume. For examples, the volumes may be adjusted to avoid use of a particular virtual namespace identifier, that virtual namespace identifier may then be migrated to a new storage system, one or more volumes may then be migrated to the new storage system, and then the ALUA/ANA states may be adjusted to favor use of the new storage system for the migrated volumes. When removing a storage system from a placement group, the sequence may include migrating volumes first, then adjusting ALUA states, and then migrating the virtual namespace identifiers previously assigned for the placement group to the now removed storage system.

Consider an example where storage system 1414 is being added to the set 1814 of placement group storage systems and storage system 1412 is being removed. In such an example, the volumes (e.g., volume 1430) on storage system 1412 are migrated to storage system 1812. In some implementations, the access state for the virtual namespace identifier 1802 is transitioned to an/active optimized for those volumes that are migrated. In other implementations, a virtual namespace identifier (e.g., virtual namespace identifier 1702) is also migrated to the storage system 1812 and remains active/optimized for the migrated volumes. A virtual namespace identifier (e.g., virtual namespace identifier 1402) assigned to storage system 1412 is transitioned to active/non-optimized, standby, or inactive for the migrated volumes. To add the new storage system 1414 to the set 1814 of placement group storage systems, the host 1422 is prompted to login to storage system 1414 and a virtual namespace identifier (e.g., virtual namespace identifier 1402) is migrated to the storage system 1414. Upon migration of one of the virtual namespace identifiers (that are mapped to the placement group 1434) to the new storage system 1414, the access states for the data path to the new storage system 1414 are reported as active/non-optimized or standby with respect to the volumes 1430, 1432 in the placement group 1434. However, volumes 1430, 1432 in the placement group 1434 can now be migrated to the new storage system 1414, and the host 1422 may be directed to the new storage system 1414 by updating the access state associated with the virtual namespace identifier 1402 now assigned to the new storage system 1414.

Figure 19:
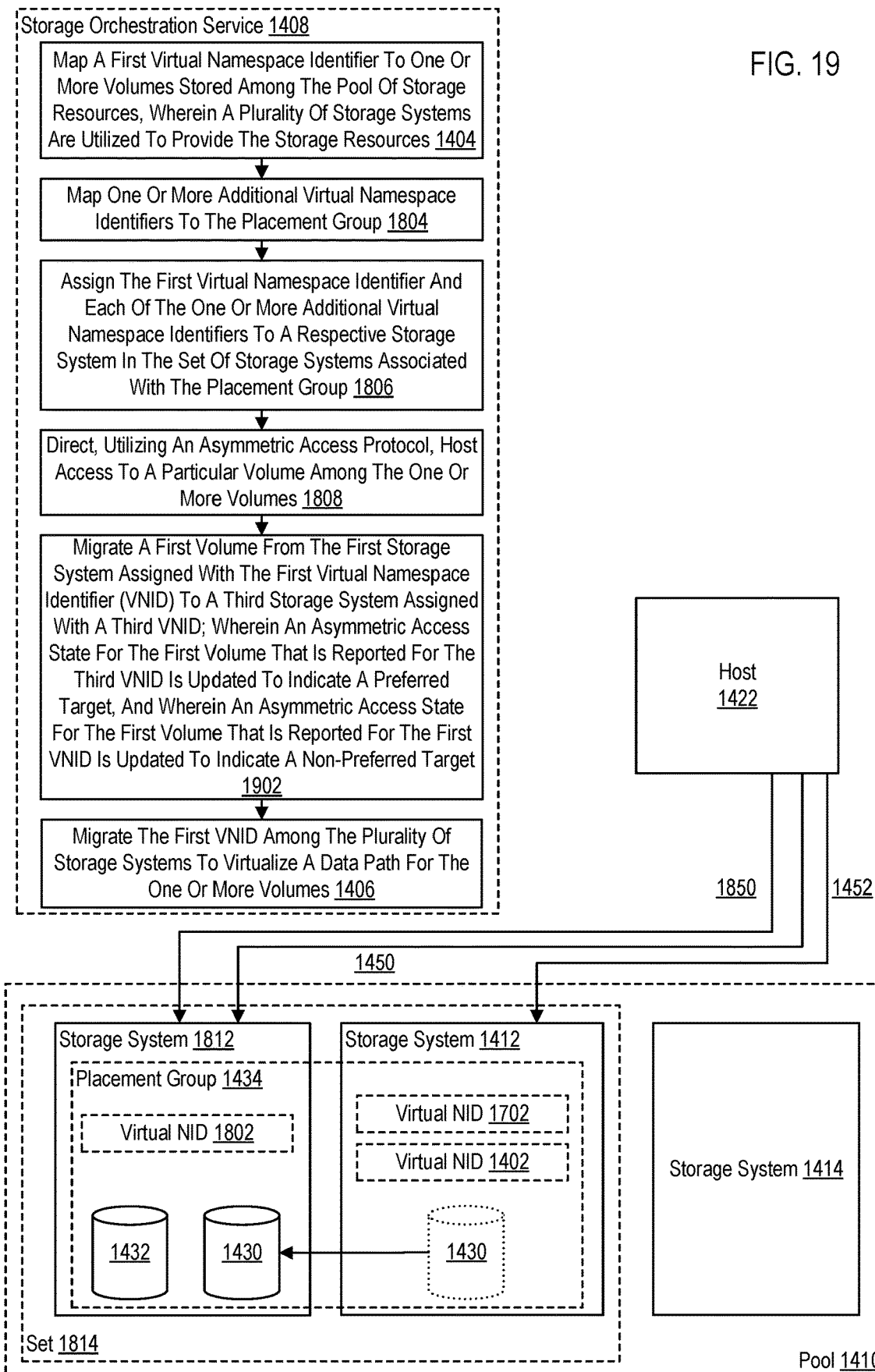
FIG. 19 sets forth a flow chart illustrating an additional example method for data path virtualization according to some embodiments of the present disclosure.

For further explanation, FIG. 19 sets forth a flow chart illustrating an additional example method of data path virtualization according to some embodiments of the present disclosure. The example method depicted in FIG. 19 is similar to the example method depicted in FIG. 18, as the example method depicted in FIG. 19 also mapping 1404 a first virtual namespace identifier 1402 to one or more volumes 1430, 1432 stored among a pool 1410 of storage resources, wherein a plurality of storage systems 1412, 1414 are utilized to provide the storage resources; mapping 1804 one or more additional virtual namespace identifiers to the placement group; assigning 1806 the first virtual namespace 1402 identifier and each of the one or more additional virtual namespace identifiers 1802 to a respective storage system 1412, 1812 in the set 1814 of storage systems 1412, 1812 associated with the placement group 1434; directing 1808, utilizing an asymmetric access protocol, host access to a particular storage system hosting a particular volume among the one or more volumes 1430, 1432; and migrating 1406 the first virtual namespace identifier 1402 among the plurality of storage systems 1412, 1414 to virtualize a data path 1450, 1452 for the one or more volumes 1430, 1432.

The example of FIG. 19 also includes migrating 1902 a first volume from the first storage system 1412 assigned with the first virtual namespace identifier 1402 to a third storage system 1812 assigned with a third virtual namespace identifier 1802, wherein an asymmetric access state for the first volume 1430 that is reported for the third virtual namespace identifier 1802 is updated to indicate a preferred target, and wherein an asymmetric access state for the first volume 1430 that is reported for the first virtual namespace identifier 1402 is updated to indicate a non-preferred target. In some examples, if volume 1430 is migrated (e.g., at the direction of the storage orchestrator 1408) from storage system 1412 to storage system 1812, the access state associated with the virtual namespace identifier 1802 is transitioned to active/optimized with respect to volume 1430, and the virtual namespace identifier 1402 is transitioned to an active/non-optimized or standby state with respect to volume 1430. Thus, storage system 1812 is now indicated as the preferred target for volume 1430, and the preferred virtualized data path 1450 for volume 1430 will move from storage system 1412 to storage system 1812. Likewise, if volume 1432 is migrated from storage system 1812 to storage system 1412, the access state associated with the first virtual namespace identifier 1402 is transitioned to active/optimized with respect to volume 1432, and the virtual namespace identifier 1802 is transitioned to an active/non-optimized or standby state with respect to volume 1432. Thus, within the set 1814 of placement group storage systems 1412, 1812, volumes 1430, 1432 and host access to those volumes may freely migrate by updating the access states associated with the virtual namespace identifiers assigned to the placement group storage systems.

Figure 20:
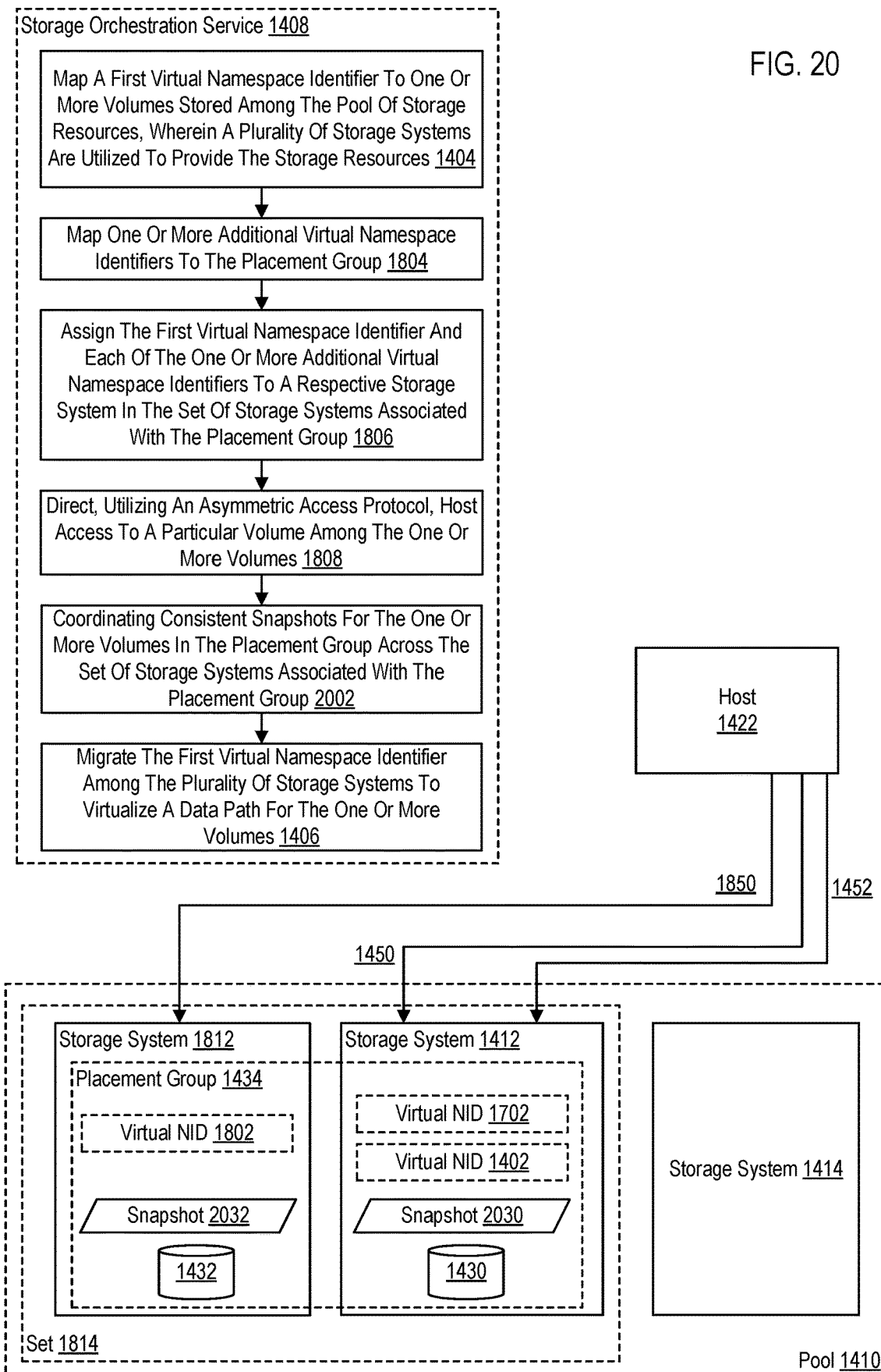
FIG. 20 sets forth a flow chart illustrating an additional example method for data path virtualization according to some embodiments of the present disclosure.

For further explanation, FIG. 20 sets forth a flow chart illustrating an additional example method of data path virtualization according to some embodiments of the present disclosure. The example method depicted in FIG. 20 is similar to the example method depicted in FIG. 18, as the example method depicted in FIG. 20 also mapping 1404 a first virtual namespace identifier 1402 to one or more volumes 1430, 1432 stored among a pool 1410 of storage resources, wherein a plurality of storage systems 1412, 1414 are utilized to provide the storage resources; mapping 1804 one or more additional virtual namespace identifiers to the placement group; assigning 1806 the first virtual namespace identifier 1402 and each of the one or more additional virtual namespace identifiers 1802 to a respective storage system 1412, 1812 in the set 1814 of storage systems 1412, 1812 associated with the placement group 1434; directing 1808, utilizing an asymmetric access protocol, host access to a particular volume among the one or more volumes 1430, 1432; and migrating 1406 the first virtual namespace identifier 1402 among the plurality of storage systems 1412, 1414 to virtualize a data path 1450, 1452 for the one or more volumes 1430, 1432.

The method of FIG. 20 also includes coordinating 2002 consistent snapshots 2030, 2032 for the one or more volumes 1430,1432 in the placement group 1434 across the set 1814 of storage systems 1412, 1812 associated with the placement group. As mentioned above, where storage systems implement cross-storage system consistent snapshots or cross-storage system consistency groups, consistent snapshots of a placement group can be supported even when volumes within a placement group are hosted on separate storage systems associated with the placement group. In some examples, to generate consistent snapshots for the placement group 1434, the storage orchestrator 1408 directs each storage system 1412, 1812 in the set 1814 of placement group storage systems to generate respective snapshots 2030, 2032 for the respective volumes 1430, 1432 of the placement group that are stored on those storage systems. In some examples, directing the set 1814 of placement group storage systems to generate consistent snapshots 2030, 2032 for the volumes 1430, 1432 can include directing the storage systems 1414, 1812 to quiesce certain aspects of storage operation processing and to generate the respective snapshots 2030, 2032. In such an example, the consistent snapshots do not need to be established at the same point in time. The set of coordinated snapshots 2030, 2032 represents a version of the volumes 1430, 1432 in the placement group in which each snapshot 2030, 2032 does not include any updates to the volumes 1430, 1432 that could causally depend on any other update to the volumes 1430, 1432 that were excluded by another snapshot. In other words, snapshot 2030 does not include any updates to volume 1430 that rely on results of an update to volume 1432 that were excluded from snapshot 2032, and vice versa. As such, the set of all consistent snapshots 2030, 2032 includes all updates to the volumes 1430, 1432, across all placement group storage systems 1412, 1812, upon which any included update could have depended. In some implementations, storage systems 1412, 1812 indicate that an I/O request has been fulfilled either by returning a read result, in the case of a read request, or by providing a completion acknowledgement, in the case of a write request, once the requested modification has been persisted. Until the host receives the completion acknowledgement, the host cannot rely on the requested modification having been applied. If the modification has not been signaled as complete, the result is not observable such that it can be relied upon by other operations. Thus, a second update can depend on a first update if the first update, or an overlapping read that could have retrieved the results of the first update, was signaled as completed prior to the second update being received. In some examples, to coordinate the consistent snapshots 2030, 2032, the storage orchestration service 1408 requests that the storage systems 1412, 1414 prepare for a snapshot by suspending or quiescing some part of I/O processing for the placement group volumes 1430, 1432. Once all placement group storage systems that are currently hosting volumes of the placement group 1434 have been suspended or quiesced, the storage orchestration service 1408 directs the storage systems 1412, 1812 to apply a snapshot, thus resulting in consistent snapshots 2030, 2032.

For further explanation, FIG. 19 sets forth a flow chart illustrating an additional example method of data path virtualization according to some embodiments of the present disclosure. The example method depicted in FIG. 19 is similar to the example method depicted in FIG. 14, as the example method depicted in FIG. 19 also includes mapping

1404 a virtual namespace identifier 1402 to one or more volumes 1430, 1432 stored among a pool 1410 of storage resources, wherein a plurality of storage systems 1412, 1414 are utilized to provide the storage resources; and migrating 1406 the first virtual namespace identifier 1402 among the plurality of storage systems 1412, 1414 to virtualize a data path 1450, 1452 for the one or more volumes 1430, 1432.

Figure 21:
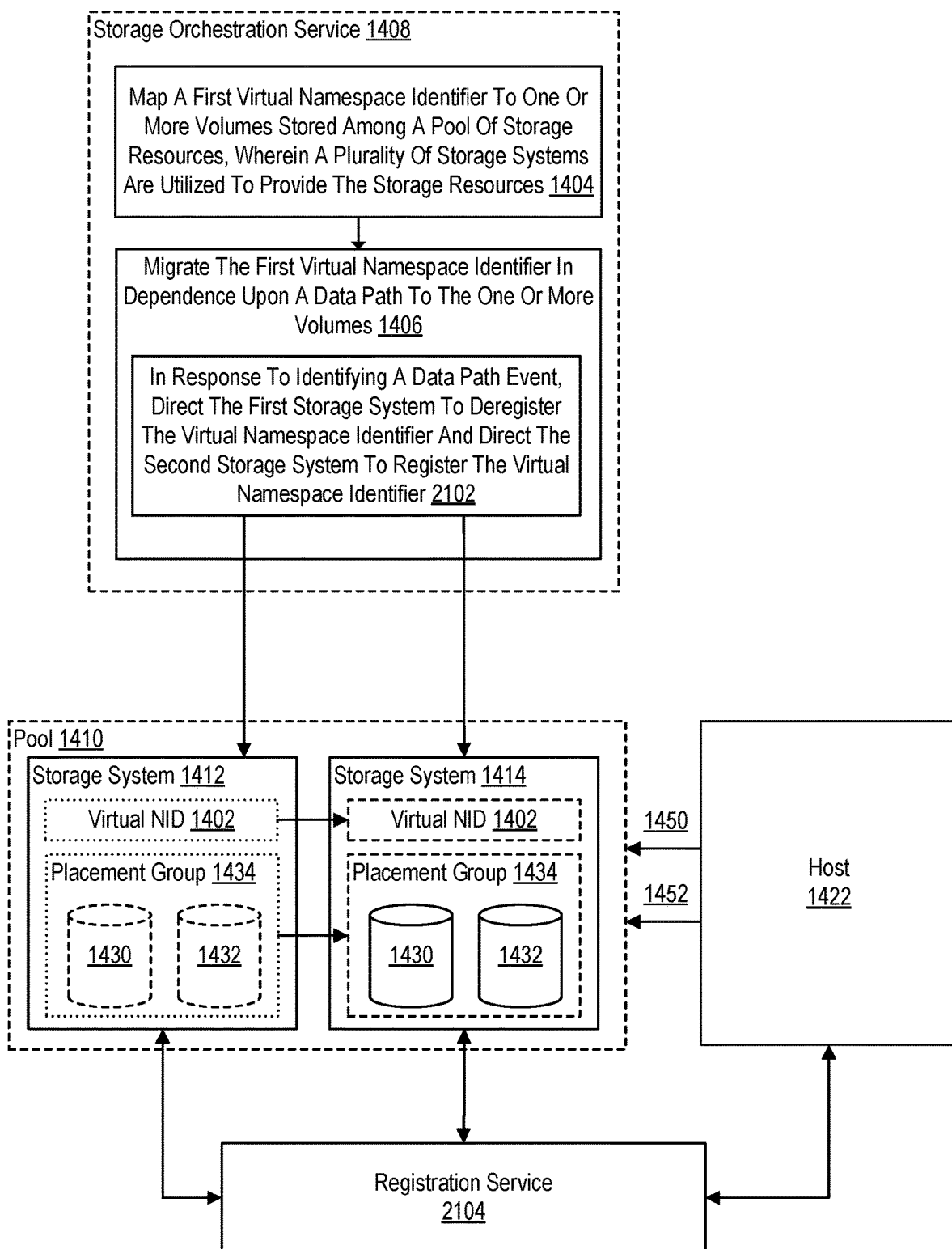
FIG. 21 sets forth a flow chart illustrating an additional example method for data path virtualization according to some embodiments of the present disclosure.

In the example method depicted in FIG. 21, migrating 1406 the first virtual namespace identifier 1402 among the plurality of storage systems 1412, 1414 to virtualize a data path 1450, 1452 for the one or more volumes 1430, 1432 includes, in response to identifying a data path event, directing 2102 the first storage system 1412 to deregister the virtual namespace identifier 1402 and directing the second storage system 1412 to register the virtual namespace identifier 1402. In some examples, a storage system registers a virtual namespace identifier 1402 with a registration service 2104. The virtual namespace identifier 1402 maps to a placement group including volumes serviced by the storage system. The host 1422 uses the virtual namespace identifier provided through the registration service to establish a data path to the storage system that services the volumes in the placement group. Where Fibre Channel is used as the connectivity medium for the data path, for example, the virtual namespace identifier may be a virtual WWN and the registration service may be a controller or name service in a Fibre Channel switch (e.g., an N_port controller). Where iSCSI is used as the connectivity medium for the data path, for example, the virtual namespace identifier may be a virtual IQN and the registration service may be an internet storage name server (iSNS). The virtual namespace identifier 1402 can be provided to the storage system by the storage orchestration service 1408. In response to identifying a data path event, as discussed above, the storage orchestration services can coordinate the migration of the virtual namespace identifier 1402 from one storage system to another. As depicted in FIG. 21, the migration of the placement group 1434 from the storage system 1412 to the storage system 1414 is an event that precipitates a migration of the virtualized data path 1450, 1452 between the host 1422 and the volumes 1430, 1432 in the placement group 1434.

In the example depicted in FIG. 21, in response to identifying a data path event, directing 2102 the first storage system 1412 to deregister the virtual namespace identifier 1402 and directing the second storage system 1412 to register the virtual namespace identifier 1402 is carried out by the storage orchestration service 1408 directing the storage system 1412 to deregister the virtual namespace identifier 1402 corresponding to the placement group 1434 from the registration service, thus dissolving the data path(s) between the host 1422 and the storage system 1412. Further, the storage orchestration service 1408 directs the storage system 1414 to register the virtual namespace identifier 1402 corresponding to the placement group 1434 with the registration service. When the storage system 1412 deregisters from the registration service, the registration service raises a state change notification even to the host 1422. The host 1422, upon detecting the state change notification, will retry a login to connect to the virtual namespace identifier 1402. Upon successful reestablishment, virtual namespace identifier 1402 for the placement group 1434 has been migrated to the storage system 1414. The new data path 1452 is established for providing host access to the volumes 1430, 1432 in the placement group.

Figure 22:
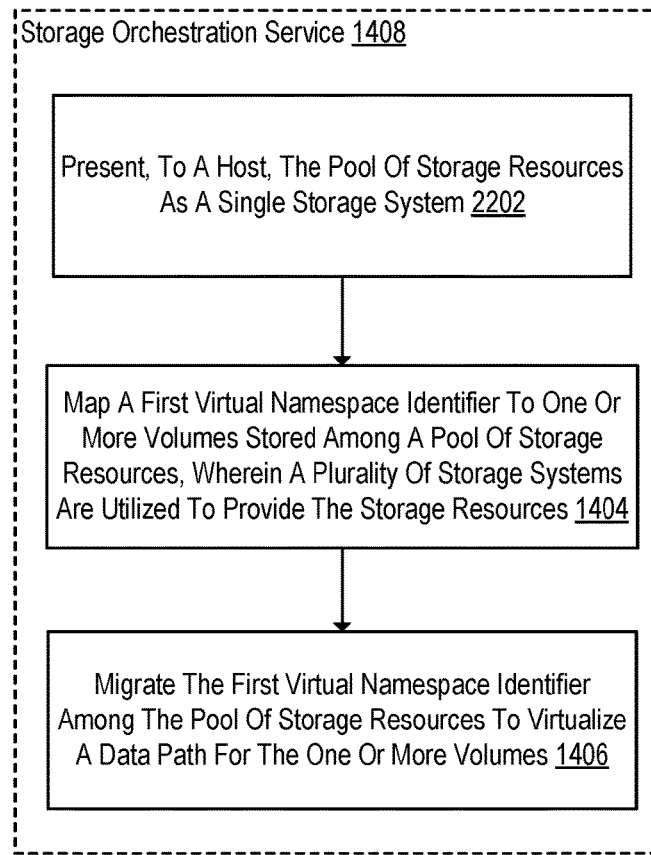
FIG. 22 sets forth a flow chart illustrating an additional example method for data path virtualization according to some embodiments of the present disclosure.
Figure 22:
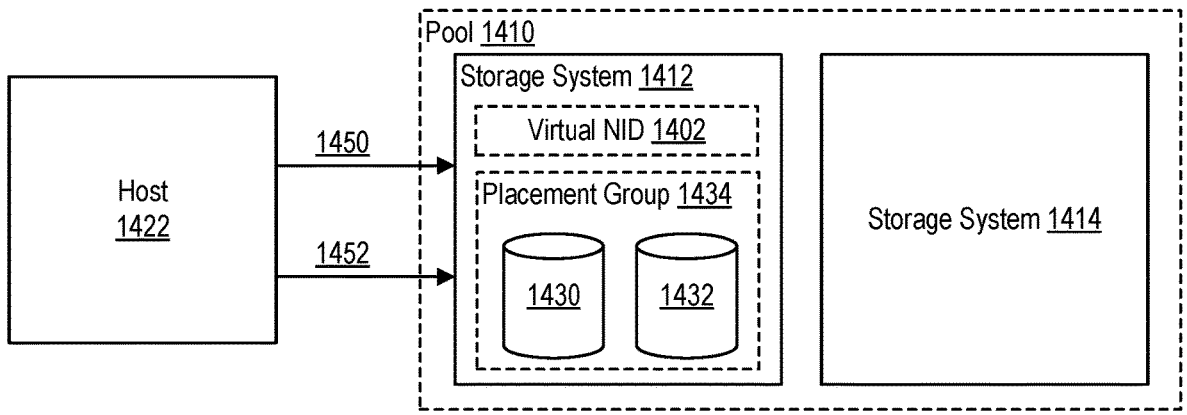

For further explanation, FIG. 22 sets forth a flow chart illustrating an additional example method of data path virtualization according to some embodiments of the present disclosure. The example method depicted in FIG. 14 is similar to the example method depicted in FIG. 14, as the example method depicted in FIG. 22 also includes mapping 1404 a virtual namespace identifier 1402 to one or more volumes 1430, 1432 stored among a pool 1410 of storage resources, wherein a plurality of storage systems 1412, 1414 are utilized to provide the storage resources; and migrating 1406 the first virtual namespace identifier 1402 among the plurality of storage systems 1412, 1414 to virtualize a data path 1450, 1452 for the one or more volumes 1430, 1432.

The example method of FIG. 22 also includes presenting 2202, to the host 1422, the pool 1410 of storage resources as a single storage system. In some examples, presenting 2202, to the host 1422, the pool 1410 of storage resources as a single storage system is carried out by the storage system orchestrator 1408 as discussed above. Using the above-described infrastructure, presenting the pool 1410 of storage resources as single storage system by the storage orchestration service 1408 can offer a number of features and services to both consumers of storage and storage providers.

In some examples, the use of iSCSI abstraction as a control point can be used to facilitate filtering, access control list operations, and security operations. For containerized storage services, this provides enhance security compared to having a dedicated IP address. Through the use of policies, the storage orchestration service 1408 may ensure that a modified policy is propagated to the storage system and that the storage system ultimately converges on a desired state. In some examples, using a virtual namespace identifier, the storage orchestration service 1408 can implement an object storage endpoint to federate object storage namespaces across multiple storage devices.

In some examples, the storage orchestration service 1408 can provide multi-array management through a single framework rather than managing individual storage arrays. Such storage management services that can manage multiple arrays as data engine components within pools of storage through a single management framework. In some examples, the storage orchestration service 1408 provides an abstraction of users away from the physical infrastructure components that enables consumers to have access to storage services while not having management access to back-end storage arrays that house the storage resources.

In some examples, the storage orchestration service 1408 can expose storage services to multiple consumers or application owners (e.g., tenants) from the same shared back-end infrastructure or pool of storage resources while segregating different groups of users from each other. Through the storage orchestration service 1408, storage may be provisioned into a tenant space. A tenant space may be analogous to a working environment or application. Tenant spaces can live within a larger tenant object. In these examples, users can have access to the resources within their own tenants or tenant spaces.

In some examples, the storage orchestration service 1408 can expose multiple different performance capabilities (storage classes) from the same underlying back-end infrastructure. The storage orchestration service 1408 may facilitate the presentation of storage classes with defined properties limiting capacity and/or performance. On the storage system, volumes can be provisioned with QoS, IOPS, and bandwidth rate limits to enforce the performance characteristics.

In some examples, the storage orchestration service 1408 can be used to lifecycle the back-end hardware in the environment without disruption. Redistributing storage resources across back-end arrays with zero disruption to existing workloads allows for the adjustment of utilization after initial placement of unpredictable workloads. This includes environments where cooperative maintenance windows cannot be coordinated with the application owners. In some examples, the storage orchestration service 1408 can non-disruptively move volumes (in groups) between different arrays for the purpose of rebalancing workloads. Additionally, the storage systems themselves already have the ability to non-disruptively update across hardware generations and to increase and decrease capacity non-disruptively.

In some examples, the storage orchestration service 1408 can expose resources as pools or availability zones rather than as individual arrays. Users will consume storage with the ability to specify affinity and anti-affinity for the underlying hardware. Regions and availability zones allow users to understand the hardware layout, and design applications that can sustain hardware failures.

In some examples, the storage orchestration service 1408 can provide an interface for storage consumers to consume storage with different properties for performance and or capacity, and to associate data protection policies with the storage objects they consume. In such examples, consumers may be able to provision volumes by instantiating them from storage classes. For example, the storage classes define the performance characteristics of the volumes they create. Additionally, data protection features are provided as policies that consumers can associate with the volumes as they are provisioned. In some examples, the storage orchestration service 1408 can provide an interface for storage consumers to attach data protection policies to the resources they consume. This includes snapshots and cross availability zone or cross region replication. In some examples, the storage orchestration service 1408 can expose data protection policies that can be attached to storage as the objects are consumed by the user.

In some examples, the storage orchestration service 1408 can facilitate the rebalance or movement of workloads between storage systems in the same availability zone without disrupting the applications or requiring assistance from network administrators or host administrators. The ability to non-disruptively migrate workloads between different back-end hardware platforms is advantageous to storage management because it provides the ability to absorb utilization changes in environments where performance requirements can be very unpredictable. In some examples, the storage orchestration service 1408 provides unassisted rebalance, where storage can be rebalanced by the storage orchestration service 1408 without the need for the storage administrator coordinating with another admin (e.g., there is no need to change the switch configuration, no need for host to rescan or change configuration, etc.). In some examples, the storage orchestration service 1408 provides assisted rebalance, where storage can be rebalanced by the storage orchestration service 1408 but with assistance or coordination with another admin (e.g., zone/network changes, server rescans, etc.). In some examples, the storage orchestration service 1408 provides automatic rebalance, in which the storage orchestration service 1408 decides what to move and when/where to move it, and performs the rebalance with no human intervention.

Enterprise storage systems, or more particularly a fleet of enterprise storage systems, typically provide telemetry data to a cloud-based service. For example, the telemetry data reported may include data describing various operating characteristics of the storage system and may be analyzed by the cloud-based service for a vast array of purposes including, for example, to determine the health of the storage system, to identify workloads that are executing on the storage system, to predict when the storage system will run out of various resources, to recommend configuration changes, workflow migrations, or other actions that may improve the operation of the storage system. However, such cloud-based services do not support a control channel for remote API requests directed to storage system APIs or for active management of software on the storage system. In the following examples, an edge management service provides such a control channel between a cloud-based service (i.e., a cloud-based storage service) and an edge device (e.g., a storage system controller or a server coupled to a storage system).

Figure 23:
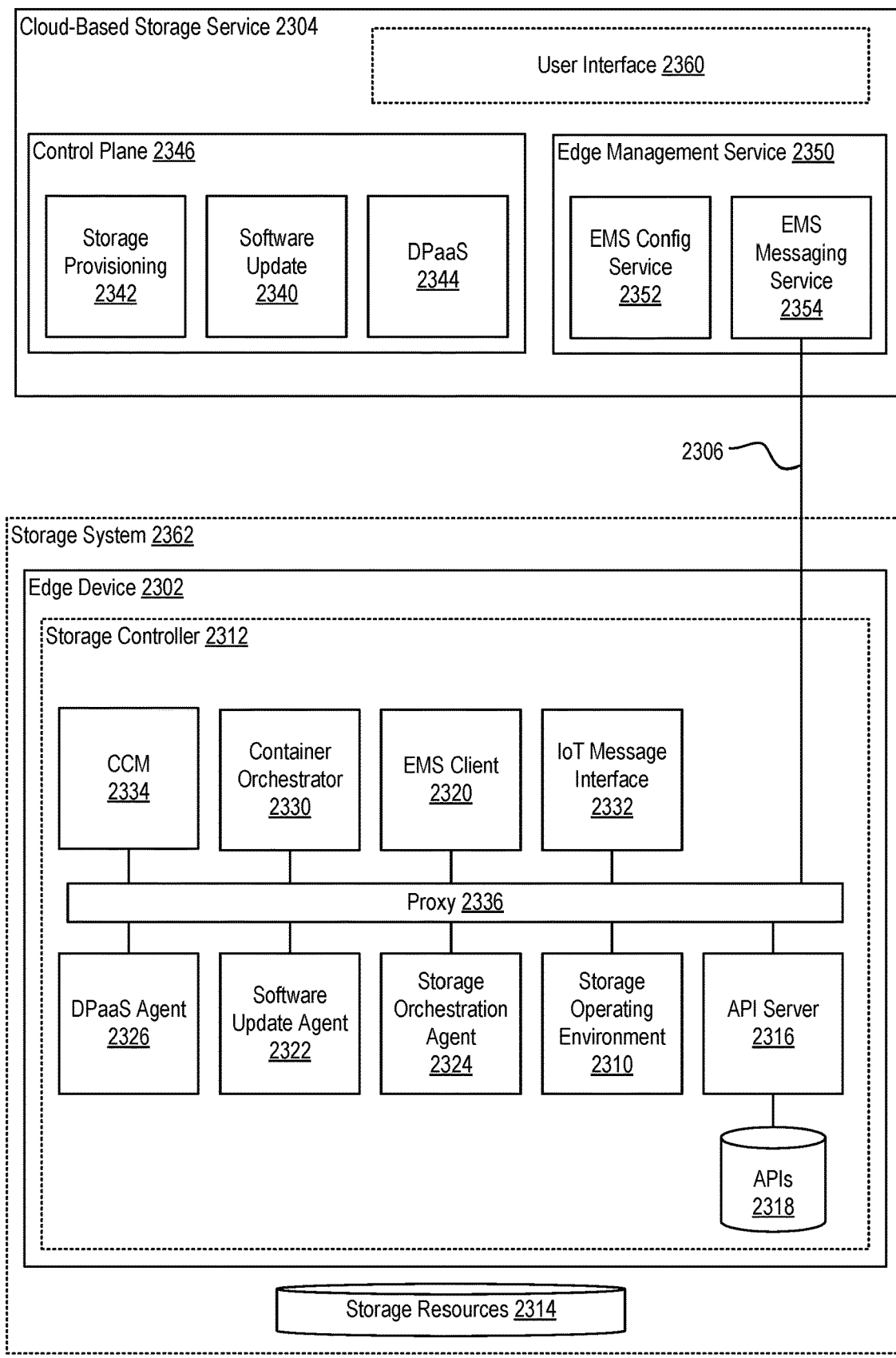
FIG. 23 sets forth a diagram of an example edge management service architecture according to some embodiments of the present disclosure.

FIG. 23 sets forth a diagram of an example architecture for an edge management service that provides a messaging channel between cloud-based components (such as cloud-based services) and enterprise devices (such as edge servers or enterprise storage systems). The example of FIG. 23 includes an edge device 2302 that is configured to receive control messages from a cloud-based storage service 2304 over a data communication link 2306. In some examples, the cloud-based storage service 2304 is a storage service or set of storage services (e.g., microservices) whose execution is supported by cloud resources (e.g., cloud computing instances) of a cloud computing environment. For example, the cloud computing environment may include a public cloud environment, a private cloud environment, a virtual private cloud environment, a hybrid cloud environment, and so on.

In some examples, the edge device 2302 is a component of storage system such as any of the storage systems discussed above. For example, edge device 2302 may be a component of an on-premises storage system located in an enterprise data center, a hosted storage system located in a remote or colocation data center, or some other physical storage system. In other examples, the edge device is 2302 is an enterprise server or other network appliance configured to interface with one or more storage systems (e.g., a fleet of storage systems). In these examples, the edge device 2302 may be, for example, a server that is collocated with one or more storage systems in an enterprise data center. In yet other examples, the edge device 2302 is a virtual device such a virtual machine hosted on a physical storage system, server, or other device collocated with one or more enterprise storage systems. For ease of explanation, in the example of FIG. 23 and following examples, the edge device 2302 is described in the context of a on-premises physical storage system unless otherwise noted. For example, the edge device can be embodied in a storage controller 2312 of a storage system 2362. The edge device 2302 may also be configured to send telemetry data (e.g., capacity, load, etc.) to the cloud-based storage service 2304.

In some examples, the cloud-based storage service 2304 includes an edge management service 2350 for managing the edge device 2302 and directing storage and data services on the edge device 2302. In this regard, the cloud-based storage service 2304 be associated with a user interface 2360 for administrators and other enterprise personnel to configure the edge device 2302 and request storage and data services on the edge device 2302. For example, the user interface may be a web-based GUI. In some examples, the cloud-based storage service 2304 includes a cloud-based control plane 2346 for deploying and managing software on the edge device 2302 as well as providing storage and data services to hosts utilizing the edge device 2302. In some examples, the cloud-based storage service 2304 includes one or more storage microservices 2340, 2342, 2344 that provide storage and data services through a control channel to the edge device 2302. For example, the storage microservices may include a storage orchestration microservice 2342 that autonomously provisions volumes or other datasets on the edge device 2302, migrates volumes, scales out storage, and so on. As another example, the storage microservices may include a data protection as-a-service (DPaaS) microservice 2344 that manages snapshotting, RPO, RTO, and other data protection policies on the edge device 2302 based on customer-driven objectives. As another example, the microservices may include a software update microservice 2340 for deploying and upgrading software on the edge device 2302. As yet another example, the storage microservices may include a disaster recovery as-a-service (DRaaS) microservice that manages data replication policies, failover procedures, and other disaster recovery safeguards for the edge device 2302. The cloud-based storage service 2304 may also provide other cloud services such as those discussed above in the context of FIG. 3A. In some non-limiting examples, control messages sent to the edge device 2302 from the cloud-based storage service 2304 may include messages directing the edge device 2302 to install or update software on the edge device 2302, provision a volume on the edge device 2302, take a snapshot of a volume on the edge device 2302, set a policy on the edge device 2302 and so on. In some examples, the control plane and its constituent microservices are architected as a service mesh.

The data communications link 2306 may be embodied as a data communications pathway that is provided through the use of one or more private and/or public data communications networks such as a LAN, WAN, SAN, the public Internet, a virtual private network, or as some other mechanism capable of transporting digital information between the edge device 2302 and the cloud-based storage service 2304. In such an example, digital information, such as control messages and telemetry data, may be exchanged between the edge device 2302 and the cloud-base storage service 2304 via the data communications link 2306 using one or more data communications protocols. For example, digital information may be exchanged using hypertext transfer protocol (HTTP), internet protocol (IP), transmission control protocol (TCP), user datagram protocol (UDP), transport layer security (TLS), and so on. In some examples, the data communications link 2306 utilizes an Internet-of-Things (IoT) messaging protocol such as the message queue telemetry transport (MQTT), advanced message queue protocol (AMQP), or other IoT messaging protocol. In such examples, messages and data may be passed between the edge device 2302 and the cloud-based storage service 2304 via a publish/subscribe messaging model and a message broker. In some examples, the IoT messaging layer supports over-the-air (OTA) installation and update of software on the edge device 2302 from the cloud-based storage service 2304.

In some implementations, the edge device 2302 includes an edge management service (EMS) client 2320 configured for communication with the edge management service 2350 of the cloud-based storage service 2304. The EMS client 2320 receives control messages published by the edge management service 2350, including but not limited to software installation messages, software update messages, security patching, and API calls for storage orchestration, DPaaS, DRaaS, and other storage and data services. As such, the EMS client 2320 may read control messages published by the control plane 2346 including the storage orchestration microservice 2342, the DPaaS microservice 2342, and so on.

The edge device 2302 also includes one or more storage service agents 2322, 2324, 2326 that perform an action based on the control messages. For example, the edge device 2302 may include a software update agent 2322 that responds to control messages issued by the control plane 2346 based on a user indication to deploy a software update. Thus, in some examples, the edge device 2302 is configured to receive an "over-the-air" (OTA) software update from the cloud-based storage service 2304 via the data communications link 2306. The edge device 2302 may also include a storage orchestration agent 2324 that responds to control messages issued by the storage orchestration microservice 2342 such as, for example, control messages to create, modify, or move volumes. The edge device 2302 may also include a DPaaS agent 2326 that responds to control messages issued by the DPaaS microservice 2344, such as, for example, control messages to set data protection policies, take snapshots, and so on. It will be recognized that the edge device 2302 may include a variety of other agents directed to storage and data services that are provided in the cloud-based storage service 2304 and carried out on the edge device 2302. The EMS client 2320 routes control messages received from the cloud-based storage service 2304 to the appropriate storage service agent 2322, 2324, 2326.

In some implementations, the storage service agents 2322, 2324, 2326 interface with a storage operating environment 2310. In some examples, the storage operating environment 2310 is a storage and data services application that executes on a storage controller 2312; however, in other examples the storage operating environment 2310 may include a set of containerized applications executing on the storage controller 2312. In examples where the edge device 2302 is a storage system, the edge device 2302 includes the storage controller 2312 and storage resources 2314. The storage controller 2312 and storage resources 2314 may be any of the storage controllers and storage resources discussed above. In examples where the edge device 2302 is a separate server or appliance, the storage service agents 2322, 2324, 2326 interface with a storage operating environment of a storage controller on a storage system that is collocated with the edge device 2302.

In some implementations, the storage service agents 2322, 2324, 2326 are configured to invoke storage system APIs exposed by the storage operating environment 2310, a storage system API server, or some other storage system component. For example, a storage controller may include a device API server 2316 that exposes a library of device APIs 2318 for the storage system. When a control message encapsulating a storage agent API request is routed by the EMS client 2320 to one of the storage service agents 2322, 2324, 2326, that storage service agent fulfills the request by invoking one or more device APIs 2318 exposed by the device API server 2316. As previously discussed, each storage service agent 2322, 2324, 2326 is tailored to perform a specific set of functions offered by a corresponding component of the cloud-based storage service 2304. For example, the update agent 2322 is tailored to performing software updates (e.g., updates to the storage operating environment) driven by the software update microservice 2340, the storage orchestration agent 2324 is tailored to performing storage provisioning operations driven by the storage orchestration microservice 2342, the DPaaS agent 2326 is tailored to performing data protection operations driven by the DPaaS microservice 2344. Accordingly, each storage service agent 2322, 2324, 2326 is provided with a set of permissions to access only the subset of device APIs 2318 necessary for carrying out its tailored operations. For example, the storage orchestration agent 2324 may have API permissions to provision a volume but not define replication targets, whereas the DPaaS agent 2326 may have API permissions to configure replication but not provision a volume. Similarly, the update agent 2322 may have permissions to update the storage operating environment 2310 but not to provision a volume.

In some implementations, each storage service agent 2322, 2324, 2326 is associated with a respective manifest that defines a set of permission claims specifying device APIs or families of device APIs to which agent requires access. These permission claims are directed only to the set of APIs necessary for carrying out the agent's operations, which is a subset of the set of device APIs exposed by the edge device 2302 or a storage system associated with the edge device 2302. In some examples, the manifest also defines actions that can be taken with respect to the APIs for which access is requested. For example, the actions may include create, modify, delete, apply, and so on. In some examples, the manifest is included in an installation package for the agent. The manifest and/or installation package may be signed by an authority or include a certificate for the permission claims and actions enumerated by the manifest. For example, the installation package for the agent may be signed by the cloud-based storage service. In some examples, each agent is assigned one or more tokens indicative of access privileges that allow the agent to access a subset of the device APIs 2318 that are needed to respond to a control message. When invoking a device API, the storage service agent presents the certificate or access token, for example, to the device API server 2316. Thus, the storage service agents 2322, 2324, 2326 are not privileged in that they are not applications that run as root and do not have access to the file system; rather; the storage service agents 2322, 2324, 2326 only interact with the storage operating environment 2310 through authorized APIs 2318 that they are privileged to use. This prevents an agent from potentially exposing a backdoor into the storage operating environment 2310. In some examples, the manifest may identify permission claims to a family of APIs. The particular device APIs that are included in a family may be platform dependent. For example, a "volume" family may include all APIs relating to creating, modifying, or deleting volumes, whereas a "software" family may include all APIs relating to installation and upgrade of software. Thus, when the agent is granted an access token for a family, the access token applies to all device APIs that are included in that family.

In some implementations, the edge management service 2350 of the cloud-based storage service 2304 includes an EMS messaging service 2354 for passing control messages from the control plane the edge device, and an EMS configuration service 2352 for verifying and publishing agent installation packages. In some examples, the EMS configuration service 2352 exposes an API for submitting an agent installation package. For example, when a developer creates a new storage service agent, the developer submits an installation package that includes the storage service agent and the manifest for the storage service agent. The manifest includes the permission claims, as discussed above, as well as metadata such as the name, version, author of the agent and a hash of the image file embodying the agent. The manifest may also describe a set of behaviors of the agent. The developer may submit the agent installation package by invoking a particular API function of the EMS configuration service 2352. The EMS configuration service 2352 may also expose an API for approving an agent installation package. For example, once an agent installation package has been received, an administrator of the cloud-based storage service 2304 may review the installation package. The administrator may approve the installation package by invoking an API function of the EMS configuration service 2352 that signs the installation package. In some examples, the signed installation package is made available to the EMS client 2320 of an edge device 2302 through the edge management service 2350 or other aspect of the cloud-based storage service 2304. In some implementations, the EMS configuration service 2352 can an API function to deploy an agent to an edge device 2302, an API function to remove an agent to an edge device 2302, an API function to upgrade an agent already deployed on an edge device 2302, as well as others. In some examples, messages passed between the EMS client 2320 and the edge management service 2350 are cryptographically signed in both directions.

In some implementations, the edge device 2302 includes a container orchestrator 2330 that deploys containerized applications that embody the storage service agents 2322, 2324, 2326. In some examples, the EMS client 2320 provides an indication to the container orchestrator 2330 to download an agent package and install a container image embodying the storage service agent. For example, a user/administrator may direct the cloud-based storage service 2304, via the user interface, to deploy a particular storage service agent on a particular edge device. In some examples, the cloud-based storage service informs the user regarding the permissions that will be granted to the storage service agent. The cloud-based storage service 2304 may publish a message indicating to the EMS client 2320 that the particular storage service agent should be deployed on the edge device 2302. The EMS client 2320 may then direct the container orchestrator 2330 to download the agent package, which has been signed by the cloud-based storage service, and install the agent. In some examples, the agent package is downloaded from the cloud-based storage service 2304, while in other examples the agent package may be downloaded from another trusted source.

In some implementations, the edge device 2302 also includes an IoT messaging interface 2332. The IoT messaging interface 2332 supports an IoT message layer of the data communications link 2306 between the edge device 2302 and the cloud-based storage service 2304. The IoT messaging interface 2332 sends and receives messages transmitted in accordance with an IoT messaging protocol such as MQTT or other IoT messaging protocols. For example, the IoT messaging interface 2332 may be an AWS Greengrass™ Core.

In some implementations, the edge device 2302 also includes a cloud connect manager (CCM) 2334. The CCM 2334 performs certificate management as well as log upload to the cloud-based storage service 2304. For example, the CCM 2334 authenticates communication received from the cloud-based storage service 2304.

In some implementations, the edge device 2302 also includes a proxy 2336 for communication with the cloud-based storage service 2304 and for communication among components of the edge device such as the EMS client 2320, the storage service agents 2322, 2324, 2326, the device API server 2316, the container orchestrator 2330, the IoT messaging interface 2332, the CCM 2334, and other components that may not be discussed here. In some examples, the proxy 2336 is an application layer (OSI layer 7) proxy for HTTP message routing. For example, the proxy 2336 may be an Envoy proxy.

Without loss of generality, consider a non-limiting example where an enterprise administrator installs the EMS client 2320 on the edge device 2302. Once installed, the EMS client 2320 registers the edge device 2302 with the edge management service 2350. Subsequently, the enterprise administrator requests the edge management service 2350 to deploy a storage service agent to an enterprise edge device 2302. In this example, the administrator makes an RPC to the edge management service 2350 of the cloud-based storage service 2304 specifying a storage service agent to deploy and one or more edge devices on which the storage service agent should be deployed. The edge management service 2350 may employ step authentication to verify the identity of the administrator before deploying the agent. The edge management service 2350 publishes a message (e.g., an IoT message) that is read by the EMS client 2320 of an edge device 2302. The EMS client 2320 directs the container orchestrator 2330 to download the agent installation package for that storage service agent. The container orchestrator 2330 verifies that the installation package is signed by an authority of the cloud-based storage service 2304 and, if verified, installs the agent on the edge device 2302. The EMS client 2320 ingests the manifest for the storage service agent and provides the agent with a token for permissions to APIs or API families and actions specified in the manifest. For example, where the storage service agent is a storage orchestration agent, the manifest may include a permission claim for a "volume" family of APIs and actions that include "create" and "delete." In this example, the storage orchestration agent is assigned a token granting access to device APIs that allow the storage orchestration agent to create or delete a volume.

Without loss of generality, consider another non-limiting example where a storage orchestration microservice 2442 makes an RPC (e.g., a gRPC) to the storage orchestration agent 2322 to create a new volume. A control message including the RPC is published by the edge management service 2350 and read by the EMS client 2320. For example, the control message may be published in an IoT messaging layer that is read through IoT messaging interface 2332. The EMS client 2320 routes the RPC to the storage orchestration agent 2322, which calls a device API to create a new volume. The device API server 2316 determines, based on a token presented by the storage orchestration agent 2322, whether the storage orchestration agent 2322 is permitted to make the API call. If the agent is permitted, the device API for creating a new volume is invoked.

Figure 24:
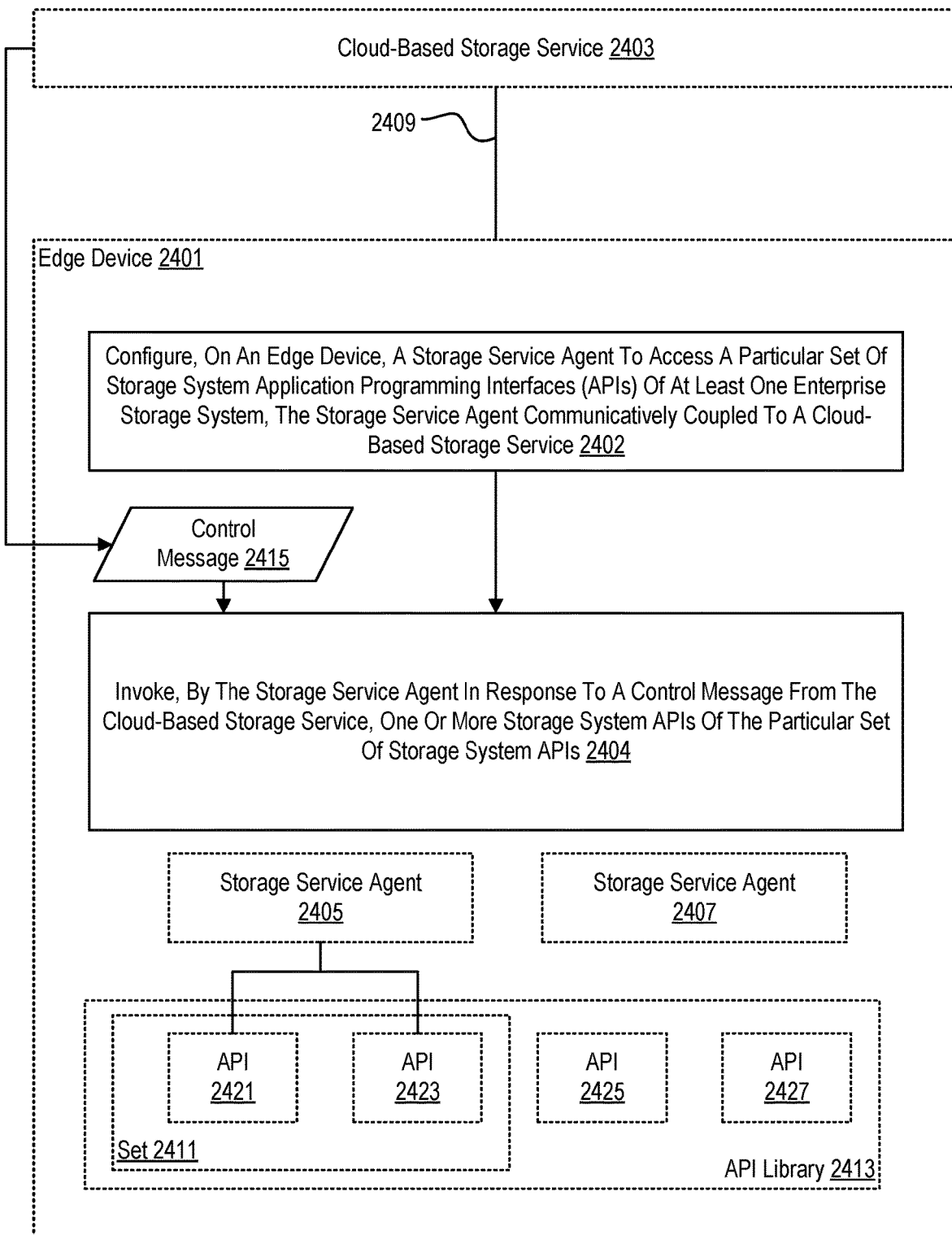
FIG. 24 sets forth a flow chart illustrating an additional example method of employing an edge management service according to some embodiments of the present disclosure.

For further explanation, FIG. 24 sets forth a flow chart illustrating an example method of employing an edge management service according to some embodiments of the present disclosure. The example method of FIG. 24 includes configuring 2402, on an edge device 2401, a storage service agent 2405 to access a particular set 2411 of storage system application programming interfaces (APIs) 2421, 2423 of at least one enterprise storage system, the storage service agent 2405 communicatively coupled to a cloud-based storage service 2403. Although depicted in less detail, the edge device 2401 and the cloud-based storage service 2403 depicted in FIG. 24 may be similar to the edge device 2302 and the cloud-based storage service 2404 described above with reference to FIG. 23. In fact, the edge device 2401 and the cloud-based storage service 2403 depicted in FIG. 24 may include the same, fewer, additional components as any of the edge devices and the cloud-based storage services described above. In some embodiments, the edge device 2401 is provided as a device in a storage system such as a storage controller. In such embodiments, the edge device 2401 may be similar to any of the storage systems discussed above. In fact, the edge device 2401 may include the same, fewer, additional components as any of the storage systems described above.

The edge device 2401 includes one or more storage service agents 2405, 2407 (e.g., the storage service agents 2322, 2324, 2326 of FIG. 23) that are responsive to control messages generated by a cloud-based control plane (e.g., the cloud-based control plane 2346 of FIG. 23) of the cloud-based storage service. For example, the cloud-based control plane can embody a storage service application, a set of storage microservices, a storage orchestrator, or combinations thereof. In one example, there is a one-to-one correspondence between a set of storage microservices of the cloud-based storage service 2403 and a set of storage service agents 2405, 2407 on the edge device 2401, such that each storage service agent 2405, 2407 on the edge device 2401 is responsive to control messages from a particular storage microservice of the cloud-based storage service 2403. In some implementations, storage service agents 2405, 2407 are containerized applications. For example, the storage service agents 2405, 2407 can be containerized applications deployed by the cloud-based storage service 2403. In some examples, where the edge device 2401 is an enterprise storage system, the storage service agents 2405, 2407 may execute on a storage controller of the enterprise storage system.

The edge device 2401 and cloud-based storage service 2403 communicate via data communications link 2409 through which the storage service agents 2405, 2407 are coupled to the cloud-based storage service 2403, and more particularly to the cloud-based control plane. In some examples, the data communications link 2409 includes an IoT messaging layer though implementation of an IoT messaging protocol. For example, the edge device 2401 may include an EMS client (e.g., the EMS client 2320 of FIG. 23) that reads control messages published by the cloud-base storage service 2403 over the IoT messaging layer. In such examples, the EMS client reads control messages directed to edge device 2401 and directs those control messages to storage service agents 2405, 2407.

The storage service agents 2405, 2407 each have a limited operational scope. For example, each storage service agent 2405, 2407 may correspond to a specific storage service such as storage-as-code, data protection, disaster recovery, update deployment, and so on. As described above, the cloud-based storage service 2403 may provide all of these services as a monolithic storage services application or as a set of microservices such as cloud-native containerized applications. In the case of the latter, each storage service agent 2405, 2407 may correspond to a respective control plane microservice of the cloud-based storage service 2403. In this case, to carry out operations on the storage system, each cloud-based microservice calls on its corresponding storage service agent 2405, 2407, for example, through a remote procedure call such as gRPC. In other cases, the cloud-based storage service 2403 may select one of the storage service agents 2405, 2407 based on the nature of the remote procedure call.

The storage service agents 2405, 2407 interact with storage system APIs 2421, 2423, 2425, 2427 to carry out operations on the storage system that are directed by the control plane of the cloud-based storage service 2403. Examples of storage system APIs can include APIs to create a new volume, migrate a volume, configure a host connection, set a snapshotting frequency, define a replication target, and so on. Readers will appreciate that a variety of APIs are provided by a storage system. The set of APIs exposed by a storage system may be referred to here as a library of APIs. As discussed above, in some implementations the edge device 2401 may be a component of enterprise storage system. In such implementations, as depicted in FIG. 24, the library of storage system APIs is provided on the edge device 2401 itself. In other implementations, the edge device 2401 may be a collocated server coupled to the enterprise storage system via a network connection. In additional implementations, the edge device 2401 may be a virtual device. In some examples, the storage system APIs 2421, 2423, 2425, 2427 are accessed by the storage service agents 2405, 2407 through an API server.

To deter the cloud-based storage service 2403 and the storage service agents 2405, 2407 from being used maliciously to gain access to the enterprise storage system, the storage service agents 2405, 2407 are limited to accessing only those storage system APIs that are necessary to carry out the operations of that storage service agent. For illustration in FIG. 24, a particular service agent 2405 can only access a particular set 2411 of storage system APIs 2421, 2423 from among the library 2413 of storage system APIs 2421, 2423, 2425, 2427. To further deter malicious external services to impersonate the cloud, and thereby interact with the agent on the device (and carry out unauthenticated/unauthorized operations), all messages (e.g., data packets) transferred between the cloud service and the agent on the edge device are encrypted and signed by mutually known private/public keys or other credential systems/ciphers appropriate for signing metadata and encryption.

In some examples, the edge device 2401 configures 2402 the storage service agent 2405 to access the particular set 2411 of storage system APIs 2421, 2423 by identifying various storage system APIs that fall within the operational scope of the storage service agent 2405. For example, a storage orchestration agent may require access to APIs to create a volume but not to set disaster recovery policies. In some examples, the storage system APIs that are applicable to the operational scope of the storage service agent 2405 are specified in a document or file associated with the storage service agent 2405. For example, the document may be a certificate, an install package manifest, or other trusted document. In such examples, the document or file may be signed by an authority associated with the cloud-based storage service 2403 or some other authority.

In some examples, the edge device 2401 configures 2402 the storage service agent 2405 to access the particular set 2411 of storage system APIs 2421, 2423 by also granting a credential for the particular set 2411 of storage system APIs 2421, 2423 to the storage service agent 2405. In some examples, granting a credential for the particular set 2411 of storage system APIs 2421, 2423 can include providing a certificate, access token, or other credential to the storage service agent 2405 either for the entire set 2411 of storage system APIs 2421, 2423 or for each storage system API 2421, 2423 individually. Thus, the storage service agent 2405 cannot access other storage system APIs 2425, 2427 that are not included in the particular set 2411 of storage systems APIs 2421, 2423 for which access has been configured.

The method of FIG. 24 also includes invoking 2404, by the storage service agent 2405 in response to a control message 2415 from the cloud-based storage service 2403, one or more storage system APIs of the particular set 2411 of storage system APIs 2421, 2423. In some examples, the edge device 2401 receives a control message 2415 from the control plane of the cloud-based storage service 2403 over the data communications link 2409. The control message 2415 message is routed to the appropriate storage service agent 2405 by a message router such as, for example, the EMS client. In some implementations, the control message 2415 includes a remote procedure call (e.g., a gRPC). For example, a storage orchestration microservice of the cloud-based storage service 2403 may publish an RPC to the edge device 2401, where the RPC is a call to create a new volume. In this example, the EMS client forwards the RPC to the storage orchestration agent. In some implementations, the control message 2415 may be embodied in an IoT message that is received by the edge device 2401 through the IoT messaging layer. For example, the EMS client may receive the control message 2415 via an IoT messaging interface (e.g., the IoT messaging interface 2332 of FIG. 23). In response to receiving the control message 2415, the storage service agent 2405 invokes a storage system API 2421 from among the set 2411 of storage system APIs 2421, 2423 for which access has been configured. Continuing the above example, when the storage orchestration agent receives the RPC to create a new volume, the storage orchestration agent invokes a storage system API to create the new volume on the storage system. In some examples, all control messages, such as RPCs, issued by the services in the cloud-based storage service 2403 and directed to the storage service agents 2405, 2407 are relayed between an EMS messaging service of the cloud-based storage service 2403 and an EMS client of the edge device 2401, thereby providing a standard messaging format and control channel pathway for all such control messages. For example, the EMS messaging service of the cloud-based storage service 2403 and an EMS client of the edge device 2401 may be couple via the IoT messaging layer.

Figure 25:
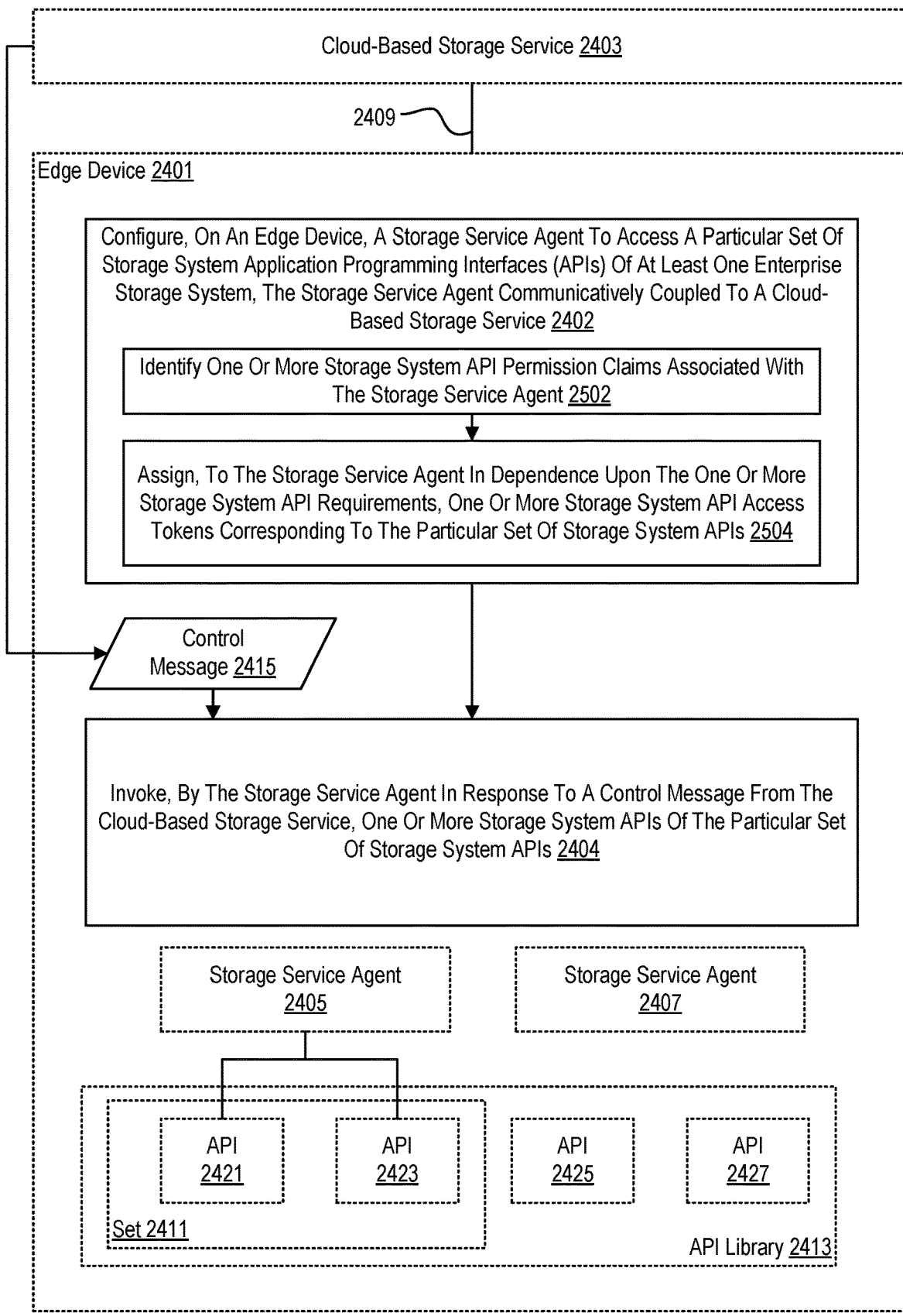
FIG. 25 sets forth a flow chart illustrating an additional example method of employing an edge management service according to some embodiments of the present disclosure.

For further explanation, FIG. 25 sets forth a flow chart illustrating an example method of employing an edge management service according to some embodiments of the present disclosure. The example method of FIG. 25 includes aspects of the method of FIG. 24. In the example method of FIG. 25, configuring 2402 the storage service agent 2405 to access the particular set 2411 of storage system APIs 2421, 2423 includes identifying 2502 one or more storage system API permission claims associated with the storage service agent 2405. As used here, an API permission claim is a declaration by a developer that the storage service agent 2405 requires access to a particular storage system API or family of storage system APIs to carry out ordained operations that are commensurate with the scope of the storage service agent 2405. For example, a storage orchestration agent may require access to an API to create storage volumes, or access to a family of APIs related to storage volumes (e.g., creating, modifying, migrating, etc.). In some examples, the API permission claim may be associated with one or more actions within a family of APIs. For example, a permission claim to storage volume family of APIs may be directed to actions for creating a storage volume but not migrating the storage volume. In some examples, the API permission claims for the storage service agent 2405 are specified in a document or file associated with the storage service agent 2405. For example, the document may be a certificate, an install package manifest, or other authorized document. In such examples, the document or file may be signed by an authority associated with the cloud-based storage service 2403 or some other authority.

In some examples, the edge device 2401 configures 2402 the storage service agent 2405 to access the particular set 2411 of storage system APIs 2421, 2423 by also determining the particular set 2411 of storage system APIs 2421, 2423 that correspond to the permission claims. In some examples, the edge device 2401 determines which storage system APIs 2421, 2423 among the library 2413 of storage system APIs correspond to the permission claims. For example, the particular set 2411 of storage system APIs 2421, 2423 may be determined based on API library architecture or structure indicating relatedness among APIs, from API naming conventions, by predetermined mappings of permission claims to API sets, or through explicit enumeration of individual APIs in the permission claims.

In the example of FIG. 25, configuring 2402 the storage service agent 2405 to access the particular set 2411 of storage system APIs 2421, 2423 also include includes assigning 2504, to the storage service agent 2405 in dependence upon the one or more storage system API permission claims, one or more storage system API access tokens corresponding to the particular set 2411 of storage system APIs 2421, 2423. In some examples, the edge device 2401 assigns access token to the storage service agent 2405 either for the set 2411 of storage system APIs 2421, 2423 or for each storage system API 2421, 2423 individually. This access token must be provided when invoking one of the storage systems APIs 2421, 2423, and no storage system APIs in the library 2413 of storage system APIs 2421, 2423, 2425, 2427 can be successfully invoked without providing a token to do so. Thus, the storage service agent 2405 cannot access other storage system APIs 2425, 2457 that are not included in the particular set 2411 of storage systems APIs 2421, 2423 for which access has been configured.

Figure 26:
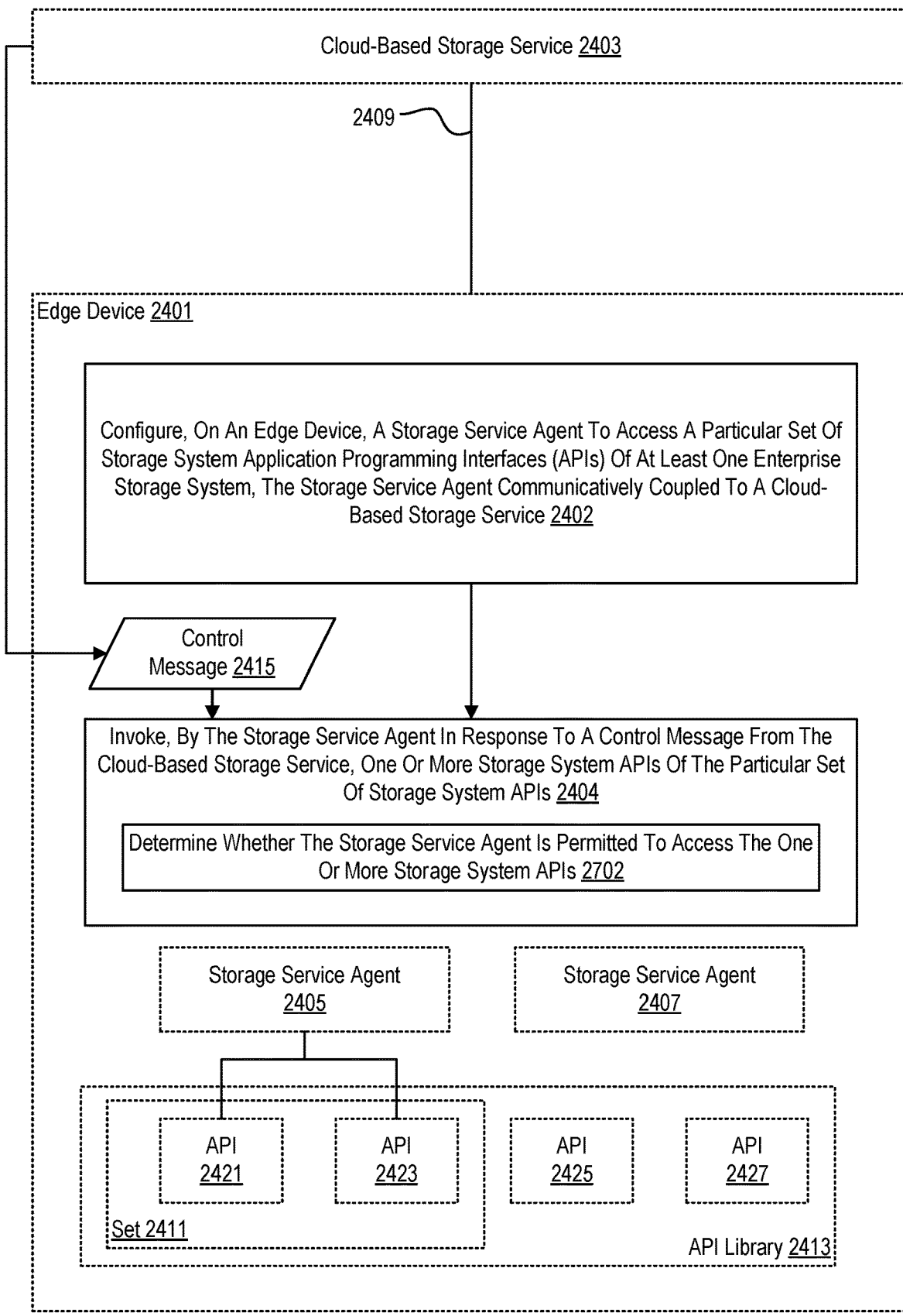
FIG. 26 sets forth a flow chart illustrating an additional example method of employing an edge management service according to some embodiments of the present disclosure.

For further explanation, FIG. 26 sets forth a flow chart illustrating an example method of employing an edge management service according to some embodiments of the present disclosure. The example method of FIG. 26 includes aspects of the method of FIG. 24. In the example method of FIG. 25, invoking 2404, by the storage service agent 2405 in response to a control message 2415 from the cloud-based storage service 2403, one or more storage system APIs of the particular set 2411 of storage system APIs 2421, 2423 includes determining 2602 whether the storage service agent is permitted to access the one or more storage system APIs. In some examples, the edge device 2401 determines whether the storage service agent 2405 has the credentials to access the storage system API that is required to carry out an RPC. In some implementations, an EMS client, upon reading the control message, determines whether the storage service agent 2405 is configured for access to the storage system API. For example, the EMS client may determine whether the storage service agent 2405 has an access token for the storage system API. If the storage service agent 2405 has an access token for the storage system API, the EMS client forwards the RPC to the storage service agent. In other implementations, a storage system API server determines whether the storage service agent 2405 is configured for access to the storage system API. For example, the storage system API server may determine whether the storage service agent 2405 has an access token for the storage system API that is called. If the storage service agent 2405 has an access token for the storage system API, the storage system API server permits invocation of the storage system API. Readers will appreciate that other components of the edge device 2401 may be tasked with verifying whether a storage service agent 2405 is permitted to make an storage system API call.

Figure 27:
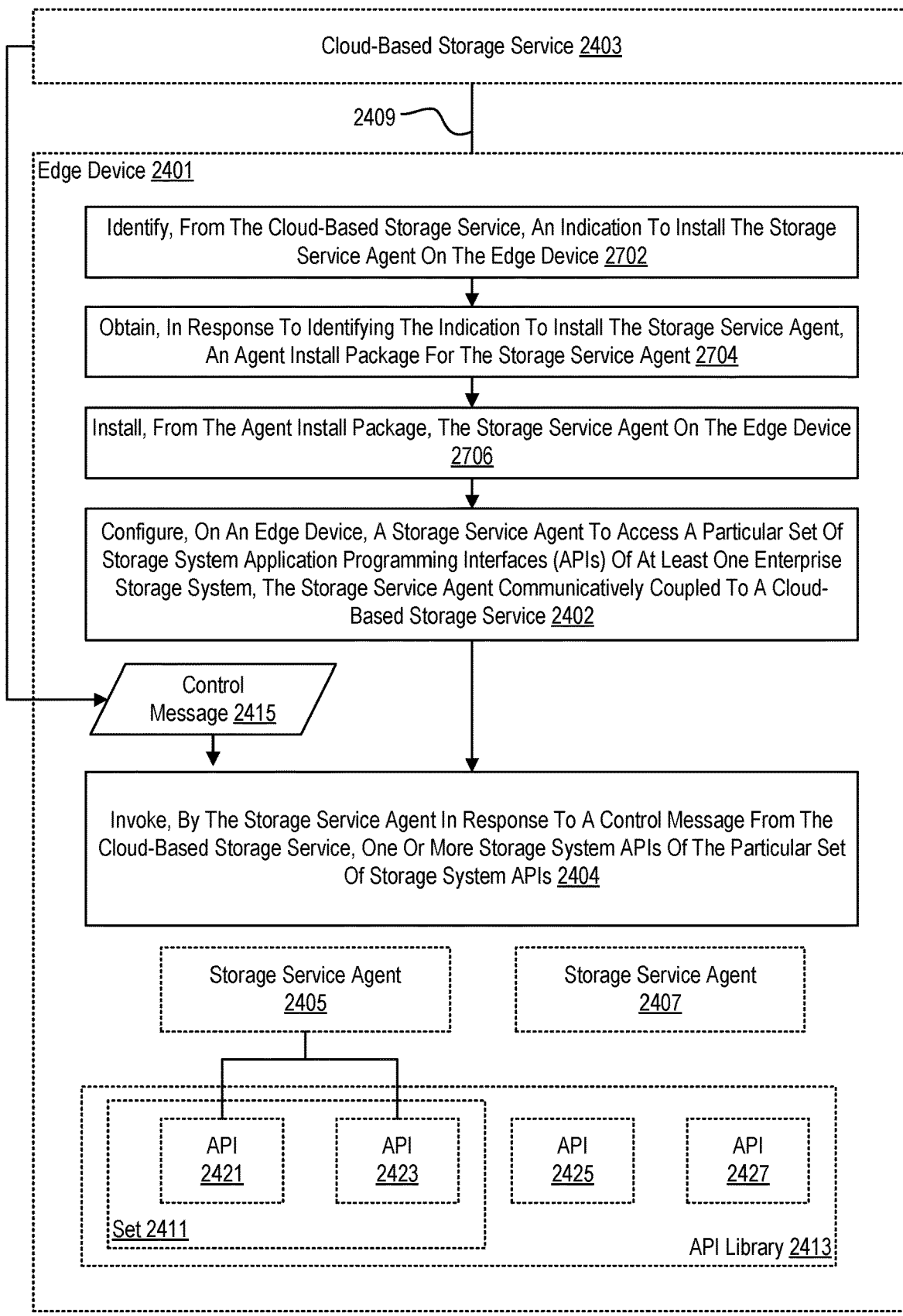
FIG. 27 sets forth a flow chart illustrating an additional example method of employing an edge management service according to some embodiments of the present disclosure.

For further explanation, FIG. 27 sets forth a flow chart illustrating an example method of employing an edge management service according to some embodiments of the present disclosure. The example method of FIG. 27 includes aspects of the method of FIG. 24. The method of FIG. 27 also includes identifying 2702, from the cloud-based storage service 2403, an indication to install the storage service agent 2405 on the edge device 2401. In some examples, an indication to install the storage service agent 2405 may be made in response to request from the administrator of an enterprise storage system. For example, the administrator may request, through a management plane API or user interface, that the storage service agent 2405 be deployed to the edge device 2401. In response, the cloud-based storage service 2403 may set a state indicating that the storage service agent 2405 is to be installed on the edge device 2401 and/or send a message to the edge device indicating the same. Upon observing the state or reading the message, the edge device 2401 identifies the storage service agent 2405 for installation on the edge device 2401. In some implementations, an EMS client of the edge device 2401 is configured to determine, based on information provided by the cloud-based storage service 2403, that the storage service agent 2405 is to be installed on the edge device 2401.

The example method of FIG. 27 also includes obtaining 2704, in response to identifying the indication to install the storage service agent 2405, an agent install package for the storage service agent 2405. In some examples, the edge device 2401 obtains the agent install package by downloading the agent install package through the cloud-based storage service. For example, an EMS client, upon identifying the indication to install the storage service agent 2405, may direct a container orchestrator to download the install package through the cloud-based storage service 2403. In some variants, the install package may be downloaded from another trusted package provider instead of the cloud-based storage service. In some implementations, the cloud-based storage service 2403 pushes the install package to the edge device 2401 without a request for the install package from the edge device 2401. The install package may be deployed to the edge device 2401 through the IoT messaging layer as an over-the-air software package.

In some examples, the install package for the storage service agent includes an image file for the storage service agent and a manifest. For example, the manifest may include metadata such as an agent name, version, author/developer, organization, and a hash of the image file. The manifest includes permission claims for the storage service agent, as discussed above. In some examples, a permission claim may be an indication of one or more storage system APIs that are utilized by the storage service agent. In some examples, a permission claim may be an indication of one or more families of storage system APIs that are utilized by the storage service agent. The families of storage system APIs may be groupings of storage system APIs related to a particular aspect of the storage system. For example, one family of storage system APIs may be directed to APIs for volume creation, configuration and management, while another family of storage APIs may be directed to host configuration and management, and so on. In some implementations, the manifest also includes one or more types of actions associated with each permission claim. A permission claim does not necessarily apply to all types of actions permissible with the API family. For example, with respect to a particular storage system API or family of APIs, the manifest may identify types of actions such a "create" or "modify" for a permission claim, but not other types of actions such as "delete" or "destroy." Thus, as one example, a permission claim for a "volumes" family of storage system APIs that is associated with the "create" and "modify" actions defines a request for access to storage system APIs that will allow the agent to create and modify, but not delete or destroy, volumes on the storage system. In some implementations, the manifest also identifies behaviors of the storage service agent 2405 such as runtime behaviors and high-availability behaviors. For example, behaviors of the storage service agent 2405 may indicate whether a storage service agent remains active 2405 on a passive secondary controller of the storage system. As one example, an update agent may be active on all storage controllers, whereas a storage orchestration agent may be active only on the active storage controller. In some examples, the install package is signed by the cloud-based storage service 2403 to ensure that the storage service agent and manifest have been verified the cloud-based storage service 2403.

The example method of FIG. 27 also includes installing 2706, from the agent install package, the storage service agent 2405 on the edge device 2401. Before installing the storage service agent, the edge device 2401 verifies the digital signature of the cloud-based storage service 2403 that is included in the install package for the storage service agent. In some examples, a container orchestrator on the edge device 2401 installs the image file for the storage service agent from the install package.

Figure 28:
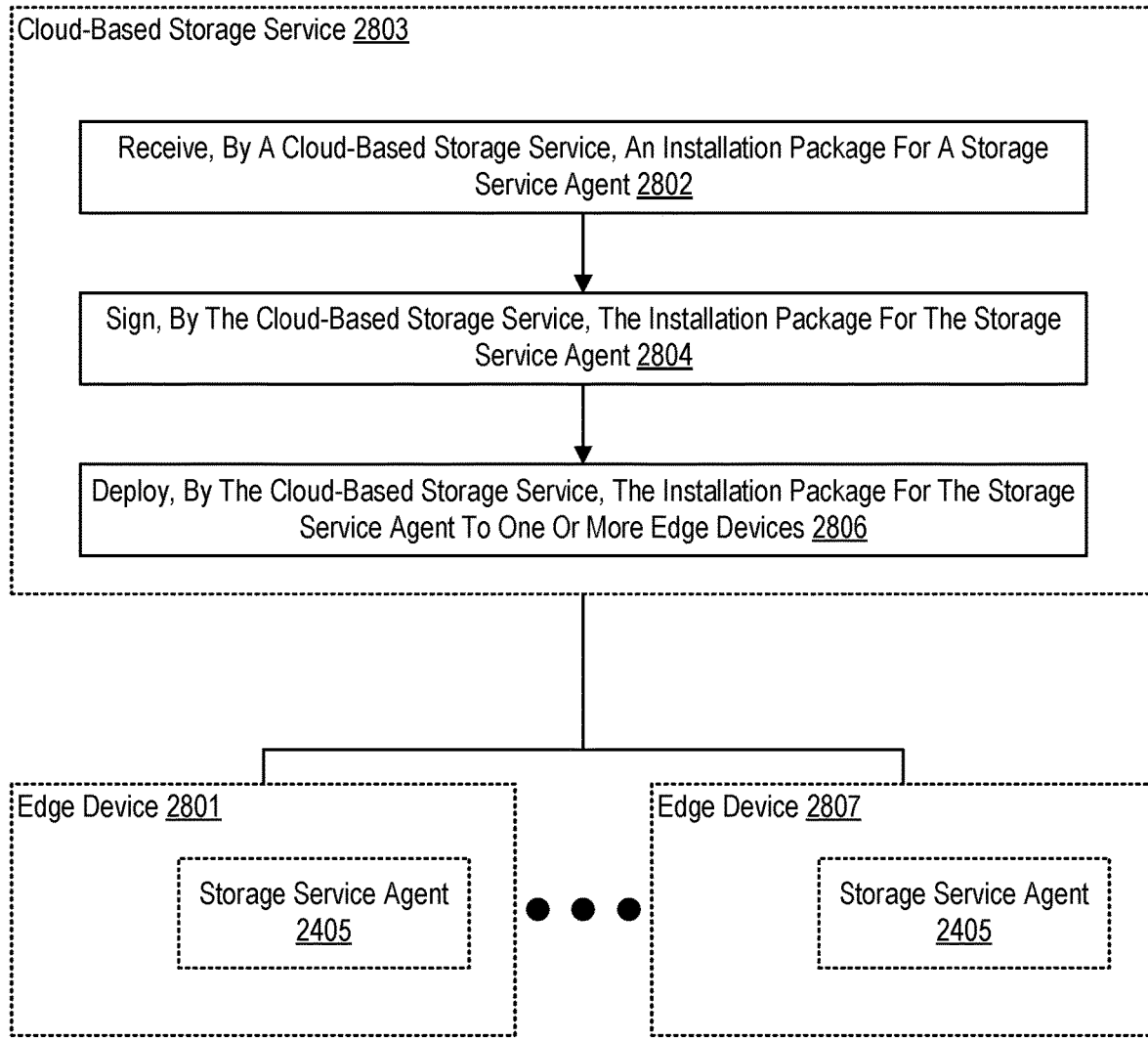
FIG. 28 sets forth a flow chart illustrating an additional example method of employing an edge management service according to some embodiments of the present disclosure.

For further explanation, FIG. 28 sets forth a flow chart illustrating an example method of employing an edge management service according to some embodiments of the present disclosure. The example method of FIG. 28 is directed to aspects of a cloud-based storage service 2803, such as any of the cloud-based storage services described above. In some examples, the cloud-based storage service 2803 includes a control plane for the management of a fleet of enterprise storage systems. In some implementations, the control plane also provides data services for the fleet of enterprise storage systems. In one example, the control plane is a monolithic storage and data services application, which may be embodied in a cloud-compute instance. In other examples, the control plane includes a collection of storage and data microservices. For example, these microservices may be containerized storage and data services applications deployed in the cloud. In such examples, there may be a storage service agent 2805 for each storage microservice of the cloud-based storage service 2803, where the storage service agent is installed on one or more edge devices 2801. In this way, the storage service agent represents a local extension of the corresponding microservice of the cloud-based storage service 2803. In some examples, an edge device 2801 may itself be an enterprise storage system. In some examples, the cloud-based storage service may include an edge management service. In such examples, the edge management service may manage the deployment and update of the storage service agents on the edge devices 2801, as well as the messaging between the control plane of the cloud-based storage service 2803 and the storage service agents 2805 on the edge devices.

The example method of FIG. 28 includes receiving 2802, by a cloud-based storage service 2803, an installation package for a storage service agent 2805. In some examples, as mentioned above, an author or developer of a storage service agent (or software update to a storage service agent) provides a storage service agent package to the cloud-based storage service 2803. The storage service agent package includes, for example, an image file or location of an image file (e.g., a container registry) of the storage service agent 2805 and a manifest for the storage service agent 2805. A manifest, such as those discussed above, for the storage service agent 2805 describes a limited set of storage system APIs accessed by the storage service agent 2805 to carry out the operations of the storage service agent 2805. For example, the manifest may include permission claims and other information as discussed above. A developer may indicate which storage system APIs or API families are called by the storage system agent. Thus, the manifest represents an enumeration of essential storage system APIs. Accordingly, using the manifest, an edge device 2801 may restrict agent access to non-essential storage system APIs. The manifest may also include other information describing runtime behaviors or information specific to particular platforms. The manifest may also include metadata such as an agent name, version, author/developer/team, organization, a description of the agent, and a hash of the image file. In some implementations, the storage service agent package is submitted to the cloud-based storage service 2803 via an API exposed by an edge management service of the cloud-based storage service 2803. In some implementations, the API includes a procedure call (e.g., gRPC) to parse structure data such a JSON or YAML file that embodies the manifest and is provided by the developer. In other implementations, the manifest may be submitted as a standalone JSON or YAML file. Readers will appreciate that a manifest for a storage service agent package may be provided in a variety of other formats.

The method of FIG. 28 also includes signing 2804, by the cloud-based storage service 2803, the installation package for the storage service agent 2805. In some examples, an API call to submit a storage service agent triggers a notification or other indication to administrators or other personnel associated with the cloud-based storage service 2803. For example, a package review team may review the storage agent package and confirm that the permission claims and action types enumerated in the manifest do not exceed the scope of the storage service agent. In other words, a package review team may identify whether the manifest includes a permission claim to an API or API family that is not essential to the functionality to the storage service agent. In some implementations, the edge management service of the cloud-based storage service 2803 exposes an API to approve the agent package. In these implementations, a member of the package review team may invoke this API to approve the agent package. In response to approval of the package, the cloud-based storage service 2803 signs the install package with its digital signature.

The method of FIG. 28 also includes deploying 2806, by the cloud-based storage service 2803, the installation package for the storage service agent 2805 to one or more edge devices 2801, 2807. In some examples, a storage service agent 2405 is deployed to one or more edge devices 2801 in response to request from the administrator of an enterprise storage system. For example, the administrator may request, through a management plane API or user interface of an edge management service, that the storage service agent 2805 be deployed to the edge device 2801. The request may indicate the storage service agent to deploy and which edge devices 2801 on which the storage service agent should be deployed. In response, the edge management service of the cloud-based storage service 2403 may deploy 2806 the storage service agent 2805 by setting a state indicating that the storage service agent 2805 is to be installed on an edge device 2801 and/or sending a message to the edge device 2801 indicating the same. In some implementations, deploying 2806 the storage service agent may include pushing the storage service agent 2805 (i.e., a storage service agent install package) to an edge device 2801. The storage service agent 2805 may be deployed or updated on a per-edge device basis, in that an administrator may wish to deploy the storage service agent on some but not all of the edge devices 2801 for a fleet of enterprise storage systems. Further, the storage service agents may be deployed and updated independently, such that portions of the control plane may be inaccessible during update of the storage service agent without suspending all functionality of the control plane, and without any effect on the data plane. In other words, the edge management service of the cloud-based storage service 2803 may deploy a plurality of storage service agents 2805 to a set of edge devices 2801, and then update a single storage service agent without updating the remaining agents on the set of edge devices, or even just update a single storage service agent on a single edge device.

Figure 29:
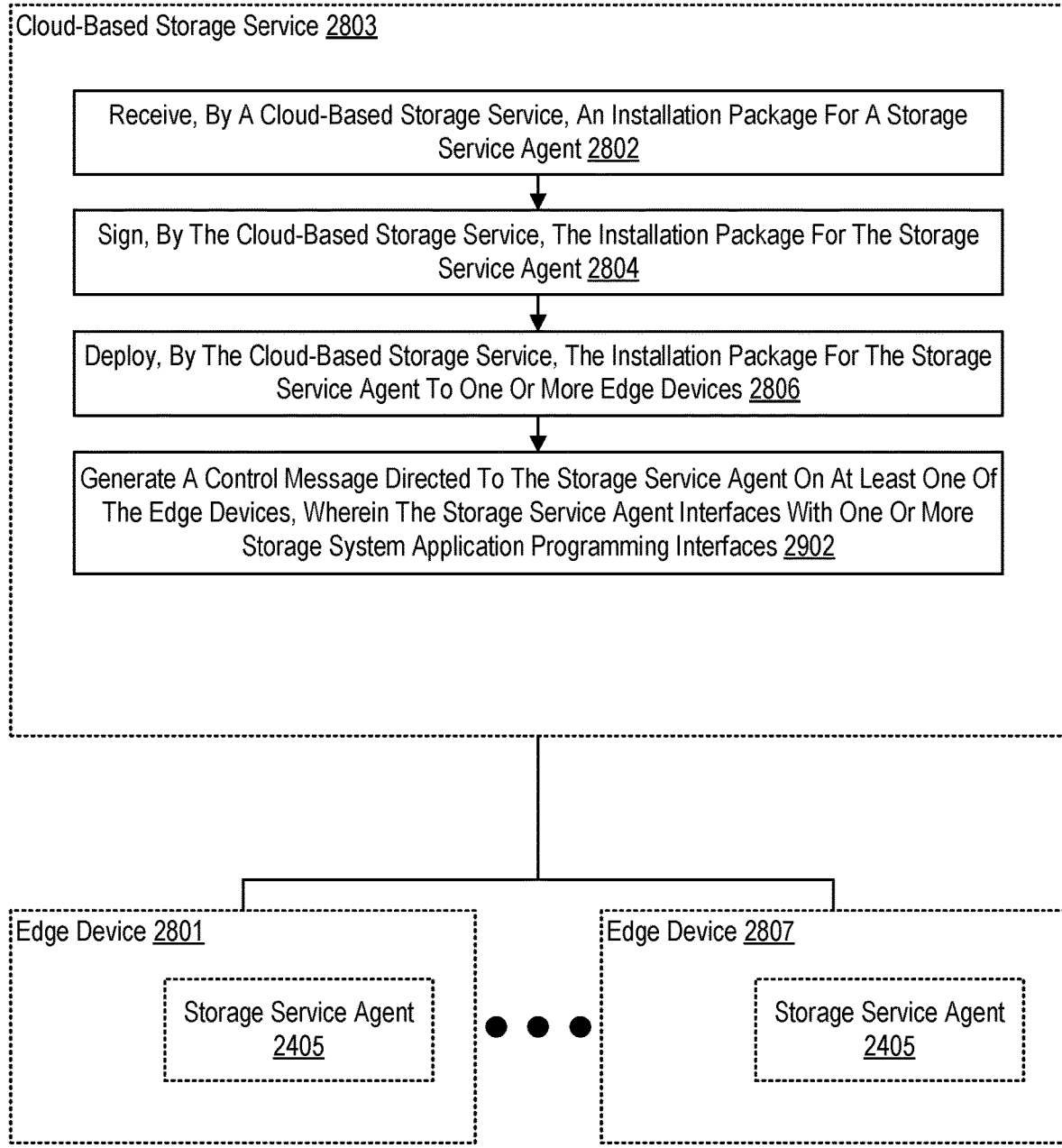
FIG. 29 sets forth a flow chart illustrating an additional example method of employing an edge management service according to some embodiments of the present disclosure.

For further explanation, FIG. 29 sets forth a flow chart illustrating an example method of employing an edge management service according to some embodiments of the present disclosure. The example method of FIG. 29 includes aspects of the example method of FIG. 28. However, the example method of FIG. 29 also includes generating 2902 a control message directed to a storage service agent on at least one of the edge devices, wherein the storage service agent interfaces with one or more storage system application programming interfaces (APIs). In some examples, a control plane of the cloud-based storage service generates a control message directed to a storage service agent 2805 on the edge device 2801. For example, the control message can be an RPC (e.g., a gRPC) to a storage service agent that in turn invokes a storage system API in response to the RPC. In some implementations, the control message is provided by the control plane to an EMS messaging service in the cloud-based storage service 2803. In these implementations, the EMS messaging service may provide the control message to an EMS client of the edge device 2801. In some examples, the control message may be embodied in an IoT message that is received by the edge device 2801 through the IoT messaging layer. As one example, a storage orchestration microservice of the cloud-based storage service 2803 may publish an RPC directed to a storage orchestration agent on the edge device 2801, where the RPC is a call to create a new volume.

Example embodiments are described largely in the context of a fully functional computer system. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

Embodiments can include be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to some embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
configuring, on an edge device, a storage service agent to access a particular set of storage system application programming interfaces (APIs) of an enterprise storage system, the storage service agent communicatively coupled to a cloud-based storage service; and
invoking, by the storage service agent in response to a control message from the cloud-based storage service, one or more storage system APIs of the particular set of storage system APIs.

2. The method of claim 1, wherein the edge device is one of a component of the enterprise storage system, a server collocated with the enterprise storage system, and a virtual device.

3. The method of claim 1, wherein the cloud-based storage service includes at least one of a cloud-based control plane, a cloud-based storage orchestrator, and a set of storage microservices.

4. The method of claim 1, wherein the storage service agent is a containerized application deployed by the cloud-based storage service.

5. The method of claim 1, wherein the particular set of storage system APIs is a subset of a storage system API library; and wherein the access is restricted to the particular set of storage system APIs.

6. The method of claim 1, wherein a data communications link between the storage service agent and the cloud-based storage service includes an Internet-of-Things (IoT) messaging layer.

7. The method of claim 6, wherein a messaging service of the cloud-based storage service is coupled to a messaging client of the edge device via the IoT messaging layer; wherein a plurality of microservices the cloud-based storage service utilize the messaging service for sending control messages to a plurality of storage service agents on the edge device.

8. The method of claim 1, wherein configuring, on an edge device, a storage service agent to access a particular set of storage system APIs of at least one enterprise storage system includes:
identifying one or more storage system API permission claims associated with the storage service agent; and
assigning, to the storage service agent in dependence upon the one or more permission claims, one or more storage system API access tokens corresponding to the particular set of storage system APIs.

9. The method of claim 1, wherein invoking, by the storage service agent in response to a control message from the cloud-based storage service, one or more storage system APIs of the particular set of storage system APIs includes:
determining whether the storage service agent is permitted to access the one or more storage system APIs.

10. The method of claim 1 further comprising:
identifying, from the cloud-based storage service, an indication to install the storage service agent on the edge device;
obtaining, in response to identifying the indication to install the storage service agent, an agent install package for the storage service agent;
installing, from the agent install package, the storage service agent on the edge device.

11. The method of claim 10, wherein the agent install package include a manifest that describes storage system API permission claims for the storage service agent.

12. The method of claim 10, wherein a permission claim identifies a storage system API family and one or more types of actions for the identified storage system API family.

13. The method of claim 10, wherein the agent install package is signed by an authority associated with the cloud-based storage service.

14. A method comprising:
- receiving, by a cloud-based storage service, an installation package for a storage service agent, wherein the storage service agent is a local extension of a microservice provided by the cloud-based storage service;
- signing, by the cloud-based storage service, the installation package for the storage service agent; and
- deploying, by the cloud-based storage service, the installation package for the storage service agent to one or more edge devices.

15. The method of claim 14, wherein the installation package includes a manifest for the storage service agent; and wherein the manifest identifies one or more storage permission claims for one or more storage system application programming interfaces (APIs).

16. The method of claim 14, wherein the installation package for the storage service agent is signed in response to an indication that the installation package has been verified by a human user.

17. The method of claim 14, wherein the cloud-based storage service deploys a plurality of storage service agents to each of the one or more edge devices; and wherein a software update to a single storage service agent is deployed to the one or more edge devices.

18. The method of claim 14 further comprising:
- generating a control message directed to the storage service agent on at least one of the one or more edge devices, wherein the storage service agent interfaces with one or more storage system application programming interfaces.

19. An apparatus comprising a computer processor, a computer memory operatively coupled to the computer processor, the computer memory having disposed within it computer program instructions that, when executed by the computer processor, cause the apparatus to:
- configure, on an edge device, a storage service agent to access a particular set of storage system application programming interfaces (APIs) of at least one enterprise storage system, the storage service agent communicatively coupled to a cloud-based storage service; and
- invoke, by the storage service agent in response to a control message from the cloud-based storage service, one or more storage system APIs of the particular set of storage system APIs.

* * * * *